US009860132B2

(12) United States Patent
Beshai

(10) Patent No.: US 9,860,132 B2
(45) Date of Patent: *Jan. 2, 2018

(54) MULTIPLE PETABIT-PER-SECOND SWITCHING SYSTEM BASED ON ORTHOGONAL FORMATIONS OF SETS OF ACCESS NODES

(71) Applicant: Maged E. Beshai, Maberly (CA)

(72) Inventor: Maged E. Beshai, Maberly (CA)

( * ) Notice: Subject to any disclaimer, the term of this patent is extended or adjusted under 35 U.S.C. 154(b) by 127 days.

This patent is subject to a terminal disclaimer.

(21) Appl. No.: 14/715,604

(22) Filed: May 19, 2015

(65) Prior Publication Data

US 2015/0256410 A1     Sep. 10, 2015

Related U.S. Application Data

(63) Continuation-in-part of application No. 14/071,576, filed on Nov. 4, 2013, now Pat. No. 9,054,979.

(51) Int. Cl.
*H04L 12/50* (2006.01)
*H04L 12/24* (2006.01)
*H04L 12/933* (2013.01)
*H04L 12/947* (2013.01)
*H04L 12/937* (2013.01)

(52) U.S. Cl.
CPC .............. *H04L 41/12* (2013.01); *H04L 49/15* (2013.01); *H04L 49/25* (2013.01); *H04L 49/254* (2013.01)

(58) Field of Classification Search
None
See application file for complete search history.

(56) References Cited

U.S. PATENT DOCUMENTS

| 5,798,580 | A  | * | 8/1998  | Morozov    | H04L 49/254 |
|           |    |   |         |            | 307/112 |
| 5,896,380 | A  | * | 4/1999  | Brown      | H04L 12/5601 |
|           |    |   |         |            | 370/388 |
| 6,233,243 | B1 | * | 5/2001  | Ganmukhi   | H04L 45/06 |
|           |    |   |         |            | 370/412 |
| 2002/0039362 | A1 | * | 4/2002  | Fisher    | H04Q 3/68 |
|           |    |   |         |            | 370/387 |
| 2002/0159445 | A1 | * | 10/2002 | Yanagimachi | H04L 49/251 |
|           |    |   |         |            | 370/355 |
| 2003/0053417 | A1 | * | 3/2003  | Munter    | H04L 49/10 |
|           |    |   |         |            | 370/244 |
| 2003/0058845 | A1 | * | 3/2003  | Tierling  | H03M 11/20 |
|           |    |   |         |            | 370/357 |

(Continued)

*Primary Examiner* — Brandon Renner

(57) ABSTRACT

A switching system having a number of nodes interfacing with external network elements and interconnected through independent switches is disclosed. The network may serve as a large-scale data center or a geographically distributed network. The nodes are arranged into a number of formations. Within each formation, the nodes are divided into a number of disjoint sets of nodes. The nodes of each set of nodes are interconnected through a respective switch and are selected so that each set of nodes of any formation is orthogonal to each set of nodes of each other formation. With such a structure, each node has a set of routes to each other node, each route of which traversing at most two switches. The switching system may grow in both capacity and coverage without disturbing an already installed configuration. A switching system of an access capacity of multiple petabits/sec and large coverage is thus realizable.

14 Claims, 80 Drawing Sheets

(56) References Cited

U.S. PATENT DOCUMENTS

| | | | | |
|---|---|---|---|---|
| 2003/0147393 | A1* | 8/2003 | Stewart | H04L 45/10 370/392 |
| 2005/0180410 | A1* | 8/2005 | Pepenella | H04J 3/1611 370/386 |
| 2007/0140230 | A1* | 6/2007 | Beshai | H04L 45/60 370/360 |
| 2008/0125055 | A1* | 5/2008 | Choi | G06F 3/04883 455/68 |
| 2008/0317015 | A1* | 12/2008 | Beshai | H04L 49/15 370/380 |
| 2012/0045204 | A1* | 2/2012 | Beshai | H04J 14/0284 398/45 |
| 2013/0279508 | A1* | 10/2013 | Kano | H04L 45/742 370/392 |
| 2014/0140216 | A1* | 5/2014 | Liu | H04L 45/125 370/238 |

* cited by examiner

1900
Routing rules:
node 120(x,y) to
node 120(u,v)

| | First switch order 1910 | Second switch order 1912 | Intermediate-node coordinates 1914 | Intermediate-node index relative to first switch 1916 | Destination-node index relative to second switch 1918 |
|---|---|---|---|---|---|
| 1920 | Primary (x) | Secondary (v) | x, v | v | u |
| | | Tertiary $\|u-v\|_m$ | x, $(x+v-u)$ modulo m | $(x+v-u)$ modulo m | u |
| 1940 | Secondary (y) | Primary (u) | u, y | u | v |
| | | Tertiary $\|u-v\|_m$ | $(y+u-v)$ modulo m, y | $(y+u-v)$ modulo m | u |
| 1960 | Tertiary $\|x-y\|_m$ | Primary (u) | u, $(y+u-x)$ modulo m | u | v |
| | | Secondary (v) | $(v-y+x)$ modulo m, v | $(v-y+x)$ modulo m | u |

FIG. 19

4600
Routing Table of Switch 200(2, 4)
Configuration of FIG. 37

820(43)

| Destination node | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| 4610 Switch Order 3 | 43 | 39 | 20 | 09 | 05 | 43 | ▨ | 28 | 24 | 05 | ▨ | 39 | 28 | 24 | 20 | 09 |
| 2 |    |    |    |    |    |    | ▨ |    |    |    | ▨ |    |    |    |    |    |
| 1 | 09 | 43 | 43 | 28 | 20 | 05 | ▨ | 24 | 09 | 09 | ▨ | 28 | 20 | 05 | 39 | 24 |
| 0 | 28 | 28 | 39 | 39 | 39 | 39 | ▨ | 39 | 39 | 43 | ▨ | 43 | 43 | 43 | 43 | 43 |

| Destination node | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| 4610 Switch Order 3 | 39 | 28 | 24 | ▨ | 43 | 39 | 28 | ▨ | 20 | 09 | 05 | ▨ | 24 | 20 | 09 | 05 |
| 2 |    |    |    | ▨ |    |    |    | ▨ |    |    |    | ▨ |    |    |    |    |
| 1 | 09 | 43 | 28 | ▨ | 20 | 05 | 39 | ▨ | 09 | 43 | 28 | ▨ | 20 | 05 | 39 | 24 |
| 0 | 20 | 20 | 20 | ▨ | 24 | 24 | 24 | ▨ | 24 | 24 | 24 | ▨ | 28 | 28 | 28 | 28 |

4640

| Destination node | 00 | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|---|
| 4610 Switch Order 3 | 39 | 28 | 24 | 20 | 09 | ▨ | 43 | 24 | 20 | ▨ | 05 | 43 | 39 | 28 | 09 |    | 43 |
| 2 |    |    |    |    |    | ▨ |    |    |    | ▨ |    |    |    |    |    | 05 |    |
| 1 | 24 | 09 | 43 | 28 | 20 | ▨ | 39 | 39 | 24 | ▨ | 43 | 28 | 20 | 05 | 05 | 39 | 24 |
| 0 | 05 | 05 | 05 | 05 | 05 | ▨ | 05 | 09 | 09 | ▨ | 09 | 09 | 09 | 09 | 20 | 20 | 20 |

4620 intermediate node

*FIG. 46*

FIG. 50 m = 7, originating node 820(11), destination node 820(43)

5000 Route sets

5020 G = 2

| 0 | 1 |
|---|---|
| × | 10 |
| 44 | × |

5030 G = 3

| 0 | 1 | 2 |
|---|---|---|
| × | 10 | 09 |
| 44 | × | 28 |
| 45 | 26 | × |

Sink switch order 5014
Intermediate node 5016

5040 G = 4

| 0 | 1 | 2 | 3 |
|---|---|---|---|
| × | 10 | 09 | × |
| 44 | × | 28 | × |
| 45 | 26 | × | × |
| × | × | × | 43 |

Source switch order 5012
Intermediate node is the destination node 5018

7000 Connectivity of nodes to switches

| η (7010 Node index) | Formation: k, 0≤k≤m | | | | | |
|---|---|---|---|---|---|---|
| | 0 | 1 | 2 | 3 | 4 | 5 |
| 0 | 0 | 0 | 0 | 0 | 0 | 0 |
| 1 | 0 | 4 | 3 | 2 | 1 | 1 |
| 2 | 0 | 3 | 1 | 4 | 2 | 2 |
| 3 | 0 | 2 | 4 | 1 | 3 | 3 |
| 4 | 0 | 1 | 2 | 3 | 4 | 4 |
| 5 | 1 | 1 | 1 | 1 | 1 | 0 |
| 6 | 1 | 0 | 4 | 3 | 2 | 1 |
| 7 | 1 | 4 | 2 | 0 | 3 | 2 |
| 8 | 1 | 3 | 0 | 2 | 4 | 3 |
| 9 | 1 | 2 | 3 | 4 | 0 | 4 |
| 10 | 2 | 2 | 2 | 2 | 2 | 0 |
| 11 | 2 | 1 | 0 | 4 | 3 | 1 |
| 12 | 2 | 0 | 3 | 1 | 4 | 2 |
| 13 | 2 | 4 | 1 | 3 | 0 | 3 |
| 14 | 2 | 3 | 4 | 0 | 1 | 4 |

7020 Index of switch group

7030 Switch order π

*FIG. 70*

7100 Routing arrays

| From node | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 |   | 0 | 0 | 0 | 0 | 5 | 1 | 3 | 2 | 4 | 5 | 2 | 1 | 4 | 3 |
| 1 | 0 |   | 0 | 0 | 0 | 4 | 5 | 1 | 3 | 2 | 3 | 5 | 2 | 1 | 4 |
| 2 | 0 | 0 |   | 0 | 0 | 2 | 4 | 5 | 1 | 3 | 4 | 3 | 5 | 2 | 1 |
| 3 | 0 | 0 | 0 |   | 0 | 3 | 2 | 4 | 5 | 1 | 1 | 4 | 3 | 5 | 2 |
| 4 | 0 | 0 | 0 | 0 |   | 1 | 3 | 2 | 4 | 5 | 2 | 1 | 4 | 3 | 5 |
| 5 | 5 | 4 | 2 | 3 | 1 |   | 0 | 0 | 0 | 0 | 5 | 5 | 5 | 5 | 5 |
| 6 | 1 | 5 | 4 | 2 | 3 | 0 |   | 0 | 0 | 0 | 4 | 4 | 4 | 4 | 4 |
| 7 | 3 | 1 | 5 | 4 | 2 | 0 | 0 |   | 0 | 0 | 2 | 2 | 2 | 2 | 2 |
| 8 | 2 | 3 | 1 | 5 | 4 | 0 | 0 | 0 |   | 0 | 3 | 3 | 3 | 3 | 3 |
| 9 | 4 | 2 | 3 | 1 | 5 | 0 | 0 | 0 | 0 |   | 1 | 1 | 1 | 1 | 1 |
| 10 | 5 | 3 | 4 | 1 | 2 | 5 | 4 | 2 | 3 | 1 |   | 0 | 0 | 0 | 0 |
| 11 | 2 | 5 | 3 | 4 | 1 | 1 | 5 | 4 | 2 | 3 | 0 |   | 0 | 0 | 0 |
| 12 | 1 | 2 | 5 | 3 | 4 | 3 | 1 | 5 | 4 | 2 | 0 | 0 |   | 0 | 0 |
| 13 | 4 | 1 | 2 | 5 | 3 | 2 | 3 | 1 | 5 | 4 | 0 | 0 | 0 |   | 0 |
| 14 | 3 | 4 | 1 | 2 | 5 | 4 | 2 | 3 | 1 | 5 | 0 | 0 | 0 | 0 |   |

7110 Index of originating node
7120 Index of destination node
7130 Index of switch group

*FIG. 71*

Routes from node 820(9) to node 820(12)
μ=3, m=5
Number of compound routes: μ×m−2 = 13

| First switch | (0, 1) | | | | (1, 2) | | (2, 3) | (3, 4) | | (4, 0) | | (5, 4) | |
|---|---|---|---|---|---|---|---|---|---|---|---|---|---|
| Intermediate node | 5 | 6 | 7 | 8 | 3 | 10 | 1 | 2 | 11 | 0 | 13 | 4 | 14 |
| Second switch | (3, 1) | (1, 0) | (5, 2) | (4, 4) | (3, 1) | (0,2) | (2, 3) | (5, 2) | (0,2) | (1, 0) | (0,2) | (4, 4) | (0, 2) |

Routes from node 820(9) to node 820(6)
μ=3, m=5
Number of compound routes: m×μ−2 = 13

| First switch | (0, 1) | | (1, 2) | | (2, 3) | | (3, 4) | | (4, 0) | | (5, 4) | | |
|---|---|---|---|---|---|---|---|---|---|---|---|---|---|
| Intermediate node | 5 | 7 | 8 | 3 | 10 | 1 | 12 | 2 | 11 | 0 | 13 | 4 | 14 |
| Second switch | (0, 1) | (2, 4) | (4, 2) | (5, 1) | (1,0) | (4, 2) | (5,1) | (3,3) | (1, 0) | (3,3) | (2, 4) |

FIG. 78

Routes from node 820(9) to node 820(12)
μ=5, m=5
Number of compound routes: μ×m−2 = 23

| First switch | (0, 1) | | | | (1, 2) | | | | (2, 3) | | |
|---|---|---|---|---|---|---|---|---|---|---|---|
| Intermediate node | 5 | 6 | 7 | 8 | 3 | 10 | 16 | 22 | 1 | 15 | 23 |
| Second switch | (3, 1) | (1, 0) | (5, 2) | (4, 4) | (3, 1) | (0, 2) | (4, 4) | (5, 2) | | | (2, 3) |

| First switch | (3, 4) | | | | (4, 0) | | | | (5, 4) | | | |
|---|---|---|---|---|---|---|---|---|---|---|---|---|
| Intermediate node | 2 | 11 | 18 | 20 | 0 | 13 | 17 | 21 | 4 | 14 | 19 | 24 |
| Second switch | (5, 2) | (0, 2) | (1, 0) | (4, 4) | (1, 0) | (0, 2) | (5, 2) | (3, 1) | (4, 4) | (0, 2) | (3, 1) | (1, 0) |

*FIG. 79*

Routes from node 820(9) to node 820(6)
μ=5, m=5
Number of compound routes: μ×m−2 = 23

| First switch | (0, 1) | | | (1, 2) | | | | (2, 3) | | |
|---|---|---|---|---|---|---|---|---|---|---|
| Intermediate node | 5 | 7 | 8 | 3 | 10 | 16 | 22 | 1 | 12 | 15 | 23 |
| Second switch | (0, 1) | | | (2, 4) | (4, 2) | (5, 12) | (3, 3) | (5, 1) | (1, 0) | (3, 3) | (4, 2) |

| First switch | (3, 4) | | | (4, 0) | | | | (5, 4) | | |
|---|---|---|---|---|---|---|---|---|---|---|
| Intermediate node | 2 | 11 | 18 | 20 | 0 | 13 | 17 | 21 | 4 | 14 | 19 | 24 |
| Second switch | (4, 2) | (5,1) | (1, 0) | (2, 4) | (1, 0) | (3,3) | (2,4) | (5, 1) | (3, 3) | (2, 4) | (4, 2) | (1, 0) |

*FIG. 80*

MULTIPLE PETABIT-PER-SECOND SWITCHING SYSTEM BASED ON ORTHOGONAL FORMATIONS OF SETS OF ACCESS NODES

CROSS-REFERENCE TO RELATED APPLICATIONS

This application is a continuation in part of U.S. patent application Ser. No. 14/071,576, the specification of which is incorporated herein by reference.

FIELD OF THE INVENTION

The present invention relates to telecommunications networks and, in particular, to data-switching systems that scale to high capacities and wide coverage.

BACKGROUND

A telecommunications network is a medium for selectively transferring data from data sources to data sinks. The complexity of the network, its performance, and cost depend heavily on the network's architecture. In particular, the control complexity of a packet-switching network increases sharply, and the performance deteriorates, as the network diameter increases; the network diameter being a metric determined as a function of the number of intervening switching-routing apparatus between a data source and a data sink. An individual switching-routing apparatus is typically implemented as a multi-stage switching system and its complexity, performance, and cost are influenced by the number of switching processes within the apparatus.

It is, therefore, desirable to explore an alternative network structure which permits scalability to wide coverage and high capacity while providing operational simplicity, high performance, and overall efficiency. It is also desirable that such a structure be applicable to the construction of an individual switching-routing apparatus.

SUMMARY

The present invention provides a data switching system of a number of nodes, interfacing with external network elements, interconnected through independent switches. The switching system may serve as a large-scale switching center or a geographically distributed network. The switching system may grow in both capacity and coverage without disturbing an already installed configuration. A global network providing an access capacity of multiple petabits/sec and coverage of a million nodes with a relatively small number of hops per connection is realizable.

In accordance with one aspect, the switching system has a plurality of switches arranged into a number of switch groups, each switch group containing a respective number of switches, and a plurality of nodes. Each node connects to one switch in each switch group. Consequently, all sets of nodes connecting to different switches of a same switch group are mutually disjoint. Each switch connects to a respective number of nodes and a set of nodes connecting to any switch of any switch group is orthogonal to a set of nodes connecting to any switch of any other switch group.

In one configuration, a selected switch group comprises a first number, $\mu$, $\mu > 1$, of switches while each other switch group comprises a second number, m, $m \geq \mu$, of switches. Each switch of the selected switch group connects to m nodes while each switch of each other switch group connects to $\mu$ nodes. Thus, the total number of nodes of the switching system is $\mu \times m$.

Preferably, each node connects to an external network element through at least one dual channel. However, some nodes may connect only to switches. To form a switching system, at least three nodes connect to external network elements, such as data sources and sinks.

Each node comprises a respective node controller and each switch comprises a respective switch controller. The node controllers and switch controllers form a distributed control system. A node controller has at least one processor and memory devices storing nodal routing tables or encoded nodal routing rules. Likewise, a switch controller has at least one processor, and memory devices storing switch routing table or encoded switch routing rules. A switch controller of a switch is communicatively coupled to node controllers of a respective number of nodes connecting to the switch.

A node controller of a given node maintains identifiers of adjacent nodes. A switch controller of a given switch maintains identifiers of nodes connecting to the switch and descriptors of at least one route from the switch to each distant node of the switch, a distant node being a node connecting to any other switch. The descriptors may include an index of each node connecting to the switch which is also adjacent to a distant node of the switch.

In a fully populated switching system, each switch connects to a same number, m, of nodes and each switch group contains m switches. The order of the switching system, i.e., the number of switch groups, is at least 2 and at most (m+1) and the number of supported nodes is $m^2$ regardless of the order of the switching system.

In one arrangement, selecting m to be a prime number exceeding 2, a switch of index $\pi$, $0 \leq \pi < m$, in a switch group of index k connects to m nodes of indices: $(j+j \times m \times k+m \times \pi)_{modulo\ M}$, $0 \leq j < m$, for $0 \leq k < m$, where $M = m^2$. A switch of switch group m connects to m nodes of indices $(j \times m + \pi)$, $0 \leq j < m$. The m switches of said each switch group are individually indexed as 0 to (m−1), and nodes are individually index as 0 to (M−1).

In an alternate arrangement of a fully configured switching system, with m selected as a prime number exceeding 2, a switch of switch group 0 connects to m nodes of indices $(j+m \times \pi)$, $0 \leq j < m$. A switch of index $\pi$, $0 \leq \pi < m$, in a switch group of index k connects to nodes of indices $(j \times m + (k \times j - j + \pi))_{modulo\ m})$, $0 \leq j < m$, for $1 \leq k \leq m$.

A partially populated switching system supports a number N of nodes at least equal to $2 \times m$. The number N may increase to $m^2$ to form a fully populated switching system.

According to the first arrangement, a node of index $\eta$, $0 \leq \eta < N$, connects to a switch of index $\pi$ in a switch group of index k, where $\pi$ is determined as: $\pi = (\lfloor \eta n/m \rfloor - k \times \eta)_{modulo\ m}$, for $0 \leq k < m$. The node of index $\eta$ connects to a switch of index $\eta_{modulo\ m}$, in a switch group of index m. The N nodes are indexed as 0 to (N−1), and the switches of each switch group are indexed sequentially in steps of 1 starting from 0.

According to the second arrangement, a node of index $\eta$, $0 \leq \eta < N$, connects to a switch of index $\lfloor \eta/m \rfloor$ in a switch group of index 0. The node connects to a switch of index $\pi$ in a switch group of index k where $\pi$ is determined as: $\pi = (\eta - (k-1) \times \lfloor \eta/m \rfloor)_{modulo\ m}$, $1 \leq k \leq m$.

In accordance with another aspect, the present invention provides a method of switching based on arranging a plurality of switches into a number of switch groups and connecting each node of a plurality of nodes to one switch in each switch group. Consequently, all sets of nodes connecting to different switches of a same switch group are mutually disjoint.

The switches to which each node connects are selected so that a set of nodes connecting to any switch of any switch group is orthogonal to a set of nodes connecting to any switch of any other switch group. According to the method, a switch controller of a given switch exchanges control messages with individual node controllers of a respective set of nodes connecting to the switch.

The method further comprises receiving at a node controller of an originating node a request for a connection to a destination node and determining availability of a preferred adjacent switch which directly connects the originating node to the destination node. If the node controller ascertains presence of a switch directly connecting the originating node to the destination node and if a path through the switch has a sufficient vacancy, a connection is established. If the path does not have a sufficient vacancy, or if the node controller determines that the destination node is a distant node with respect to the originating node, the node controller seeks a compound path through any of the adjacent switches of the originating node.

The method further comprises configuring a switch controller of a first switch to route data from an originating node connecting to the first switch to a destination node connecting to a second switch through an intermediate node connecting to both the first switch and the second switch. A node controller of the originating node may cyclically select the first switch from a set of switches to which the originating node connects. Alternatively, the node controller of the originating node may selects the first switch from a set of switches to which the originating node connects according to occupancy of channels connecting the originating node to the set of switches.

To configure a partially populated switching system which lends itself to expansion without disturbing current physical connections of nodes to switches, the method further comprises providing a number of switches for a selected switch group to equal a first number, u of switches less than the maximum number m ($2 \leq \mu < m$). The switching system would be fully populated if $\mu u = m$. Each other switch group would then have m switches, $m \geq \mu$, so that each switch group supports the entire population of $\mu \times m$ nodes which may grow in steps to the maximum number, $m^2$, of nodes. Thus, in a partially populated switching system, each switch of the selected switch group connects to m nodes of a population of $\mu \times m$ nodes and each switch of each other switch group connects to $\mu$ nodes of the population of $\mu \times m$ nodes.

A switching system, whether partially populated or fully populated, provides a path from each node to each other node traversing only one switch if the switching system is provisioned to have the maximum number (m+1) of switch groups so that each node is adjacent to each other node in one switch group, m being the maximum number of dual ports per switch. The number m of dual ports excludes ports which may be used for control purposes. A switching system configured to include the maximum number of switch groups is called a "contiguous switching system" since it renders each directed node pair an adjacent node pair. In a contiguous switching system, whether partially populated or fully populated, each node is a neighbor of each other node in one node set. There is a short path traversing only one switch and a number ($\mu \times m - 2$) compound path from each node to each other node, where $\mu$ is the number of switches of the selected switch group.

Several connectivity patterns of nodes to switches may be devised to comply with the requirement that sets of nodes connecting to switches of different switch groups be mutually orthogonal.

In one embodiment of the present invention, the method comprises selecting the number of nodes per switch to be a predefined number, m, greater than 2 and selecting the number of switches for each switch group to equal the same predefined number m. The number of switch groups is at least 2 but may grow in steps to (m+1). In other words, the order of the switching system may grow from 2 to (m+1). According to this connectivity pattern, the number of nodes populating the switching system is $m^2$ regardless of the order of the switching system. Growing the switching system in this fashion does not increase the coverage (number of nodes) but increases the number of dual ports of each node, thus increasing the number of access ports and increasing the overall capacity of the switching system.

The method comprises selecting m as a prime number and connecting a switch of index $\pi$ in a switch group of index k, $0 \leq k < m$, $0 \leq \pi < m$, to nodes of indices $(j + j \times m \times k + m\pi)_{modulo\ M}$, where $M = m^2$. The m switches of each switch group are individually indexed as 0 to (m-1), and the $m^2$ nodes are individually indexed in steps of 1 starting from 0 to $m^2 - 1$.

In another connectivity pattern of a partially populated switching system, a number N of nodes populating the switching system is selected to be in the range $(2 \times m) \leq N \leq m^2$. With m selected to be a prime number, a node of index $\eta$ is connected to a switch of index $\pi$ in a switch group of index k, where $\pi$ is determined as: $\pi = (\lfloor \eta/m \rfloor - k \times \eta)_{modulo\ m}$, $0 \leq k < m$.

In accordance with a further aspect, the present invention provides a switching system having a plurality of independent switches interconnecting a plurality of nodes. The nodes are arranged into a number of formations where each formation comprises a respective number of disjoint sets of nodes constituting the entire node population. Thus, each node belongs to one set of nodes in each formation. The nodes of each set of nodes are interconnected through a respective switch. The formations are devised so that each set of nodes of any formation is orthogonal to each set of nodes of each other formation.

In a fully populated switching system, each switch of the plurality of independent switches has a same switch dimension. The number of formations may be selected to be at least two and at most the number of dual ports per switch plus one. A switch dimension is defined herein as a number of dual ports of the switch, excluding any ports which may be used for control purposes rather than handling payload data.

In a partially populated switching system, a selected formation may have a first number, $\mu$, of disjoint sets of nodes, each set of which containing a first number, m, of nodes, while each other formation may have a number, m, of disjoint sets of nodes with each set of nodes containing a number of nodes equal to $\mu$, where $2 \leq \mu \leq m$. The switching system becomes fully populated when $\mu = m$.

In the partially populated switching system supporting a node population of N nodes in the range $(2 \times m) \leq N \leq m^2$, the connectivity pattern according to an embodiment of the present invention is devised so that a node of index $\eta$ belongs to a set of nodes of formation k and index $\pi$ determined as: $\pi = (\lfloor \eta/m \rfloor - k \times \eta)_{modulo\ m}$, $0 \leq k < m$, the N nodes being indexed as 0 to (N-1).

Each node comprises a node controller and each switch comprises a switch controller. Each node comprises a plurality of dual ports divided into a number of inner ports and a number of outer ports. One inner port of each node of a set of nodes of any formation connects to a respective switch while the outer ports connect to external network elements. A node controller is configured to track output vacancy of each dual port of the node.

The switch controller of a given switch is configured to maintain a record of vacancy of output ports of the switch and maintain a routing table identifying routes from the switch to each node of the switching system. The switch controller is further configured to schedule transfer of data from an originating node to a destination node, where the destination node is adjacent to the originating node, both connecting to the same switch, through a simple path or a compound path. A simple path from the originating node traverses the switch to the destination node. A compound path traverses the switch to any intermediate node connecting to the switch then traverses the switch again to the destination node. There is one simple path and, with the number of nodes connecting to the switch exceeding two, a number of compound paths equal to the number of nodes connecting to the switch minus two.

The switch controller schedules transfer of data from an originating node connecting to a first switch to a distant destination node connecting to a second switch through a compound path which traverses the first switch to a node connecting to both the first switch and the second switch, then traverses the second switch to the distant node. In a fully populated non-contiguous switching system of order G, $2 \leq G \leq m$, there are exactly $G \times (G-1)$ compound paths from any node to a distant node. In a partially populated non-contiguous switching system of order G, $2 \leq G \leq m$, there are at least $2 \times (G-1)$ compound paths from any node to a distant node. In a contiguous switching system, whether partially populated or fully populated, $G=(m+1)$ and each node is adjacent to each other node. There is a path traversing one switch and $(\mu \times m - 2)$ compound paths each traversing two switches from each node to each other node, $\mu$ being the number of node sets of the selected formation and m being the number of node sets in each other formation; m is also the maximum number of dual ports per switch, excluding any ports which may be used for control purposes rather than handling payload data.

A node controller of a node connecting to a particular switch has a dedicated time-limited path to a switch controller of the particular switch. Conversely, the switch controller has a dedicated time-limited control path to a node controller of each node connecting to the switch.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Example embodiments of this invention are described below with reference to accompanying drawings, in which.

Figure 3:
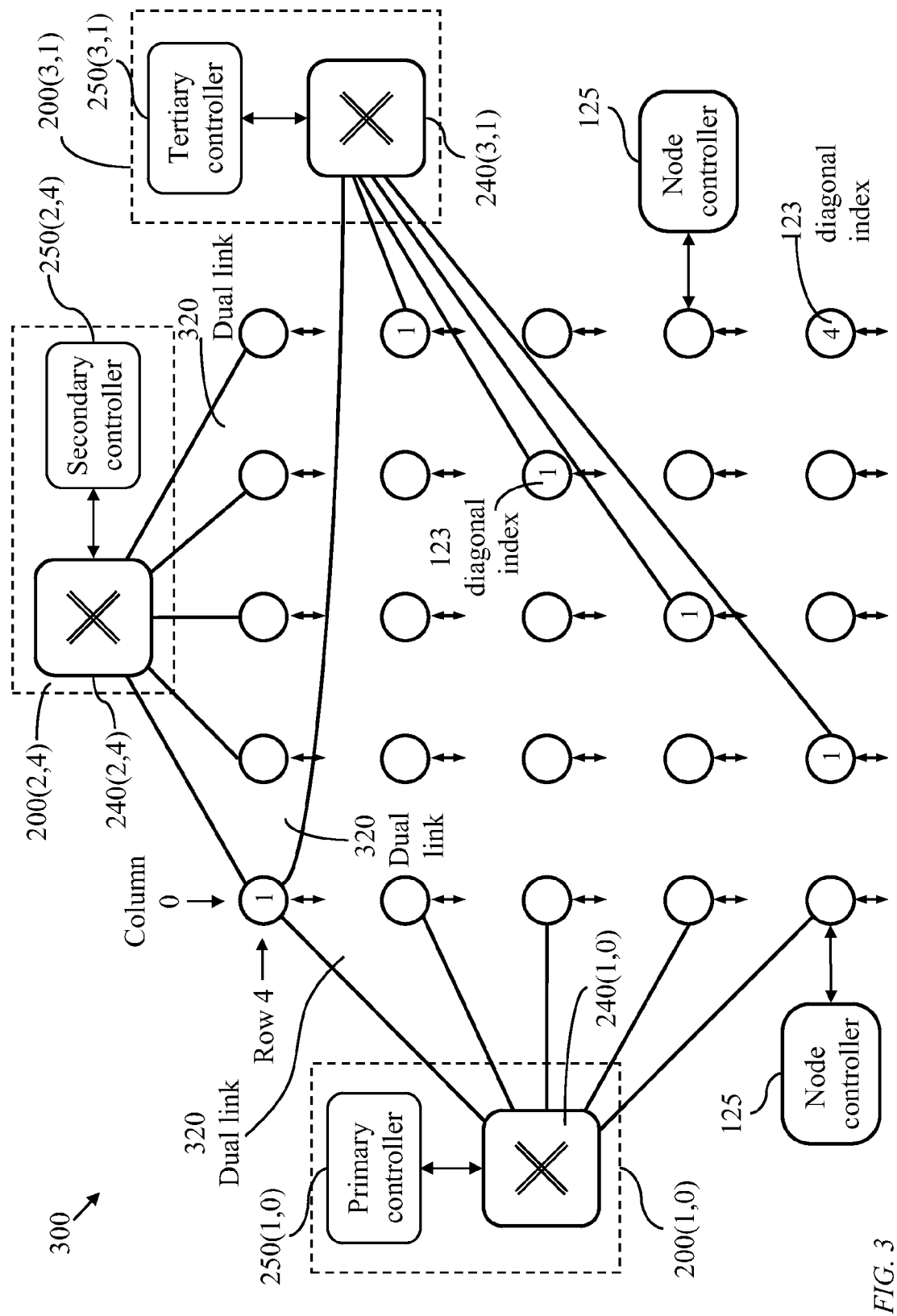
FIG. 3 illustrates a switching system formed by providing a plurality of switches arranged into a group of primary switches, a group of secondary switches, and a group of tertiary switches, each switch interconnecting a respective set of nodes of the plurality of nodes of FIG. 1 where nodes of each column of the matrix of nodes are interconnected through a respective primary switch to form a respective primary star sub-network, nodes of each row of the matrix of nodes are interconnected through a respective switch to form a respective secondary star-subnetwork, and nodes of each diagonal of the matrix of nodes are interconnected through a respective switch to form a respective star sub-network, in accordance with an embodiment of the present invention.
Figure 4:
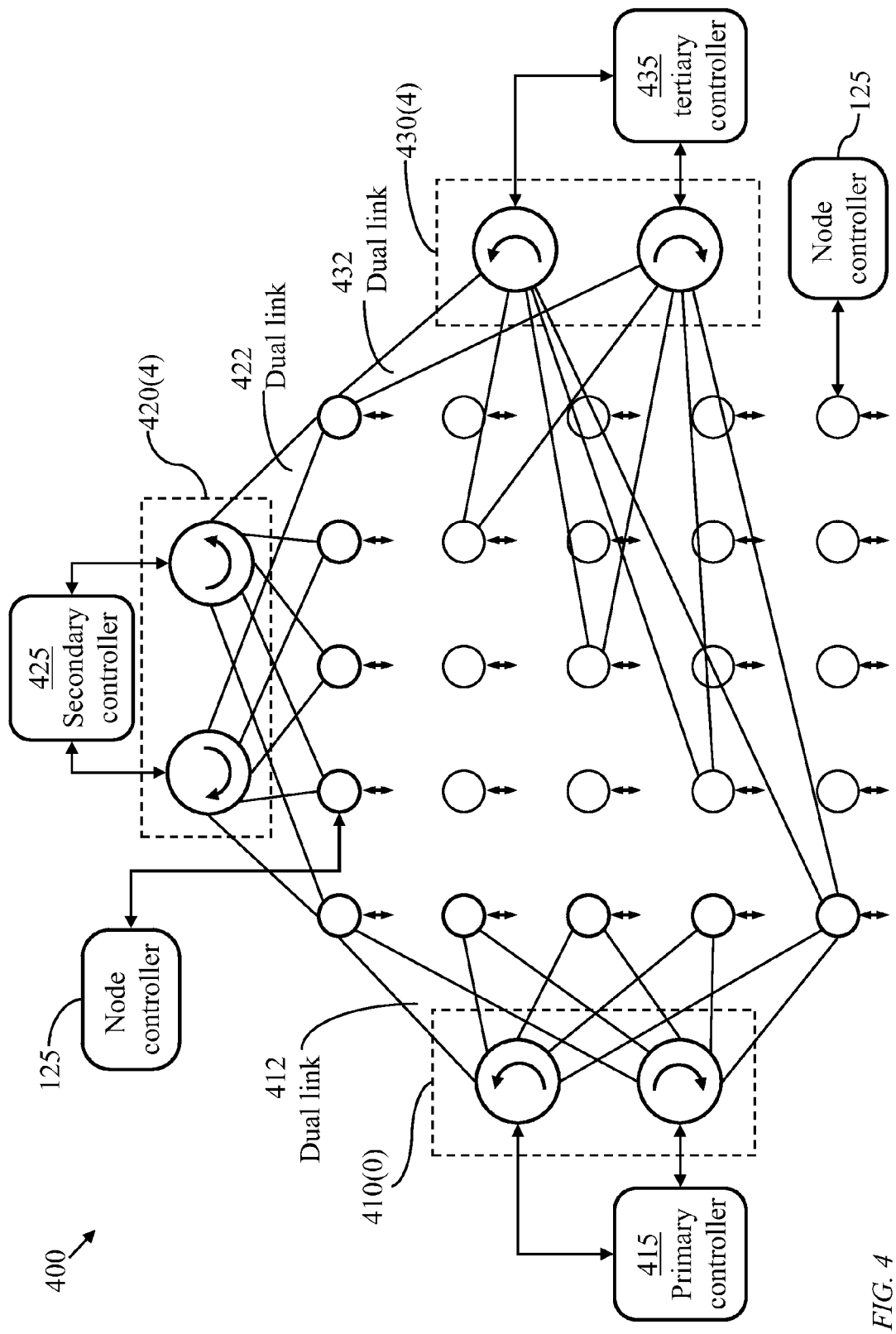
FIG. 4 illustrates a switching system formed by providing a plurality of rotators arranged into a group of primary rotator pairs, a group of secondary rotator pairs, and a group of tertiary rotator pairs, each rotator-pair interconnecting a respective set of nodes, in accordance with an embodiment of the present invention.
Figure 5:
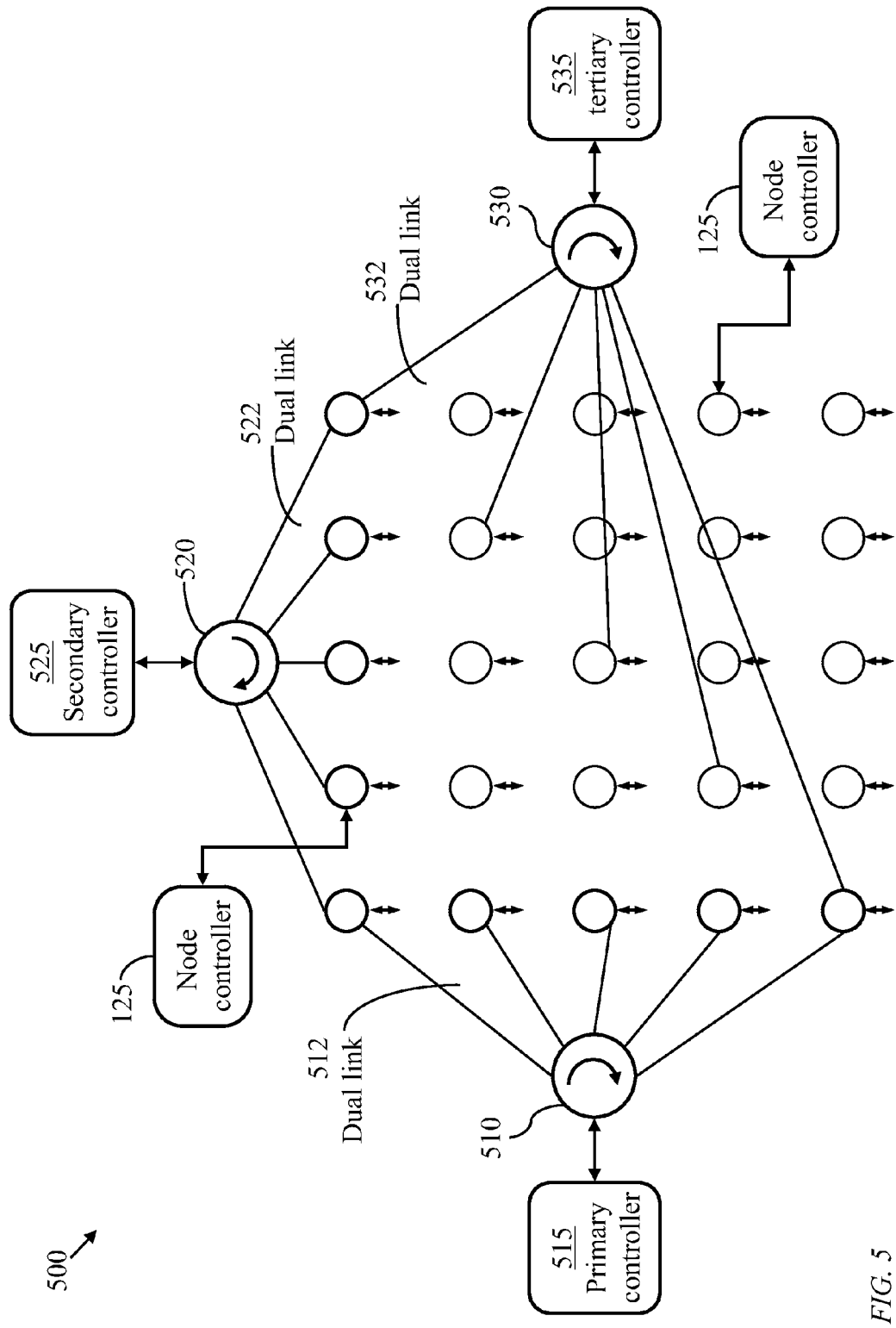
FIG. 5 illustrates a switching system formed by providing a plurality of rotators arranged into a group of primary rotators, a group of secondary rotators, and a group of tertiary rotators, each rotator interconnecting a respective set of nodes of the plurality of nodes of FIG. 1 in time-alternating modes, in accordance with an embodiment of the present invention.
Figure 20:
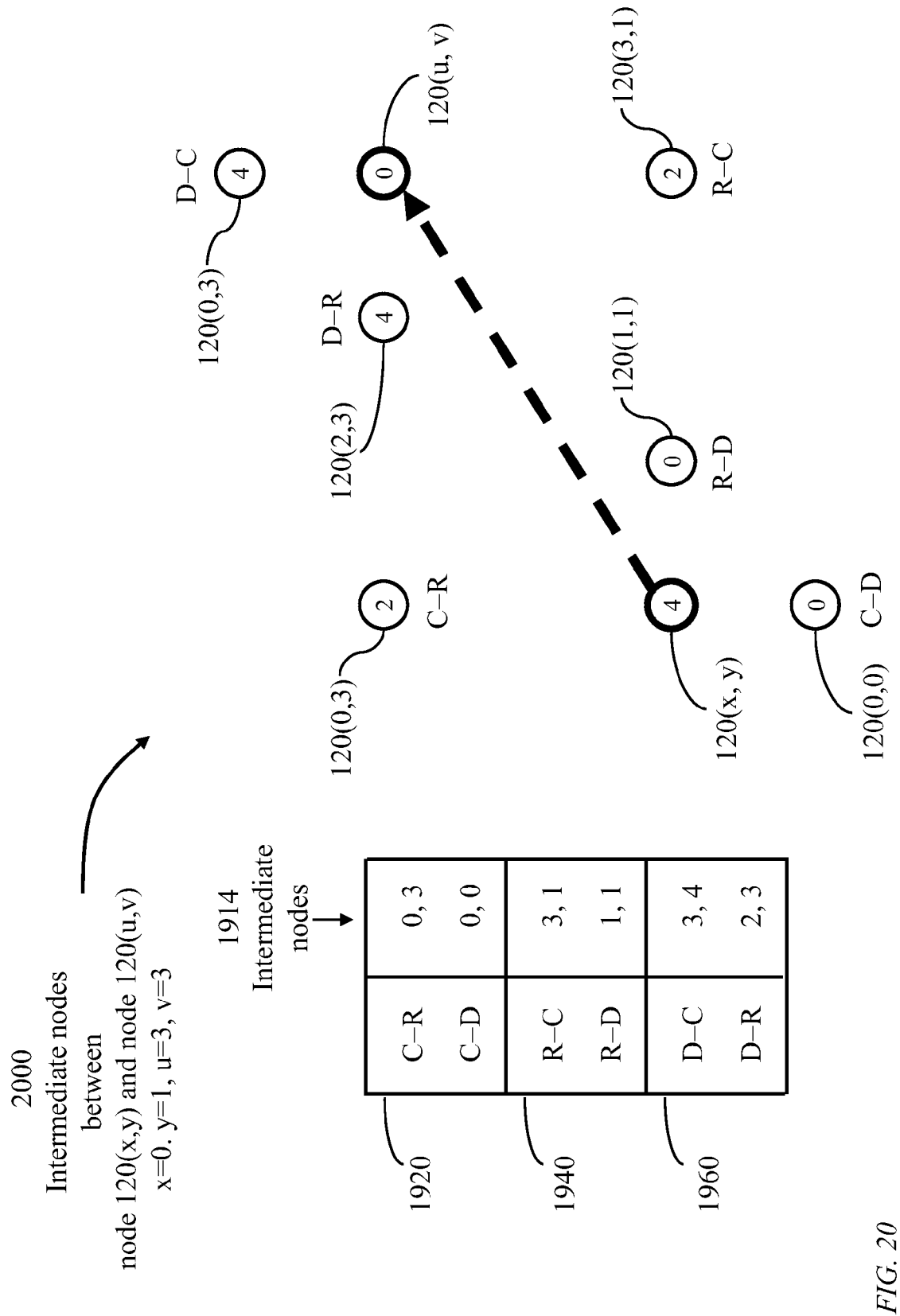
Figure 21:
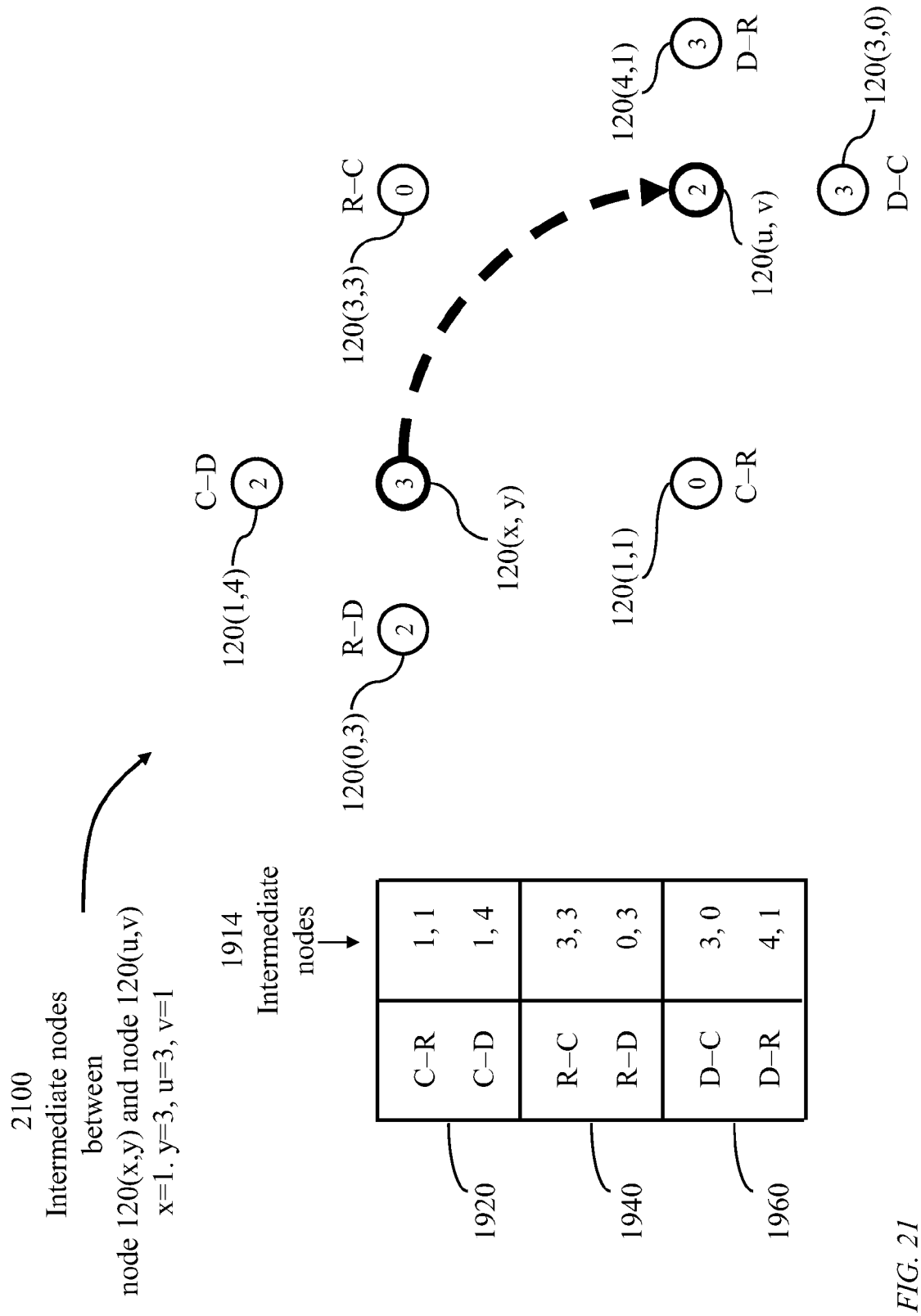
Figure 22:
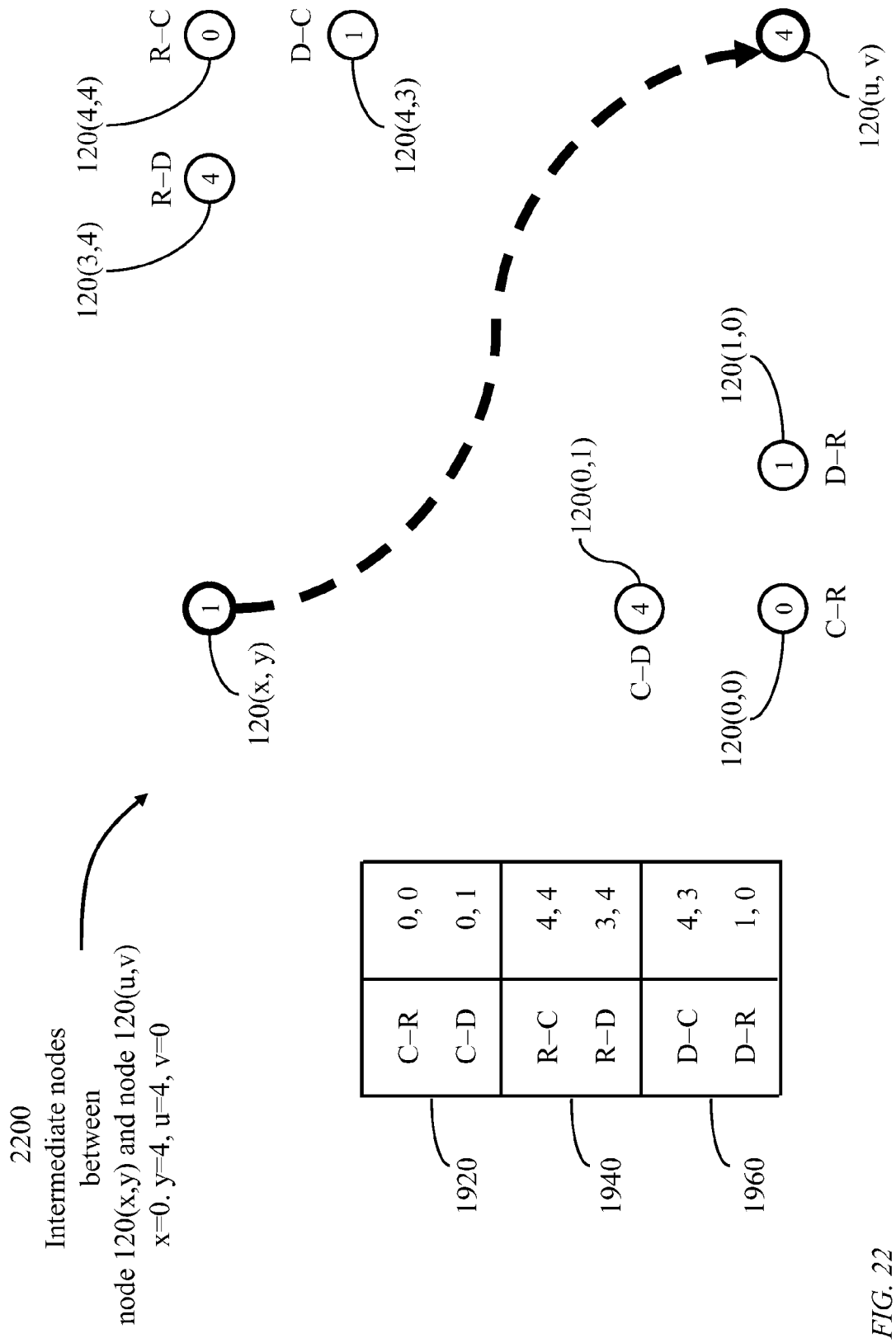
Figure 23:
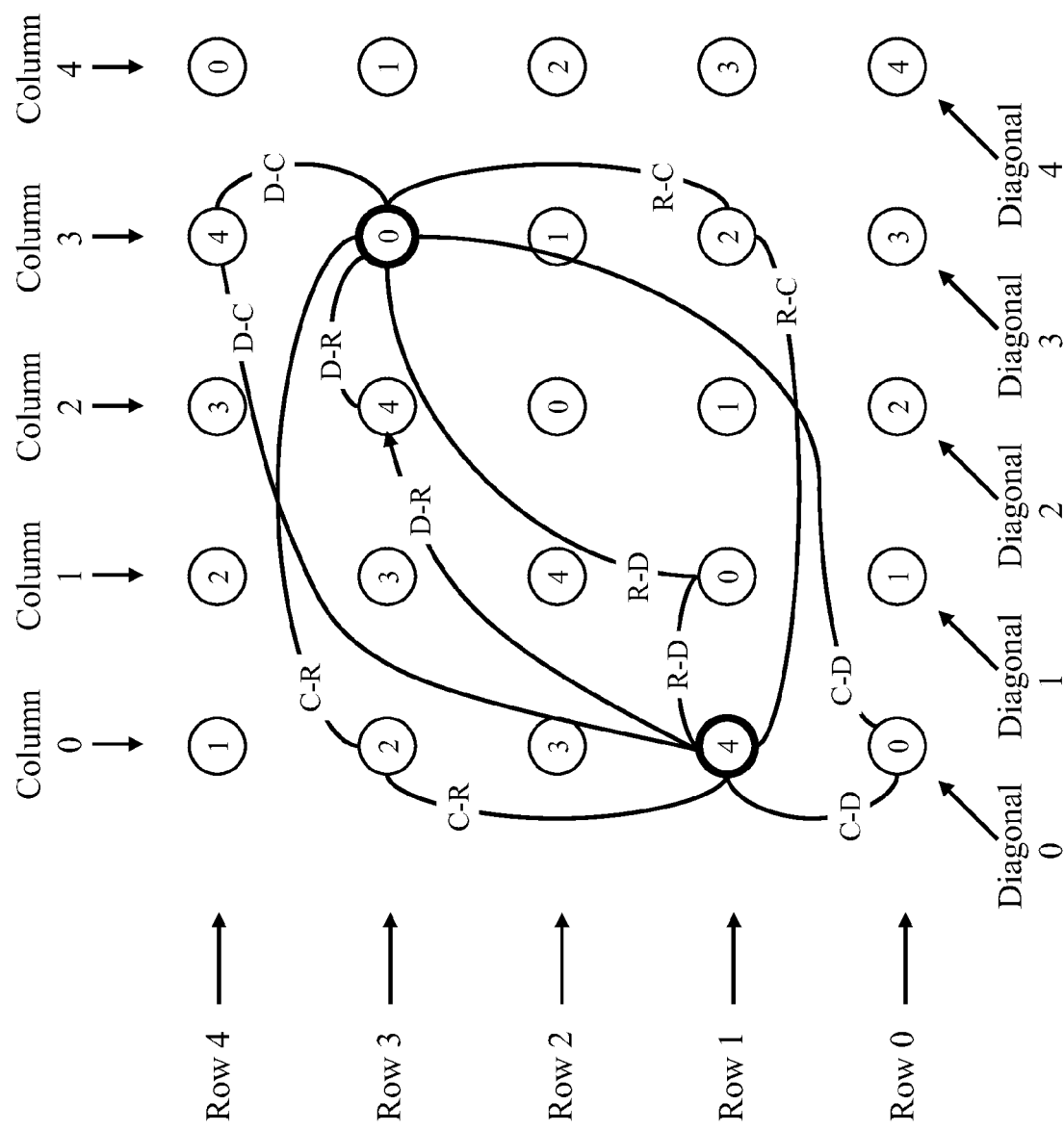
Figure 24:
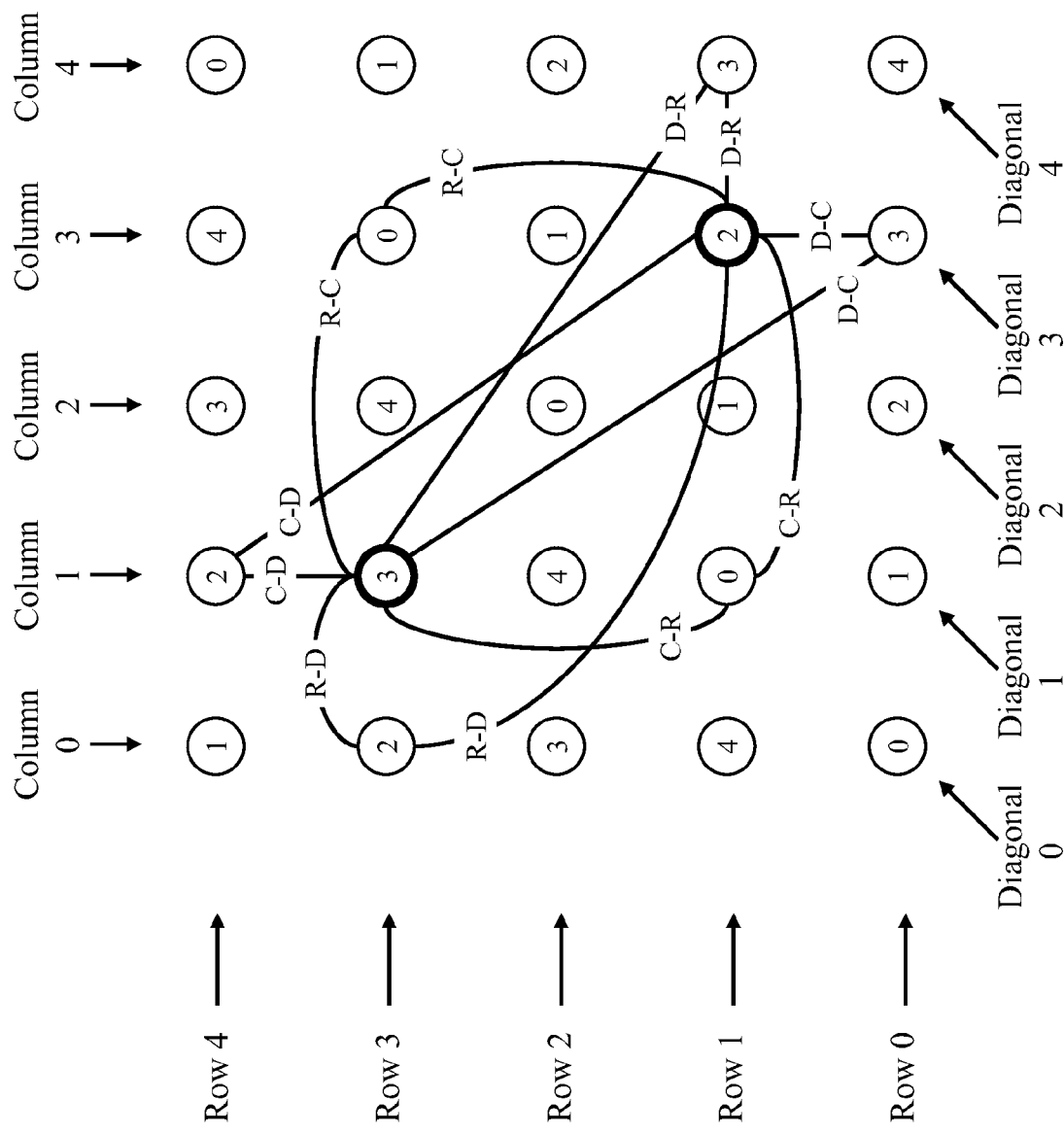
Figure 25:
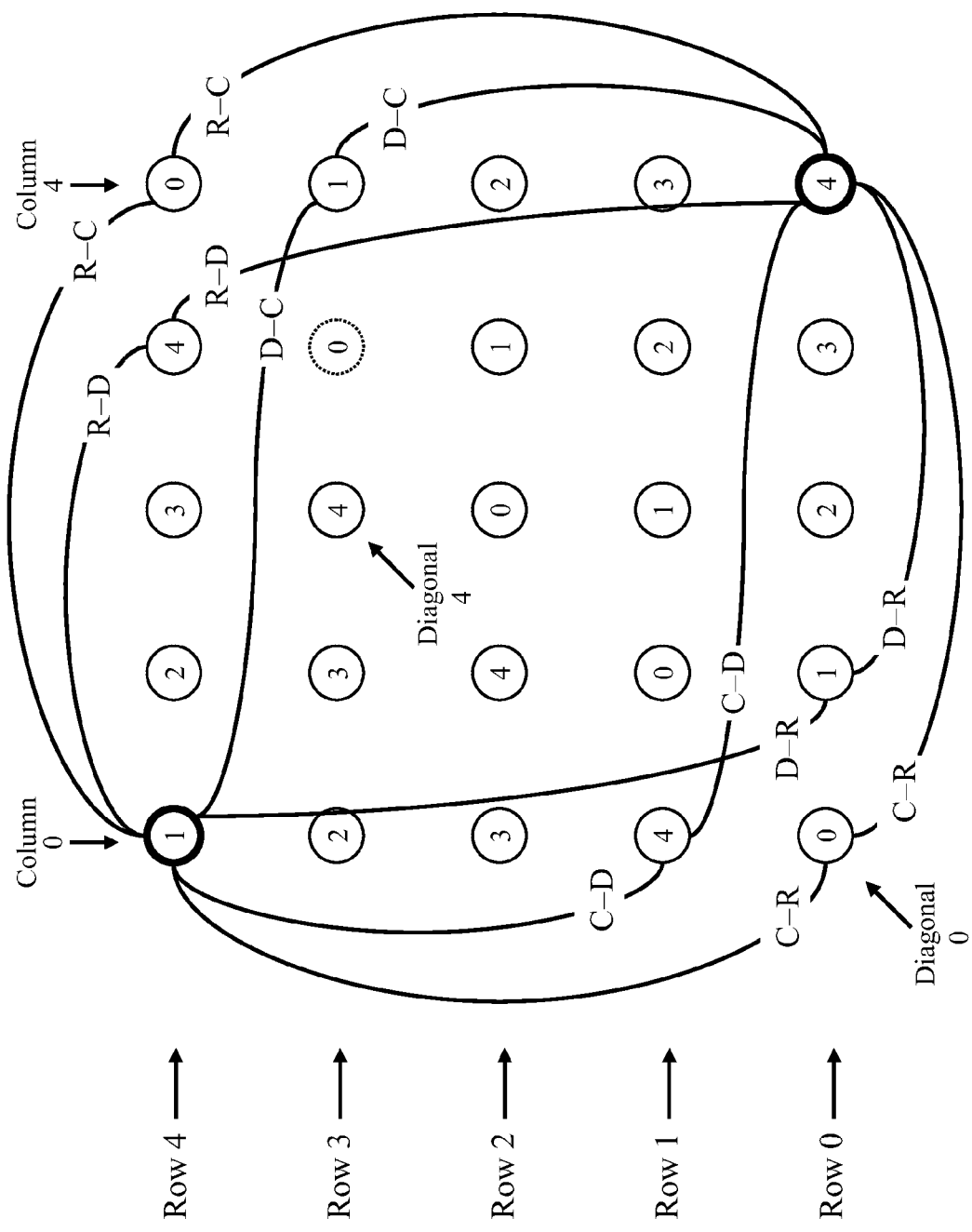
Figure 26:
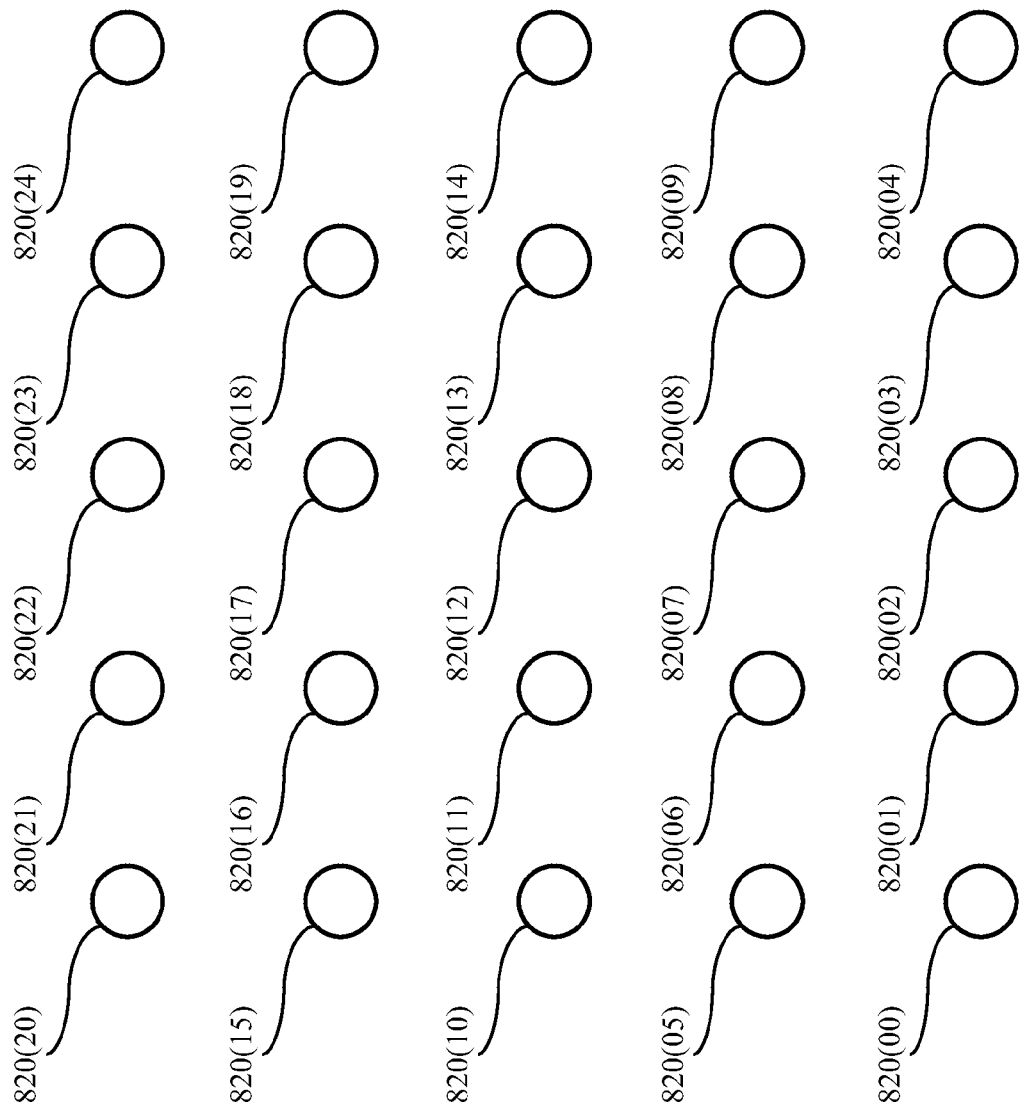
Figure 27:
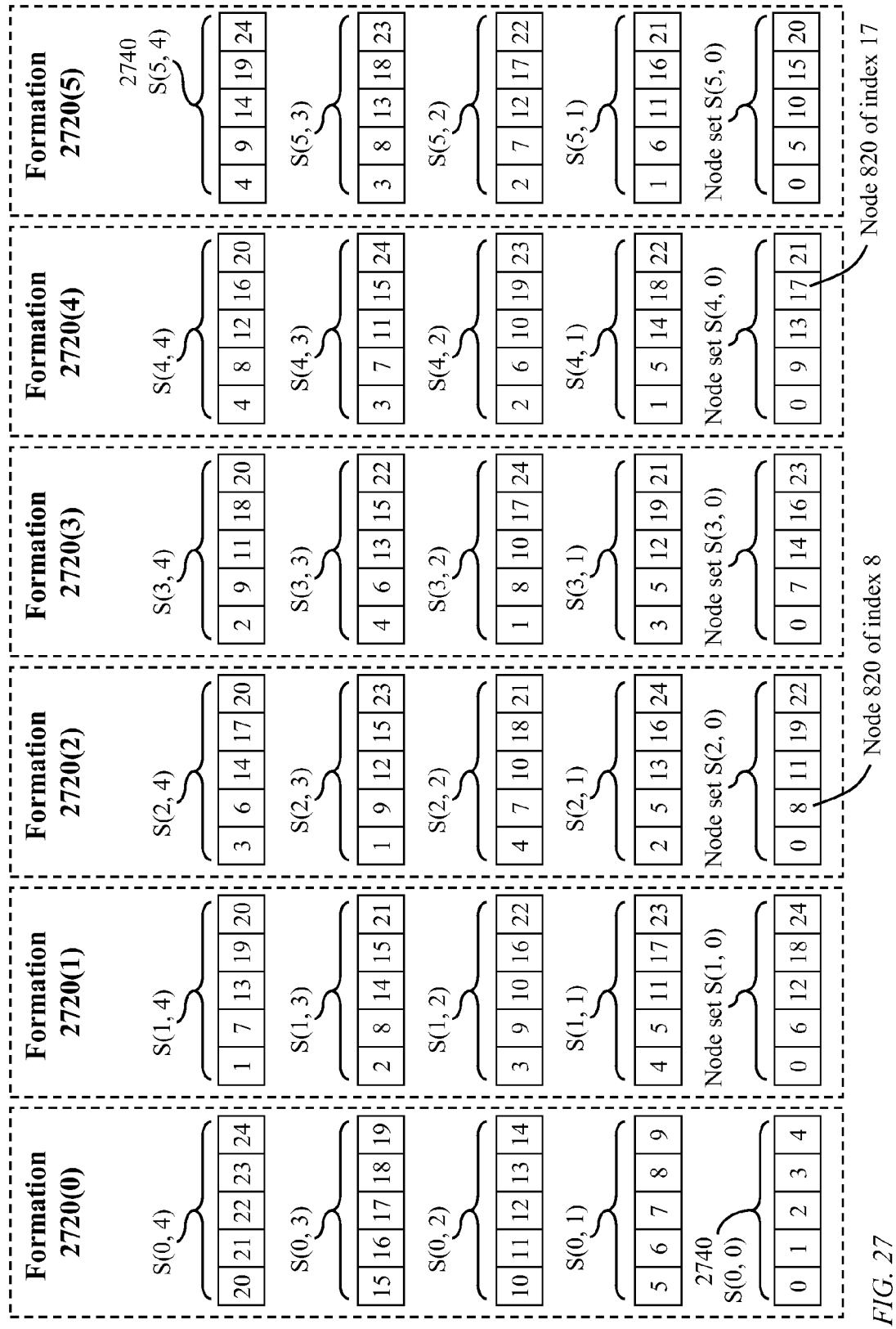
Figure 28:
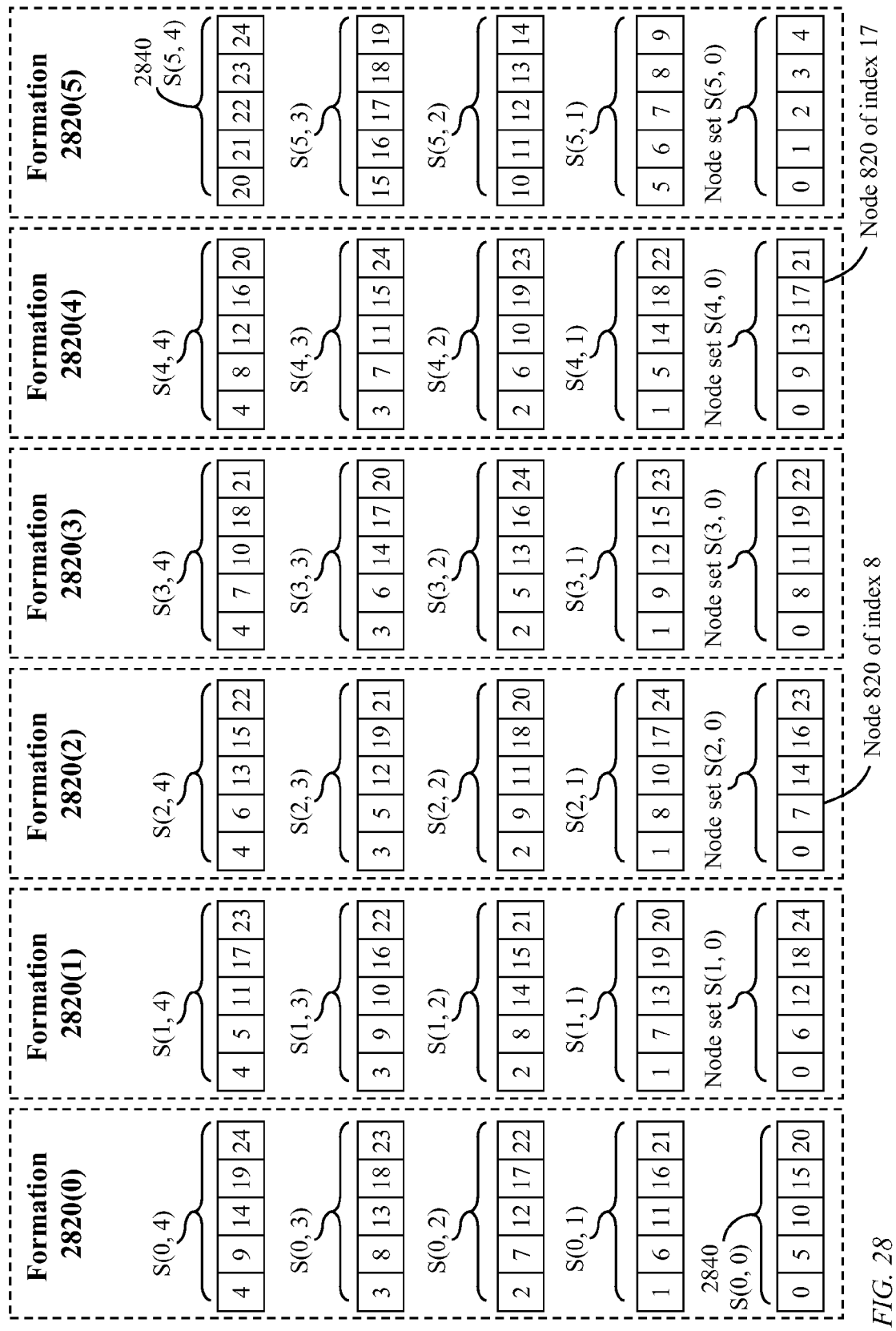
Figure 29:
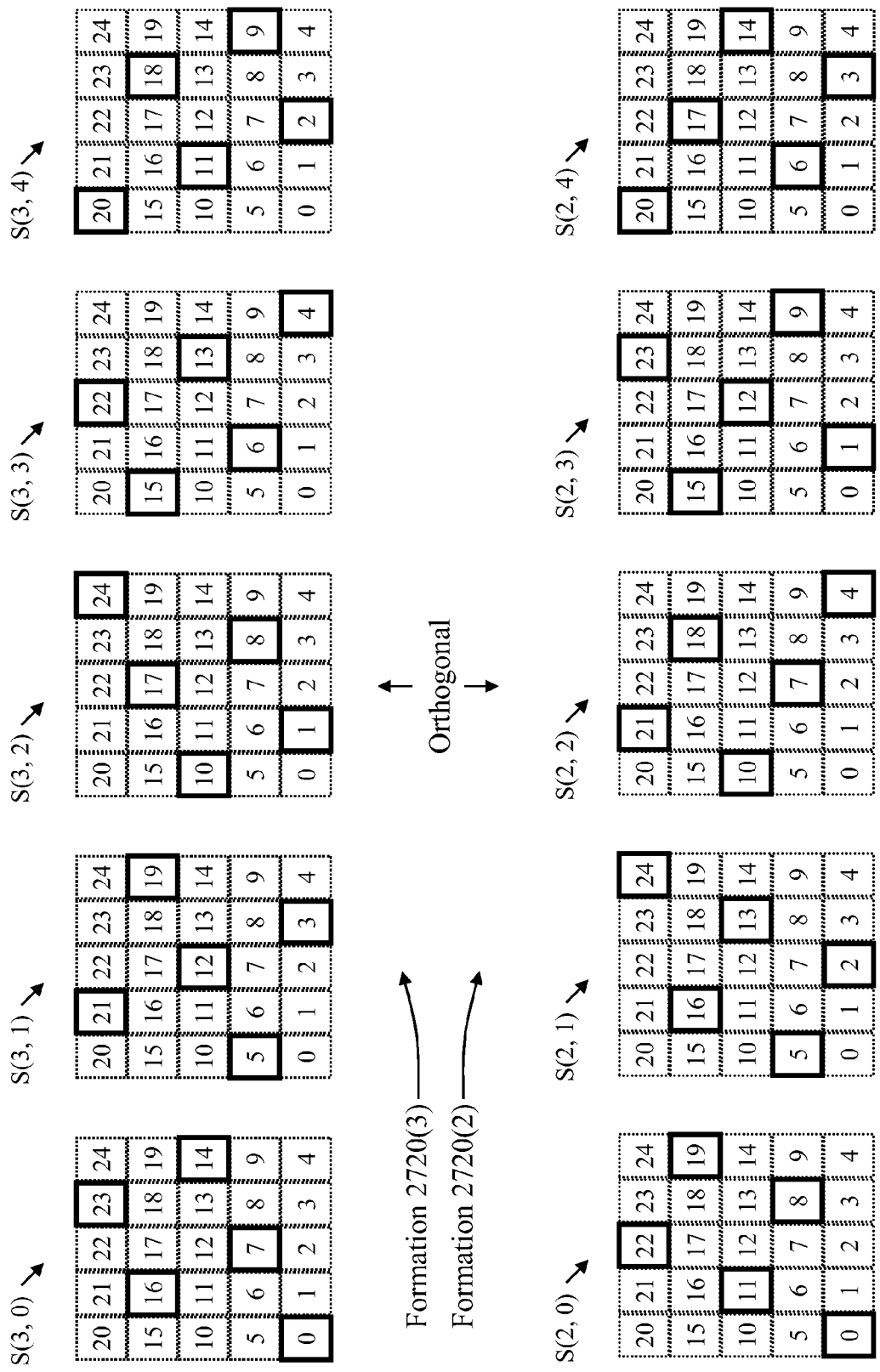
Figure 30:
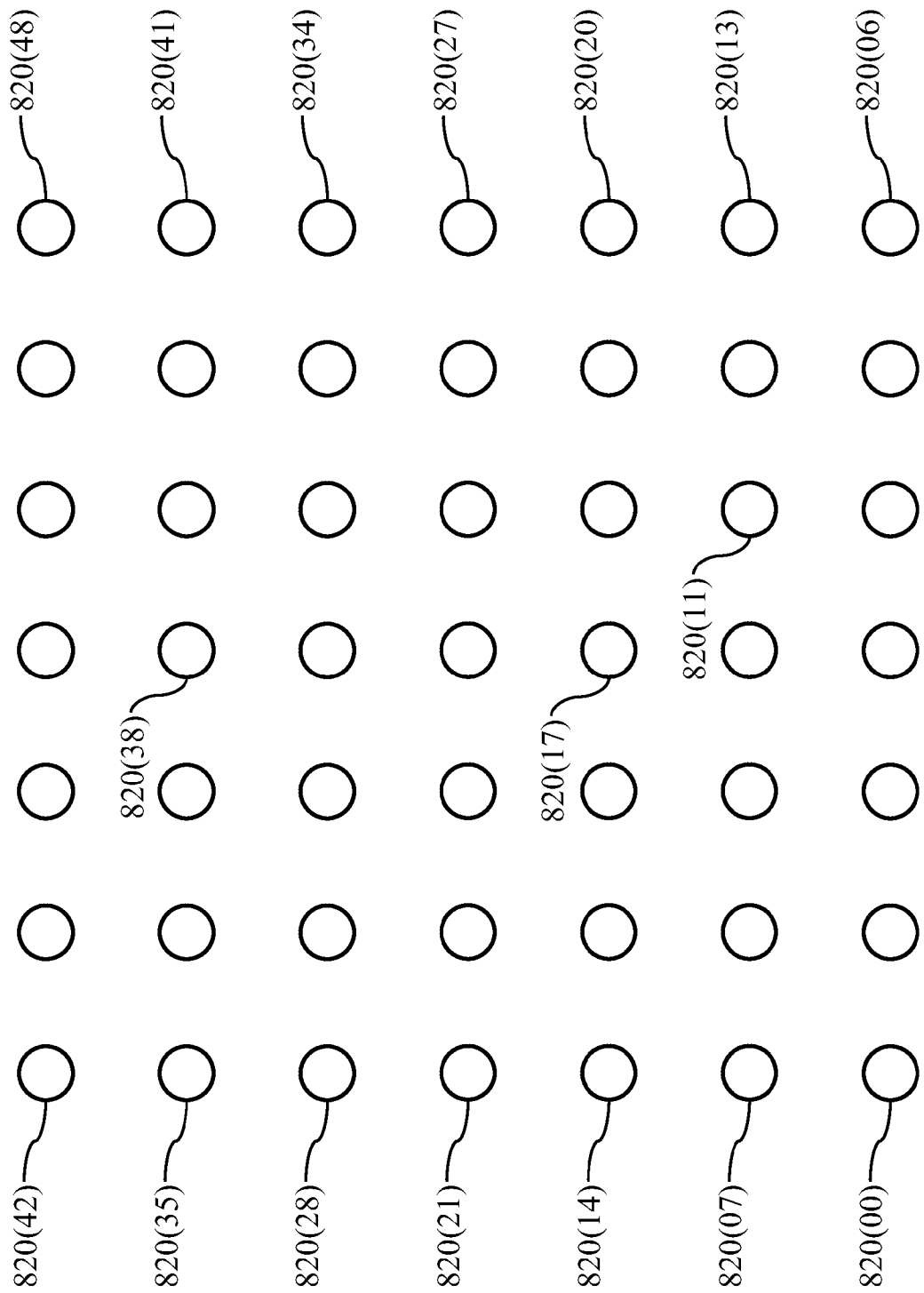
Figure 31:
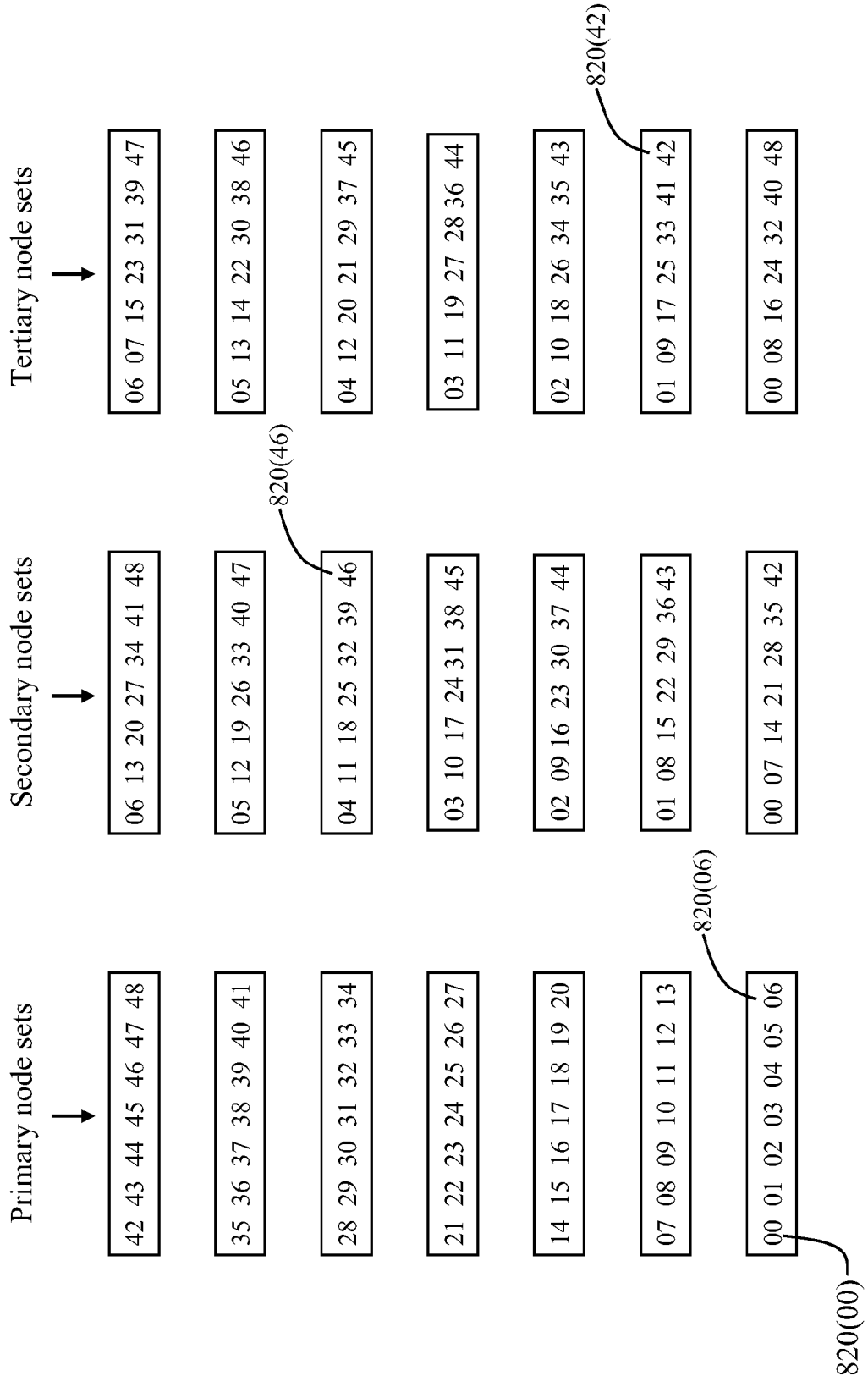
Figure 32:
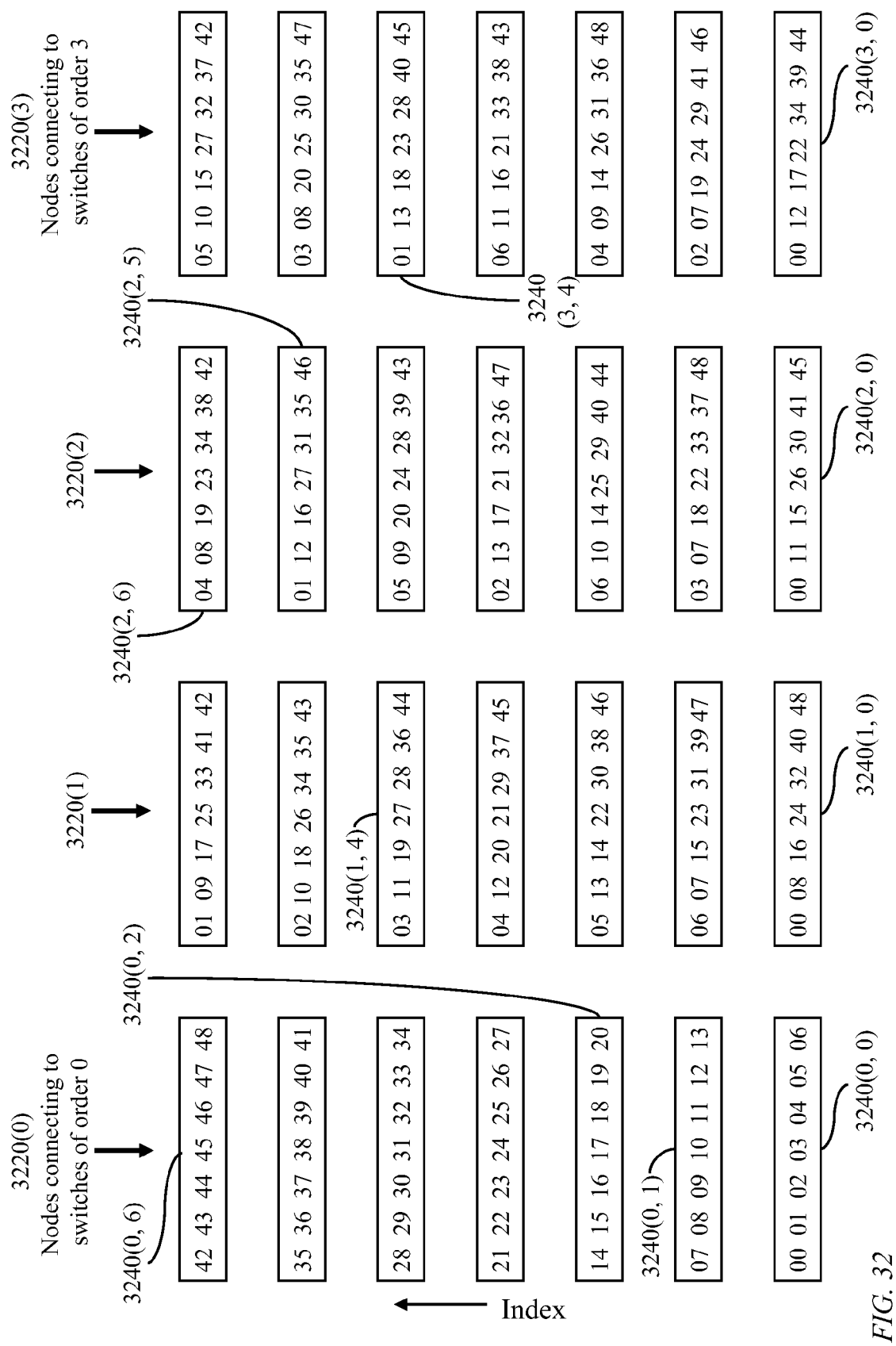
Figure 33:
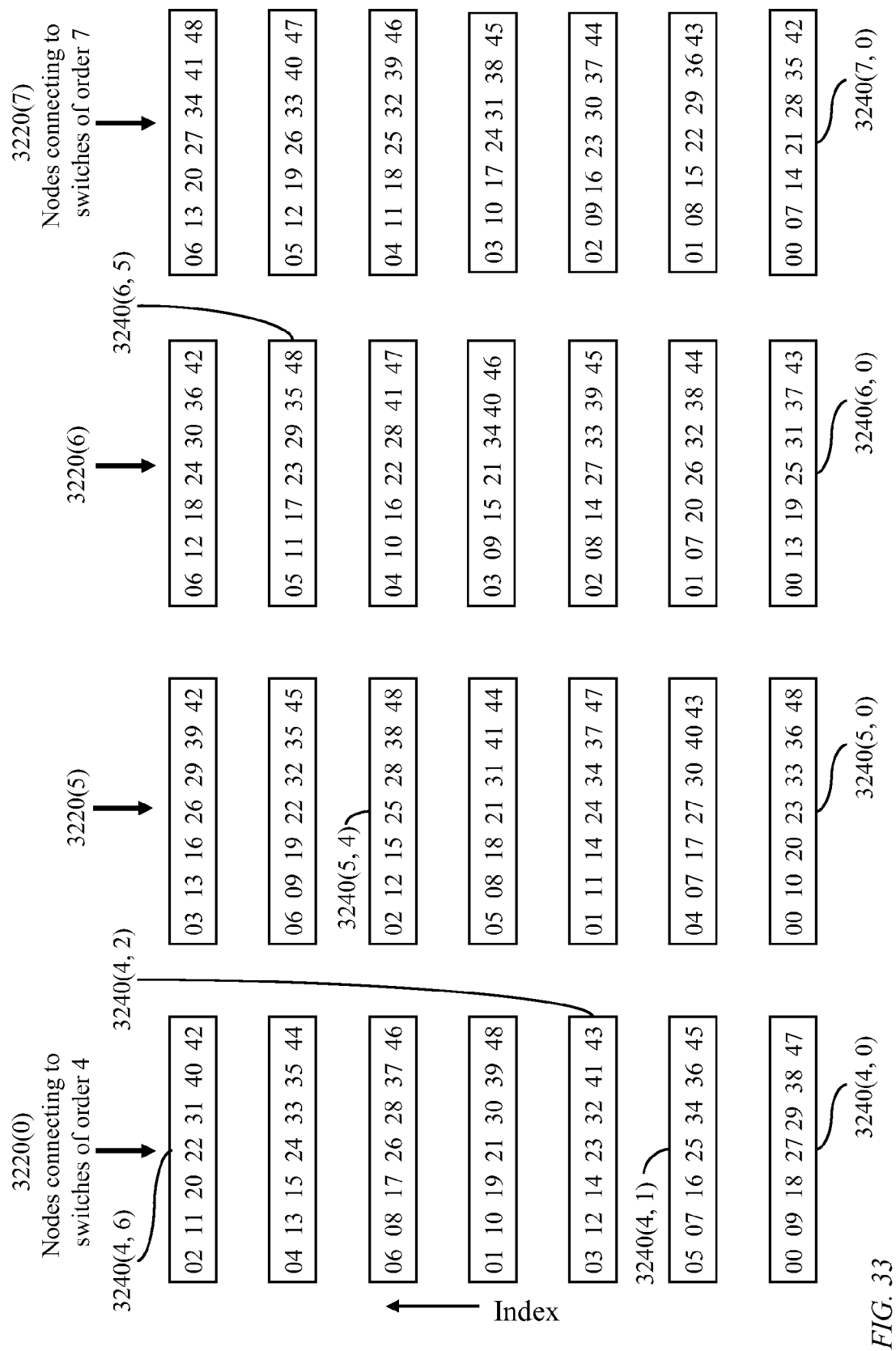
Figure 34:
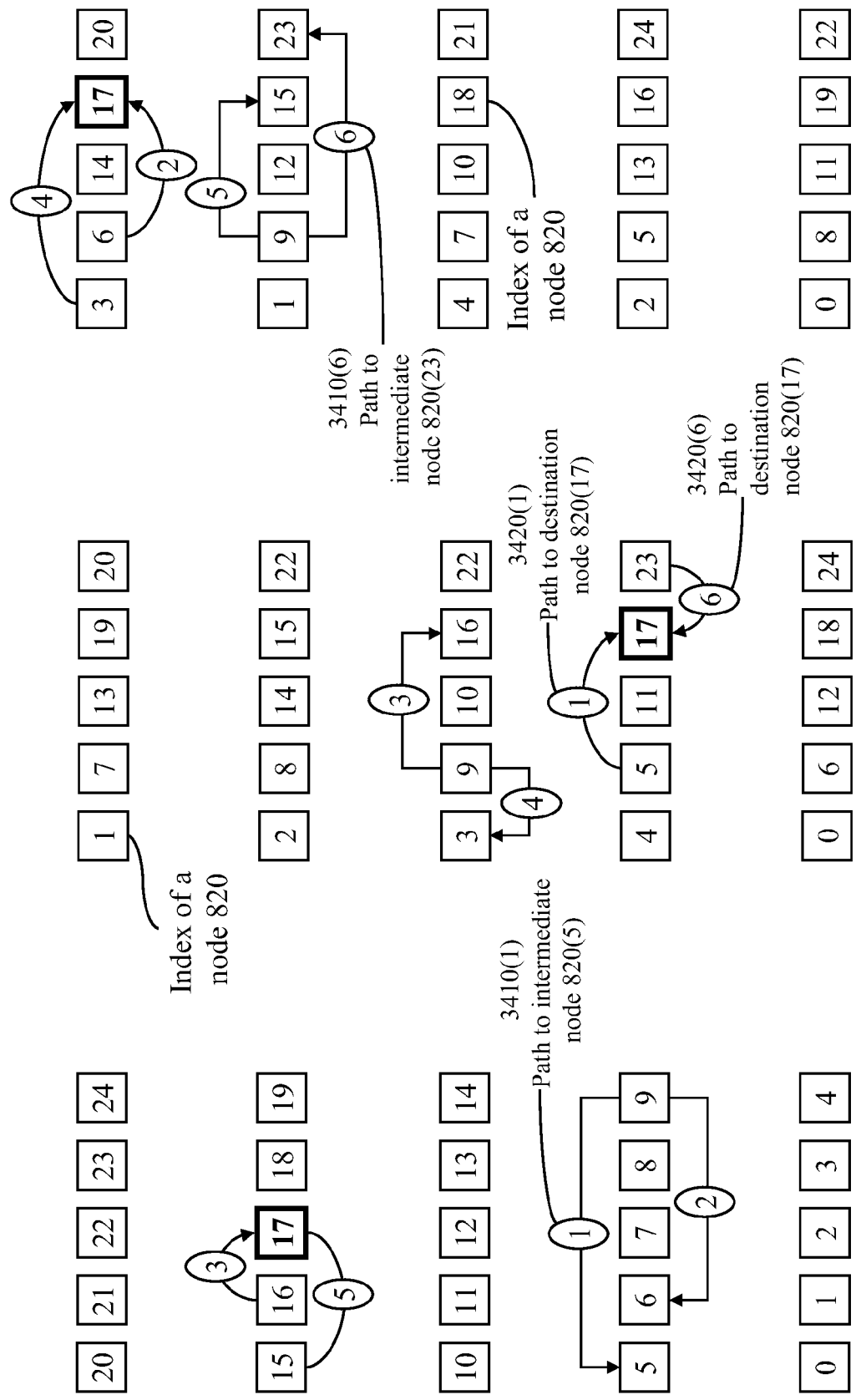
Figure 35:
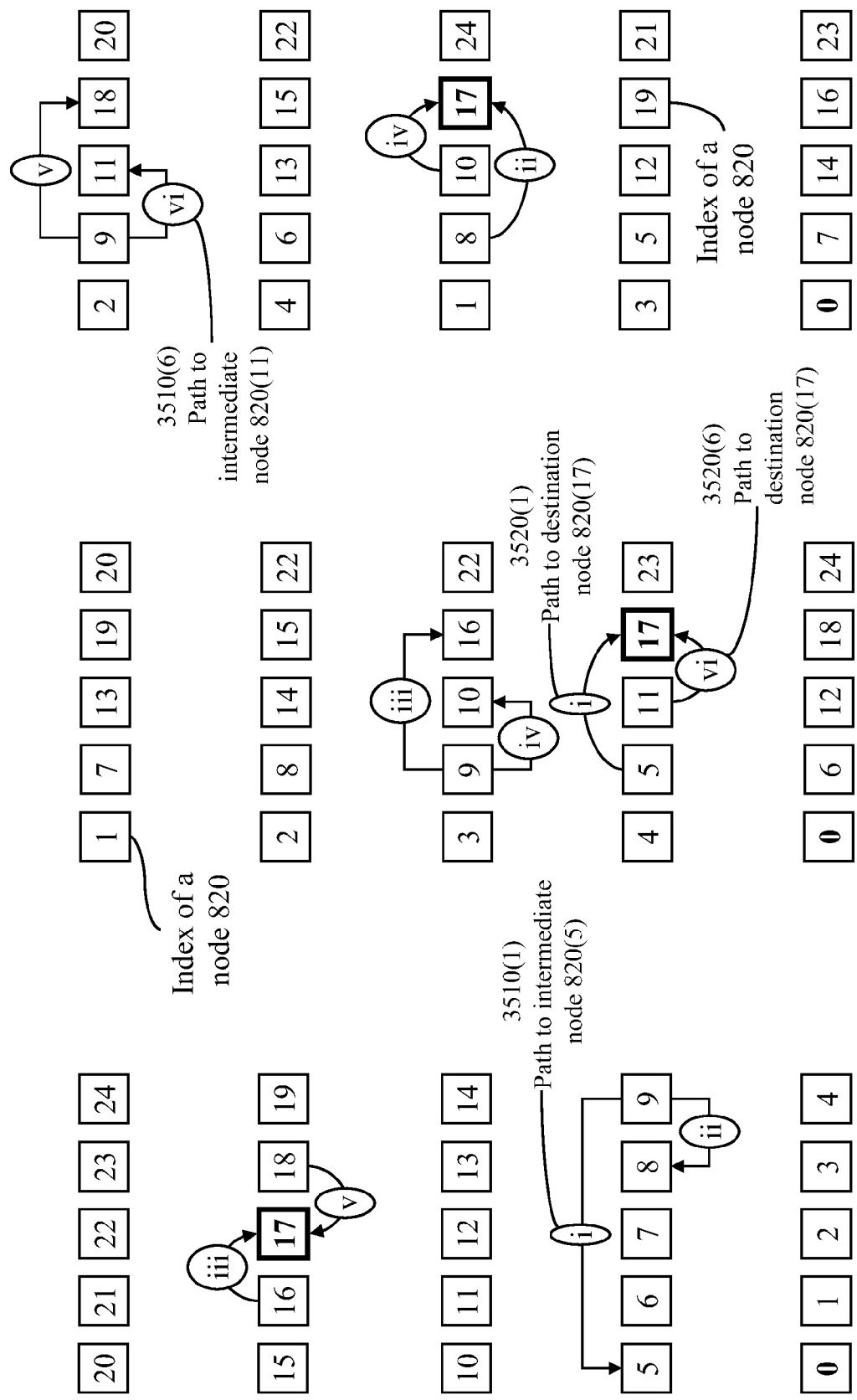
Figure 36:
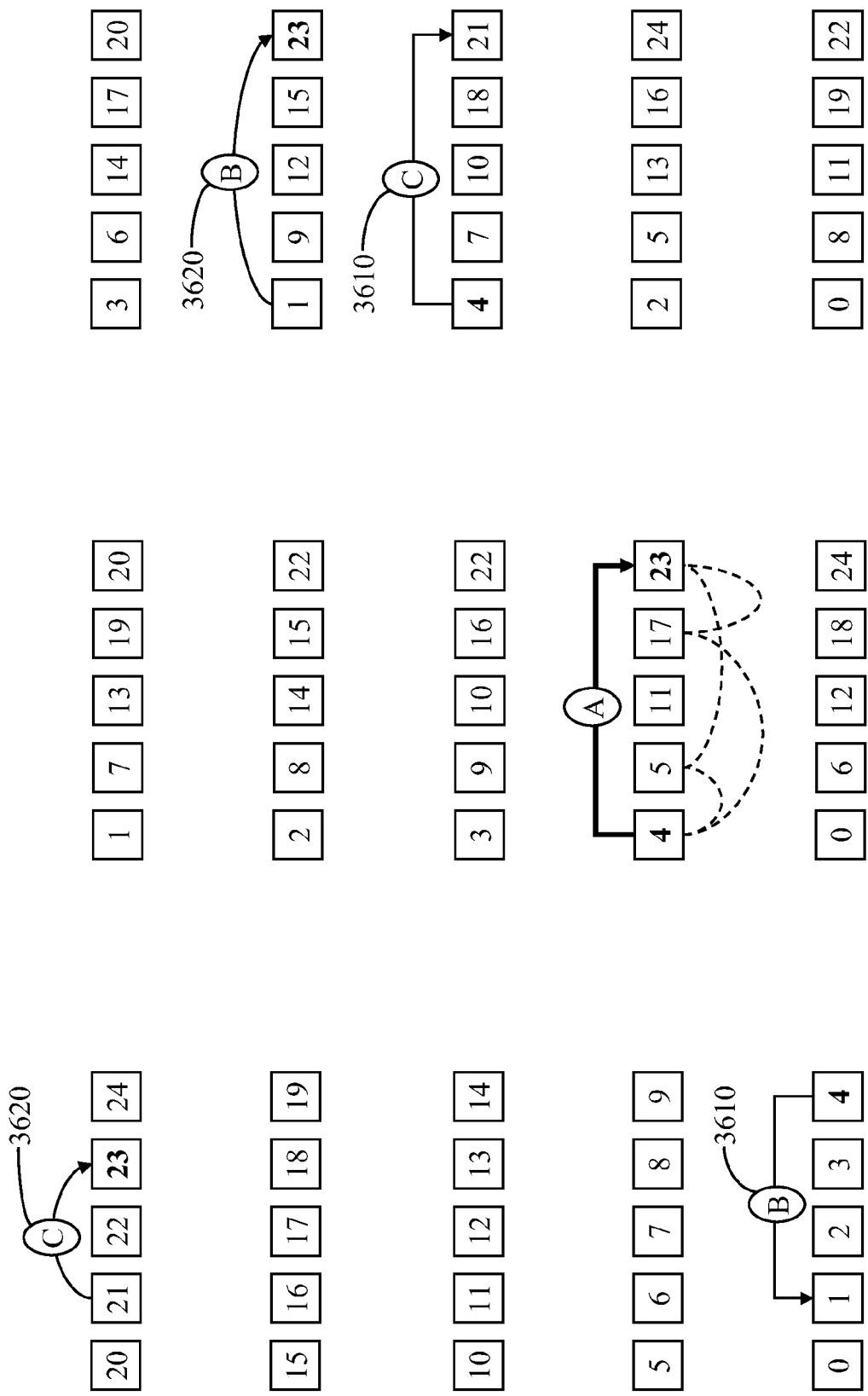
Figure 37:
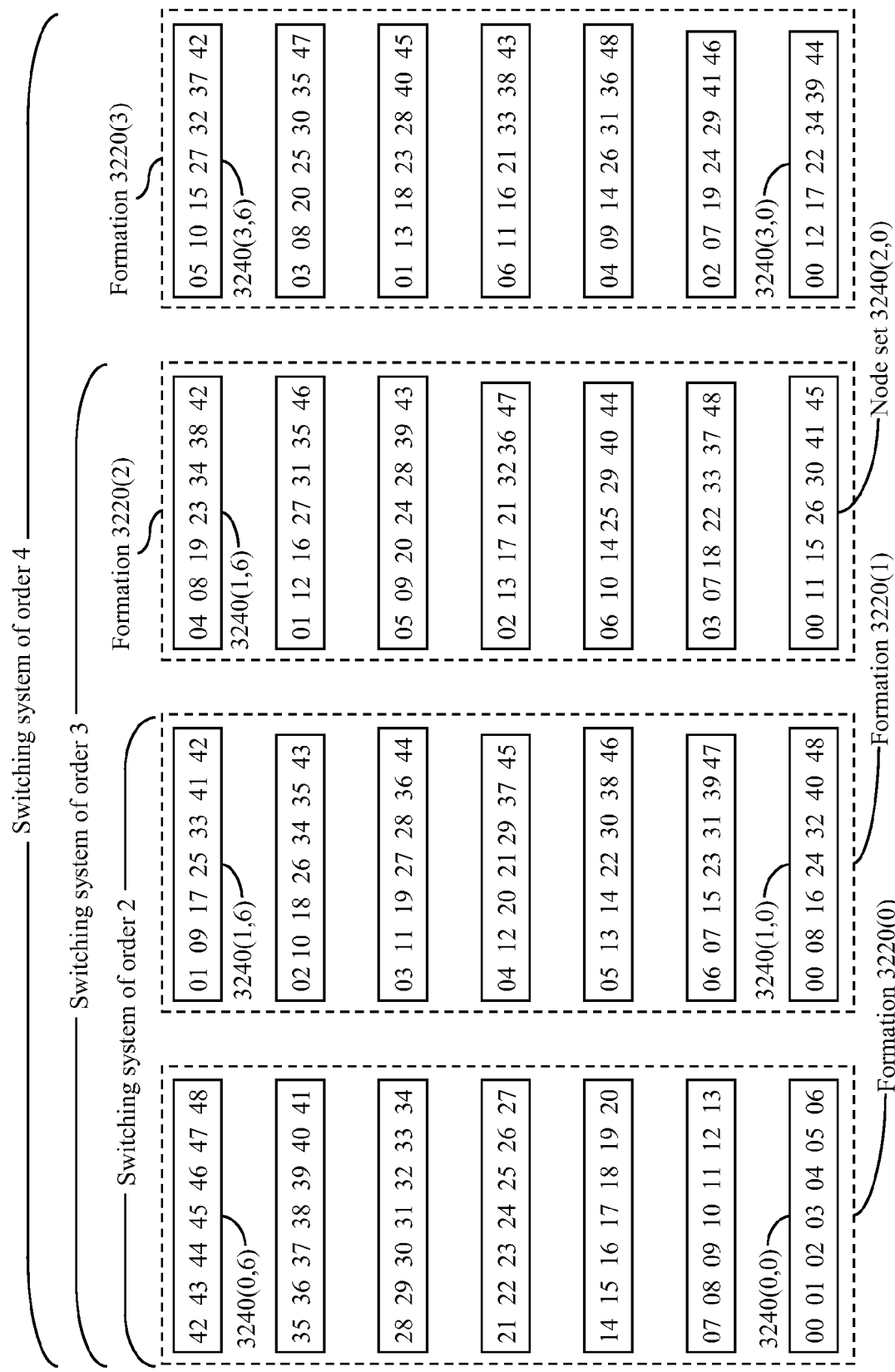
Figure 38:
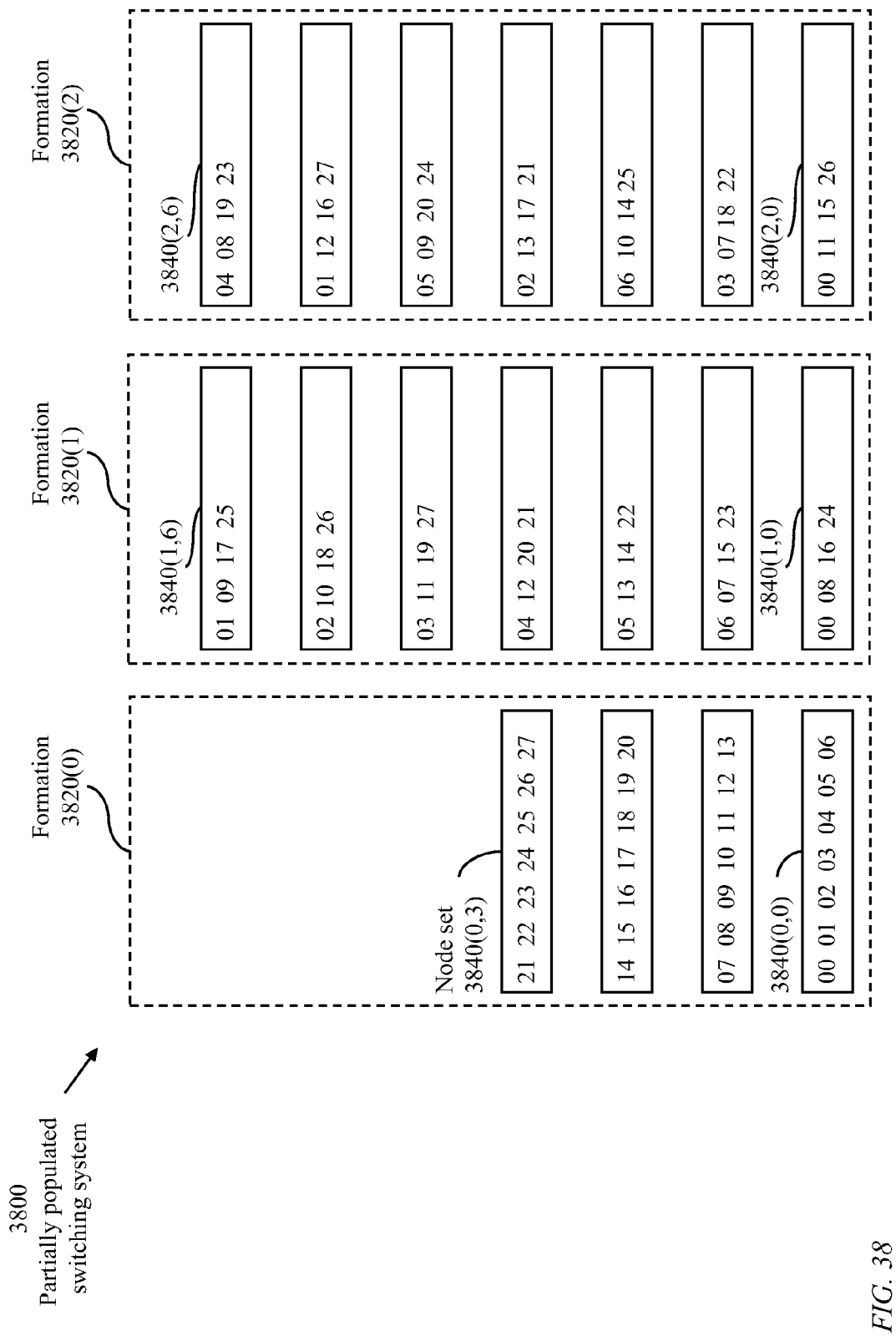
Figure 39:
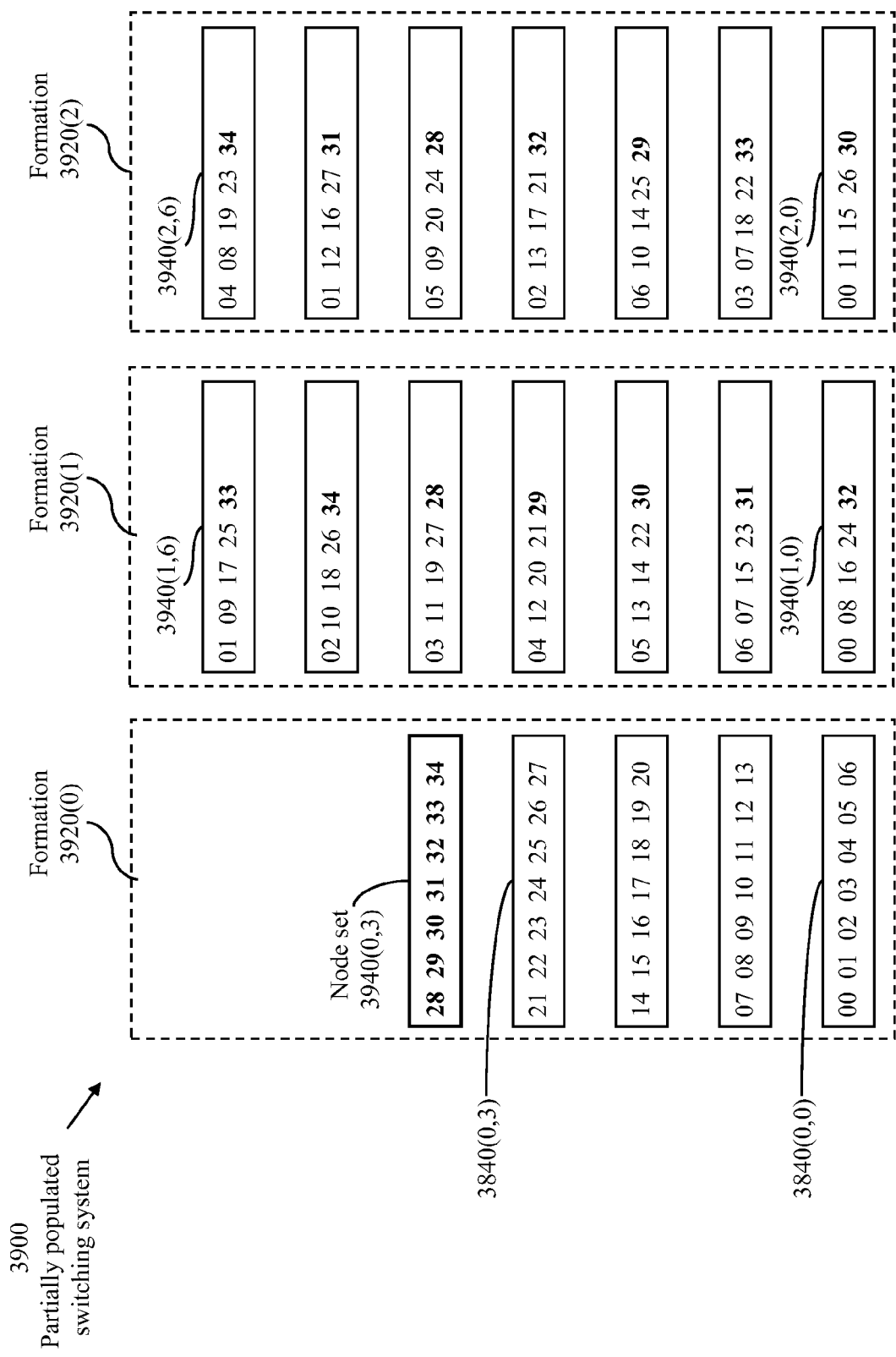
Figure 40:
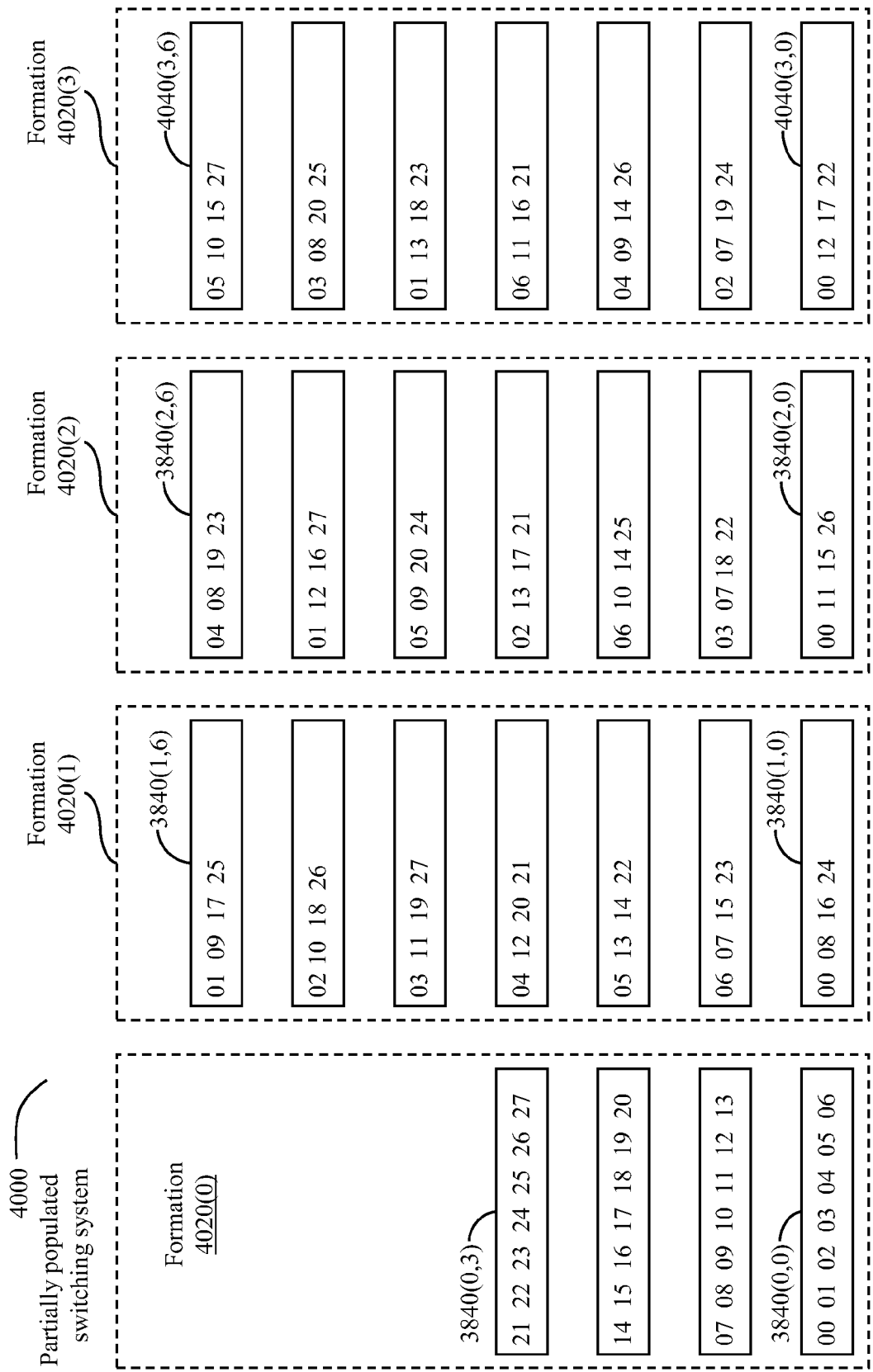
Figure 41:
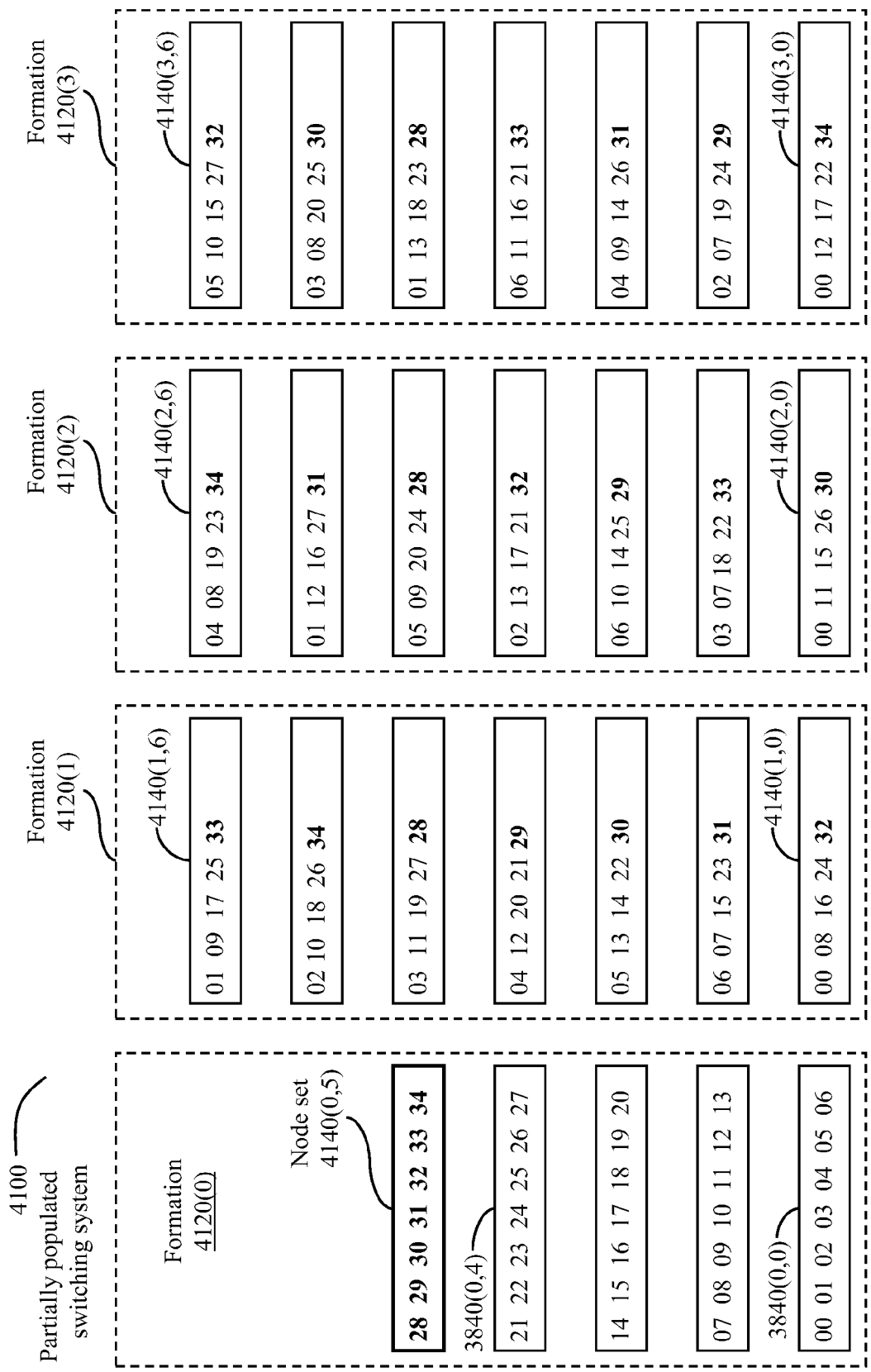
Figure 42:
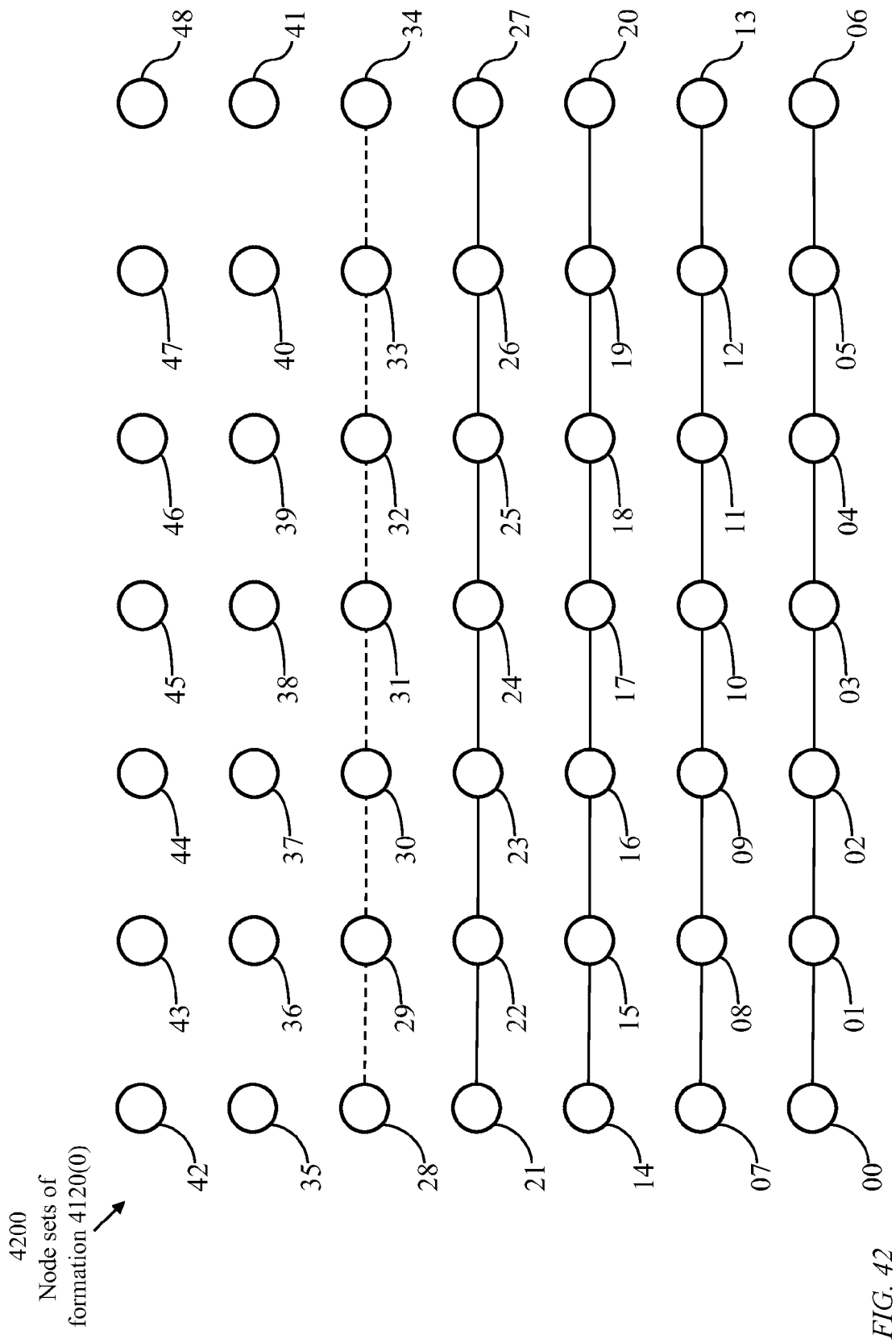
Figure 47:
Figure 48:
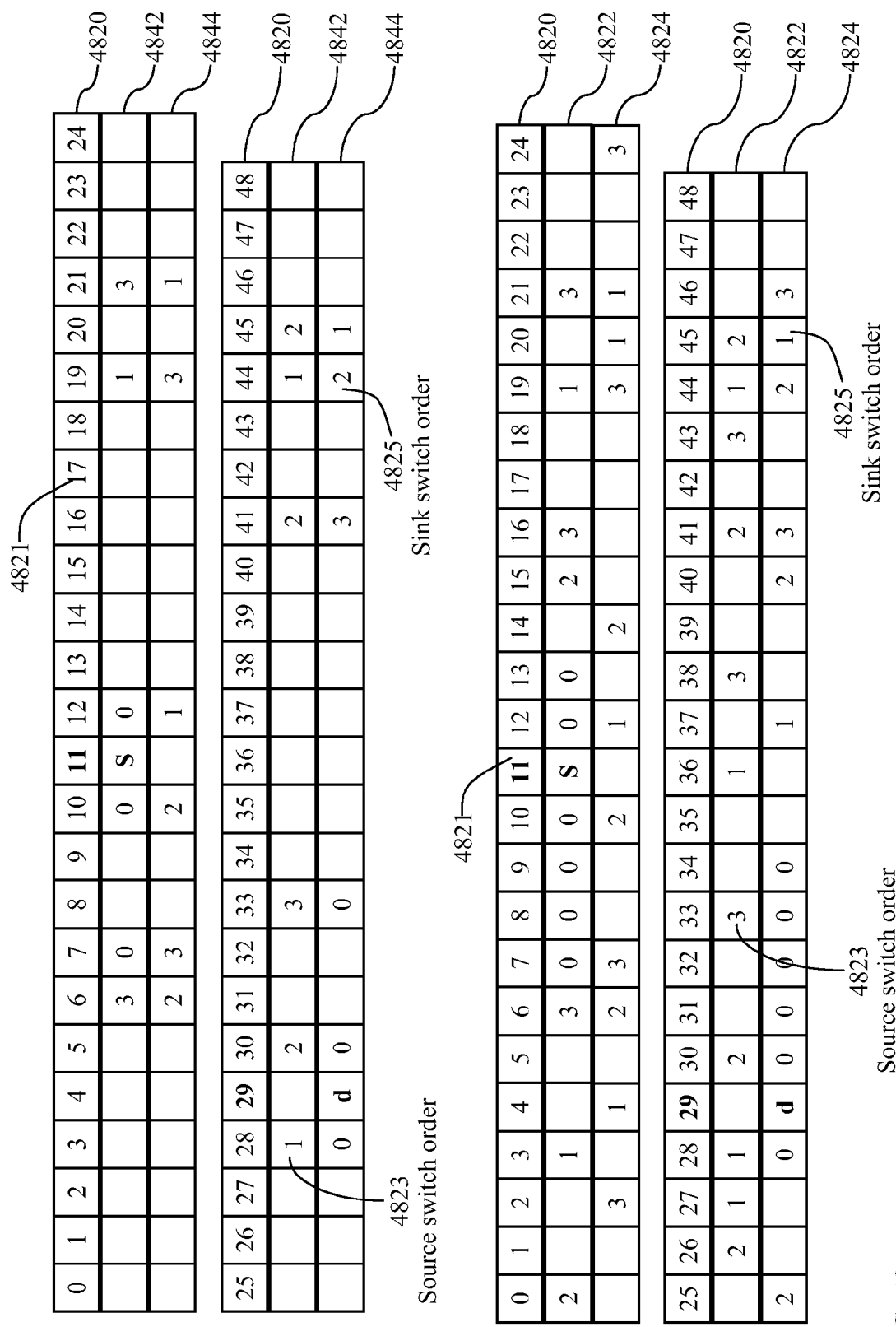
Figure 49:
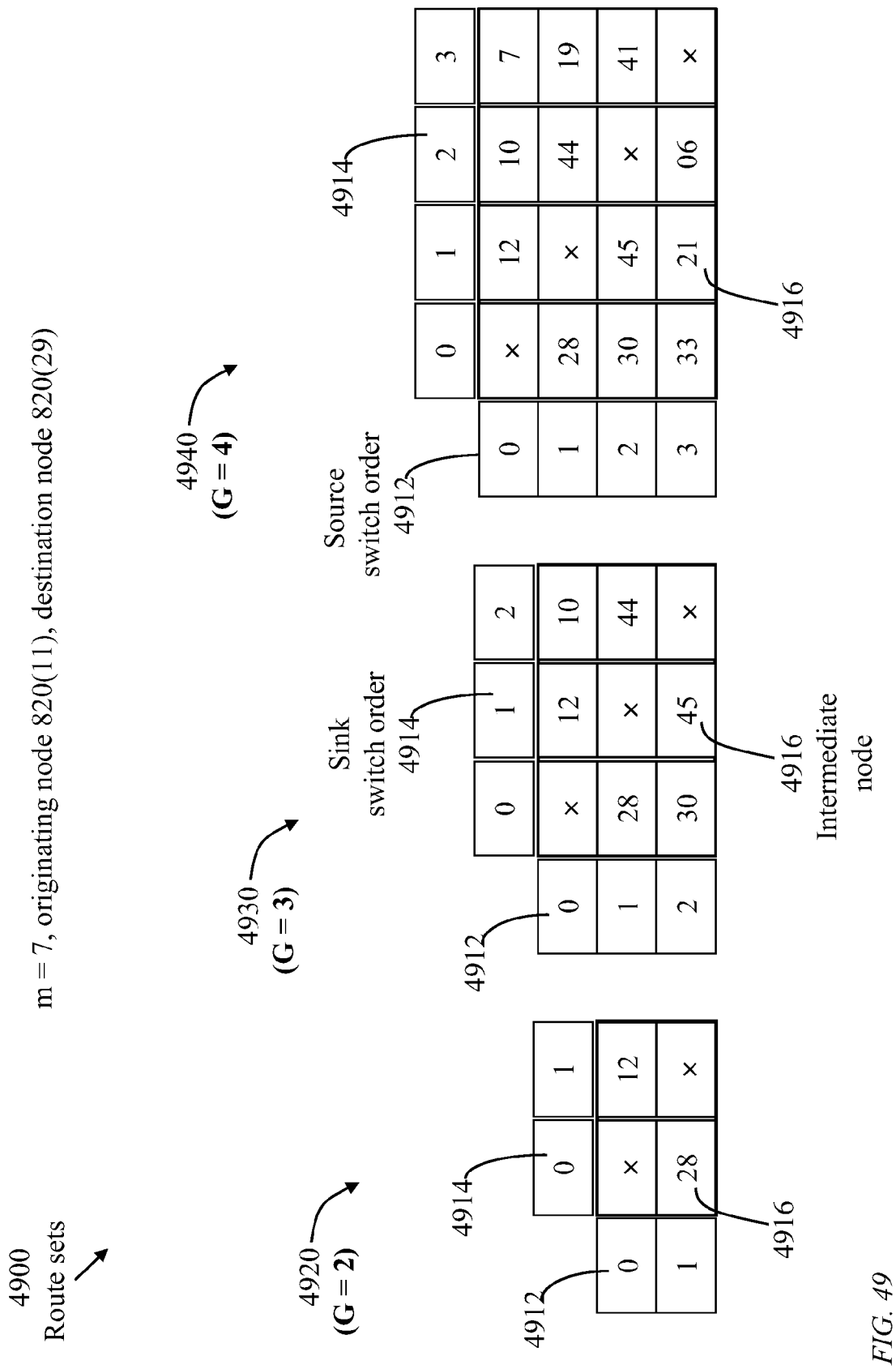
Figure 51:
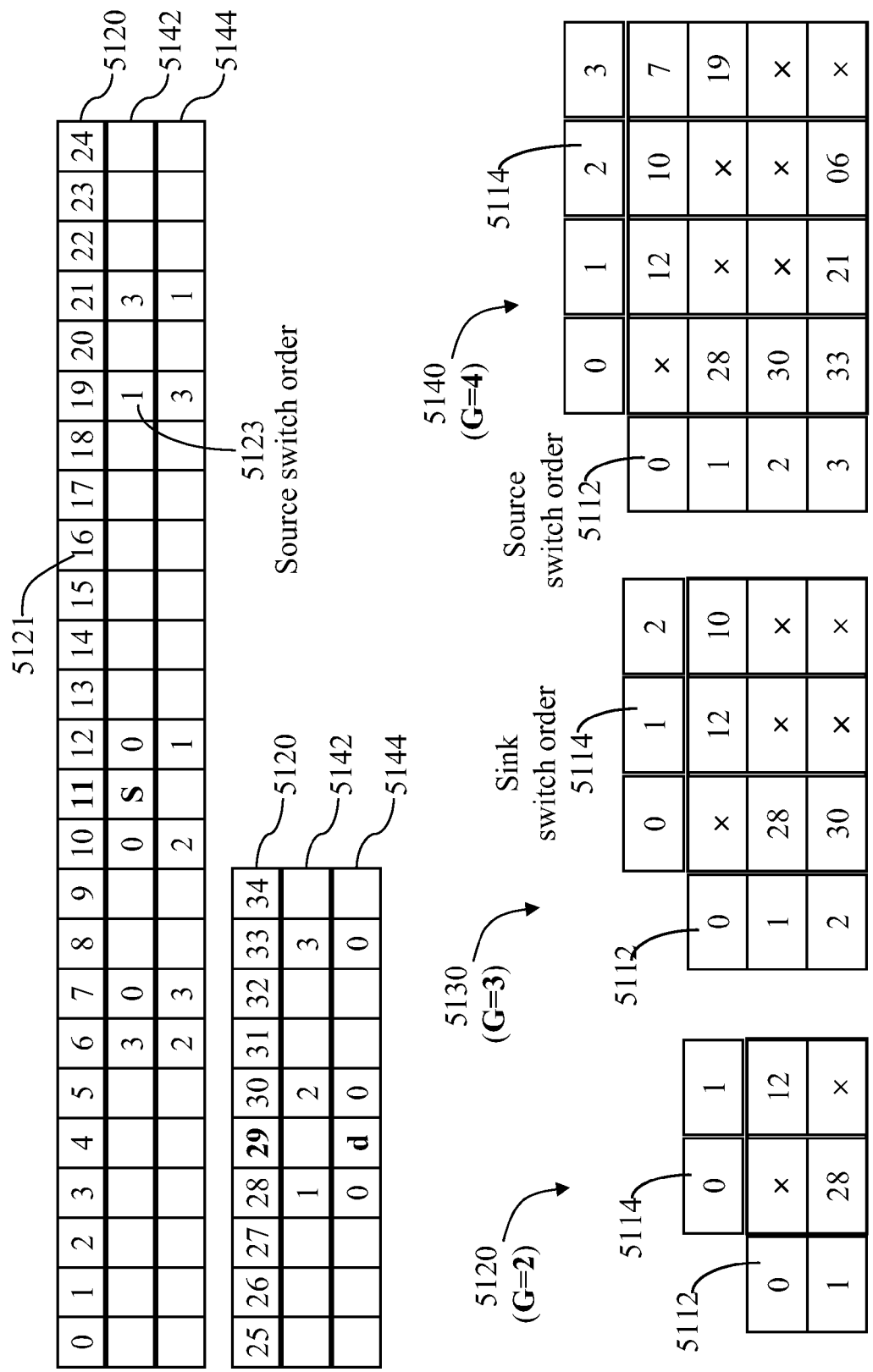
Figure 52:
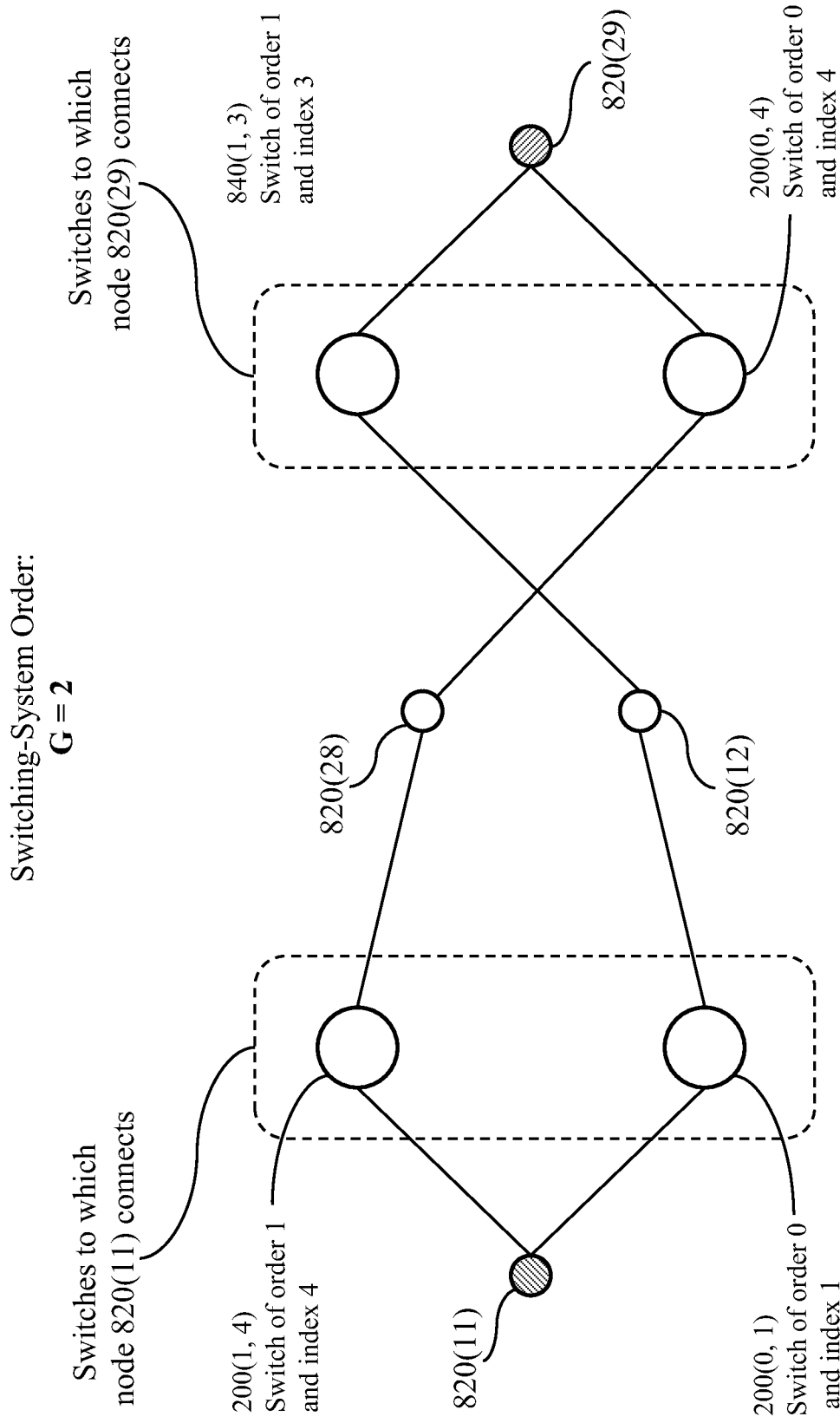
Figure 53:
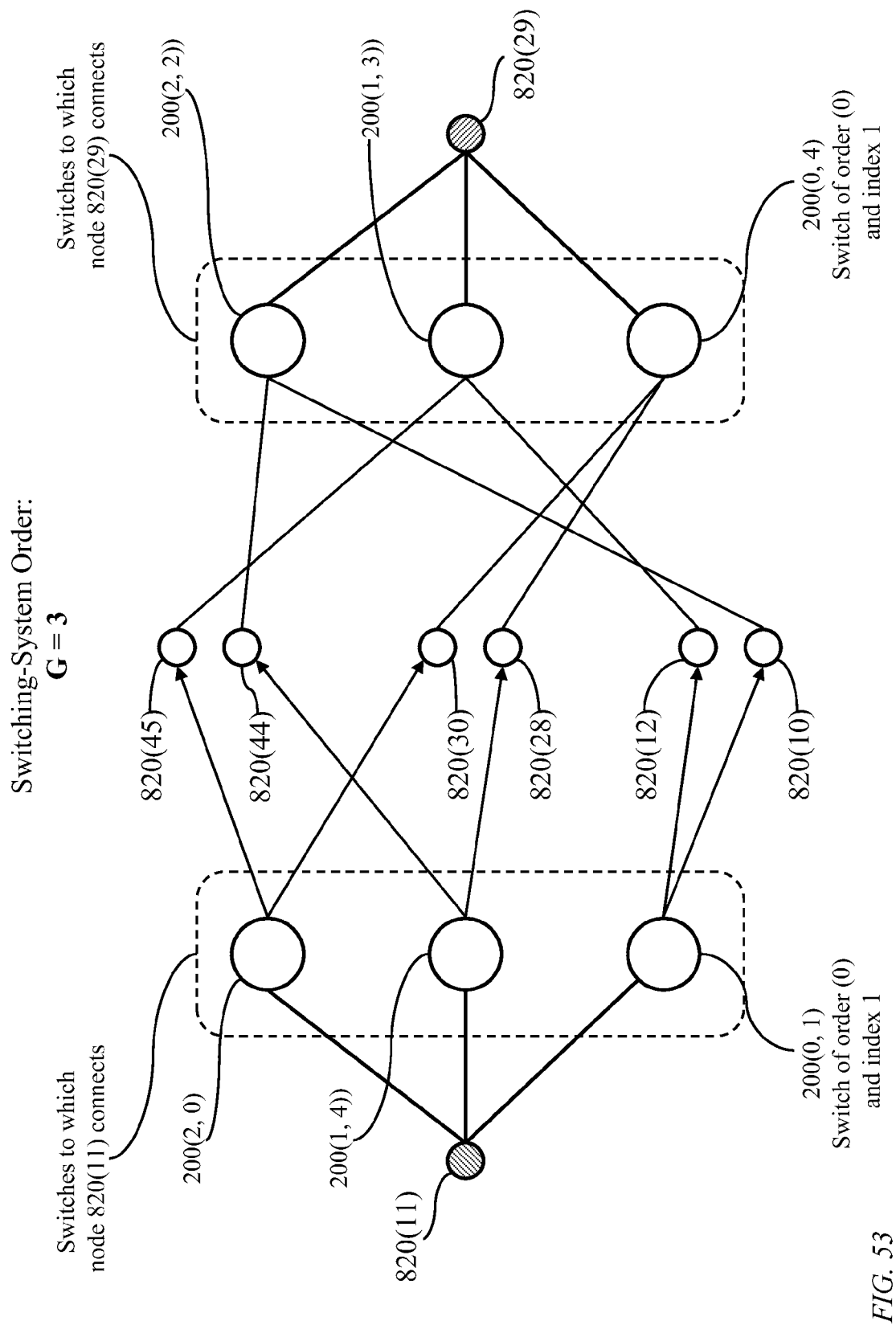
Figure 54:
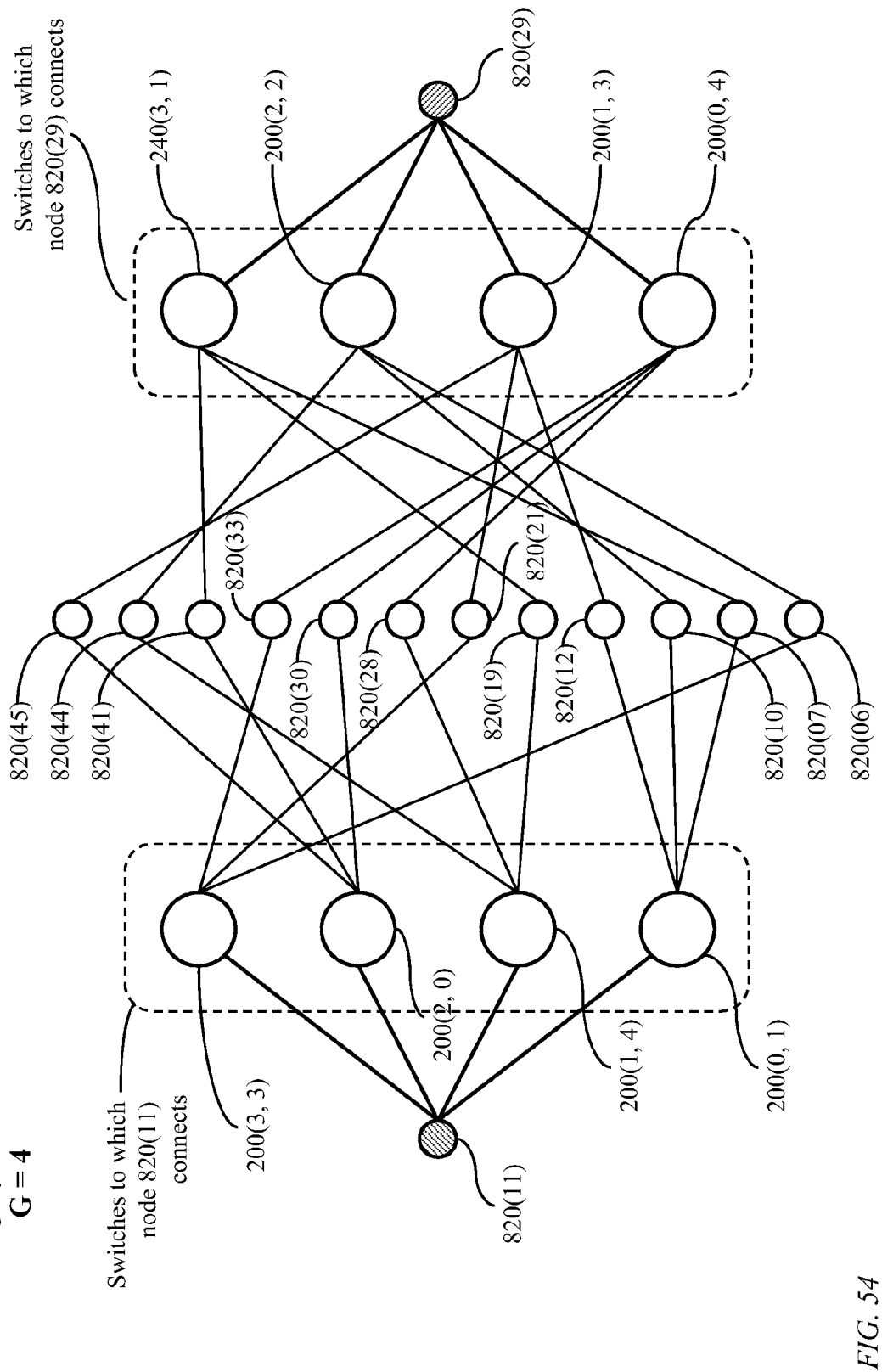
Figure 55:
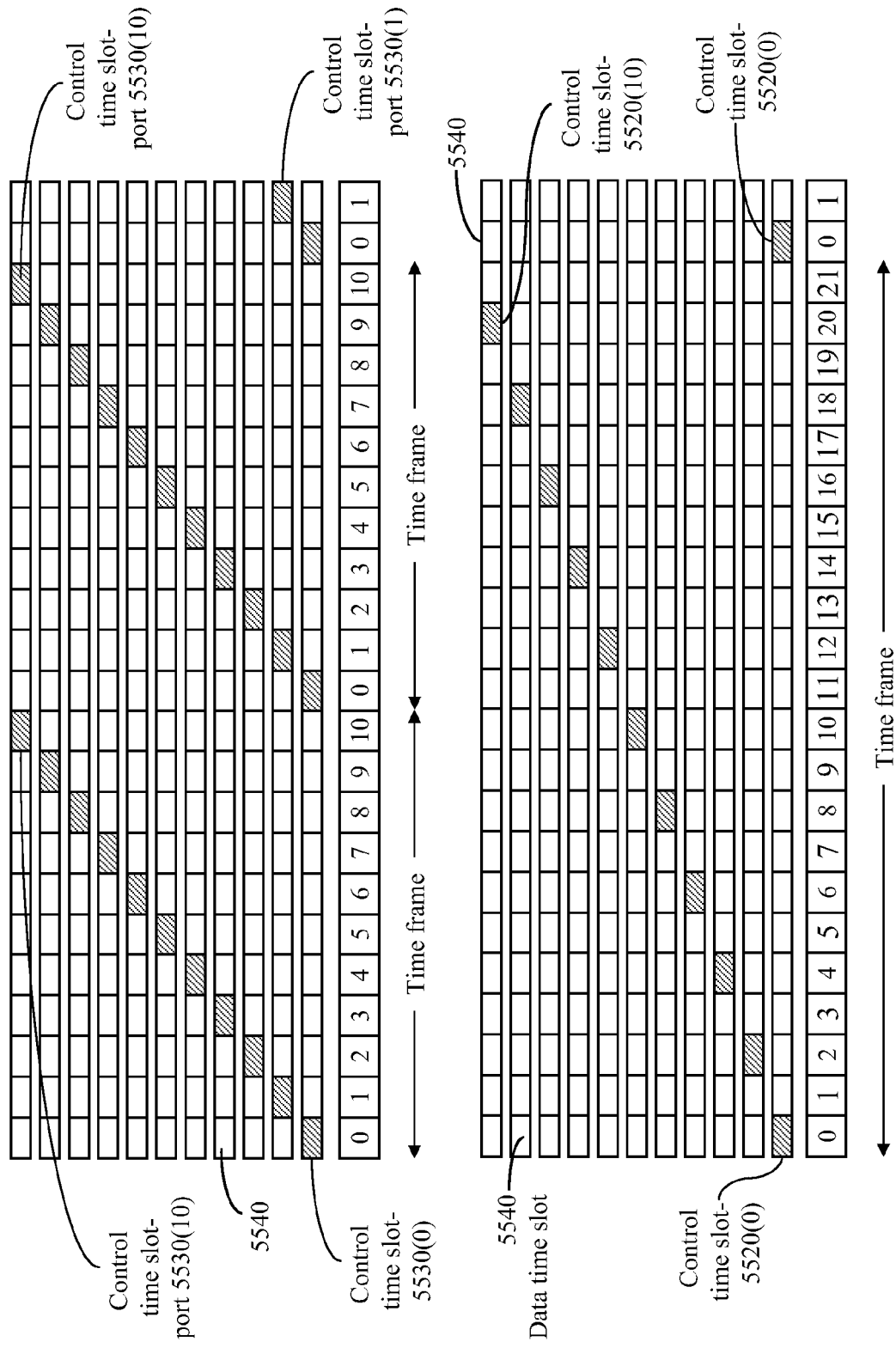
Figure 56:
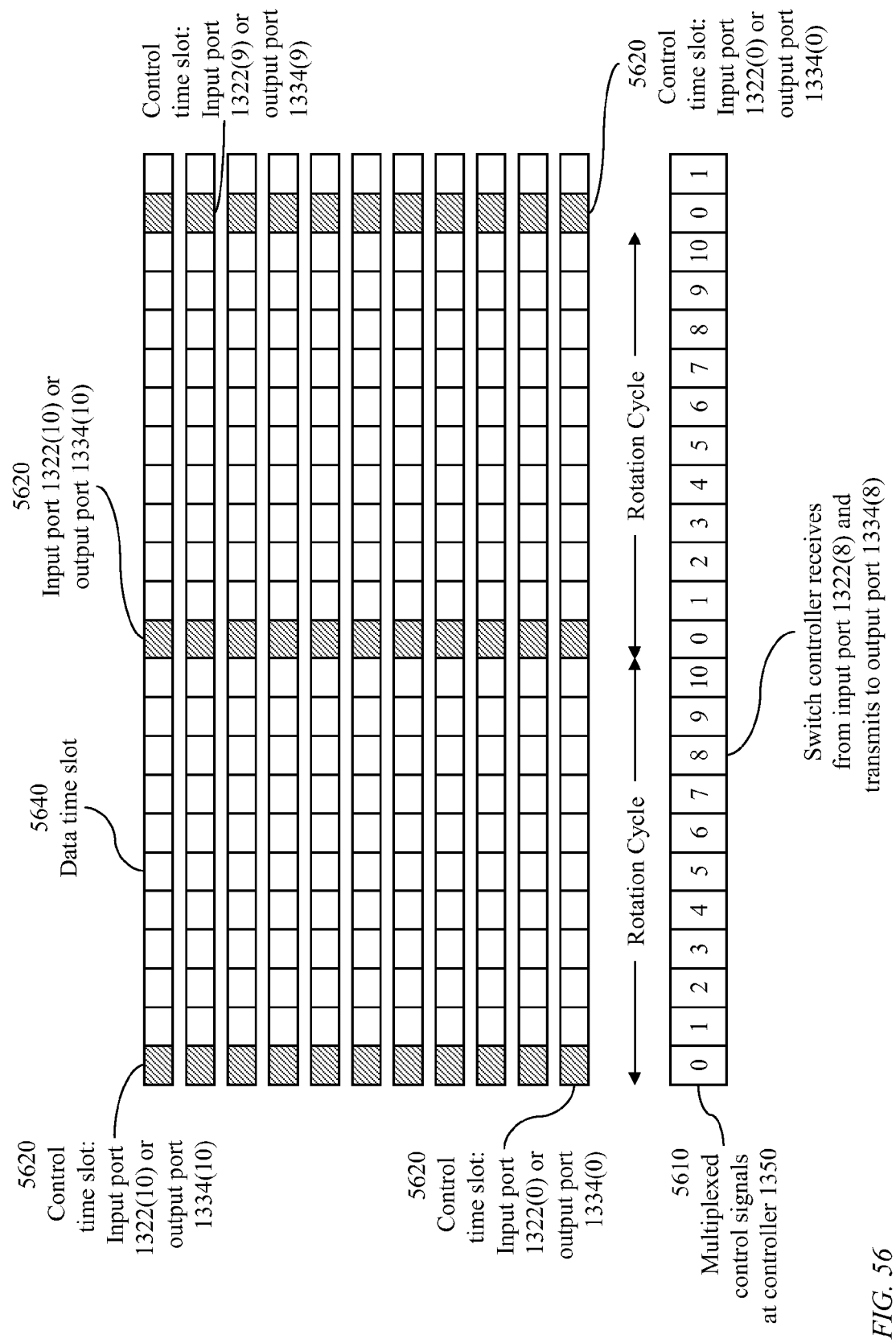
Figure 57:
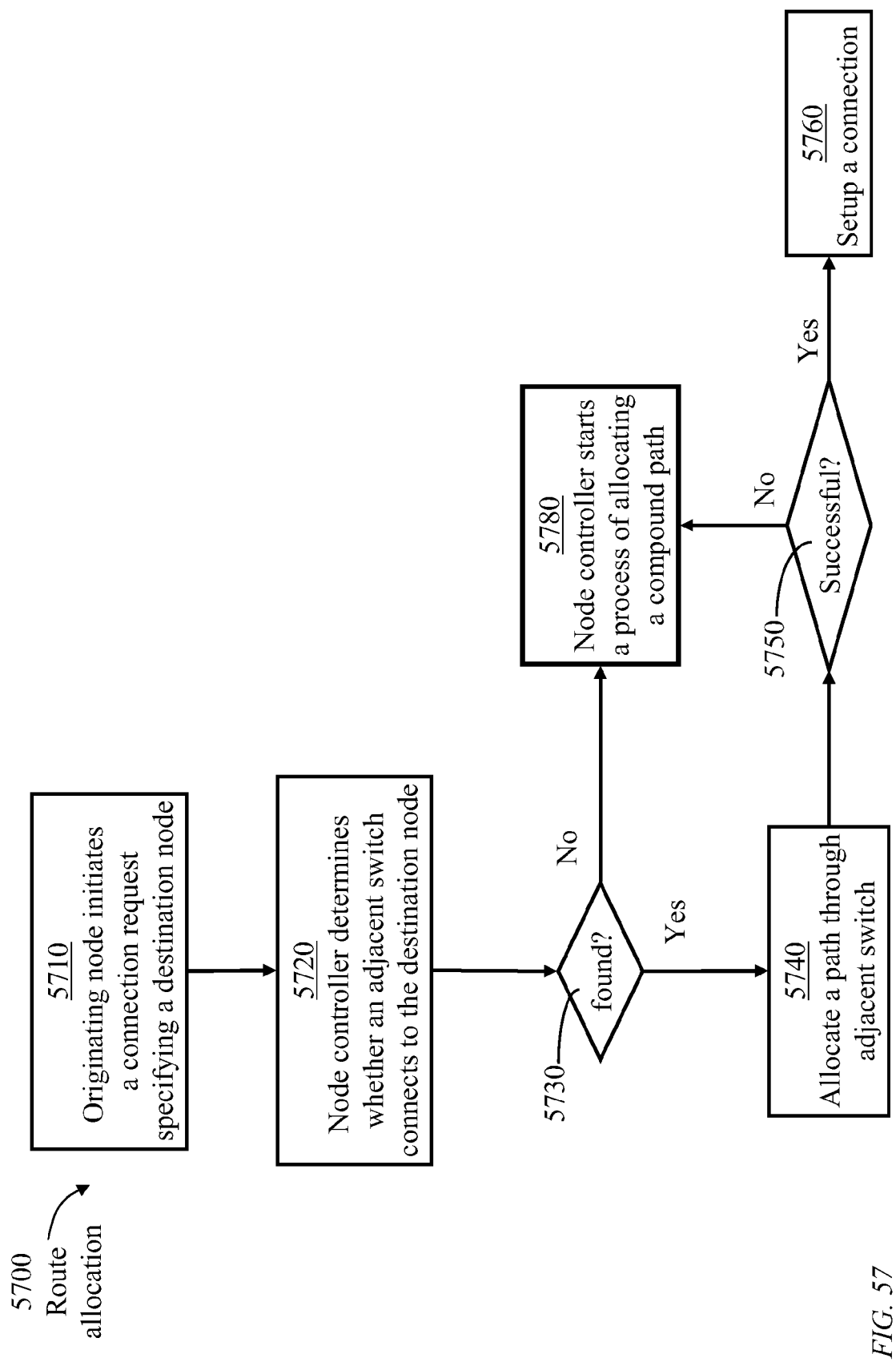
Figure 58:
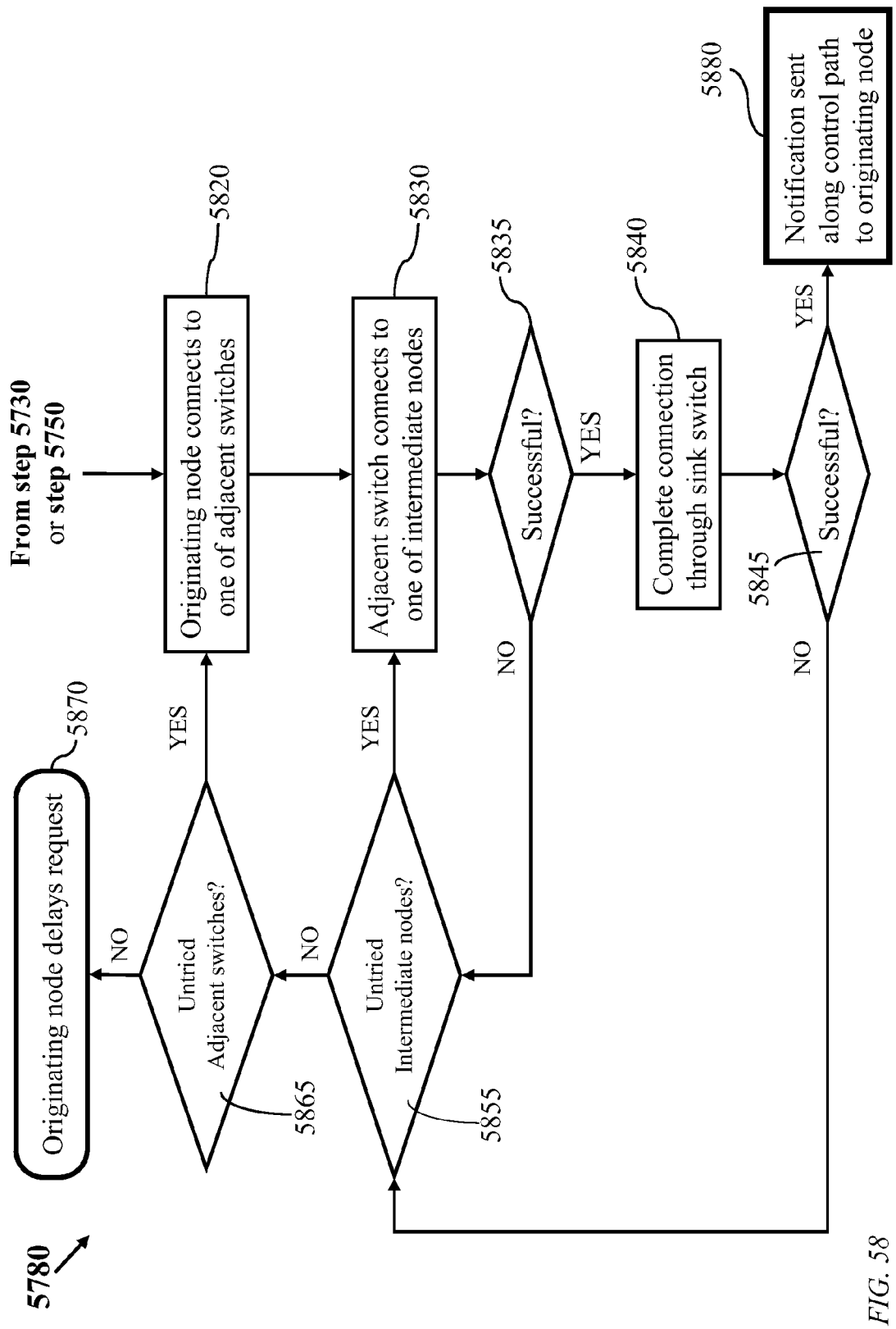
Figure 59:
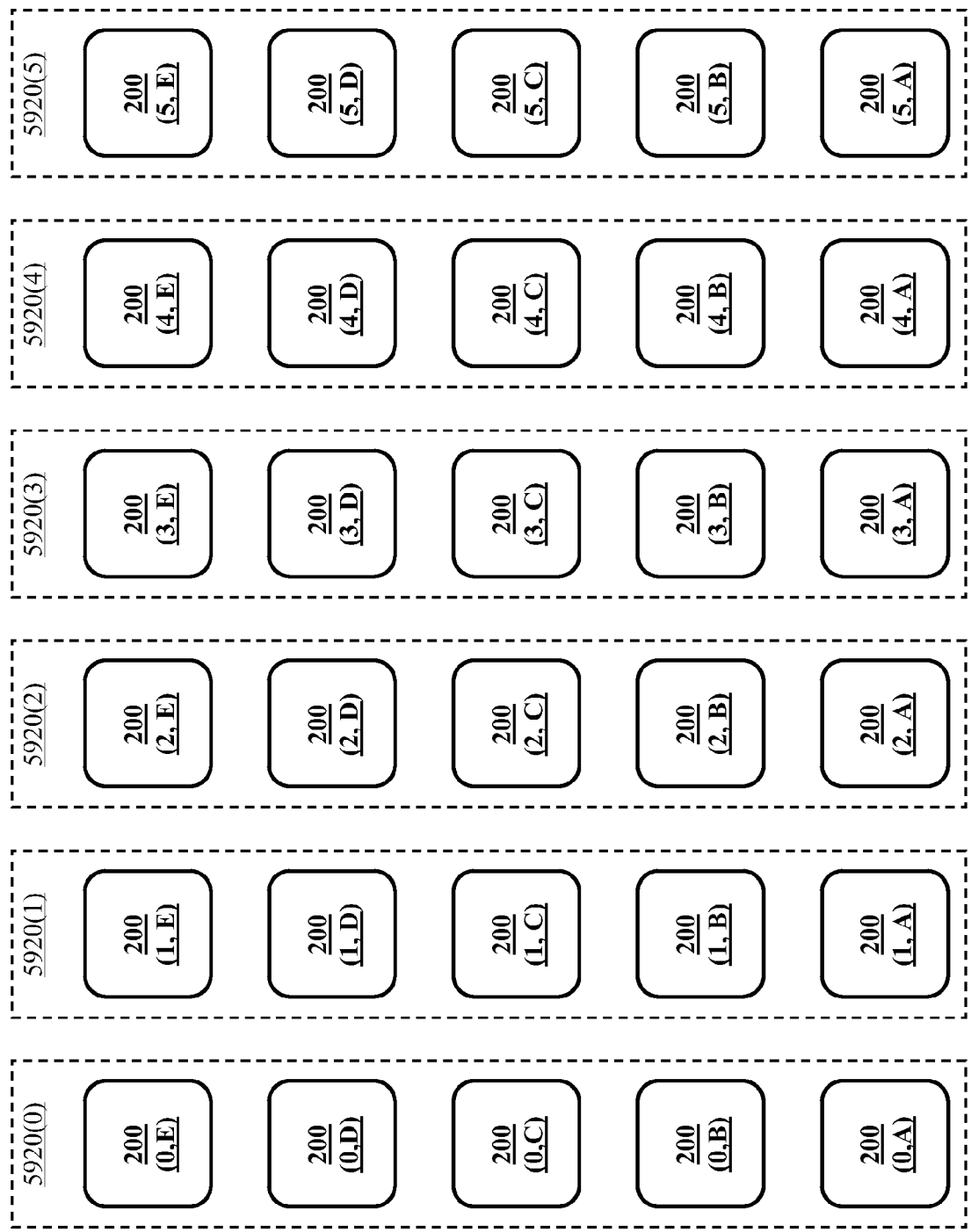
Figure 60:
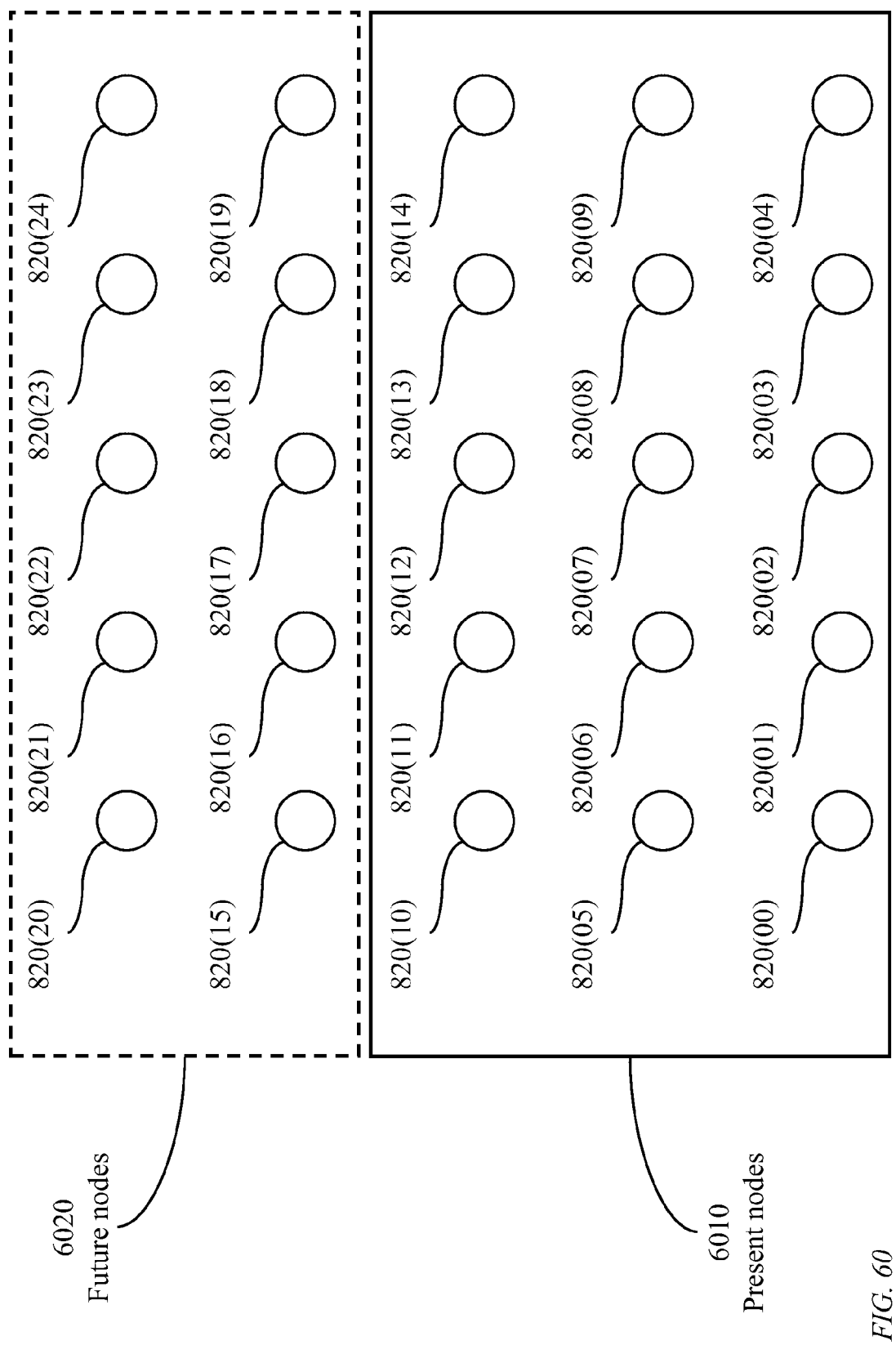

3 having a common initial path to an intermediate node of a set of third-order nodes, in accordance with an embodiment of the present invention;

FIG. 19 illustrates simple rules for establishing paths from an originating node to a destination node of any of the networks of FIG. 3, 4, or 5, in accordance with an embodiment of the present invention;

FIG. 20 illustrates intermediate nodes defining compound paths for a first directed node pair of any of the networks of FIG. 3, FIG. 4, or FIG. 5;

FIG. 21 illustrates intermediate nodes defining compound paths for a second directed node pair of any of the networks of FIG. 3, FIG. 4, or FIG. 5;

FIG. 22 illustrates intermediate nodes defining compound paths for a third directed node pair of any of the networks of FIG. 3, FIG. 4, or FIG. 5;

FIG. 23 illustrates six compound paths for the first directed node pair of FIG. 20;

FIG. 24 illustrates six compound paths for the second directed node pair of FIG. 21;

FIG. 25 illustrates six compound paths for the third directed node pair of FIG. 22;

FIG. 26 illustrates arbitrary numbering of a first plurality of nodes for use in determining generalized mutually orthogonal sets of nodes;

FIG. 27 illustrates exemplary formations of nodes of the first plurality of nodes of FIG. 26, with each formation comprising a number of disjoint sets of nodes constituting the entire plurality of nodes, where the nodes of each set of nodes are interconnected through a respective switch, in accordance with an embodiment of the present invention;

FIG. 28 illustrates other exemplary formations of nodes of the first plurality of nodes of FIG. 26, with each formation comprising a number of disjoint sets of nodes constituting the entire plurality of nodes, where the nodes of each set of nodes are interconnected through a respective switch, in accordance with an embodiment of the present invention;

FIG. 29 illustrates exemplary disjoint and orthogonal sets of nodes based on the formations of FIG. 27, in accordance with an embodiment of the present invention;

FIG. 30 illustrates arbitrary numbering of a second plurality of nodes for use in determining generalized mutually orthogonal sets of nodes;

FIG. 31 illustrates orthogonal sets of nodes corresponding to the second plurality of nodes of FIG. 30;

FIG. 32 and FIG. 33 illustrate exemplary generic formations of nodes of the second plurality of nodes of FIG. 30, with each formation comprising a number of disjoint sets of nodes constituting the entire plurality of nodes, where the nodes of each set of nodes are interconnected through a respective switch, in accordance with an embodiment of the present invention;

FIG. 34 illustrates a route set for a selected distant node pair of the plurality of nodes of FIG. 26 for a switching system of order 3 based on three formations selected from the formations of FIG. 27;

FIG. 35 illustrates a route set for the node pair of FIG. 34 for a switching system of order 3 based on other formations selected from the formations of FIG. 27;

FIG. 36 illustrates a route set for an adjacent node pair of the plurality of nodes of FIG. 26 for a switching system of order 3 based on the formations of FIG. 34;

FIG. 37 illustrates network capacity growth based on increasing network order, in accordance with an embodiment of the present invention;

FIG. 38 illustrates formations of a partially populated network based on the generic formations of FIG. 32 and FIG. 33 where an initial number of nodes is smaller than the attainable number of nodes;

FIG. 39 illustrates a coverage growth scheme of the partially populated network of FIG. 38 based on adding a switch while the network order is kept unchanged, in accordance with an embodiment of the present invention;

FIG. 40 illustrates a capacity growth scheme of the partially populated network of FIG. 38 where the network order is increased, in accordance with an embodiment of the present invention;

FIG. 41 illustrates coverage growth and capacity growth of the partially populated network of FIG. 38 where a switch is added and the network order is increased, in accordance with an embodiment of the present invention;

FIG. 42, FIG. 43, FIG. 44, FIG. 45, illustrate connectivity of nodes to switches according to the growth scheme of FIG. 41;

FIG. 46 illustrates a routing table maintained at a switch of the fully populated network of FIG. 37, in accordance with an embodiment of the present invention;

FIG. 47 illustrates a routing table maintained at a switch of the partially populated network of FIG. 40, in accordance with an embodiment of the present invention;

FIG. 48 illustrates determining a source routing table, in accordance with an embodiment of the present invention;

FIG. 49 illustrates exemplary data structures of a source routing table of a first node pair for fully populated switching systems of order 2, 3, and 4 based on the generic formations of FIG. 32 and FIG. 33, in accordance with an embodiment of the present invention;

FIG. 50 illustrates a source routing table of a second node pair for networks of order 2, 3, and 4;

FIG. 51 illustrates source routing tables of the node pair of FIG. 49 for partially populated switching systems of order 2, 3, and 4 based on the generic formations of FIG. 32 and FIG. 33, FIG. 52 illustrates a route set of a network of order 2;

FIG. 53 illustrates a route set of a network of order 3;

FIG. 54 illustrates a route set of a network of order 4;

FIG. 55 illustrates dedicated control time slots in a switching system employing instantaneous space switches;

FIG. 56 illustrates dedicated control time slots in a switching system employing latent space switches;

FIG. 57 is a flow chart illustrating allocation of a path;

FIG. 58 is a flow chart providing details of allocation of a compound path;

FIG. 59 illustrates a plurality of switches of a fully populated contiguous switching system;

FIG. 60 illustrates nodes of a switching system partitioned into currently operating present nodes and future nodes.

Figure 61:
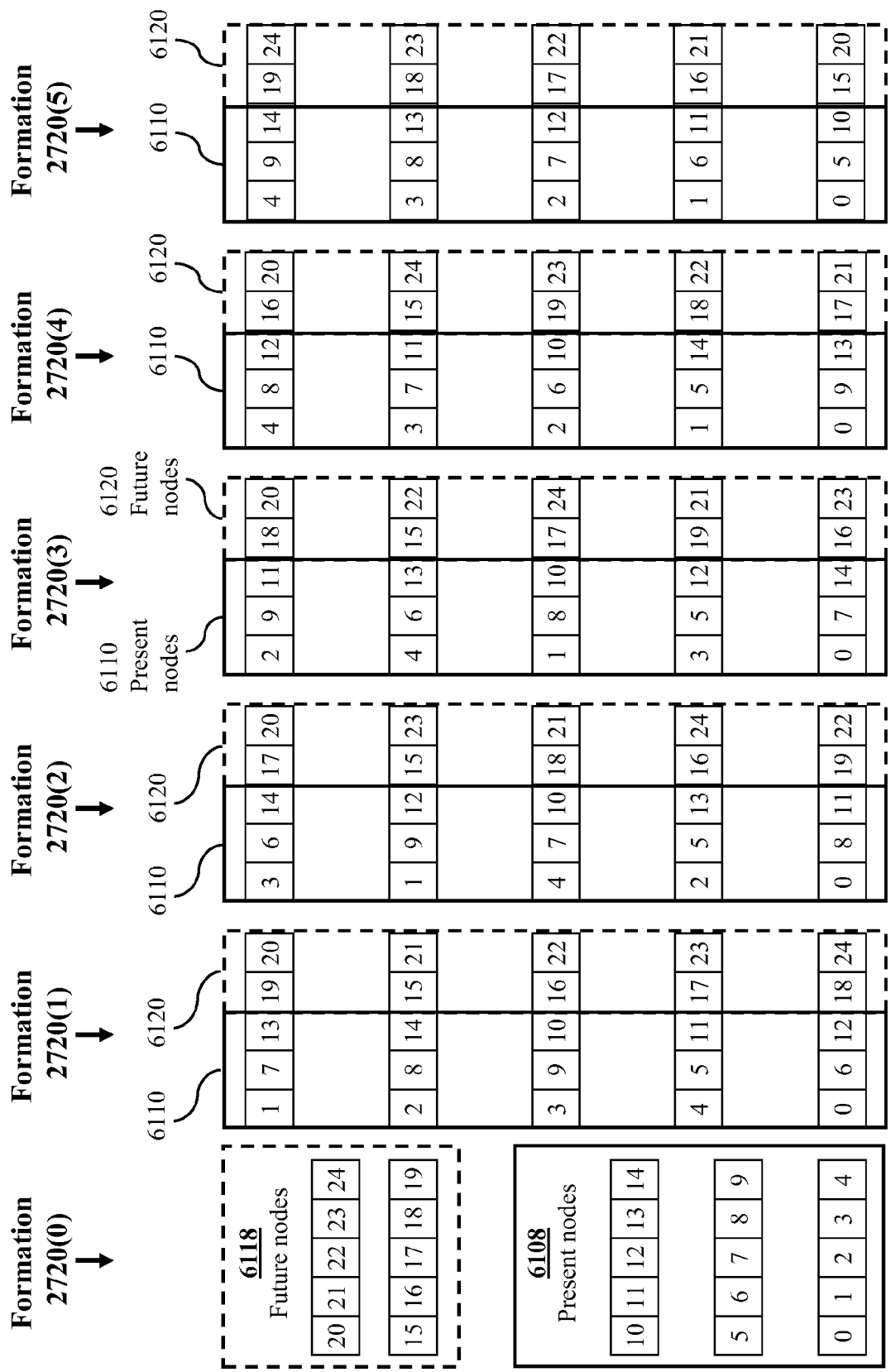
Figure 62:
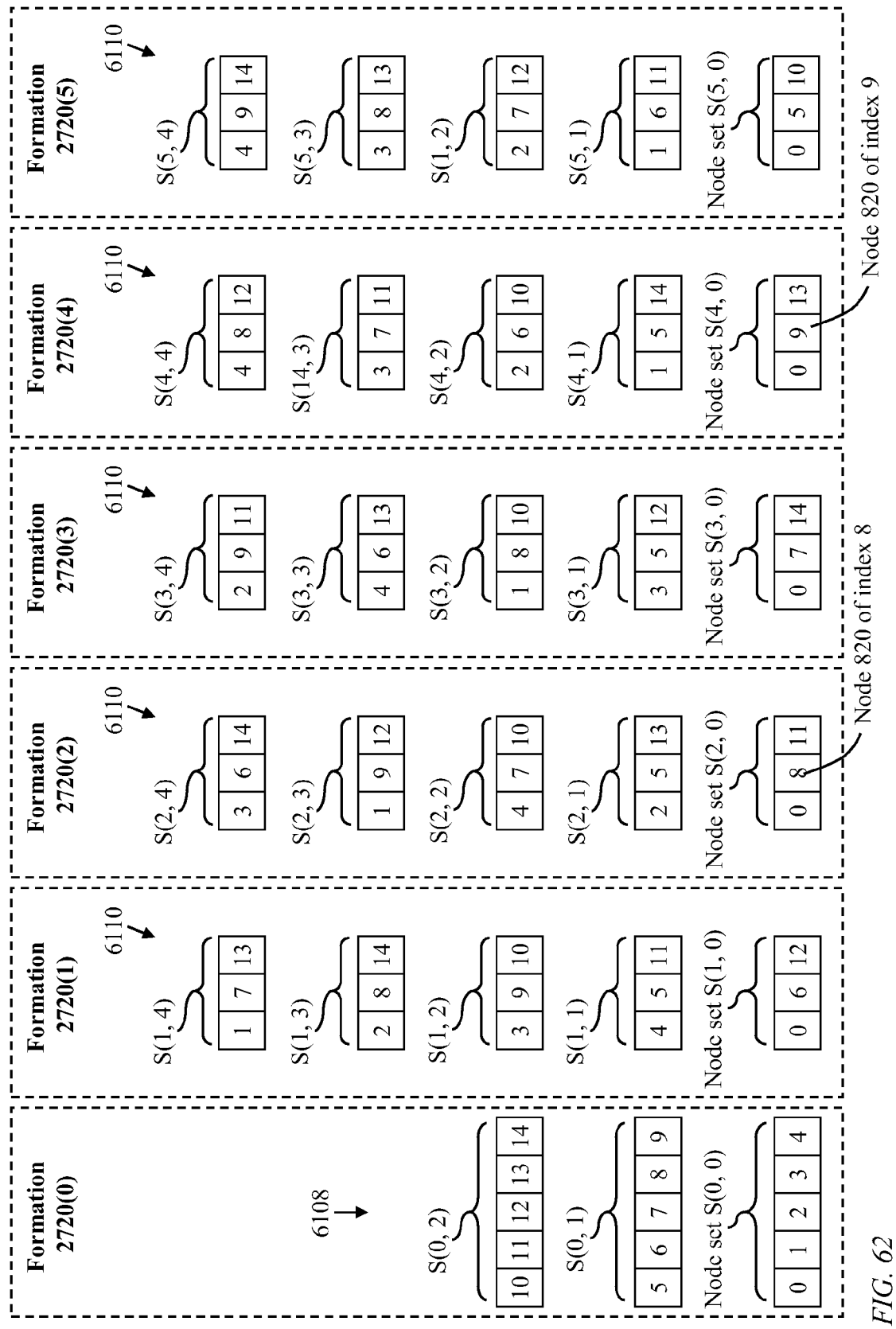
Figure 63:
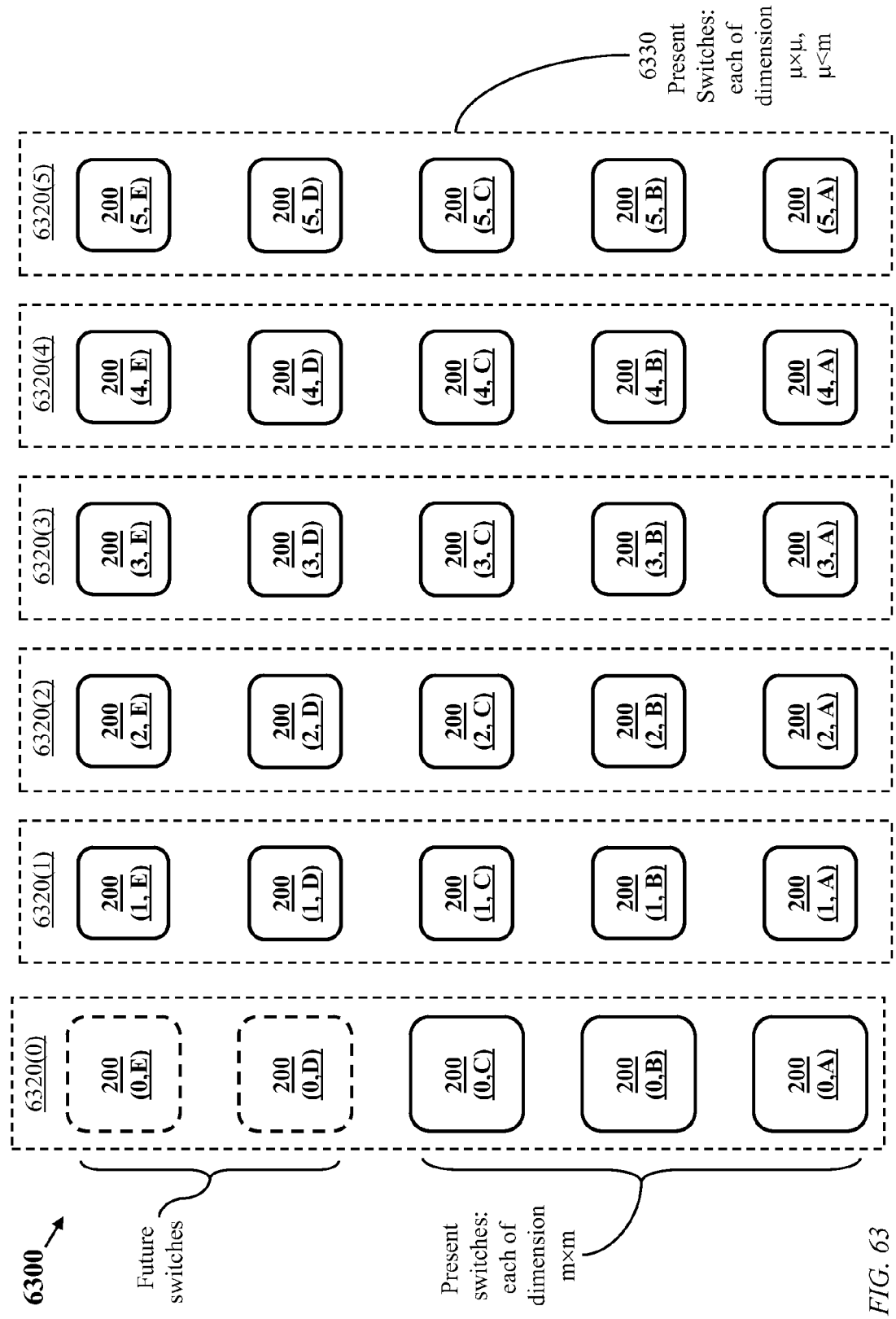
Figure 64:
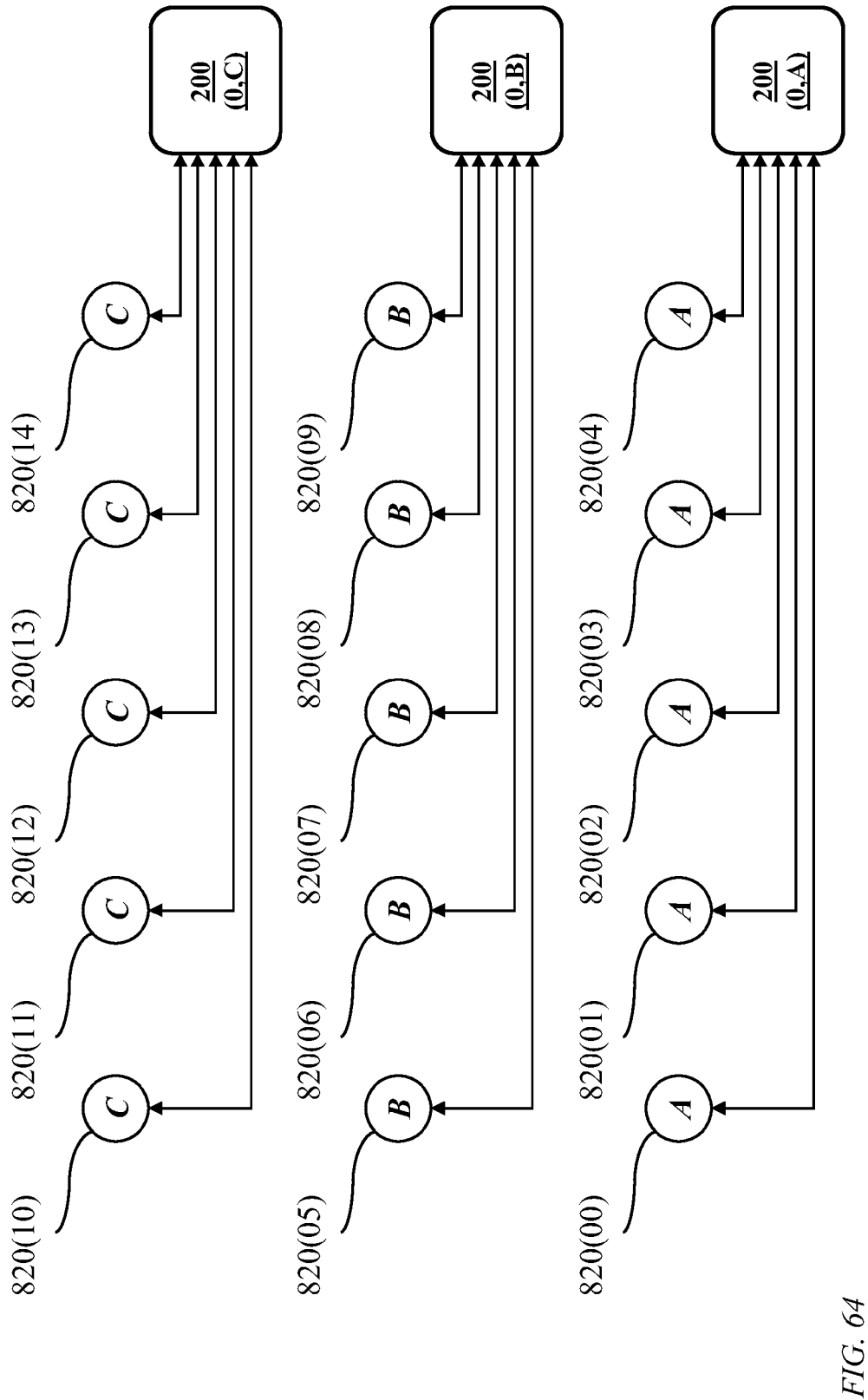
Figure 72:
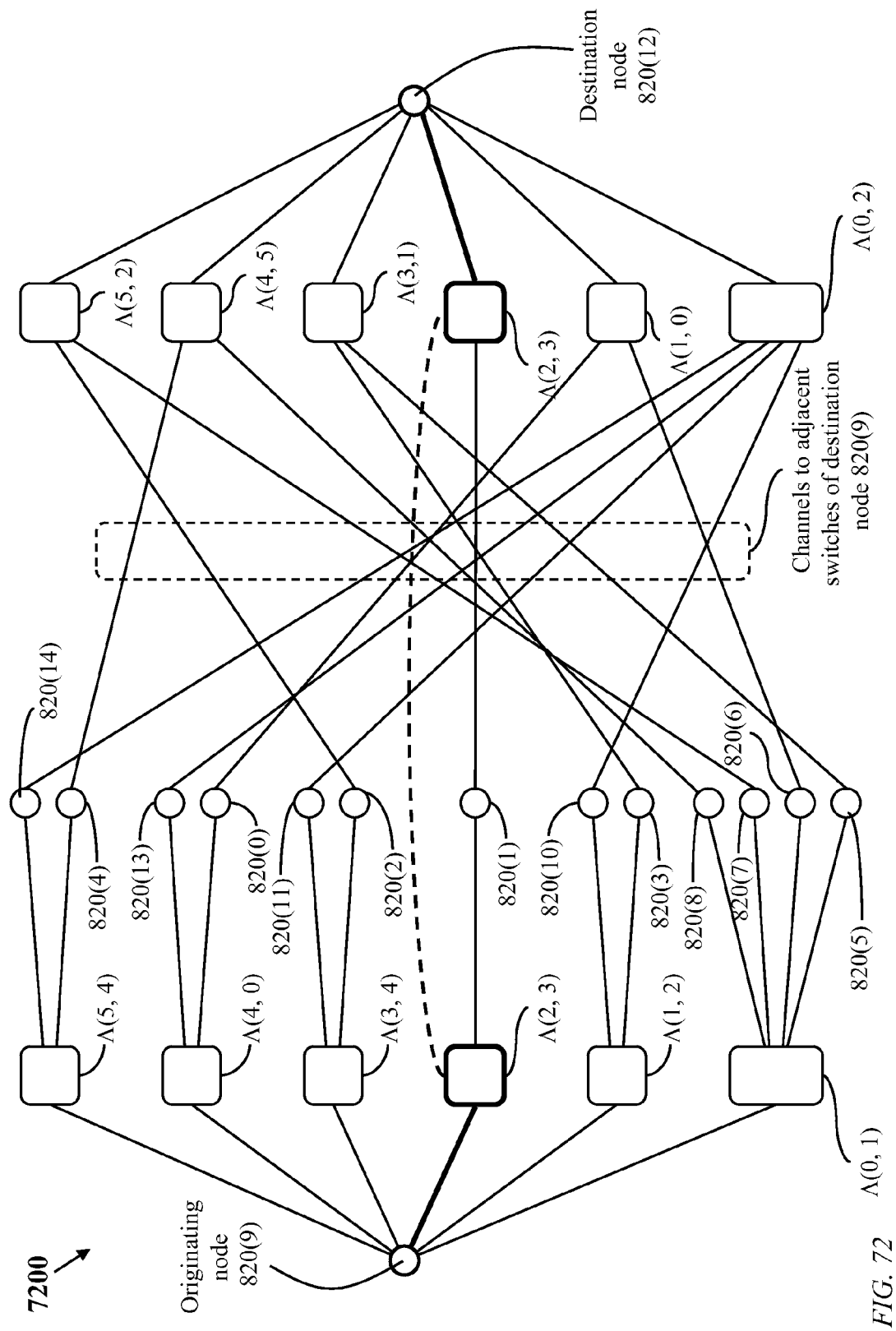
Figure 73:
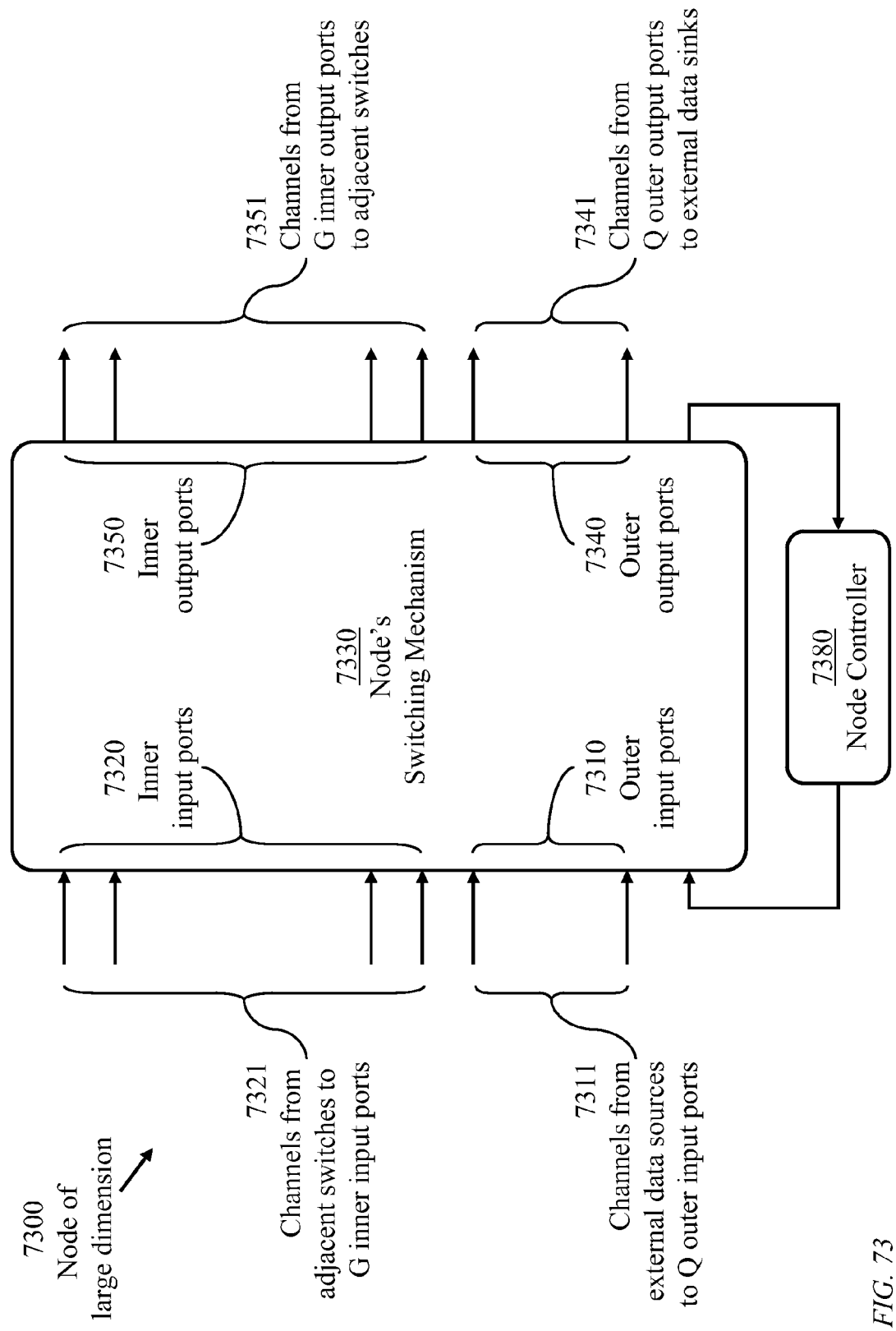
Figure 74:
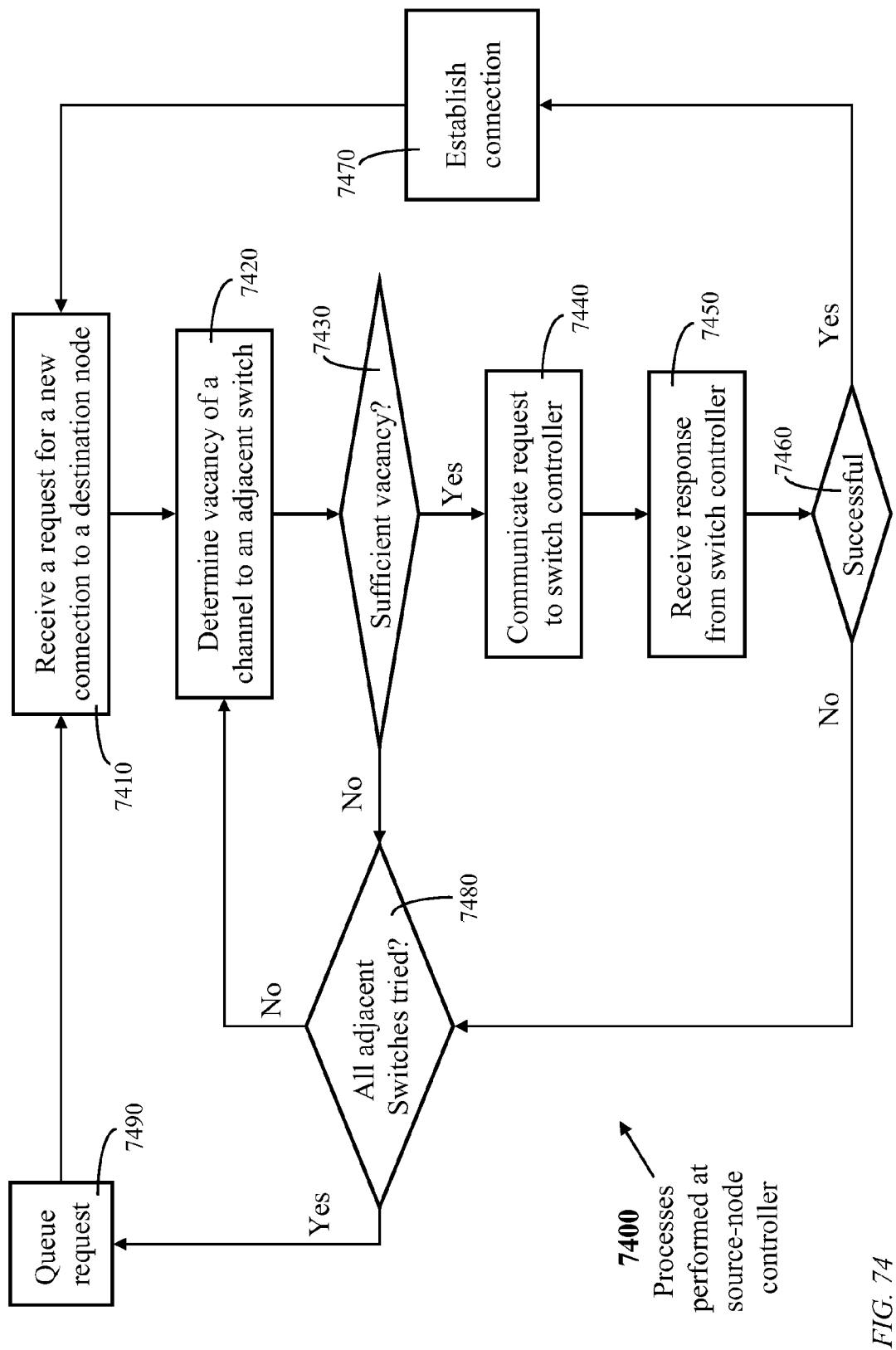
Figure 75:
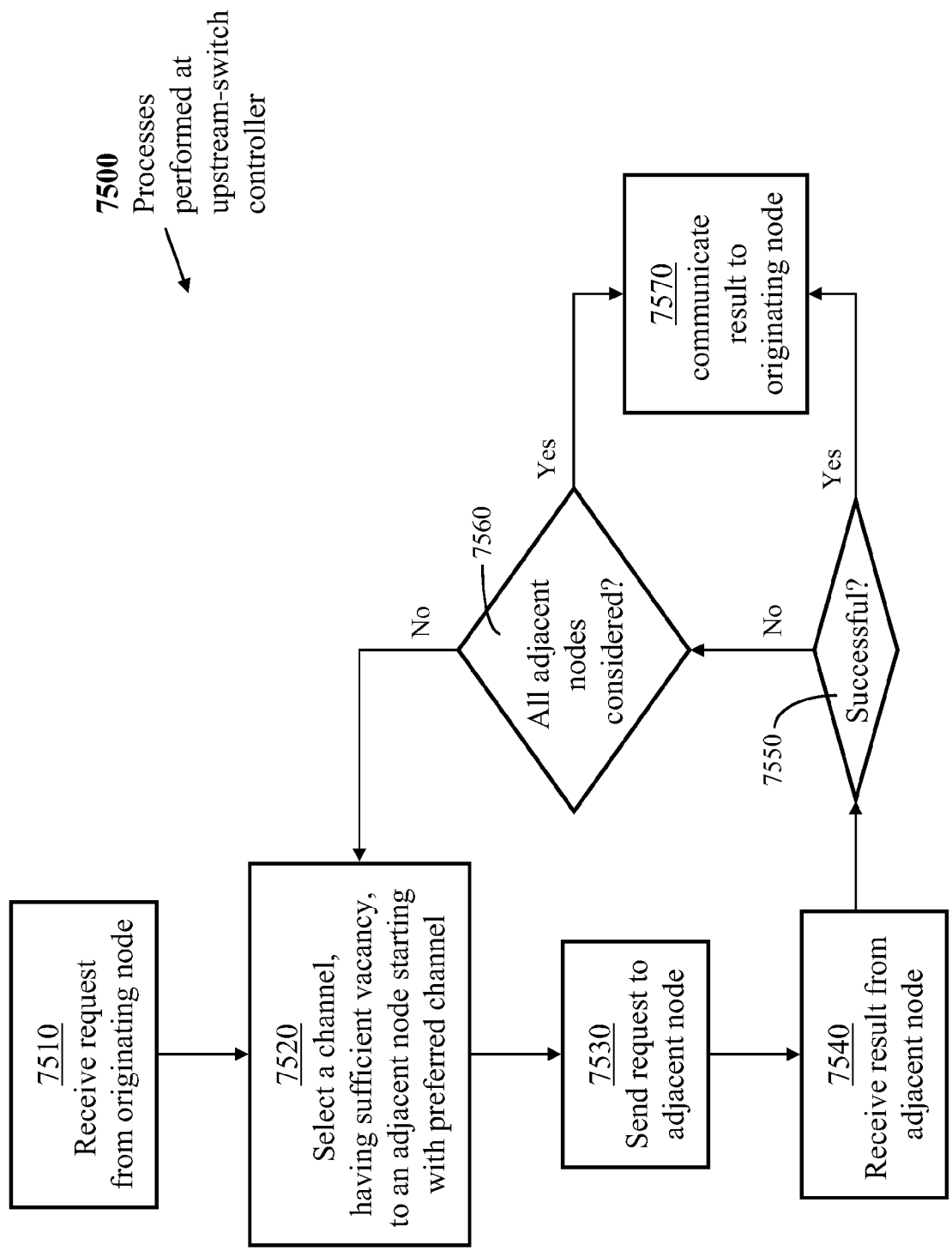
Figure 76:
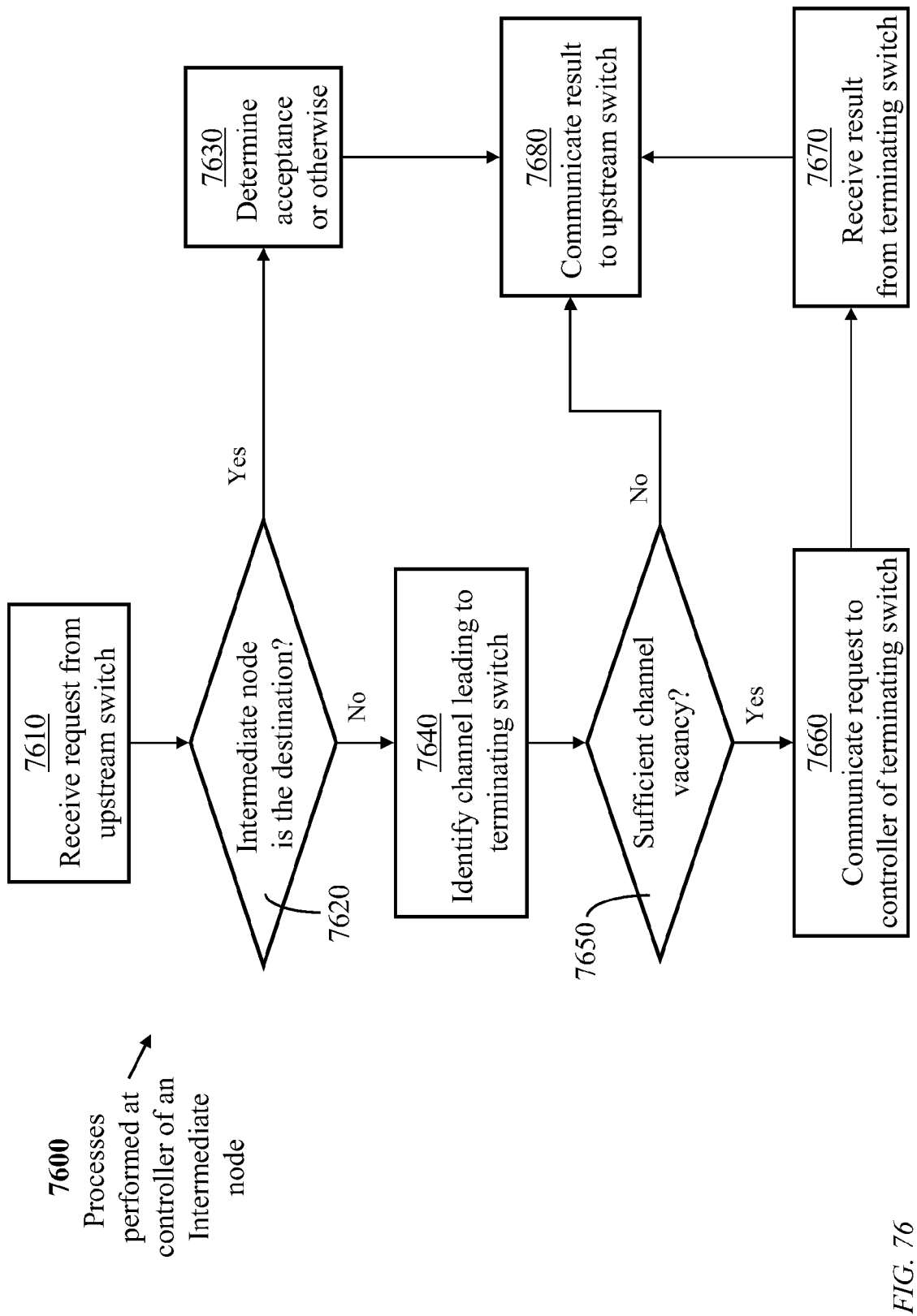
Figure 77:
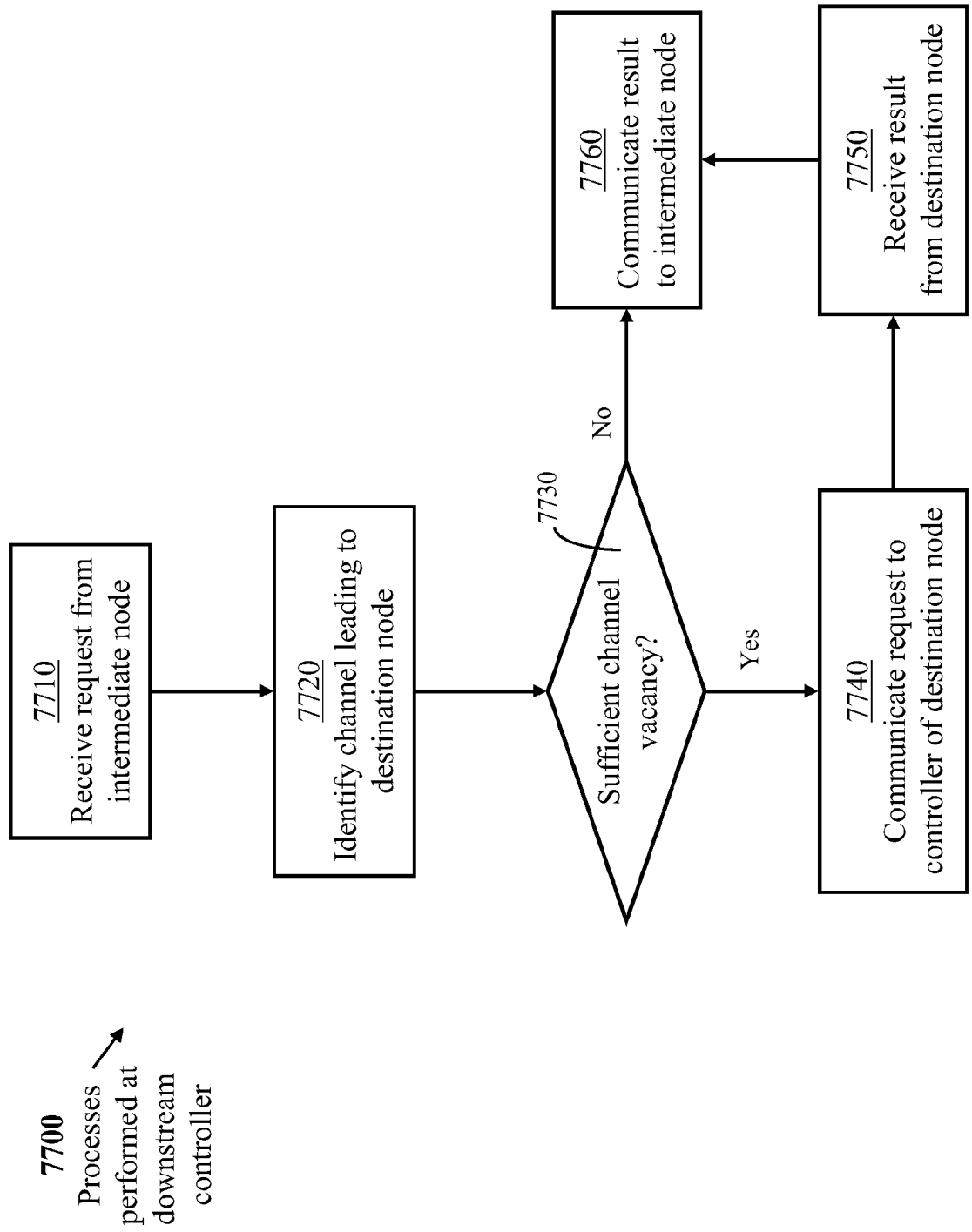

FIG. 61 illustrates all node formations of present and future nodes determined in accordance with an embodiment of the present invention;

FIG. 62 illustrates node formations of the present nodes of FIG. 61;

FIG. 63 illustrates switch groups corresponding to the node formations of FIG. 61, in accordance with an embodiment of the present invention;

FIG. 64 illustrates connectivity of node sets of a first node formation of FIG. 62 to switches of a corresponding switch group, in accordance with an embodiment of the present invention;

FIGS. 65 to 69 illustrate connectivity of node sets of node formations of FIG. 62 to switches of corresponding switch groups, in accordance with an embodiment of the present invention;

FIG. 70 illustrates connectivity of nodes to switches in a partially-populated contiguous switching system, in accordance with an embodiment of the present invention;

FIG. 71 illustrates a routing array for each of the nodes of the switching system of FIG. 62, in accordance with an embodiment of the present invention;

FIG. 72 illustrates all paths from a first node to a second node of a partially-populated contiguous switching-system, in accordance with an embodiment of the present invention;

FIG. 73 illustrates a node suitable for use in a contiguous switching system;

FIG. 74 illustrates establishing a path from a first node to a second node of the switching system, in accordance with an embodiment of the present invention;

FIG. 75 illustrates request processing at an upstream switch, in accordance with an embodiment of the present invention;

FIG. 76 illustrates request processing performed by a node controller of an intermediate node of a compound path, in accordance with an embodiment of the present invention;

FIG. 77 illustrates request processing performed by a switch controller of a downstream switch, in accordance with an embodiment of the present invention;

FIG. 78 illustrates all compound paths for a first directed node pair, and all compound paths for a second directed node pair, in a partially populated contiguous switching system, in accordance with an embodiment of the present invention;

FIG. 79 illustrates all compound paths from a first node to a second node in a fully populated contiguous switching system, in accordance with an embodiment of the present invention; and FIG. 80 illustrates all compound paths for a node pair in a fully populated contiguous switching system, in accordance with an embodiment of the present invention.

TERMINOLOGY

Node: A node comprises a switching mechanism and a number of dual ports divided into inner ports and outer ports. An inner port connects to a switch of a switching system while an outer port connects to external network elements, such as data sources and sinks or a link to/from an external network element. A node is also called an "access node" or an "edge node".

Switching-system coverage: The term refers to the number of nodes of a switching system.

Wide-coverage network: A wide-coverage network is a distributed switching system comprising a large number of nodes. The network transfers data from data sources to data sinks, where the data sources and sinks may be distributed over a wide geographical area, such as a continent or the entire Globe.

Adjacent nodes: Nodes sharing a same switch are said to be "topologically mutually adjacent nodes" or simply "mutually adjacent nodes". A first node is said to be adjacent to a second node if the two nodes connect to a same switch.

Topologically distant nodes (distant nodes for brevity): any two nodes connecting to different switches are said to be "topologically distant nodes" or simply "distant nodes". A node not connected to a particular switch is also said to be a distant node with respect to the particular switch. Thus, all nodes excluding a set of nodes connecting to a particular switch are distant nodes with respect to the particular switch.

Formation: The nodes of a switching system may be divided into a group of disjoint node sets called a "node formation" or "formation for brevity. Thus, a formation comprises a number of node sets of disjoint nodes which collectively contain all the nodes of a respective switching system.

Order of a formation: A switching system may be based on two or more formations. The formations may be individually identified according to their sequential order.

Node-set order: A node set of a formation k is referenced as a node set of order k, or a k-order node set.

Switch group: The nodes of each node set are interconnected through a respective switch. The switches coupled to node sets of a formation form a "switch group".

Fully-populated switching system: In a fully populated switching system, each switch connects to a same number, m, of nodes and each switch group contains m switches. Thus, the switching system supports $m^2$ nodes. The number of switch groups is at least 2 and at most (m+1).

Partially-populated switching system: A partially-populated switching system supports a number of nodes less than the maximum of $m^2$ nodes. One switch group may contain less than m switches. The number of switch groups is at least 2 and at most (m+1).

Contiguous switching system: A switching system configured to include the maximum number of switch groups is called a "contiguous switching system" since it renders each directed node pair an adjacent node pair. In a contiguous switching system, whether partially populated or fully populated, each node is adjacent to each other node in one node set.

Capacity of a switching system: The capacity of a switching system is the sum of capacities of all access ports of the switching system, i.e., the total capacity available to external data sources.

Data-switching center: A data-switching centre is an apparatus for directing data from any input channel of a plurality input channels to any output channel of a plurality of output channel. The input data may include packets of arbitrary lengths and, to facilitate switching, the packets may be segmented into data segments of equal size and switched internally as such. The switched data segments are re-assembled at output to reproduce the packets in the forms in which they were received.

Dual port: In a device having multiple input ports and multiple output ports, each input port may be associated with a respective output port to form a "dual port".

Node controller: A node controller is a device having at least one processor and at least one memory device storing processor-readable instructions. Each node is coupled to a respective node controller. A node controller may be embedded in the structure of a respective node or configured as a separate entity communicatively coupled to the respective node.

Switch: A switch has a number of input ports, a number of output ports, and a switching mechanism (often called a "switch fabric") connecting any input port to any output port. A switch may comprise multiple building blocks called "switch units" or "switch modules".

Switch dimension: The number of input ports (inlet ports) and the number of output ports (outlet ports) of a switch define a "dimension" of the switch. A switch having $n_1$ input ports and $n_2$ output ports, $n_1>1$, $n_2>1$, is said to be of dimension $n_1 \times n_2$. An input port and a corresponding output port constitute a dual port. With $n_1=n_2=n$, the switch would have n dual ports and the switch dimension may simply be expressed as the number of dual ports.

Space switch: A space switch has input ports and output ports and is configured to connect any input port to any output port. An instantaneous space switch transfers data from an input port to a selected output port with negligible delay. A latent space switch transfers data from an input port to an output port after a systematic switching delay.

Non-blocking switching: A switching device having multiple input ports and multiple output ports which guarantees a path from an input port to an output port (where both the input port and the output port have a sufficient vacancy) is said to provide contention-free switching. The switching device may be a node or a switch, as defined above, in the switching system of the present invention.

Contention-free switching: A switching device having multiple input ports and multiple output ports which establishes a path from an input port to an output port (where both the input port and the output port have a sufficient vacancy) without a search process is said to provide contention-free switching. A contention-free switching device is naturally a non-blocking switching device. A contention-free switching device is typically of a moderate dimension; having 64 dual ports for example. The switching device may be a node or a switch in the switching system of the present invention.

Switch controller: A switch controller is a device having at least one processor and at least one memory device storing processor-readable instructions. Each switch is coupled to a respective switch controller. A switch controller may be embedded in the structure of a respective switch or configured as a separate entity communicatively coupled to the respective switch.

Rotator: A rotator is a simple device having multiple inlets and multiple outlets. The rotator cyclically connects each inlet to each outlet in a predefined order during every rotation cycle. The rotator itself is not a switching device because it lacks the steering capability; a switching device should have at least one degree of freedom. A rotator scales to a very high dimension, i.e., a large number of inlets and a large number of outlets.

Ascending rotator: A rotator having a plurality of inlets and a plurality of sequentially indexed outlets, where each inlet cyclically accesses the outlets in an ascending index order, is called an ascending rotator. An ascending rotator having N inlets, indexed as 0 to (N−1), and N outlets indexed as 0 to (N−1), connects an inlet of index j to an outlet of index $\{j+t\}_{modulo\ N}$ during time slot t of a repetitive time frame organized into N time slots, $0 \le j < N$, $0 \le t < N$.

Descending rotator: A rotator having a plurality of inlets and a plurality of sequentially indexed outlets, where each inlet cyclically accesses the outlets in a descending index order, is called a descending rotator. A descending rotator having N inlets, indexed as 0 to (N−1), and N outlets indexed as 0 to (N−1), connects an inlet of index j to an outlet of index $\{j-t\}_{modulo\ N}$ during time slot t of a repetitive time frame organized into N time slots, $0 \le j < N$, $0 \le t < N$.

Input occupancy: The allocated capacity of an input port of a switch is referenced as the (absolute) input occupancy of the input port. A relative occupancy of the input port may be defined as a ratio of the allocated capacity to capacity of the input port. In operation, the controller of a switch may use the vacancy of the input port for route allocation.

The vacancy of an input port is the capacity of the input port minus the allocated capacity.

Output occupancy: The allocated capacity of an output port of a switch is referenced as the (absolute) output occupancy of the output port. A relative occupancy of the output port may be defined as a ratio of the allocated capacity to capacity of the output port. In operation, the controller of a switch may use the vacancy of the output port for route allocation. The vacancy of an output port is the capacity of the output port minus the allocated capacity.

Switch order: A switch interconnecting nodes of a node set of order k is referenced as a switch of order k or a "k-order" switch.

Order of a switch group: A group of k-order switches is referenced as a switch group of order k or a k-order switch group.

Route or path: The terms "route" and "path" are used synonymously

Simple route: A route from an originating node to a destination node (from a node to another node) which traverses only one switch is herein called a "simple route".

Compound route: A route from a first node to a second node which traverses a first switch, an intermediate node, and a second switch is herein called a "compound route". A compound route comprises two joined simple routes.

Source switch and sink switch: A compound route from an originating node to a destination node traverses a first switch connecting to the originating node and a second switch connecting to the destination node. The first switch is referenced as a "source switch" and the second switch is referenced as a "sink switch". Each switch may function as a source switch and a sink switch.

Upstream switch: A source switch is also called an upstream switch.

Downstream switch: A sink switch is also called a downstream switch.

Upstream direction: The direction of signal flow from a node towards a switch is referenced as the upstream direction. A channel from a node to a switch is referenced as an upstream channel.

Downstream direction: The direction of signal flow from a switch towards a node is referenced as the downstream direction. A channel from a switch to a node is referenced as a downstream channel.

Flow: The term refers to at least one data stream from an originating node to a destination node.

Orthogonal sets: Any two sets of nodes are said to be orthogonal if the two sets have a number of common nodes not exceeding a predefined upper bound.

Orthogonality Index: The number of common nodes in any two sets of nodes defines an orthogonality index.

$\lfloor \alpha \rfloor$: $\lfloor \alpha \rfloor$ denotes the nearest integer lower than or equal to $\alpha$ if $\alpha$ is a real number; $\lfloor \alpha \rfloor = \alpha$ if $\alpha$ is an integer $\lceil \alpha \rceil$: $\lceil \alpha \rceil$ denotes the nearest integer higher than or equal to $\alpha$ if $\alpha$ is a real number; $\lfloor \alpha \rfloor = \alpha$ if $\alpha$ is an integer Modulo operation: The operation "X modulo W", herein denoted $X_{modulo\ W}$, or $|X|_W$, where X is any integer, which may be a positive integer or a negative integer, and W is a positive integer is a remainder determined as: $X_{modulo\ W} = X - W \times \lfloor X/W \rfloor$, where $\lfloor R \rfloor$ is the nearest integer that is less than R or equal to R if R is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$.

Thus, $7_{modulo\ 8} = 7$, $(-7)_{modulo\ 8} = \{-7-(-1)\times 8\} = 1$, $8_{modulo\ 8} = 0$, $(-8)_{modulo\ 8} = 0$, $9_{modulo\ 8} = 1$, and $(-9)_{modulo\ 8} = 7$.

A reference numeral may refer to items of a same type individually or collectively. A reference numeral may further be indexed to distinguish individual items of a same type.

LIST OF REFERENCE NUMERALS

100: An arrangement of nodes of a switching system
120: A node or collectively a number of nodes
123: An index of a diagonal of nodes 120
125: A controller of a node 120
200: A data switch (referenced as a "switch" for brevity)
210: upstream channels (individually or collectively) to switch 200
220: input ports (individually or collectively) of a switch 200
230: Output ports (individually or collectively) of a switch 200
240: Switching mechanism (also called switch fabric) of a switch 200
250: Controller of a switch 200
280: Downstream channels (individually or collectively) from switch 200.
300: A switching system employing a plurality of switches each interconnecting a respective set of nodes 120
320: A dual link connecting a node 120 to an adjacent switch 200
400: A switching system employing rotator pairs, each rotator pair interconnecting a respective set of nodes 120
410: A primary rotator pair interconnecting nodes of a column in the arrangement of FIG. 1
412: A dual link connecting a node to an adjacent primary rotator pair
415: A controller connecting to a primary rotator pair 410
420: A secondary rotator pair interconnecting nodes of a row in the arrangement of FIG. 1
422: A dual link connecting a node to an adjacent secondary rotator pair
425: A controller connecting to a secondary rotator pair 420
430: A tertiary rotator pair interconnecting nodes of a diagonal in the arrangement of FIG. 1
432: A dual link connecting a node to an adjacent tertiary rotator pair
435: A controller connecting to a tertiary rotator pair 430
500: A switching system employing rotators, each rotator interconnecting a respective set of nodes 120
510: A primary rotator interconnecting nodes of a column in the arrangement of FIG. 1
512: A dual link connecting a node to an adjacent primary rotator
515: A controller connecting to a primary rotator 510
520: A secondary rotator interconnecting nodes of a row in the arrangement of FIG. 1
522: A dual link connecting a node to an adjacent secondary rotator
525: A controller connecting to a secondary rotator 520
530: A tertiary rotator interconnecting nodes of a diagonal in the arrangement of FIG. 1
532: A dual link connecting a node to an adjacent tertiary rotator
535: A controller connecting to a tertiary rotator 530
820: A node similar to node 120 but identified differently
825: A controller of a node 820
910: Communication channel from external data sources to a node 120 or 820
912: Inner channel from a primary switch to a node 120 or 820
914: Inner channel from a secondary switch to a node 120 or 820
916: Inner channel from a tertiary switch to a node 120 or 820
920: Input port (individually or collectively) of a node 120 or 820
924: Control multiplexer/demultiplexer
930: Data buffers (individually or collectively)
932: A temporal multiplexer (selector) cyclically connecting data from a buffer 930 to a shared memory device
950: A shared memory device
952: A temporal demultiplexer (selector) cyclically distributing data blocks read from memory device 950 to output ports
960: Output ports (individually or collectively) of a node 120 or 820
980: Communication channel from a node 120 or 820 to external data sinks
982: Inner channel from a node 120 or 820 to a primary switch
984: Inner channel from a node 120 or 820 to a secondary switch
986: Inner channel from a node 120 or 820 to a tertiary switch
1010: Communication channel from external data sources to a node 120 or 820
1011: Inner channel from an ascending rotator of a primary rotator pair to a node 120 or 820
1012: Inner channel from a descending rotator of a primary rotator pair to a node 120 or 820
1013: Inner channel from an ascending rotator of a secondary rotator pair to a node 120 or 820
1014: Inner channel from a descending rotator of a secondary rotator pair to a node 120 or 820
1015: Inner channel from an ascending rotator of a tertiary rotator pair to a node 120 or 820
1016: Inner channel from a descending rotator of a tertiary rotator pair to a node 120 or 820
1020: Input port (individually or collectively) of a node 120 or 820
1024: Control multiplexer/demultiplexer
1030: Data buffers (individually or collectively)
1032: A temporal multiplexer (selector) cyclically connecting data from a buffer 1030 to a shared memory device
1050: A shared memory device
1052: A temporal demultiplexer (selector) cyclically distributing data blocks read from memory device 1050 to output ports
1060: Output ports (individually or collectively) of a node 120 or 820
1080: Communication channel from a node 120 or 820 to external data sinks
1081: Inner channel from a node 120 or 820 to an ascending rotator of a primary rotator pair
1082: Inner channel from a node 120 or 820 to a descending rotator of a primary rotator pair
1083: Inner channel from a node 120 or 820 to an ascending rotator of a secondary rotator pair
1084: Inner channel from a node 120 or 820 to a descending rotator of a secondary rotator pair
1085: Inner channel from a node 120 or 820 to an ascending rotator of a tertiary rotator pair
1086: Inner channel from a node 120 or 820 to a descending rotator of a tertiary rotator pair
1100: An instantaneous space switch
1110: Upstream channels from nodes 120 or 820
1120: Input ports 1122: Distributor control port
1130: Output ports
1132: Collector control port
1140: Switching mechanism (switch fabric)
1150: Switch controller
1151: Channel from switch controller to distributor control port
1152: Channel from collector control port to switch controller
1180: Downstream channels to nodes 120 or 820
1200: Latent space switch—first configuration
1210: Upstream channels from nodes 120 or 820
1220: Input rotator
1221: Distributor control port
1222: Input ports (individually or collectively) of input rotator
1224: Output ports (individually or collectively) of input rotator
1230: Output rotator
1231: Collector control port
1232: Input ports (individually or collectively) of output rotator
1234: Output ports (individually or collectively) of output rotator
1240: Switching mechanism (switch fabric)
1245: Transit memory devices (individually or collectively)
1250: Switch controller of latent space switch 1200
1251: Channel from switch controller to distributor control port
1252: Channel from collector control port to switch controller
1280: Downstream channels from nodes 120 or 820
1300: Latent space switch—second configuration
1310: Upstream channels from nodes 120 or 820
1320: Input rotator
1322: Input ports (individually or collectively) of input rotator
1324: Output ports (individually or collectively) of input rotator
1330: Output rotator
1332: Input ports (individually or collectively) of output rotator
1334: Output ports (individually or collectively) of output rotator
1340: Switching mechanism (switch fabric)
1345: Transit memory devices (individually or collectively)
1350: Switch controller of latent space switch 1300
1351: Channel from an output port of input rotator to switch controller
1352: Channel from switch controller to an input port of output rotator
1380: Downstream channels from nodes 120 or 820
1610: Path to an intermediate node in a primary set of nodes
1612: Path from intermediate node to a node adjacent to originating node
1614: Path from intermediate node to a node adjacent to originating node
1620: Paths from intermediate node to nodes of a secondary set of nodes
1630: Paths from intermediate node to nodes of a tertiary set of nodes
1710: Path to an intermediate node in a secondary set of nodes
1712: Path from intermediate node to a node adjacent to originating node
1714: Path from intermediate node to a node adjacent to originating node
1720: Paths from intermediate node to nodes of a primary set of nodes
1730: Paths from intermediate node to nodes of a tertiary set of nodes
1810: Path to an intermediate node in a tertiary set of nodes
1812: Path from intermediate node to a node adjacent to originating node
1814: Path from intermediate node to a node adjacent to originating node
1820: Paths from intermediate node to nodes of a primary set of nodes
1830: Paths from intermediate node to nodes of a secondary set of nodes
1900: Table of routing rules
1910: Indices of source switches of compound routes
1912: Indices of sink switches of compound routes
1914: Indices of intermediate nodes of compound routes
1916: Indices of intermediate nodes relative to respective source switches
1918: Indices of destination node relevant to sink switches
1920: Compound routes traversing a primary switch adjacent to originating node
1940: Compound routes traversing a secondary switch adjacent to originating node
1960: Compound routes traversing a tertiary switch adjacent to originating node
2000: A set of intermediate nodes
2100: A set of intermediate nodes
2200: A set of intermediate nodes
2720: A node formation of a first plurality of nodes determined according to a first expression
2740: A node set in a formation 2720
2820: A node formation of the first plurality of nodes determined according to a second expression
2840: A node set in a formation 2820
3220: A node formation of a second plurality of nodes determined according to a first expression
3240: A node set of a formation 3220
3410: First part of a compound route
3420: Second part of a compound route
3510: First part of a compound route
3520: Second part of a compound route
3610: First part of a compound route
3620: Second part of a compound route
3820: A formation of a partially populated switching system
3840: A node set of a formation 3820
3920: A formation resulting from adding nodes to a respective formation 3820
3940: A node set of a formation 3920
4020: An added formation to formations 3820
4040: A node set of formation 4020
4120: An added formation to formations 3920
4140: A node set of formation 4120
4200: Node sets of a first formation indicating added nodes
4300: Node sets of a second formation indicating the added nodes
4400: Node sets of a third formation indicating the added nodes
4500: Node sets of a fourth formation indicating the added nodes
4600: Switch routing table of a fully populated switching system
4610: Order of a sink switch of a compound route
4620: Index of an intermediate node of a compound route
4640: Index of a destination node
4700: Switch routing table of a partially populated switching system 4710: Order of a sink switch of a compound route
4720: Index of an intermediate node of a compound route
4740: Index of a destination node
4820: An array indicating all nodes of a switching system
4821: Index of node 820
4822: An array identifying adjacent nodes of an originating node
4824: An array indicating adjacent nodes of a destination node
4842: An array indicating an order of a source switch for each intermediate node
4844: An array indicating an order of a sink switch for each intermediate node
4900: Route sets for an originating node to a distant destination node of a fully populated switching system
4912: Order of a source switch
4914: Order of a sink switch
4916: Index of an intermediate node of a compound route
4920: Route set for a switching system of order 2
4930: Route set for a switching system of order 3
4940: Route set for a switching system of order 4
5000: Route sets for an originating node to an adjacent destination node of a fully populated switching system
5012: Order of a source switch
5014: Order of a sink switch
5016: Index of an intermediate node of a compound route
5018: An indication that a destination node is an adjacent node of the originating node
5020: Route set for a switching system of order 2
5030: Route set for a switching system of order 3
5040: Route set for a switching system of order 4
5120: Route set for a switching system of order 2 of a partially populated switching system
5130: Route set for a switching system of order 3 of a partially populated switching system
5140: Route set for a switching system of order 4 of a partially populated switching system
5520: A control time slot of a first time frame in a switching system employing instantaneous space switches
5530: A control time slot of a second time frame in a switching system employing instantaneous space switches
5540: Data time slot
5610: Control data at switch controller
5620: A control time slot in a switching system employing latent space switches
5640: Data time slot
5700: flow chart illustrating allocation of a path
5710, 5720, 5730, 5740, 5750, 5760, and 5780: Steps of a route allocation process
5820, 5830, 5835, 5840, 5845, 5855, 5865, 5870, and 5880: Details of step 5780
5900: Arrangement of switches of a fully-populated contiguous switching system
5920: Switch group of the fully populated switching system
6010: Arrangement of currently installed nodes (present nodes) of a partially populated switching system
6020: Future nodes to be installed
6108: Formation of index 0 of present nodes
6118: Formation of index 0 of future nodes
6110: Formation of index $\gamma$, $0 \le \gamma < G$ of present nodes
6120: Formation of index $\gamma$, $0 \le \gamma < G$ of future nodes
6300: Arrangement of switches of a partially populated contiguous switching system
6320: Switch groups of the arrangement 6300
7000: Node connectivity to switches
7010: Node index
7020: Formation index or switch-group index
7030: Switch index within a switch group
7100: Nodal routing arrays
7110: Index of originating node
7120: Index of destination node
7130: Index of switch group having a switch directly connecting an originating node to destination node
7200: All paths from an originating node to a destination node
7300: Node of a medium or large dimension
7310: Outer input ports
7311: Channels from external data sources to outer input ports
7320: Inner input ports
7321: Channels from adjacent switches to inner input ports
7330: Switching mechanism of node 7300
7340: Outer output ports
7341: Channels from outer output ports to external data sinks
7350: Inner output ports
7351: Channels from inner output ports to adjacent switches
7380: Node controller
7400: Processes (7410 to 7490) performed at a controller of an originating node
7500: Processes (7510 to 7570) performed at a controller of an upstream switch
7600: Processes (7610 to 7680) performed at a controller of an intermediate node
7700: Processes (7710 to 7760) performed at a controller of a downstream switch

DETAILED DESCRIPTION

Figure 1:
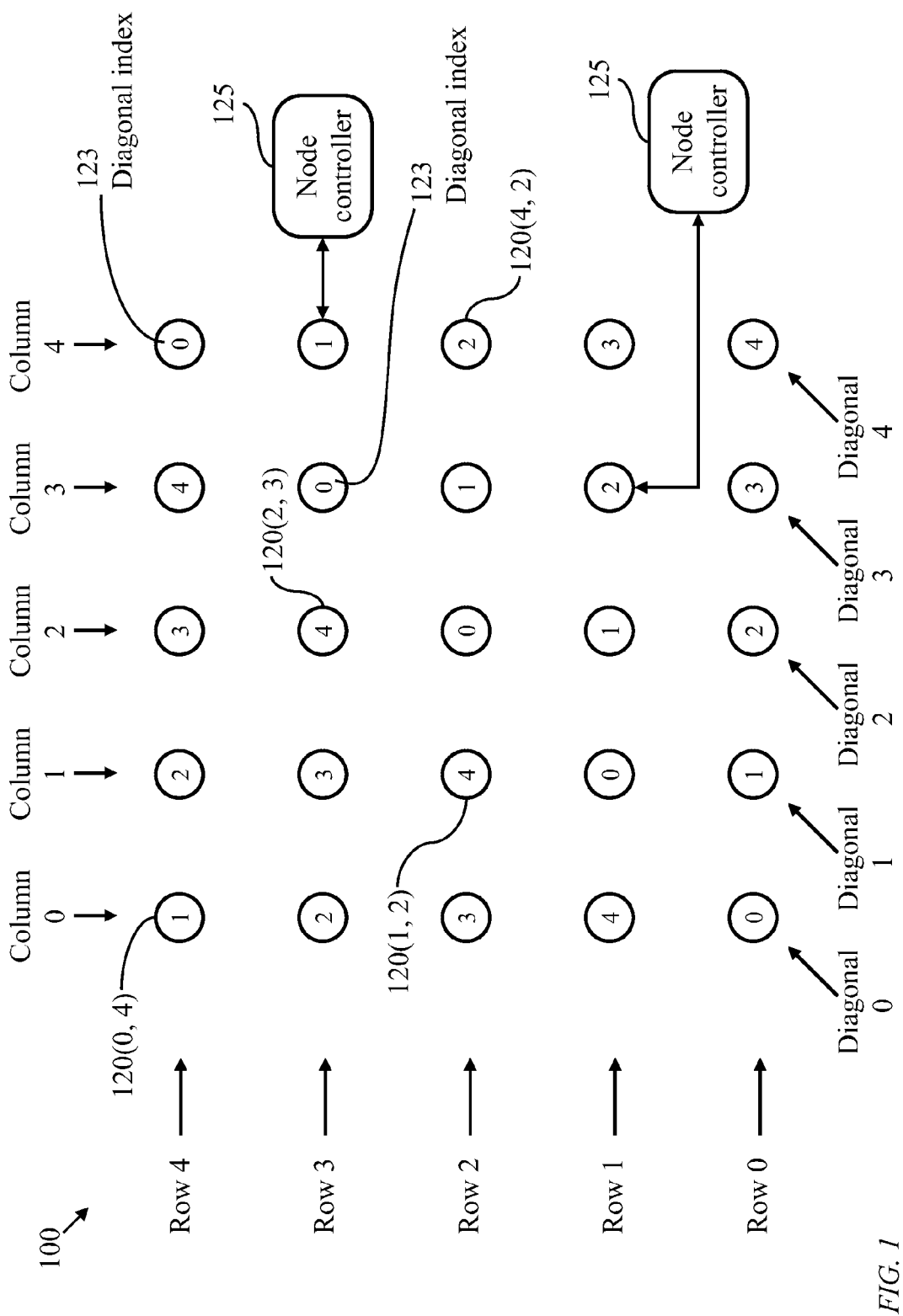
FIG. 1 illustrates a plurality of nodes arranged in a matrix of nodes.

FIG. 1 illustrates a plurality of nodes 120 arranged in a logical matrix 100 of nodes having m columns and m rows, where m>2. Each node is coupled to a respective node controller 125; only two node controllers are illustrated in FIG. 1. The nodes may be collocated, to form a large-scale data-switching center, or geographically distributed to form a network of regional or global coverage. The m columns are indexed as 0 to (m−1) and the m rows are indexed as 0 to (m−1). Thus, the nodes 120 of plurality of nodes may be individually identified as 120(x,y), where x is an index of a column and y is an index of a row, $0 \le x < m$, $0 \le y < m$. A set of m nodes belonging to m different rows and m different columns are said to belong to a diagonal of the logical matrix of nodes. According to a simple definition of a diagonal of nodes, a node 120 belonging to a column x and a row y, $0 \le x < m$, $0 \le y < m$, is said to belong to diagonal $|x-y|_m$. Thus, a set of m nodes 120 of indices $\{|y+\zeta|_m, y\}$, $0 \le y < m$, form a diagonal of index $\zeta$, $0 \le \zeta < m$. For example, with m=5, nodes 120 of indices (0,0), (1,1), (2,2), (3,3), and (4,4) form a diagonal of index $\zeta$=0. Nodes of indices (2,0), (3,1), (4,2), (0,3), and (1,4) form a diagonal of index $\zeta$=2. In the exemplary arrangement of nodes of FIG. 1, an index 123 of a diagonal to which a node 120 belongs is indicated.

Figure 2:
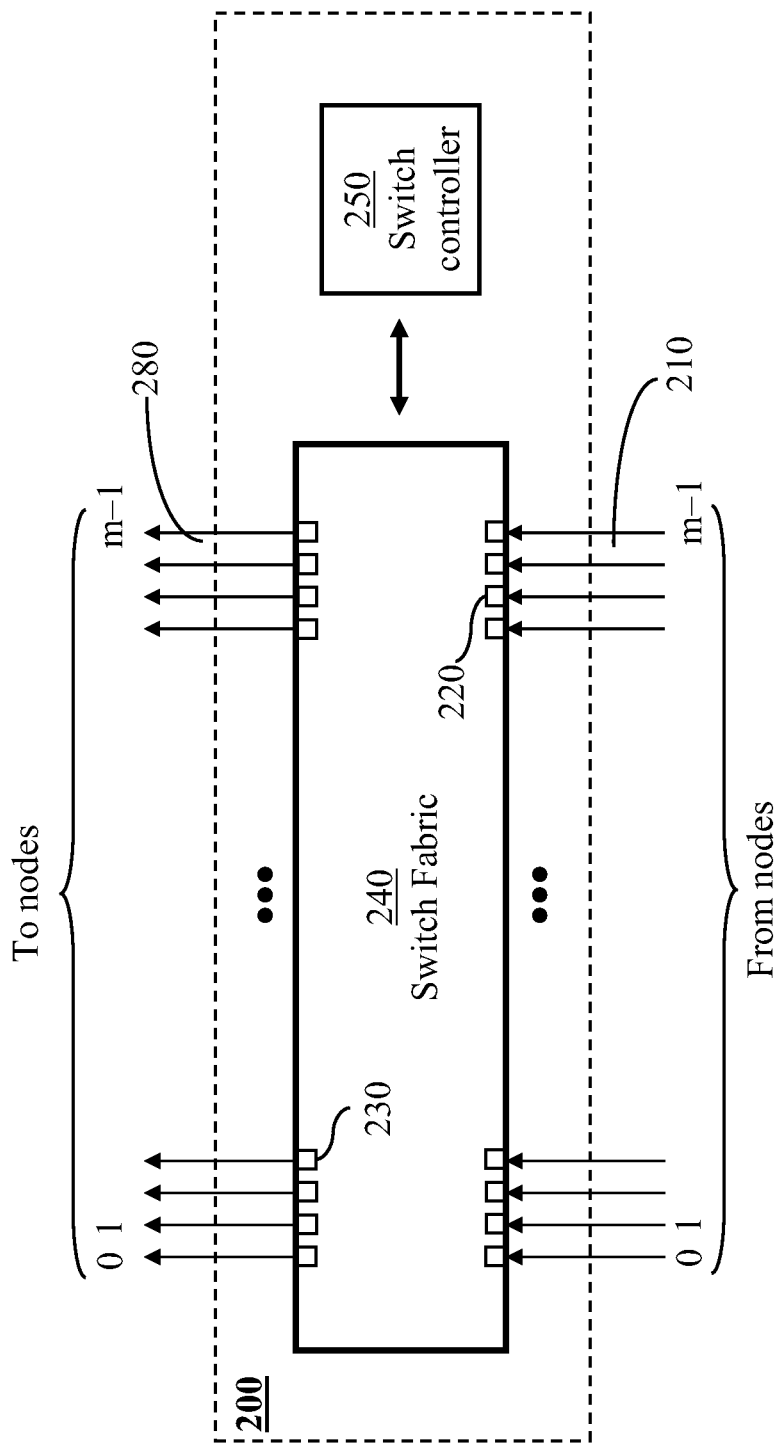
FIG. 2 illustrates a switch connecting to a set of nodes.

FIG. 2 illustrates a switch 200 coupled to a respective switch controller 250. The switch has m input ports 220 connecting to upstream channels 210, for receiving data from a first set of m nodes, and m output ports 230 connecting to downstream channels 280, for transmitting data to a second set of m nodes. The second set of nodes may be the same first set of nodes. The switch controller 250 may be accessed through a switch fabric 240 or coupled to a plurality of input ports 220 and output ports 230 of the switch.

FIG. 3 illustrates a switching system 300 formed by providing a plurality of switches 200. The switches are independent of each other and each switch interconnects a respective set of nodes of the plurality of nodes of FIG. 1. Preferably, each node of the plurality of nodes connects to an external network element through at least one dual channel (not illustrated) and connects to each switch 200 of its adjacent switches through a respective dual link 320. Some nodes, however, may connect only to switches 200. In any case, at least three nodes 120 need be connected to external network elements, such as data sources and data sinks, to form a switching system.

The switches may be arranged into a set of m primary switches, a set of m secondary switches, and a set of m tertiary switches. Each primary switch interconnects nodes of a respective column, each secondary switch interconnects nodes of a respective row, and each tertiary switch interconnects nodes of a respective diagonal of the matrix.

Thus, nodes of each column of the matrix of nodes are interconnected through a respective primary switch 200 to form a respective primary star sub-network. Likewise, nodes of each row of the matrix of nodes are interconnected through a respective secondary switch to form a respective secondary star sub-network, and nodes of each diagonal of the matrix of nodes are interconnected through a respective tertiary switch to form a respective tertiary star sub-network. Each switch is coupled to a respective switch controller 250. As described below, this arrangement provides several paths from any node 120 to any other node 120 of the plurality of nodes, each path traversing at most two switches 200 of the plurality of switches.

A switch 200 interconnects nodes of a column, a row, or a diagonal. The switches are individually identified according to the indices of corresponding columns, rows, or diagonals. A primary switch interconnecting nodes of a column of index x, $0 \le x < m$, is identified as 200(1,x). A secondary switch interconnecting nodes of a row of index y, $0 \le y < m$, is identified as 200(2,y). A tertiary switch interconnecting nodes of a diagonal $\zeta$, $0 \le \zeta < m$, is identified as 200(3,$\zeta$). The corresponding switch mechanisms 240 are identified as 240(1,x), 240(2,y), and 240(3,$\zeta$), respectively. Likewise, the corresponding switch controllers 250 are individually identified as 250(1,x), 250(2,y), and 250(3,$\zeta$), respectively. FIG. 3 illustrates only 3 switches of the total of 3×m switches and only two node controllers 125 of the total of $m^2$ node controllers. The tertiary switch interconnects nodes of a diagonal of index 1 as indicated in FIG. 3.

The arrangement of the plurality of nodes into a logical matrix is only exemplary. In general, the nodes are connected to the switches so that a first set of nodes connecting to any primary switch, a second set of nodes connecting to any secondary switch, and a third set of nodes connecting to any tertiary switch are mutually orthogonal.

With the plurality of nodes organized in a matrix having m columns and m rows, the first set of nodes may comprise nodes of a respective column, the second set of nodes may comprise nodes of a respective column, and the third set of nodes may comprise nodes of a respective diagonal of the matrix.

Each node has a dual channel to a respective primary switch, a dual channel to a respective secondary switch and a dual channel to a respective tertiary switch. Accordingly, the sets of nodes connecting to primary switches are mutually disjoint, the sets of nodes connecting to the secondary switches are mutually disjoint, and the sets of nodes connecting to the tertiary switches are mutually disjoint. With each switch connecting to m nodes, m>2, and the number of nodes limited to $m^2$, several paths may be established from any node to any other node with each path traversing at most two switches.

FIG. 4 illustrates a switching system 400 formed by providing a plurality of rotators arranged into a group of m primary rotator pairs, a group of m secondary rotator pairs, and a group of m tertiary rotator pairs, each rotator-pair interconnecting a respective set of nodes of the plurality of nodes of FIG. 1 where nodes of each column of the matrix of nodes are interconnected through a respective primary rotator pair 410 to form a respective primary circulating switch, nodes of each row of the matrix of nodes are interconnected through a respective secondary rotator pair 520 to form a respective secondary circulating switch, and nodes of each diagonal of the matrix of nodes are interconnected through a respective tertiary rotator pair 430 to form a respective tertiary circulating switch. A circulating switch comprising a rotator pair interconnecting a set of nodes is described in U.S. Pat. No. 7,567,556.

The switching system 400 employs 3×m rotator pairs each connecting to a respective controller. FIG. 4 illustrates one primary rotator pair 410 of the m primary rotator pairs, one secondary rotator pair 420 of the m secondary rotator pairs, and one tertiary rotator pair 430 of the m tertiary rotator pair. Rotator pair 410 is coupled to a primary controller 415, rotator pair 420 is coupled to secondary controller 425, and rotator pair 430 is coupled to tertiary controller 435. Each rotator of primary rotator pair 410 has a dual link 412 to each node 120 of a respective column of nodes, each rotator of rotator pair 420 has a dual link 422 to each node of a respective row of nodes, and each rotator of rotator pair 430 has a dual link 432 to each node of a respective diagonal of nodes.

FIG. 5 illustrates a switching system 500 formed by providing a plurality of rotators arranged into a group of m primary rotators, a group of m secondary rotators, and a group of m tertiary rotators, each rotator interconnecting a respective set of nodes of the plurality of nodes of FIG. 1 in time-alternating modes where nodes of each column of the matrix of nodes are interconnected through a respective primary rotator to form a respective primary single-rotator circulating switch, nodes of each row of the matrix of nodes are interconnected through a respective secondary rotator to form a respective secondary single-circulating switch, and nodes of each diagonal of the matrix of nodes are interconnected through a respective tertiary rotator to form a respective tertiary single-rotator circulating switch. A single-rotator circulating switch interconnecting a set of nodes is described in U.S. Pat. No. 8,204,050.

The switching system 500 employs 3×m rotators each connecting to a respective controller. FIG. 5 illustrates one primary rotator 510 of the m primary rotators, one secondary rotator 520 of the m secondary rotators, and one tertiary rotator 530 of the m tertiary rotators. Rotator 510 is coupled to a primary controller 515, rotator 530 is coupled to secondary controller 525, and rotator 530 is coupled to tertiary controller 535. Rotator 510 has a dual link 512 to each node 120 of a respective column of nodes, rotator 520 has a dual link 522 to each node of a respective row of nodes, and rotator 530 has a dual link 532 to each node of a respective diagonal of nodes. FIG. 5 illustrates only two nodes controllers 125 of the total of 25 node controllers (m=5).

Figure 6:
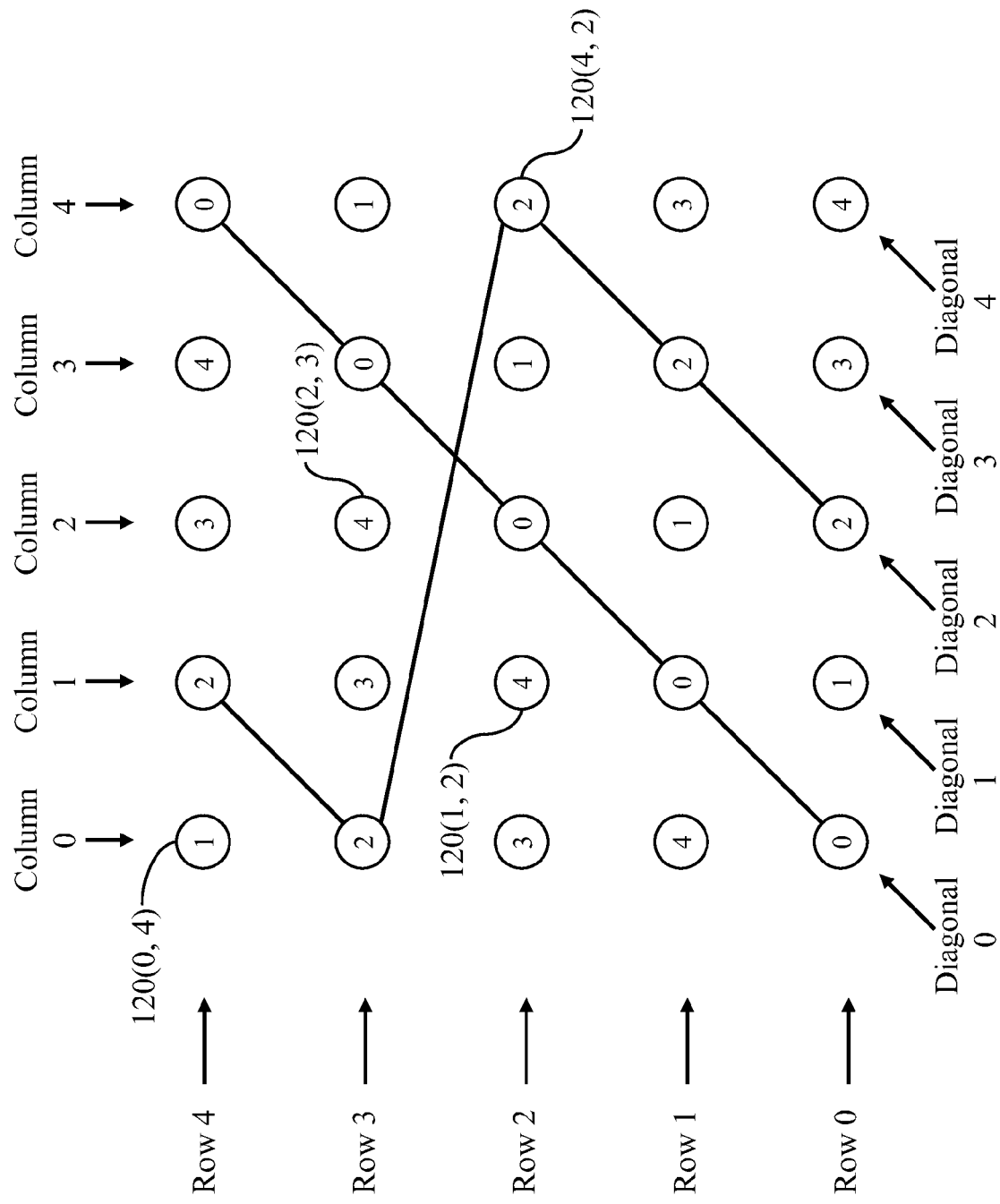
FIG. 6 illustrates exemplary node sets connecting to different tertiary switches in the switching system of FIG. 3, different tertiary rotator pairs in the switching system of FIG. 4, or different tertiary single rotators in the switching system of FIG. 5, in accordance with an embodiment of the present invention.

FIG. 6 illustrates exemplary node sets connecting to different tertiary switches in the switching system of FIG. 3, different tertiary rotator pairs in the switching system of FIG. 4, or different tertiary single rotators in the switching system of FIG. 5. Nodes 120 of a diagonal of index 2, for example, are interconnected through a switch 200 in switching system 300, a rotator pair in switching system 400, or a rotator with time-alternating access modes in switching system 500.

Figure 7:
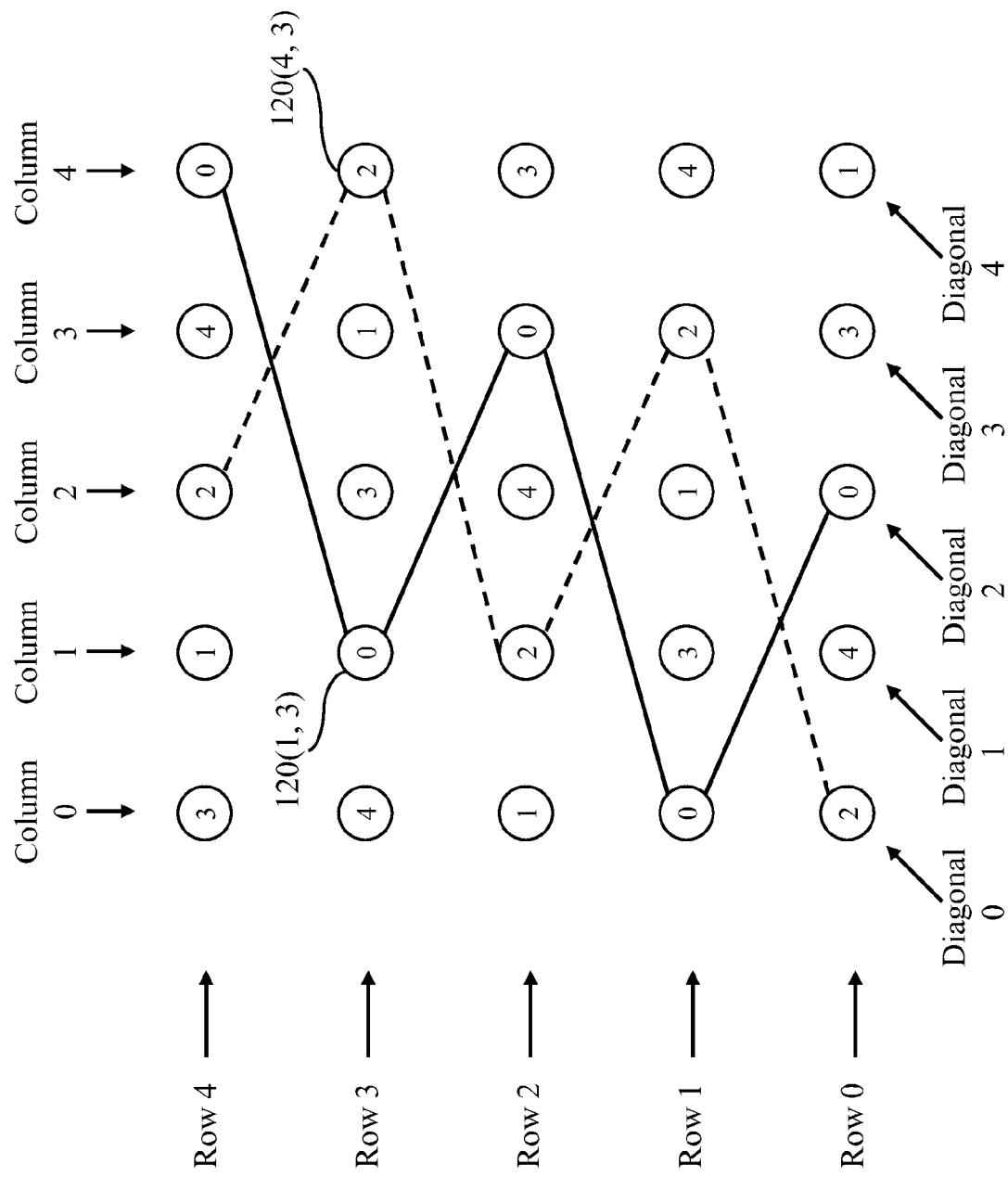
FIG. 7 illustrates other exemplary node sets connecting to different tertiary switches in the switching system of FIG. 3, different tertiary rotator pairs in the switching system of FIG. 4, or different tertiary single rotators in the switching system of FIG. 5, in accordance with an embodiment of the present invention.

FIG. 7 illustrates other exemplary node sets connecting to different tertiary switches in the switching system of FIG. 3, different tertiary rotator pairs in the switching system of FIG. 4, or different tertiary single rotators in the switching system of FIG. 5. Each of the illustrated two diagonals includes nodes of different rows and different columns. The nodes of each diagonal are interconnected with a respective tertiary switch, a respective tertiary rotator pair, or a respective tertiary rotator operating in time-alternating access modes.

The nodes 120 in the arrangement of FIG. 1 are individually identified according to the column and row to which a node belongs. A node 120 in column x and row y is identified as 120$(x,y)$, $0 \le x < m$, $0 \le y < m$. It may be more convenient to number the nodes sequentially. Thus, the nodes of a switching system supporting N nodes, N>2, would be indexed sequentially as 0, 1, . . . , (N−1). To enable establishing connections each traversing at most two switches for any node pair, in a switching system where the dimension of a switch is limited to m dual ports, the maximum number, N, of nodes is limited to $m^2$. A switching system supporting the maximum number of nodes is herein referenced as a fully-populated switching system. A partially populated network may have at least 2×m nodes as will be discussed below.

Figure 8:
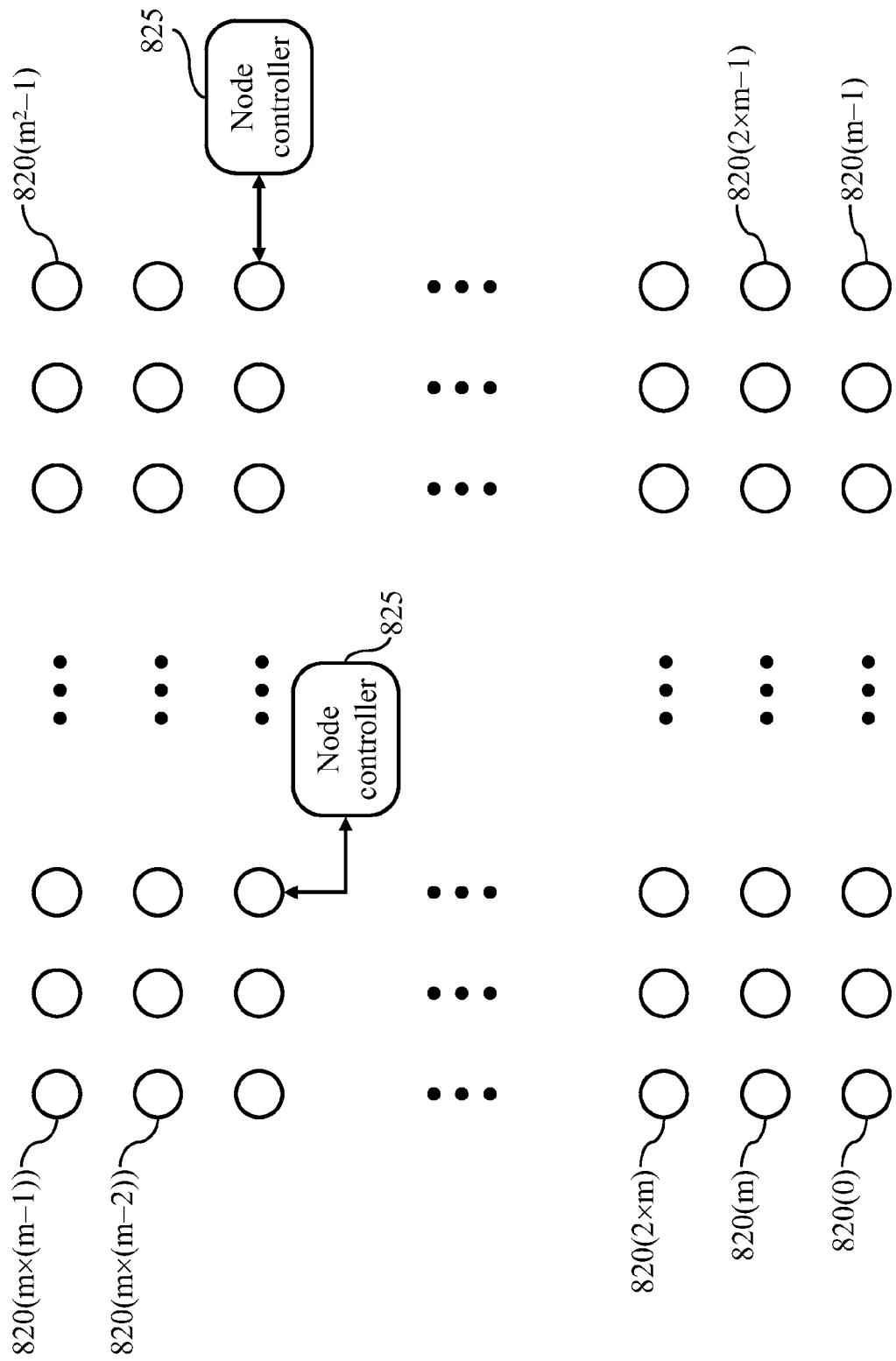
FIG. 8 illustrates arbitrary numbering of nodes.

FIG. 8 illustrates arbitrary numbering of nodes of a fully populated switching system. To distinguish individual node column-row indexing from sequential indexing, a node indexed according to column-row coordinates is referenced as 120$(x,y)$ while a node indexed according to sequential integers is referenced as 820$(s)$, where x and y are respectively column and row indices of a matrix of nodes and s is an index of an array of nodes. Each node 820 includes, or is coupled to, a node controller 825.

Nodes 120 or 820 may receive data of different formats, such as packets of variable length, from external data sources and transmit data to external data sinks. One or more nodes 120 or 820 may perform administrative functions as will be described below.

Distributed Control System

The plurality of nodes and the plurality of switches may be collocated to form a switching system scalable to high capacity, or geographically distributed to form a local network, a regional network, or a global network of wide coverage. The capacity of a switching network is a measure of the access capacity, i.e., the capacity available to external data sources and sinks. The coverage of a network is a measure of the number of nodes that can be supported. Whether the switching network serves as a high-capacity data switch or as a geographically distributed network, a distributed control system comprising node controllers and switch controllers is preferably employed. Each node controller is coupled to a respective node of the plurality of nodes and each switch controller is coupled to a respective switch of the plurality of switches. In other words, each node has its own node controller and each switch has its own switch controller.

Thus, the distributed control system comprises a plurality of node controllers and a plurality of switch controllers. Each node controller 125 or 825 has a respective node processor and is coupled to a respective node of the plurality of nodes. A node controller 125 or 825 may also comprise memory devices for storing routing data and processor-readable instructions for implementing source routing processes. Each switch controller 250 has a respective switch processor and is coupled to a respective switch of the plurality of switches. A switch controller 250 may also have memory devices for storing respective routing data and processor-readable instructions for implementing switch routing processes. The control system is configured to set a path from any node of the plurality of nodes to any other node of the plurality of nodes traversing at most two switches of the plurality of switches.

Each node receives data from external sources and transmits data to external sinks A node controller of a node may be configured to track vacancy levels of channels to the primary switch, the secondary switch, and the tertiary switch to which the node connects. The node controller may direct a connection request received from an external source to one of the primary switch, the secondary switch, and the tertiary switch according to the tracked vacancy levels. Preferably, the switch associated with the channel of highest vacancy is selected.

A switch controller of each switch may be configured to track vacancy levels of channels connecting the switch to respective m nodes of the plurality of nodes. Where more than one of the m nodes may serve as an intermediate node to a specified destination node, the switch controller may select an intermediate node associated with a channel of highest vacancy.

Switching-System Order

With each switch 200 having at most m dual ports, m>2, interconnecting at most m nodes, the number of nodes is limited to $m^2$. With each node connecting to at least two switches, a "switching-system order" (also called a "network order"), denoted G, is defined as the number of switch groups which is the maximum number of switches to which a node connects. The minimum switching-system order is two and the maximum switching-system order is m; thus, $2 \le G \le (m+1)$.

The nodes of a switching system may be divided into a group of disjoint sets of nodes, herein referenced as a formation. A formation comprises a number of sets of disjoint nodes which collectively contain all the nodes of a respective switching system. There are numerous ways of creating formations as will be described with reference to FIG. 27 and FIG. 28.

A switching system may be based on any number G, G>1, of formations. The nodes of each node set of each considered formation are interconnected through a respective switch 200. The formations may be indexed as 0 to (G−1); the formation of index k is referenced as a formation of order k, or a "k-order" formation, $0 \le k < G$. A node set of a formation of order k is likewise referenced as a node set of order k or a "k-order node set". A switch 200 interconnecting nodes of a node set of order k is referenced as a switch of order k or a "k-order" switch. A group of k-order switches is referenced as a switch group of order k or a k-order switch group. Each node 120 or 820 connects to G switches of order 0 to (G−1).

In the arrangement 100 of FIG. 1, the nodes 120 of a column of the logical matrix constitute a node set (also referenced as a set of nodes) and the node sets corresponding to all columns constitute one formation. The nodes 120 of a row of the logical matrix constitute a node set and the node sets corresponding to all rows constitute another formation.

The nodes 120 of a diagonal of the logical matrix constitute a node set and the node sets corresponding to all diagonals constitute another formation.

Node Structure

A node comprises a plurality of dual ports divided into a number of inner ports and a number of outer ports. Each inner port connects to a switch interconnecting a set of nodes to which the node belongs in a respective formation. The outer ports connect to external network elements. A node controller may be configured to track output vacancy of each dual port of the node.

A node connects to dual links from external data sources and sinks as well as a dual link to each of G of switches of different switch groups. Preferably, the number m of dual ports of a switch is substantially higher than the number G defining the order of a network of the structure of FIG. 3, FIG. 4, or FIG. 5. The number of dual links connecting to external sources and sinks (of different forms) would be $\lfloor G/2 \rfloor$, to take into consideration that a proportion of paths are compound paths. A node has a number of dual ports and performs a switching function among the dual ports. A node may be configured to have a number of dual ports equal to $p=(G+\lfloor G/2 \rfloor)$. A node may be configured to be a low-blocking node, a non-blocking node, or a contention-free node. A contention-free node is naturally non-blocking. The switching system may employ a mixture of nodes of different types.

A contention-free node may be configured as a shared memory device holding data received from multiple input ports through a multiplexer and distributing data to multiple output ports through a demultiplexer. The multiplexer cyclically transfers to the memory device data received from external sources, a primary switch to which the node connects, a secondary switch to which the node connects, and a tertiary switch to which the node connects. The demultiplexer cyclically transfers data from the memory device to external sinks, the primary switch, the secondary switch, and the tertiary switch.

A contention-free switch module may also be constructed by time-interleaving input data units received simultaneously from several input ports written in a bank of transit memory devices. Time-interleaving-access may be performed using temporal rotators.

The input channels at a node 120 in the switching system of FIG. 3 connects to a primary switch, a secondary switch, and a tertiary switch as well as external sources and sinks (A source is a terminal or another network element sending data to the node and a sink is a terminal or a network element receiving data from the node.) Thus, the node would have an input channel from respective data sources, an output channel to respective data sinks, a dual channel (a dual channel comprises an input channel and an output channel) connecting to a respective primary switch, a dual channel connecting to a respective secondary switch, and a dual channel connecting to a respective tertiary switch.

Figure 9:
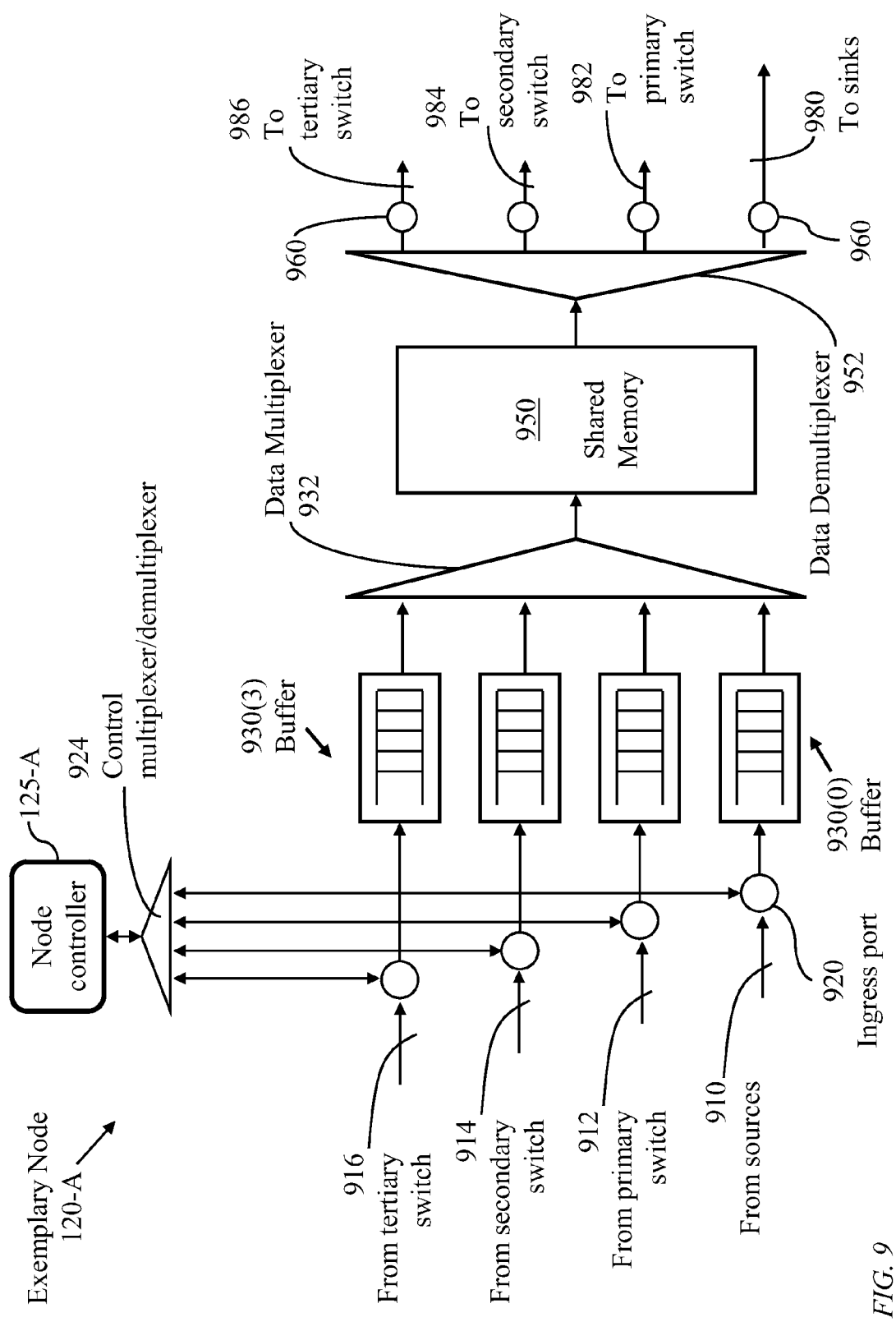
FIG. 9 illustrates an exemplary structure of a node connecting to respective switches in the switching system of FIG. 3, in accordance with an embodiment of the present invention.

FIG. 9 illustrates an exemplary node 120-A having four input ports 920 and four output ports 960. A channel 910 carries data from data sources (any external network elements) to a respective input port 920. Channels 912, 914, and 916 carry data from a primary switch, a secondary switch, and a tertiary switch, respectively, to respective input ports 920. Each input port 920 organizes respective received data into data blocks and places the data blocks in a respective buffer 930, each data block directed to a respective single output port 960. A multiplexer 932 cyclically transfers data from the buffers 930 to a shared memory device 950. The demultiplexer 952 cyclically transfers data from the shared memory device 950 to the output ports 960. An output port 960 receives data directed to external sinks and transmits the data over a channel 980. The other output ports 960 individually receive data directed to a primary switch, a secondary switch, and a tertiary switch and transmit the data over channels 982, 984, and 986, respectively. A node controller 125-A cyclically connects to input ports 920 through control multiplexer/demultiplexer 924. The node controller extracts control data from the input ports 920 and provides an address in the shared memory 950 for each data block formed at the input ports 920.

The input channels at a node 120 in the switching system of FIG. 4 connect to a primary rotator pair, a secondary rotator pair, and a tertiary rotator pair as well as external sources and sinks. Thus, the node 120 would have an input channel from respective data sources, an output channel to respective data sinks, two dual channels connecting to a respective primary rotator pair, two dual channels connecting to a respective secondary rotator pair, and two dual channels connecting to a respective tertiary rotator pair. The functions of the switches of FIG. 3 are embedded in the nodes in the switching system of FIG. 4 and the network of FIG. 5.

Figure 10:
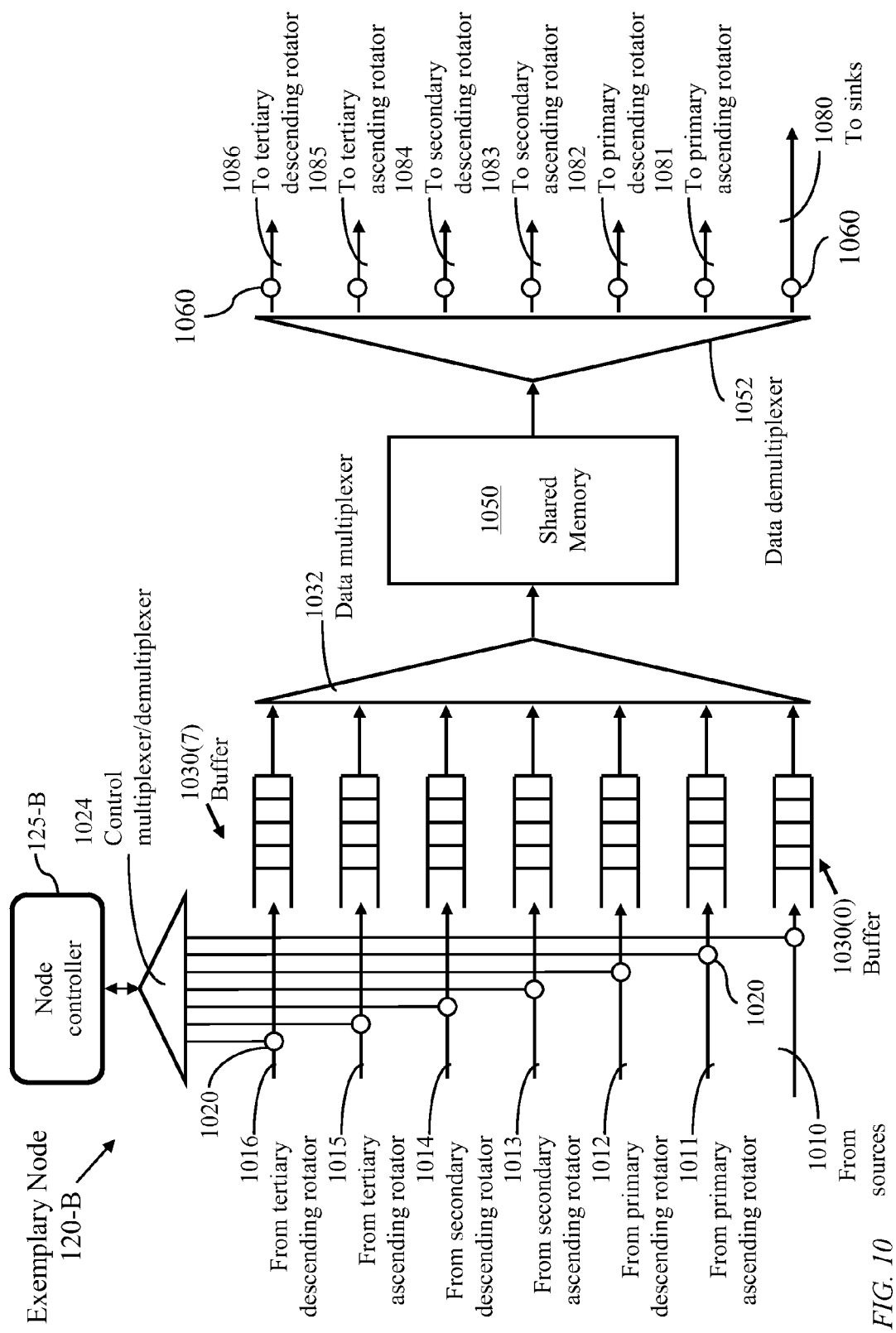
FIG. 10 illustrates an exemplary structure of a node connecting to respective rotator pairs in the switching system of FIG. 4, in accordance with an embodiment of the present invention.

FIG. 10 illustrates an exemplary node 120-B having seven input ports 1020 and seven output ports 1060. A channel 1010 carries data from data sources (any external network elements) to a respective input port 1020. Channels 1011, 1012 carry data received through a primary rotator pair. Channels 1013, 1014 carry data received through a secondary rotator pair. Channels 1015, 1016 carry data received through a tertiary rotator pair. The respective input ports 1020. Each input port 1020 organizes respective received data into data blocks and places the data blocks in a respective buffer 1030, each data block directed to a respective single output port 1060.

A multiplexer 1032 cyclically transfers data from the buffers 1030 to a shared memory device 1050. The demultiplexer 1052 cyclically transfers data from the shared memory device 1050 to the output ports 1060. An output port 1060 receives data directed to external sinks and transmits the data over a channel 1080. The other output ports 1060 individually receive data directed to a primary rotator pair, a secondary rotator pair, and a tertiary rotator and transmit the data over channels 1081 to 1086 as indicated in FIG. 10. A node controller 125-B cyclically connects to input ports 1020 through control multiplexer/demultiplexer 1024. The node controller extracts control data from the input ports 1020 and provides an address in the shared memory 1050 for each data block formed at the input ports 1020.

FIG. 9 and FIG. 10 illustrate nodes used for a switching system of order G=3. In general, the order of the switching system may be selected to be of a larger order. The order, G, of a switching system employing switches each having a dimension not exceeding m, m≥2, may be selected in the range: $2 \le G \le (m+1)$. In a switching system of order G, a node 820 has p dual ports, p>G. Some connections may be routed over simple paths, each traversing one switch, while other connections are routed through compound paths each traversing two switches. With dual ports of a same capacity (each operating at 10 Gigabits/second, for example), the number of dual ports connecting to data sources and sink is preferable limited to $\lfloor G/2 \rfloor$. With G=3, as in the configuration of FIG. 3, $p=G+\lfloor G/2 \rfloor=4$.

In general, a node 820 in a switching system of order G, may have the same structure of node 120-A of FIG. 9 with the number of dual ports equal to p=G+⌊G/2⌋. A multiplexer cyclically transfers data to the memory device from (p−G) links connecting to external sources and from G switches of switch groups 0, 1, . . . , (G−1). The demultiplexer cyclically transfers data from the memory device to (p−G) links connecting to external sinks and to G switches of order 0, 1, . . . , (G−1).

A node controller of a node in the network of FIG. 3 may cyclically direct a connection request received from an external source to switches to which the specific node connects. Alternatively, the node controller may be configured to track occupancy levels of channels to a primary switch, a secondary switch, and a tertiary switch to which the node connects. The node controller then directs a connection request received from an external source to the primary switch, the secondary switch, or the tertiary switch according to the occupancy levels. Preferably, the connection request is sent to the switch (primary, secondary, or tertiary) connecting to the channel of least occupancy. Switch selection according to occupancy may provide better load balancing.

Switch Structure

Several structures of the switches may be considered. A switch may be an electronic switch constructed of electronic switch elements or an optical switch constructed of optical switch elements. The switches may include both electronic switches and optical switches. An electronic switch may be an instantaneous time-multiplexed space switch or a latent space switch which relies on a bank of transit memory devices. Due to unavailability of random-access buffers in the optical domain, an optical switch would be implemented as an instantaneous time-multiplexed space switch.

A preferred latent space switch comprises an input rotator, an output rotator, and a bank of transit-memory devices, each connecting an output of the input rotator to an input of the output rotator. The two rotators are of different rotation directions; a switch may have an ascending input rotator and a descending output rotator, or vice versa.

A path through a switch, whether instantaneous or latent, occupies an integer number of time slots of a cyclical time frame organized into a number T time slots, T being an integer exceeding 1.

A switch controller of any switch may be accessible through a switching mechanism of the switch and may distribute control data through the switching mechanism. If a switch connects to collocated nodes, requests from node controllers of the collocated nodes may be communicated to the switch controller through a temporal multiplexer. The switch controller may distribute responses to the collocated nodes through a temporal demultiplexer.

A switch controller 250 of a switch 200 may be accessible through a temporal multiplexer (not illustrated) receiving control data from node controllers of a set of m nodes connecting to the switch, in which case the switch controller 250 distributes control data to the set of m nodes through a temporal demultiplexer (not illustrated). Alternatively, a switch controller of a switch may be accessible through a switching mechanism (switch fabric) of the switch, in which case the switch controller distributes control data through the switching mechanism.

Figure 11:
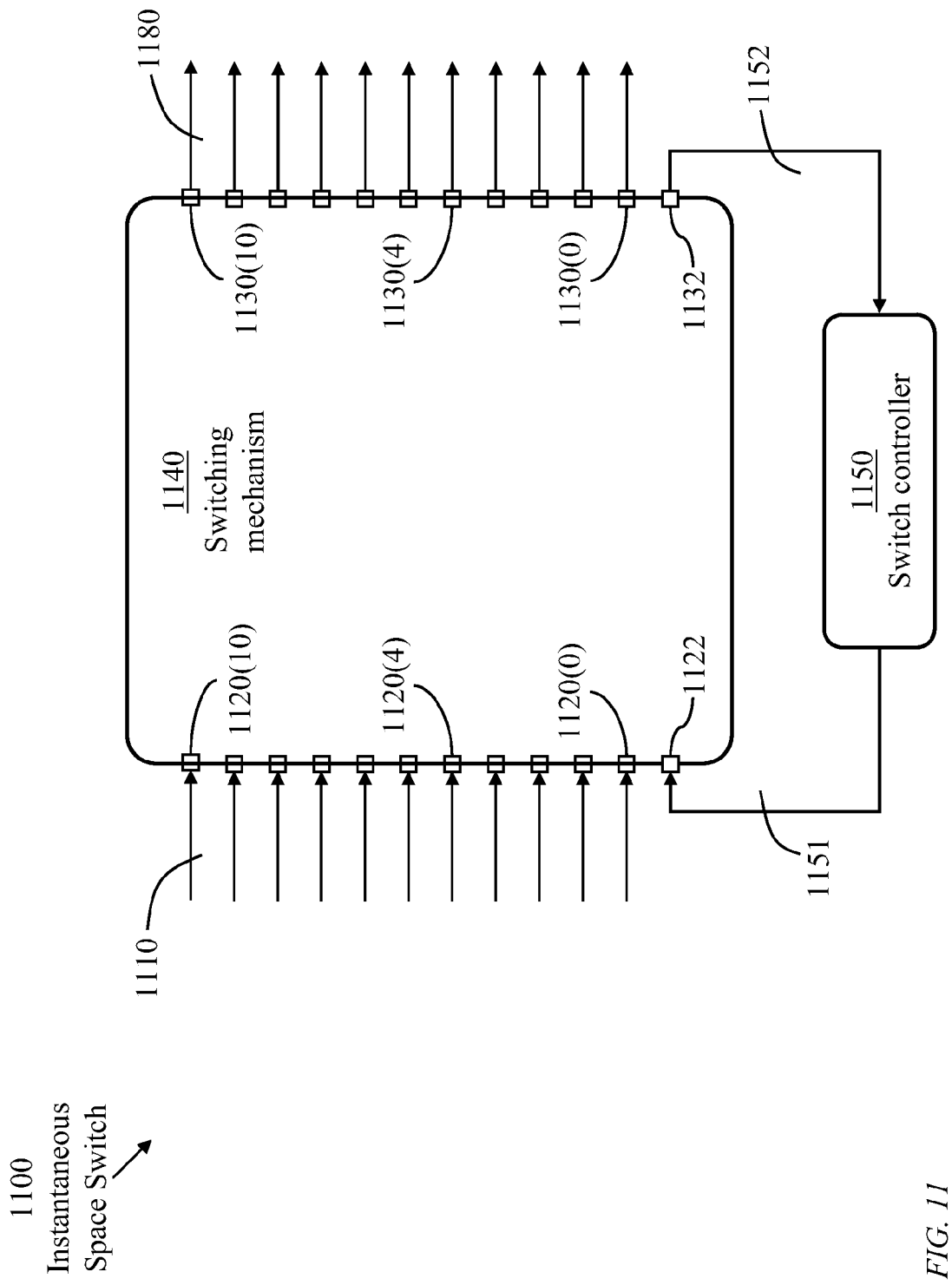
FIG. 11 illustrates an instantaneous space switch for use in an embodiment of the present invention.

FIG. 11 illustrates a configuration 1100 of the switch of FIG. 2 in which the switching mechanism (the switch fabric) 1140 switches data without delay and a switch controller 1150 is accessible through the switching mechanism. The switch is referenced as an "instantaneous space switch". A number, m, of input ports 1120 connects upstream channels 1110 incoming from a set of nodes 120 to the switch fabric. A number, m, of output ports 1130 connects the switch fabric to downstream channels 1180 to the set of nodes. In the exemplary configuration of FIG. 11, m=11. Each of input ports 1120(0) to 1120(m−1) receives both payload data and control data from a respective node 120. Each of output ports 1130(0) to 1130(m−1) transmits both payload data and control data to a respective node 120. A distributor control port 1122 connects to a channel 1151 carrying control data from the switch controller 1150. Control data from each upstream channel 1110 is switched through the switching mechanism 1140 to a collector control port 1132 which delivers the control data to the switch controller 1150 through a channel 1152. Control data from the switch controller 1150 to the downstream channels 1180 is switched through the space switch 1140. In a space switch 1100 of large dimension, the switch controller may connect to more than one distributor control port 1122 and more than one collector control port 1132.

Figure 12:
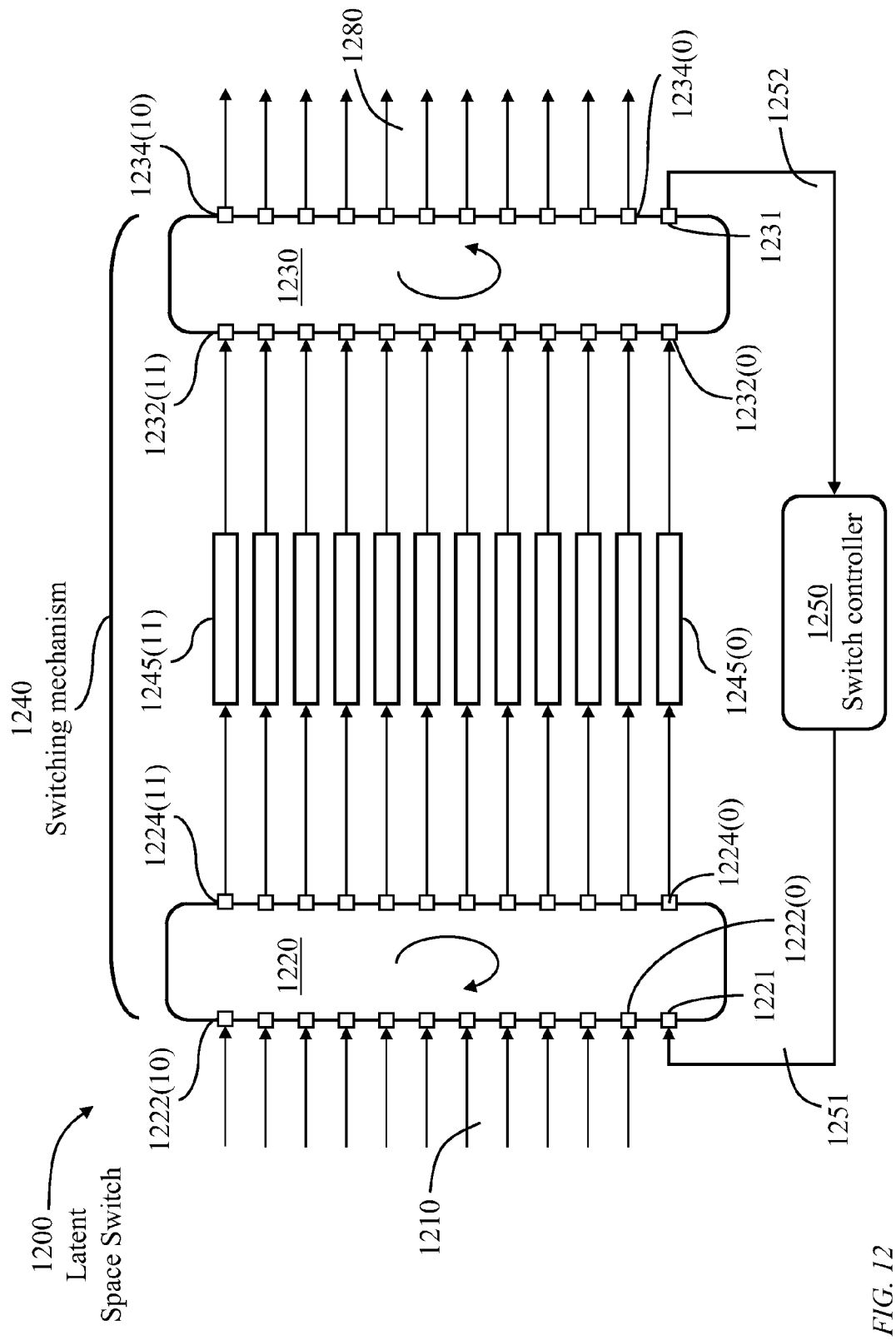
FIG. 12 illustrates a first connectivity of a switch controller to a latent space switch.

FIG. 12 illustrates another configuration 1200 of the switch of FIG. 2 in which the switching mechanism (switch fabric) 1240 transfers data from input to output after a systematic delay. The switch is referenced as a "latent space switch". The latent space switch 1200 receives data from m upstream channels 1210 (m=11 in the exemplary latent switch of FIG. 12) and transmitting data through m downstream channels 1280. The latent space switch 1240 comprises an input rotator 1220, a bank of transit memory devices 1245, and an output rotator 1230.

The input rotator 1220 has (m+1) input ports and (m+1) output ports and the output rotator 1230 has (m+1) input ports and (m+1) output ports. The input ports of input rotator 1220 include a distributor control port 1221 connecting to a switch controller 1250 and m input ports 1222, individually identified as 1222(0) to 1222(m−1) connecting to upstream channels 1210. The (m+1) output ports 1224 of input rotator 1220, individually identified as 1224(0) to 1224(m), connect to (m+1) transit memory devices individually identified as 1245(0) to 1245(m). The (m+1) input ports 1232 of output rotator 1230, individually identified as 1232(0) to 1232(m), connect to the (m+1) transit memory devices 1245(0) to 1245(m). The (m+1) output ports of output rotator 1230 include a collector control port 1231 connecting to switch controller 1250 and output ports 1234, individually identified as 1234(0) to 1234(m−1), connecting to m downstream channels 1280.

Each of input ports 1222(0) to 1222(m−1) receives both payload data and control data from a respective node 120. Each of output ports 1234(0) to 1234(m−1) transmits both payload data and control data to a respective node 120. The distributor control port 1221 connects to a channel 1251 carrying control data from the switch controller 1250. Control data from each upstream channel 1210 is switched through the switching mechanism 1240 to the collector control output port 1231 which delivers the control data to the switch controller 1250 through a channel 1252. Control data from the switch controller 1250 to each downstream channel 1280 is switched through the switching mechanism 1240. In a latent space switch 1200 of large dimension, having 1000 dual ports 1222/1234 for example, the switch controller may connect to more than one distributor control port 1221 and more than one collector control port 1231.

Figure 13:
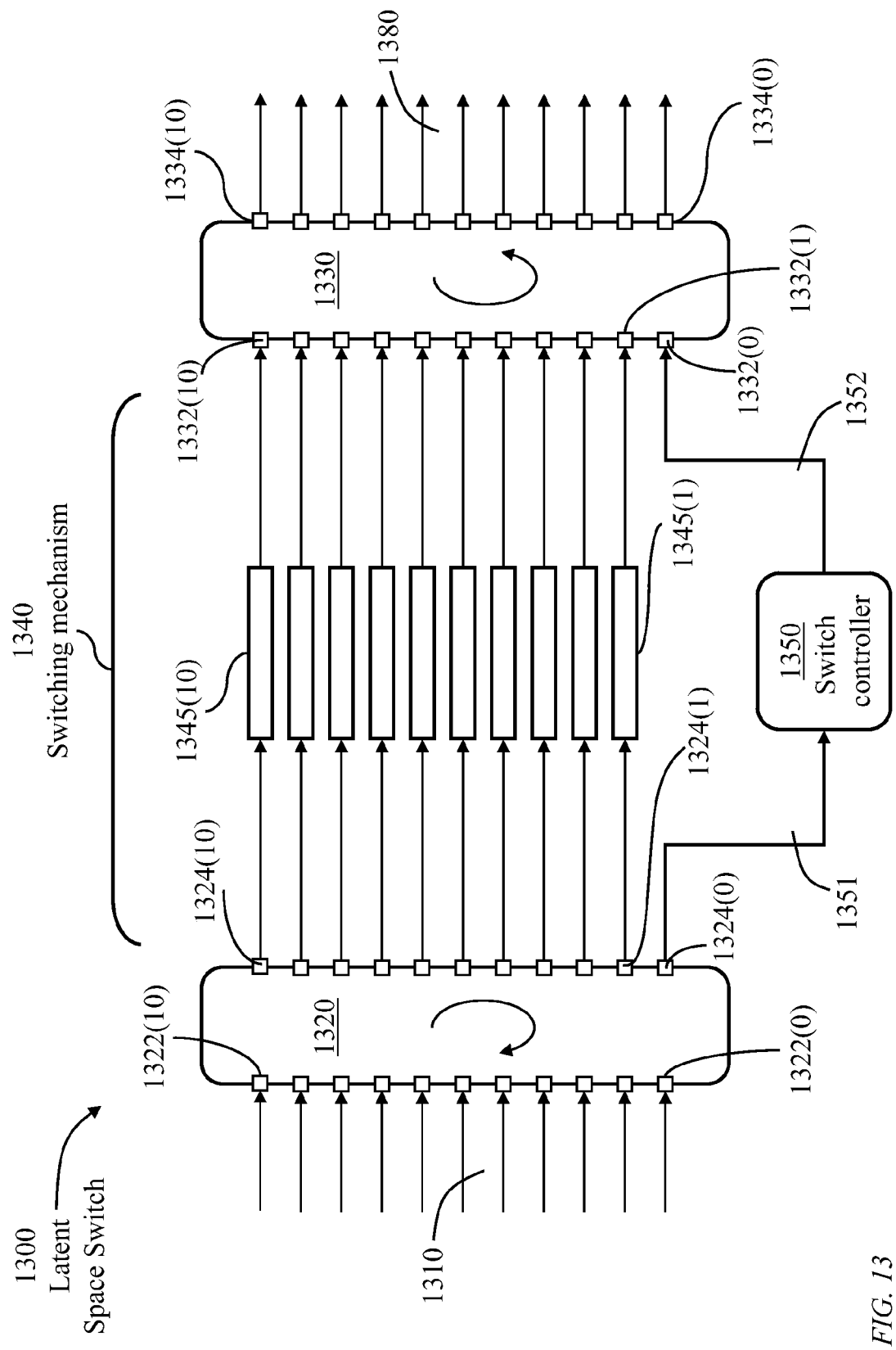
FIG. 13 illustrates a second connectivity of a switch controller to a latent space switch.

FIG. 13 illustrates a preferred configuration 1300 of the switch of FIG. 2 in which the switching mechanism (switch fabric) 1340 switches data after a systematic delay. The switch is referenced as a "latent space switch". The latent space switch 1300 receives data from m upstream channels 1310 (m=11 in the exemplary latent switch of FIG. 13) and transmitting data through m downstream channels 1380. The switching mechanism 1340 comprises an input rotator 1320, a bank of (m−1) transit memory devices 1345(1) to 1345(m−1), and an output rotator 1330. The input rotator 1320 has m input ports 1322, individually identified as 1322(0) to 1322(m−1), and m output ports 1324, individually identified as 1324(0) to 1324(m−1). The output rotator 1330 has m input ports 1332, individually identified as 1332(0) to 1332(m−1), and m output ports 1334, individually identified as 1334(0) to 1334(m−1). Input ports 1322(0) to 1322(m−1) of the input rotator 1320 connect the m upstream channels 1310 to the input rotator 1320. Output ports 1334(0) to 1334(m−1) connect the output rotator 1330 to the m downstream channels 1380. Each of input ports 1322(0) to 1322(m−1) receives both payload data and control data from a respective node 120. Each of output ports 1334(0) to 1334(m−1) transmits both payload data and control data to a respective node 120. The (m−1) transit memory devices connect each output port 1324(j) of input rotator 1320 to a respective input port 1332(j) of output rotator 1330, 1≤j<m. A switch controller 1350 connects to a channel 1351 from output port 1324(0) of the input rotator 1320 and connects to a channel 1352 to input port 1332(0) of output rotator 1330. The switch controller receives upstream control data from each upstream channel 1310 through the input rotator and transmits downstream control data to each downstream channel 1380 through output rotator 1330. In a latent space switch 1300 of large dimension, having 1000 dual ports 1322/1334 for example, the switch controller 1350 may connect to more than one output port 1324 of input rotator 1320 and connect to more than one input port 1332 of output rotator 1330.

Each of switch controllers 1150, 1250, and 1350 is configured to maintain a record of vacancy of output ports 1130, 1234, and 1334, respectively. Each of the switch controllers 1150, 1250, and 1350 maintains a routing table identifying routes to each node in the switching system.

Distributed Control System

Each node 120 or 820 comprises a respective node controller 125 or 825 comprising a node processor and memory devices. Each switch 200 comprises a respective switch controller 250, comprising a switch processor and memory devices. A switch controller of a particular switch is communicatively coupled to node controllers of all nodes connecting to the switch.

The node controller 825 of a node 820 is preferably configured to track output vacancy of each dual port of the node and to maintain identifiers of adjacent nodes of the node. A switch controller of a particular switch is preferably configured to maintain identifiers of nodes 820 connecting to the switch and maintain descriptors of at least one route from the switch to each distant node of the switch. As defined earlier, a distant node is a node connecting to any other switch. The descriptors of a route comprise an index of each node connecting to the switch which is also adjacent to the each distant node.

Figure 14:
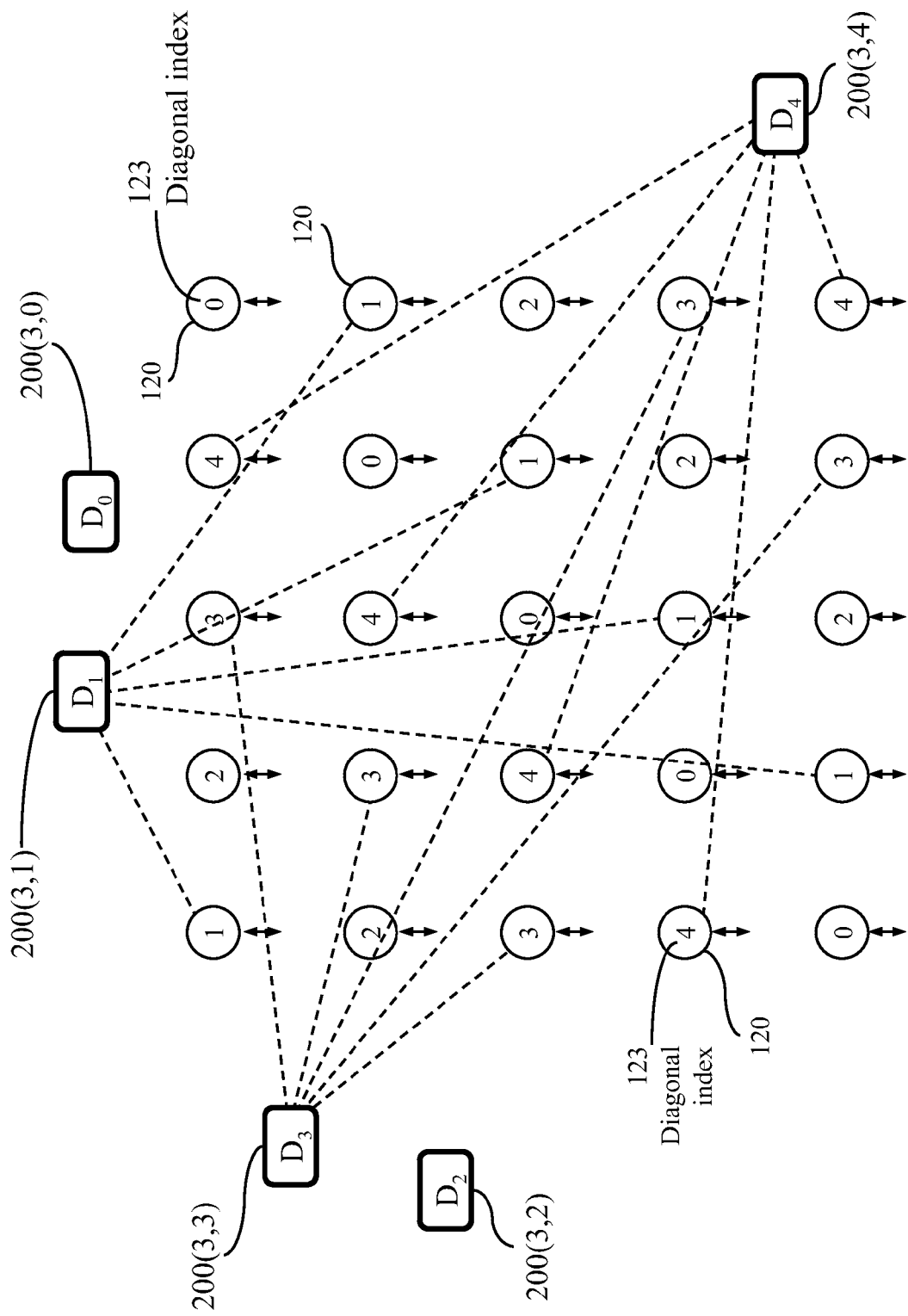
FIG. 14 illustrates independent tertiary switches interconnecting nodes of respective diagonal node sets of the arrangement of FIG. 1, in accordance with an embodiment of the present invention.
Figure 17:
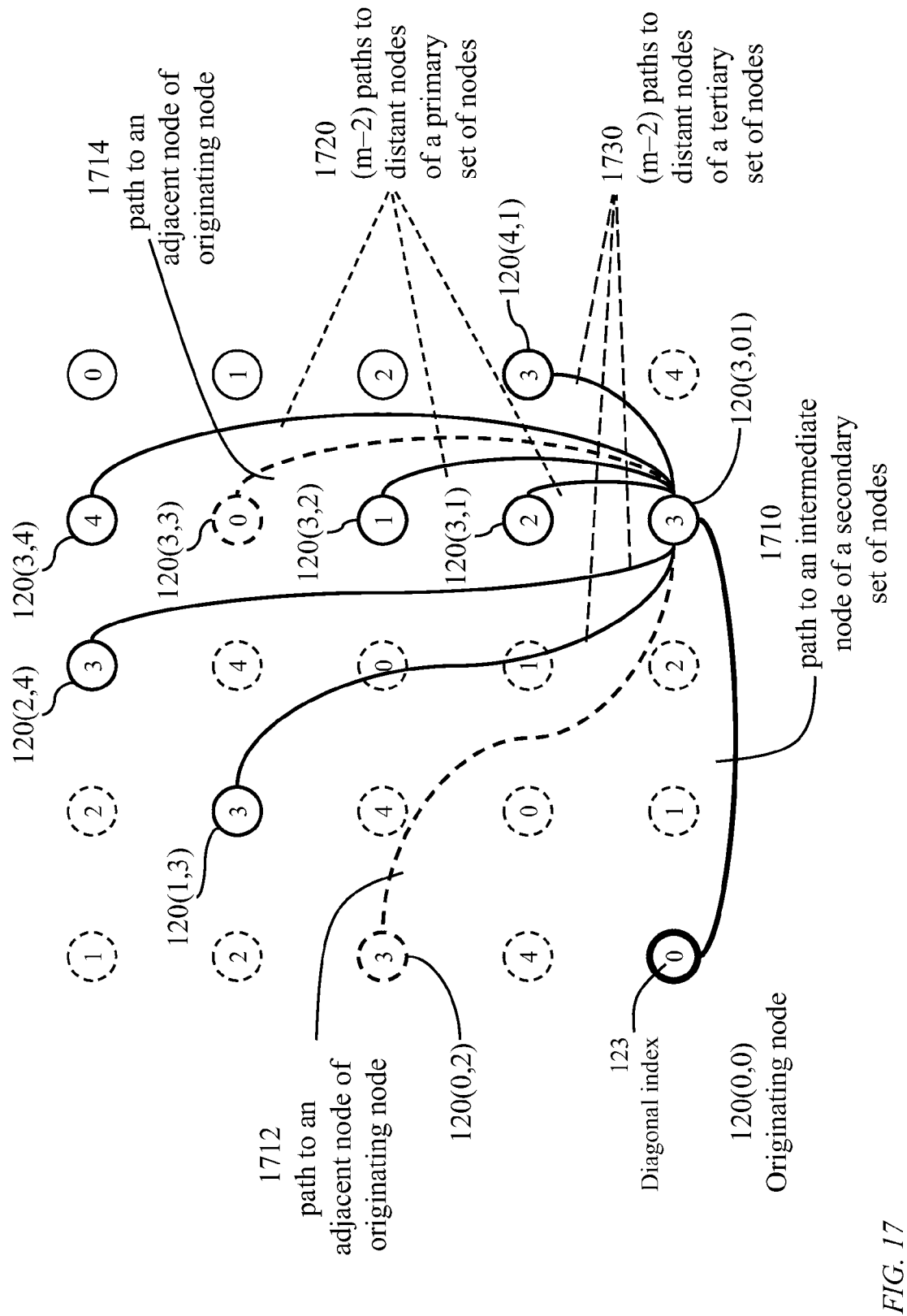
FIG. 17 illustrates compound paths from an originating node to a destination node of the switching system of FIG. 3 having a common initial path to an intermediate node of a set of second-order nodes, in accordance with an embodiment of the present invention.

FIG. 14 illustrates switches 200 each connecting to a diagonal node set of the logical matrix of nodes 120 of FIG. 1. The matrix has 5 columns and 5 rows (m=5). The $m^2$ nodes may be divided into m diagonal node sets, each diagonal node set containing m nodes. The diagonal node sets may be indexed as 0 to (m−1). An index 123 of a diagonal node set to which a node 120 belongs is indicated in FIG. 17. A diagonal node set may be defined in several ways as illustrated in FIG. 7. Each of the diagonal node sets of FIG. 14 connects to a respective switch 200. The diagonal node sets are disjoint. The nodes of a diagonal node set of index $\pi$, 0≤$\pi$<m, are interconnected through a switch 200 (3,$\pi$), labeled $D_\pi$.

Figure 15:
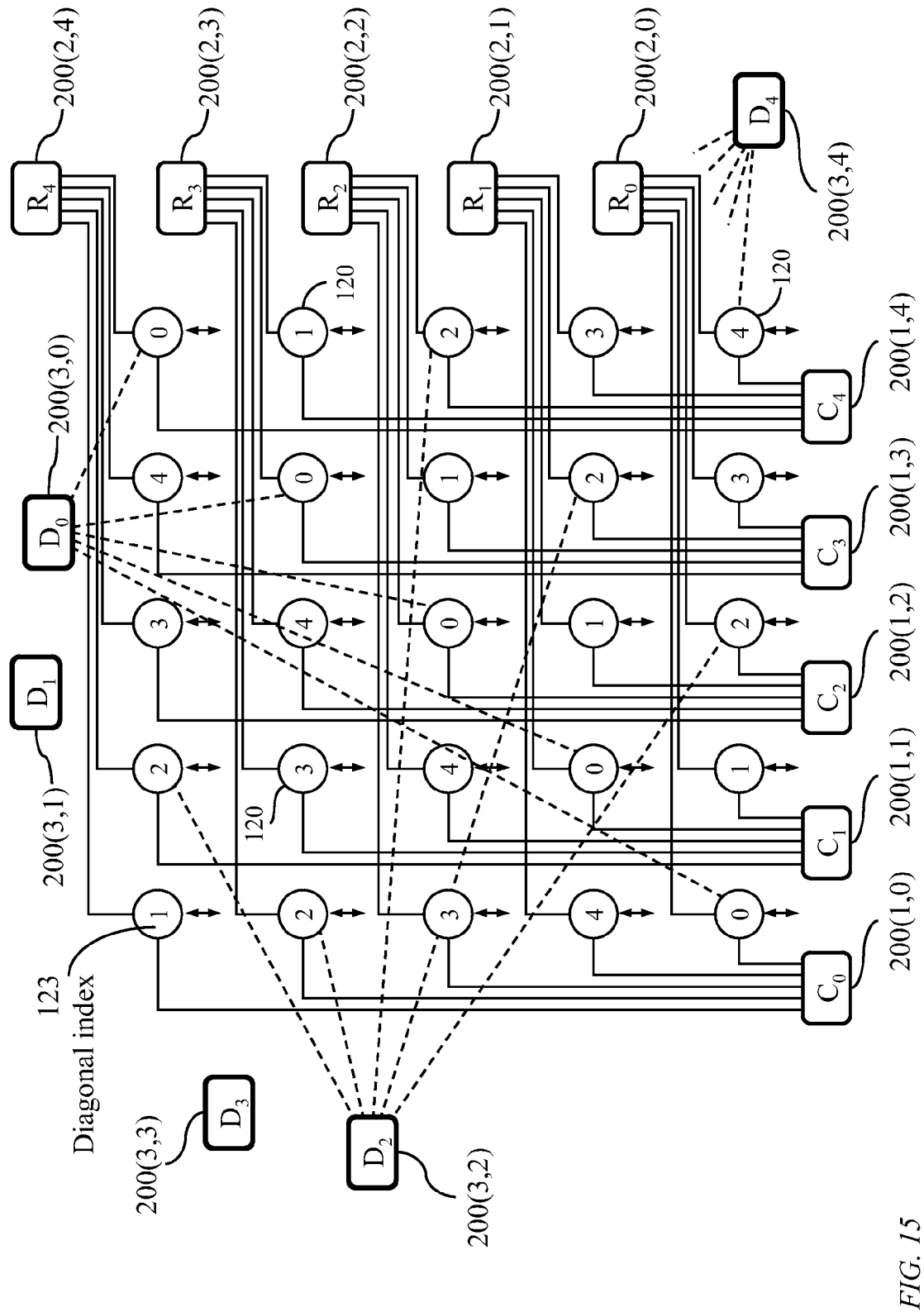
FIG. 15 illustrates independent switches interconnecting nodes of respective, column node sets, row node sets, and diagonal node sets of the arrangement of FIG. 1, in accordance with an embodiment of the present invention.

FIG. 15 illustrates a switching system having $m^2$ nodes 120 and 3×m switches 200 with m=5. Each of switches 200(1,$\pi$), 0≤$\pi$<m, labeled $C_0$ to $C_4$, interconnects nodes of a column node set. Each of switches 200(2,$\pi$), 0≤$\pi$<m, labeled $R_0$ to $R_4$, interconnects nodes of a row node set. Each of m switches 200(3,$\pi$), 0≤$\pi$<m, labeled $D_0$ to $D_4$, interconnects nodes of a diagonal node set. The nodes 120 receive data from external data sources and transmit data to external data sinks.

The nodes 120 and switches 200 may be geographically distributed to form a telecommunications network. The nodes 120 and the switches 200 may also be collocated to form a routing-switching center in a telecommunications network. With m=1000, for example, the switching system may have one million nodes thus forming a wide coverage network which provides multiple paths from each node to each other node, each path traversing at most two switches 200. One or more nodes 120 may be dedicated to distribute administrative information and/or instructions to the other nodes 120 and to the switches 200 of the switching system. The administrative information may be in the form of routing tables, software modules, or both. Exemplary routing rules applicable to the switching system of FIG. 15 are presented in FIG. 19. Other routing rules may also be devised.

In accordance with one embodiment, a switch controller of a specific switch cyclically directs a connection request received from a node to the two intermediate nodes each connecting to a switch leading to a destination node.

The switch controller 250 of a switch 200 is preferably configured to track occupancy levels of channels connecting the switch to nodes connecting to the switch. In accordance with another embodiment, the switch controller may direct a connection request received from a node to one of the (G−1) intermediate nodes according to the occupancy levels. Preferably, the connection request is sent to the intermediate node connecting to the channel of least occupancy.

Coordinates Based Routing

The m columns, m rows, and m diagonals of the (logical) matrix of nodes of FIG. 3 may be individually and uniquely indexed as 0 to (m−1), although other identifiers may be devised. Each node is then identified according to two indices; a column index and a row index.

There are (m−1) simple paths from an originating node to (m−1) adjacent intermediate nodes of a primary set of nodes to which the node belongs. There are (m−1) simple paths from each intermediate node to (m−1) nodes of a secondary set of nodes to which the intermediate node belongs. However, (m−2) paths from an intermediate node lead to distant nodes of the originating node and one of the (m−1) simple paths leads to a node which is adjacent to the originating node. Likewise, there are (m−2) simple paths from each intermediate node to (m−2) distant nodes of a tertiary set of nodes to which the intermediate node belongs and one simple path from the intermediate node to a node which is adjacent to the originating node.

Equivalently, a primary switch of index π, 0≤π<m, interconnects m nodes of indices (π×m) to (π×m+m−1), the $m^2$ nodes being indexed as 0 to ($m^2$−1).

Alternatively, with m selected as a prime number: a primary switch of index π, 0≤π<m, interconnects m nodes of indices $|j+m×π|_M$; a secondary switch of index it interconnects m nodes of indices $|j+k_1×j×m+m×π|_M$; a tertiary switch of index it interconnects m nodes of indices $|j+k_2×j×m+m×π|_M$, where 0≤j<m, M=$m^2$, 0≤π<m, $k_1$ and $k_2$ being different integers selected arbitrarily within the range 1 to (m−1). The nodes of the network are individually indexed as 0 to (M−1), the m primary switches are individually and uniquely indexed as 0 to (m−1), the m secondary switches are individually and uniquely indexed as 0 to (m−1), and the m tertiary switches are individually and uniquely indexed as 0 to (m−1).

With $k_1$, for example, selected to equal 0, a primary switch of index π, interconnects m nodes of indices (π×m) to (π×m+m−1). As indicated above, the term $|j+m×π|_M$ means $(j+m×π)_{moduloM}$, the term $|j+k_1×j×m+m×π|_M$ means $(j+k_1×j×m+m×π)_{moduloM}$, and so on.

Figure 16:
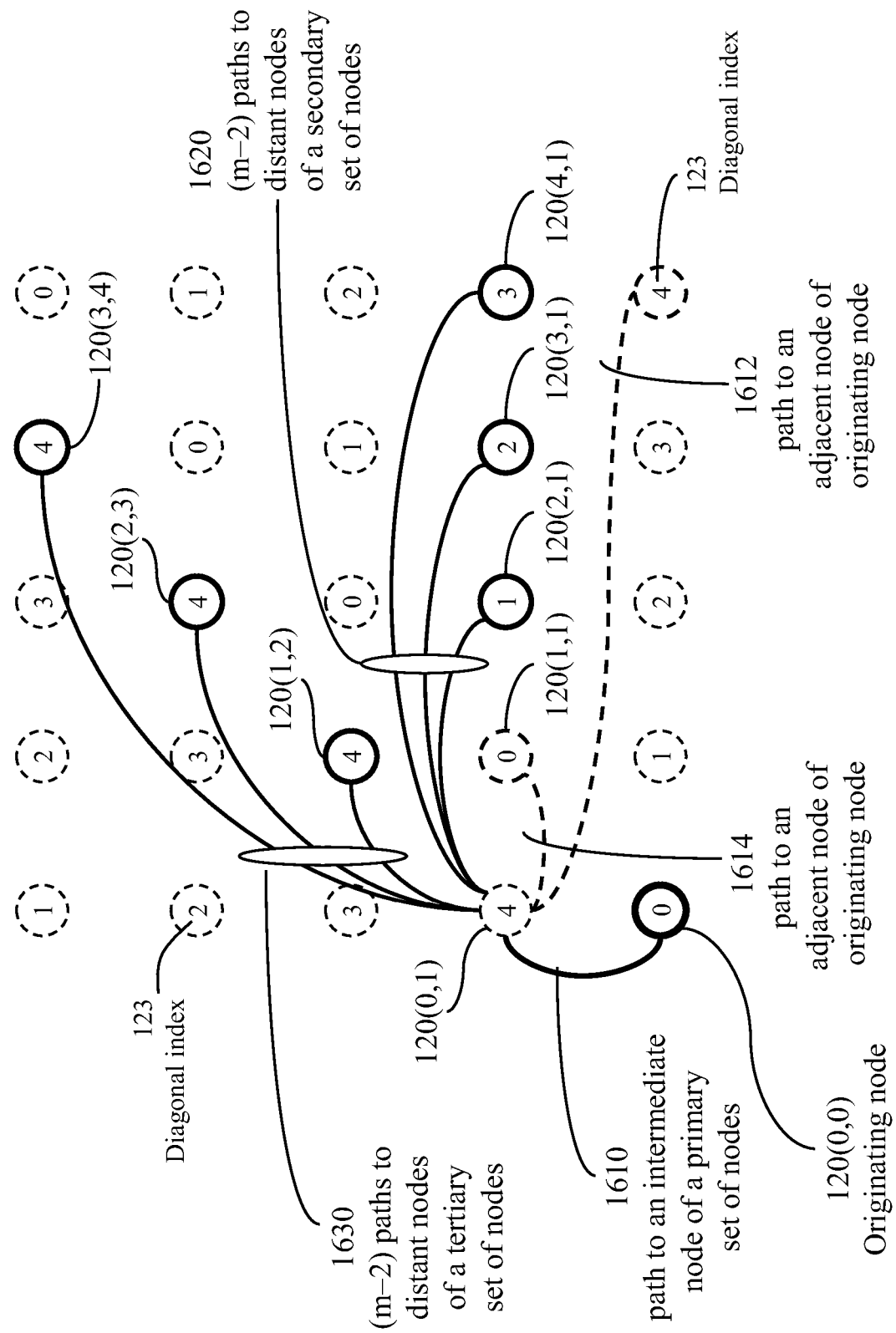
FIG. 16 illustrates compound paths from an originating node to a destination node of the switching system of FIG. 3 having a common initial path to an intermediate node of a set of first-order nodes, in accordance with an embodiment of the present invention.

FIG. 16 illustrates compound paths from an originating node to destination nodes of the network of FIG. 3 having a common simple path to an intermediate node of a set of first-order nodes. Originating node 120(0,0) has a path 1610 to intermediate adjacent node 120(0,1). Intermediate node 120(0,1) has one path 1612 to node 120(4,0) which is adjacent to the originating node 120(0,0), both connecting to a same secondary switch, and one path 1614 to node 120(1,1) which is adjacent to the originating node 120(0,0), both connecting to a same tertiary switch. Intermediate node 120(0,1) has three paths 1620 to nodes 120(2,1), 120(3,1), and 120(4,1), of a secondary set of nodes, which are distant nodes with respect to the originating node. Intermediate node 120(0,1) has three paths 1630 to nodes 120(1,2), 120(2, 3), and 120(3,4), of a tertiary set of nodes, which are distant nodes with respect to the originating node.

FIG. 17 illustrates compound paths from an originating node to a destination node of the network of FIG. 3 having a common simple path to an intermediate node of a set of second-order nodes. Originating node 120(0,0) has a path 1710 to intermediate adjacent node 120(3,0). Intermediate node 120(3,0) has one path 1712 to node 120(0,2) which is adjacent to the originating node 120(0,0), both connecting to a same primary switch and one path 1714 to node 120(3,3) which is adjacent to the originating node 120(0,0), both connecting to a same tertiary switch. Intermediate node 120(3,0) has three paths 1720 to nodes 120(3,1), 120(3, 2), and 120(3,4), of a primary set of nodes, which are distant nodes with respect to the originating node. Intermediate node 120(3,0) has three paths 1730 to nodes 120(1,3), 120(2, 4), and 120(4,1), of a tertiary set of nodes, which are distant nodes with respect to the originating node.

Figure 18:
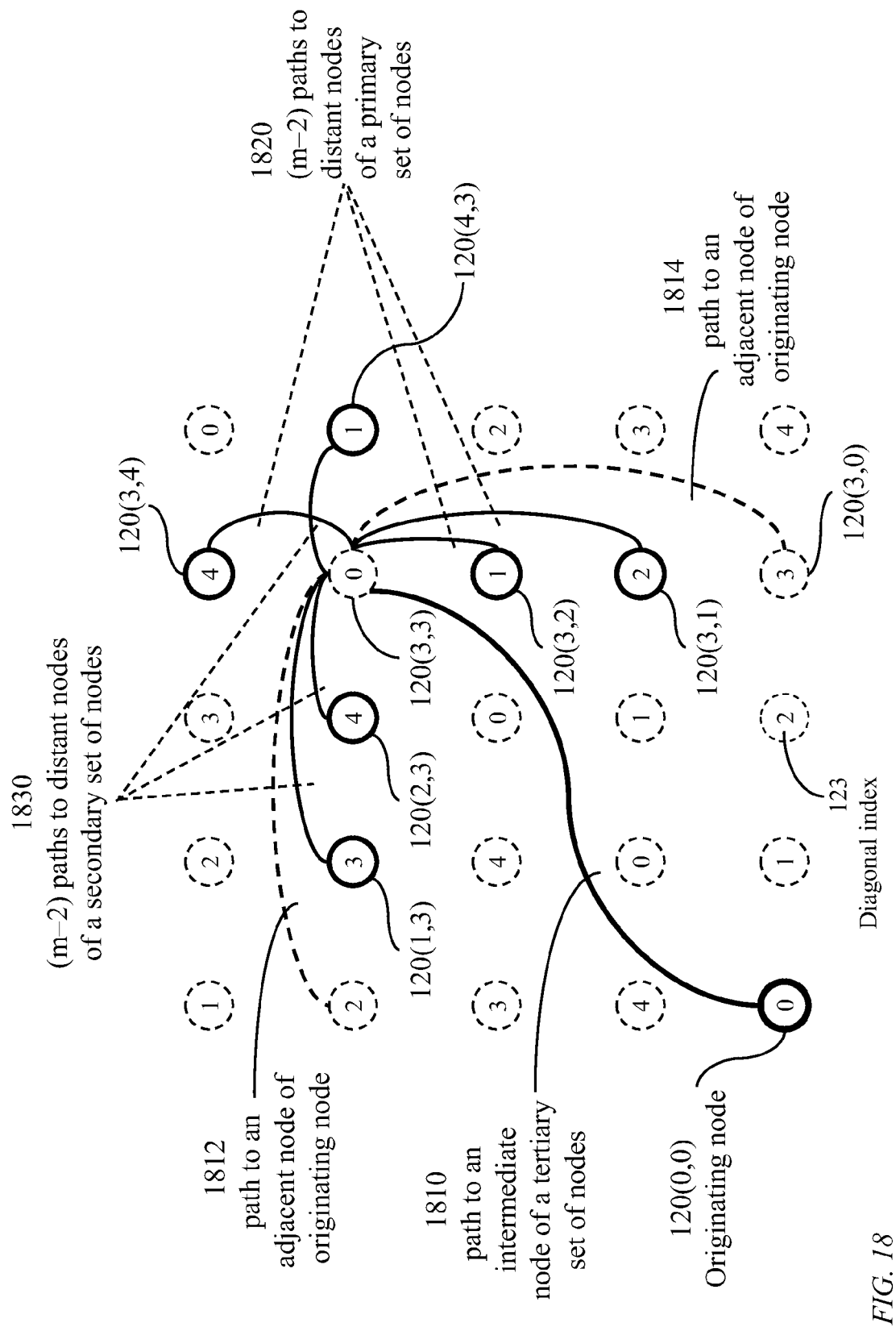
FIG. 18 illustrates compound paths from an originating node to a destination node of the switching system of FIG.

FIG. 18 illustrates compound paths from an originating node to a destination node of the network of FIG. 3 having a common simple path to an intermediate node of a set of third-order nodes. Originating node 120(0,0) has a path 1810 to intermediate adjacent node 120(3,3). Intermediate node 120(3,3) has one path 1812 to node 120(0,3) which is adjacent to the originating node 120(0,0), both connecting to a same primary switch, and one path 1814 to node 120(3,0) which is adjacent to the originating node 120(0,0), both connecting to a same secondary switch. Intermediate node 120(3,3) has three paths 1820 to nodes 120(3,1), 120(3, 2), and 120(3,4), of a primary set of nodes, which are distant nodes with respect to the originating node. Intermediate node 120(3,3) has three paths 1830 to nodes 120(1,3), 120(2, 3), and 120(4,3), of a secondary set of nodes, which are distant nodes with respect to the originating node.

The node controllers may be configured to determine routes according to nodal coordinates. With columns, rows, and diagonals being individually and uniquely indexed as 0 to (m−1), a node controller 125 of a node 120 in column x and row y, 0≤x<m, 0≤y<m, may be configured to:

(a) communicate with a switch controller 250(1,x) of a primary switch 200(1,x) interconnecting nodes of column x to set a path to any node 120 of column x;

(b) communicate with a switch controller 250(2,y) of a secondary switch 200(2,y) interconnecting nodes of row y to set a path to any node of row y; and (c) communicate with a switch controller 250(3,ζ) of a tertiary switch 200(3,ζ), ζ=$|x−y|_m$, interconnecting nodes of diagonal ζ to set a path to any node of diagonal ζ.

FIG. 19 illustrates simple routing rules for establishing paths from an originating node 120(x,y) to a destination node 120(u,v), where 0≤x<m, 0≤y<m, 0≤u<m, and 0≤v<m, of any of the networks of FIG. 3, 4, or 5. If the destination node is a distant node with respect to the first node, i.e., if u≠x, v≠y, (u−v)≠(x−y), the route set comprises six compound routes. Table 1900 defines the six routes. A compound route traverses two switches 200. A row 1920 defines compound routes traversing a primary switch adjacent to the originating node. A row 1940 defines compound routes traversing a secondary switch adjacent to the originating node. A row 1960 defines compound routes traversing a tertiary switch adjacent to the originating node. Column 1910 identifies indices of a primary switch, a secondary switch, and a tertiary switch, respectively, adjacent to the originating node. Column 1912 identifies an order and an index of each switch which may be used to complete a compound route. Column 1914 identifies an index of an intermediate node connecting to a first switch of a compound path. Column 1916 identifies indices of intermediate nodes relative to respective source switches. Column 1918 identifies an index of the destination node relevant to a switch used to complete a compound route. A switch controller 250 of a switch 200, regardless of the order of the switch, need not be aware of the topological position of nodes 120 or 820 connecting to the switch. The switch controller need only be aware of a relative identifier of each of the nodes connecting to the switch.

To establish a route, the originating node communicates the coordinates (u,v) of the destination node to one of the switch controller 250(1,x) of the primary switch 200(1,x), the switch controller 250(2,y) of secondary switch 200(2,y), and the switch controller 250(3,ζ) of tertiary switch ζ, where ζ=$|x−y|_m$.

If switch controller 250(1,x) of primary switch 200(1,x) determines that u=x, then a simple path may be established through the primary switch 200(1,x). Otherwise, two compound routes may be established. One compound route traverses primary switch 200(1,x) to an intermediate node 120(x,v) then traverses secondary switch 200(2,v) to the destination node. As indicated in Table 1900, switch controller 250(1,x) recognizes the intermediate node as an adjacent node of index "v" and switch controller 250(2,v) recognizes the destination node as an adjacent node of index "u". Another compound route traverses primary switch 250(1,x) to intermediate node 120(x, $|x+v−u|_m$) then traverses tertiary switch 250(3, $|u−v|_m$) to the destination node. Switch controller 250(1,x) recognizes the intermediate node as an adjacent node of index "$|x+v-u|_m$," and switch controller $250(3, |u-v|_m)$ recognizes the destination node as an adjacent node of index "u".

If switch controller $250(2,y)$ of secondary switch $200(2,y)$ determines that v=y, then a simple path may be established through the secondary switch $200(2,y)$. Otherwise, two compound routes may be established. One compound route traverses secondary switch $200(2,y)$ to an intermediate node $120(u,y)$ then traverses primary switch $200(1,u)$ to the destination node. Switch controller $250(2,y)$ recognizes the intermediate node as an adjacent node of index "|u" and switch controller $250(1,u)$ recognizes the destination node as an adjacent node of index "v". Another compound route traverses secondary switch $200(2,y)$ to intermediate node $120(|y+u-v|_m, y)$ then traverses tertiary switch $200(3, |u-v|_m)$ to the destination node. Switch controller $250(2,y)$ recognizes the intermediate node as an adjacent node of index "$|y+u-v|_m$" and switch controller $250(3,|u-v|_m)$ recognizes the destination node as an adjacent node of index "u".

If switch controller $250(3,\zeta)$ of tertiary switch $200(3,\zeta)$ determines that (u−v)=(x−y), then a simple path is established through the tertiary switch. Otherwise, two compound routes may be established. One compound route traverses tertiary switch $250(3,\zeta)$ to an intermediate node $120(u, (y+u-x)|_m)$ then traverses primary switch $200(1,u)$ to the destination node. Switch controller $250(3,\zeta)$ recognizes the intermediate node as an adjacent node of index "|u" and switch controller $250(1,u)$ recognizes the destination node as an adjacent node of index "v". Another compound route traverses tertiary switch $200(3,\zeta)$ to an intermediate node $120(|v-y+x|_m, v)$ then traverses secondary switch $200(2,v)$ to the destination node. Switch controller $250(3,\zeta)$ recognizes the intermediate node as an adjacent node of index "$|v-y+x|_m$" and switch controller $250(2,v)$ recognizes the destination node as an adjacent node of index "u".

A node $120(x,y)$ is adjacent to switches $200(1,x)$, $200(2,y)$, and $200(3, |x-y|_m)$. The node controller of node $120(x,y)$ may communicate with a switch controller of any of the adjacent switches to set up a connection to any node in the network. A path from node $120(x,y)$ to an adjacent destination node $120(u,v)$, $0 \le x<m$, $0 \le y<m$, $0 \le u<m$, $0 \le v<m$, traverses only switch. The path traverses only primary switch $200(1,x)$ if u=x, the path traverses only secondary switch $(2,y)$ if v=y, and the path traverses only tertiary switch $(x-y)_{modulo\ m}$ if (u−v)=(x−y).

The node controller of node $120(x,y)$ may communicate with switch controller $250(1,x)$ to set up a first path traversing switch $200(1,x)$ to a first adjacent node in column x and row v, $0 \le v<m$, $v \ne y$. The path carries new data originating from data sources connecting to node $120(x,y)$ and destined to nodes of row v and to nodes of diagonal $(x-v)_{modulo\ m}$. The path also carries data received at node $120(x,y)$ from nodes of row y and from nodes of diagonal $(x-y)_{modulo\ m}$ and destined to the first adjacent node.

The node controller of node $120(x,y)$ may communicate with a switch controller $250(2,y)$ to set up a second path traversing switch $200(2,y)$ to a second adjacent node in column u and row y, $0 \le u<m$, $u \ne x$. The path carries new data originating from data sources connecting to node $120(x,y)$ and destined to nodes of column u and to nodes of diagonal $(u-y)_{modulo\ m}$. The path also carries switched data received at node $120(x,y)$ from nodes of column x and from nodes of diagonal $(x-y)_{modulo\ m}$ and destined to the second adjacent node.

The node controller of node $120(x,y)$ node controller may communicate with a switch controller $250(3,|x-y|_m)$ to set up a third path traversing switch $200(3, |x-y|_m)$ to a third adjacent node in column $|x+j|_m$ and row $|y+j|_m$, $0<j<m$. The path carries new data originating from node $120(x,y)$ and destined to nodes of column $|x+j|_m$ and to nodes of row $|y+j|_m$. The path also carries switched data received from nodes of column x and from nodes of row y and destined to the third adjacent node.

As indicated in FIG. 3, a switch 200 interconnecting nodes of a respective column of the matrix of nodes is referenced as a primary (column) switch, a switch 240 interconnecting nodes of a respective row of the matrix of nodes is referenced as a secondary (row) switch, and a switch interconnecting nodes of a respective diagonal is arbitrarily referenced as a tertiary (diagonal) switch. This nomenclature is only exemplary. A compound-path logical direction is identified by the first traversed switch 200 and the second traversed switch 200. A compound path traversing a primary (column) switch followed by a secondary (row) switch is identified by the notation C-R. Likewise, the notations C-D, R-C, R-D, D-C, and D-R, respectively refer to compound paths traversing a column switch then a diagonal switch, a row switch then a column switch, a row switch then a diagonal switch, a diagonal-switch then a column switch, and a diagonal switch then a row switch.

FIG. 20 illustrates a set 2000 of six intermediate nodes defining compound paths for a directed node pair {120(x,y), 120(u,v)}, where x=0, y=1, u=3, and v=3) of any of the networks of FIG. 3, FIG. 4, or FIG. 5. Based on the routing rules of FIG. 19, the intermediate nodes are 120(0,3), 120(0,0), 120(3,1), 120(1,1), 120(3,4), and 120(2,3). The originating node 120(0,1) connects to a primary switch 200(1,0), a secondary switch 200(2,1), and a tertiary switch 200(3,4). The destination node 120(3,3) connects to a primary switch 200(1,3), a secondary switch 200(2,3), and a tertiary switch 200(3,0).

FIG. 21 illustrates a set 2100 of six intermediate nodes defining compound paths for a directed node pair {120(x,y), 120(u,v)}, where x=1, y=3, u=3, and v=1) of any of the switching systems of FIG. 3, FIG. 4, or FIG. 5. Based on the routing rules of FIG. 19, the intermediate nodes are 120(1,1), 120(1,4), 120(3,3), 120(0,3), 120(3,0), and 120(4,1). The originating node 120(1,3) connects to a primary switch 200(1,1), a secondary switch 200(2,3), and a tertiary switch 200(3,3). The destination node 120(3,1) connects to a primary switch 200(1,3), a secondary switch 200(2,1), and a tertiary switch 200(3,2).

FIG. 22 illustrates a set 2200 of six intermediate nodes defining compound paths for a directed node pair {120(x,y), 120(u,v)}, where x=0, y=4, u=4, and v=0) of any of the switching systems of FIG. 3, FIG. 4, or FIG. 5. Based on the routing rules of FIG. 19, the intermediate nodes are 120(0,0), 120(0,1), 120(4,4), 120(3,4), 120(4,3), and 120(1,0). The originating node 120(0,4) connects to a primary switch 200(1,0), a secondary switch 200(2,4), and a tertiary switch 200(3,1). The destination node 120(4,0) connects to a primary switch 200(1,4), a secondary switch 200(2,0), and a tertiary switch 200(3,4).

FIG. 23 illustrates six compound paths for the directed node pair 120(0,1) and 120(3,3) of FIG. 20 based on the rules of FIG. 19. Table-I identifies the six compound paths.

A first compound path, labeled column-row (C-R), traverses primary switch 200(1,0) to an intermediate node 120(0,3) then traverses secondary switch 200(2,3) to the destination node. A second compound path, labeled column-diagonal (C-D), traverses primary switch 200(1,0) to an intermediate node 120(0,0) then traverses tertiary switch 200(3,0) to the destination node.

A third compound path, labeled row-column (R-C), traverses secondary switch 200(2,1) to an intermediate node 120(3,1) then traverses primary switch 200(1,3) to the destination node. A fourth compound path, labeled row-diagonal (R-D), traverses secondary switch 200(1,0) to an intermediate node 120(1,1) then traverses tertiary switch 200(3,0) to the destination node.

A fifth compound path, labeled diagonal-column (D-C), traverses tertiary switch 200(3,4) to an intermediate node 120(3,4) then traverses primary switch 200(1,3) to the destination node. A sixth compound path, labeled diagonal-row (D-R), traverses tertiary switch 200(3,4) to an intermediate node 120(2,3) then traverses secondary switch 200(2,3) to the destination node.

TABLE I

Paths from node 120(0,1) to destination node 120(3,3)

| First switch | Intermediate node coordinates | Intermediate node index in first switch | Second Switch | Destination node index in second switch |
|---|---|---|---|---|
| 1,0 | 0,3 | 3 | 2,3 | 3 |
|  | 0,0 | 0 | 3,0 | 3 |
| 2,1 | 3,1 | 3 | 1,3 | 3 |
|  | 1,1 | 1 | 3,0 | 3 |
| 3,4 | 3,4 | 3 | 1,3 | 3 |
|  | 2,3 | 2 | 2,3 | 3 |

FIG. 24 illustrates the six compound paths for the directed node pair 120(1,3) 120(3,1) of FIG. 21. Table-II identifies the six compound paths.

A first compound path (labeled C-R) traverses primary switch 200(1,1) to an intermediate node 120(1,1) then traverses secondary switch 200(2,1) to the destination node. A second compound path (labeled C-D) traverses primary switch 200(1,1) to an intermediate node 120(1,4) then traverses tertiary switch 200(3,2) to the destination node.

A third compound path (labeled R-C) traverses secondary switch 200(2,3) to an intermediate node 120(3,3) then traverses primary switch 200(1,3) to the destination node. A fourth compound path (labeled R-D) traverses secondary switch 200(1,3) to an intermediate node 120(0,3) then traverses tertiary switch 260(3,2) to the destination node.

A fifth compound path (labeled D-C) traverses tertiary switch 200(3,3) to an intermediate node 120(3,0) then traverses primary switch 200(1,3) to the destination node. A sixth compound path (labeled D-R) traverses tertiary switch 200(3,3) to an intermediate node 120(4,1) then traverses secondary switch 200(2,1) to the destination node.

TABLE II

Paths from node 120(1,3) to destination node 120(3,1)

| First switch | Intermediate node coordinates | Intermediate node index in first switch | Second Switch | Destination node index in second switch |
|---|---|---|---|---|
| 1,1 | 1,1 | 1 | 2,1 | 3 |
|  | 1,4 | 4 | 3,2 | 3 |
| 2,3 | 3,3 | 3 | 1,3 | 1 |
|  | 0,3 | 0 | 3,2 | 3 |
| 3,3 | 3,0 | 3 | 1,3 | 1 |
|  | 4,1 | 4 | 2,1 | 3 |

FIG. 25 illustrates six compound paths for directed node pair 120(0,4) and 120(4,0) of FIG. 22. Table-III identifies the six compound paths.

TABLE III

Paths from node 120(0,4) to destination node 120(4,0)

| First switch | Intermediate node coordinates | Intermediate node index in first switch | Second Switch | Destination node index in second switch |
|---|---|---|---|---|
| 1,0 | 0,0 | 0 | 2,0 | 4 |
|  | 0,1 | 1 | 3,4 | 4 |
| 2,4 | 4,4 | 4 | 1,4 | 0 |
|  | 3,4 | 3 | 3,4 | 4 |
| 3,1 | 4,3 | 4 | 1,4 | 0 |
|  | 1,0 | 1 | 2,0 | 4 |

A first compound path (labeled C-R) traverses primary switch 200(1,0) to an intermediate node 120(0,0) then traverses secondary switch 200(2,0) to the destination node. A second compound path (labeled C-D) traverses primary switch 200(1,0) to an intermediate node 120(0,1) then traverses tertiary switch 200(3,4) to the destination node.

A third compound path (labeled R-C) traverses secondary switch 200(2,4) to an intermediate node 120(4,4) then traverses primary switch 200(1,4) to the destination node. A fourth compound path (labeled R-D) traverses secondary switch 200(2,4) to an intermediate node 120(3,1) then traverses tertiary switch 200(3,4) to the destination node.

A fifth compound path (labeled D-C) traverses tertiary switch 200(3,1) to an intermediate node 120(4,34) then traverses primary switch 200(1,4) to the destination node. A sixth compound path (labeled D-R) traverses tertiary switch 260(3,1) to an intermediate node 120(1,0) then traverses secondary switch 200(2,0) to the destination node.

A controller of a primary switch x, 0≤x<m, may be configured to route a connection to a destination node in column u and row v through a first channel to a node in column x and row v, or a second channel to a node in column x and row $|x-u+v|_m$. The selection of either channel may be cyclical, random, or based on tracked occupancy levels of the first channel and the second channel. As mentioned earlier, the m columns, m rows, m primary switches, m secondary switches, and m tertiary switches are individually and uniquely indexed as 0 to (m−1).

A controller of a secondary switch y, 0≤y<m, may be configured to route a connection to a destination node in column u and row v through a third channel to a node in column u and row y, or a fourth channel to a node in column $|y+u-v|_{modulo\ m}$ and row y. The selection of either channel may be cyclical, random, or based on tracked occupancy levels of the third channel and the fourth channel.

A controller of a tertiary switch ζ, 0≤ζ<m, may be configured to route a connection to a destination node in column u and row v through one of a fifth channel to a node in column u and row $|u-\zeta|_{modulo\ m}$, or a sixth channel to a node in column $|v+\zeta|_{modulo\ m}$ and row v. The selection of either channel may be cyclical, random, or based on tracked occupancy levels of the fifth channel and the sixth channel.

A switch controller 250(1,x), 250(2,y), or 250(3,ζ), ζ=|x−y|$_m$, of a switch 200(1,x), 200(2,y), or 200(3,ζ) connecting to m nodes, m>2, may establish one simple route for any two nodes of the m nodes. The switch controller may also establish (m−2) compound paths for a directed pair of adjacent nodes where a compound path traverses the switch once to an intermediate adjacent node then traverses the same switch again to a destination adjacent node.

Each node controller 125 of a respective node 120 in column x, 0≤x<m, is configured to communicate with a switch controller 250(1,x) of a primary switch interconnecting nodes of column x to establish at least one compound path from a first node in column x and row y, $0 \leq y < m$, to a destination node of column x and row v, $0 \leq v < m$. A compound path traverses the switch controller to any intermediate node then traverses the switch controller again to connect the intermediate node to the destination node. There are (m−2) intermediate nodes. Thus, the paths between any two nodes belonging to a same column include one simple path, as described earlier, and (m−2) compound paths all traversing the same column switch.

Likewise, there are one simple path and (m−2) compound paths between any two nodes of a same row traversing a same row switch and there are one simple path and (m−2) compound paths between any two nodes of a same diagonal traversing a same diagonal switch.

As indicated in Table 1900, a path from an originating node of column x and row y to a destination node of column u and row v, $0 \leq x < m$, $0 \leq y < m$, $0 \leq u < m$, $0 \leq v < m$, where $u \neq x$, $v \neq y$, $(u-v) \neq (x-y)$, traverses one of six switch pairs:

a primary switch 200(1,x) and a secondary switch 200(2, v);

a primary switch 200(1,x) and a tertiary switch $|u-v|_m$, i.e., $(u-v)_{modulo\ m}$;

a secondary switch 200(2,y) and a primary switch 200(1, u);

a secondary switch 200(2,y) and a tertiary switch 200(3, $|u-v|_m$);

a tertiary switch 200(3,$(x-y)|_m$) and a primary switch 200(1,u); and a tertiary switch 200(3,$(x-y)|_m$) and a secondary switch 200(2,v).

General Orthogonal Connectivity Patterns of Nodes to Switches

The above describes a network configuration based on a coordinate system. In general, a network of order G, $G>1$, may be configured based on connecting each switch of a plurality of switches to orthogonal sets of nodes. Setting the dimension of a switch to not exceed a predefined upper bound m, $m>2$, the maximum number of nodes which may be supported by any of the networks of FIG. 3, FIG. 4, or FIG. 5 is $m^2$.

As illustrated in FIG. 8, the N nodes of the network, $N \geq 4$, may be indexed as 0 to (N−1). If N selected is to equal $m^2$, m being an integer, the nodes may be arranged in a logical matrix of m columns and m rows, and the $m^2$ nodes may be indexed as 0 to $(m^2-1)$. The number N of nodes may be selected to be less than $m^2$ as will be described below.

FIG. 26 illustrates numbering of a first plurality of nodes, following the pattern of FIG. 8, for use in determining generalized mutually orthogonal sets of nodes. The nodes are arranged in a logical matrix having five columns and five rows (m=5). The nodes are indexed as 0 to 24.

The nodes may be arranged into G formations, $2 \leq G \leq (m+1)$, each formation comprising m sets of nodes with each node being common to exactly G sets of nodes in different formations. Denoting the formations as $\Omega_k$, $0 \leq k < G$, and indexing the G formations as $0, 1, \ldots, (G-1)$, a formation of index k, $0 \leq k < G$, comprises m disjoint node sets $S_{k,\pi}$, $0 \leq \pi < m$, constituting the entire nodes of the switching system.

Selecting m as a prime number, a node set $S_{k,\pi}$ includes m nodes of indices: $|j+j \times m \times k + m \times \pi|_M$, $0 \leq j < m$, $M=m^2$. Thus, a switch of switch group k and index $\pi$, $0 \leq G$, $2 \leq G \leq m$, $0 \leq \pi < m$, connects to nodes of indices $|j+j \times m \times k + m \times \pi|_M$, where nodes of the switching system are individually index as 0 to (M−1), the m switches of each group are individually and uniquely indexed as 0 to (m−1).

Each node set $S_{k,\pi}$, $0 \leq \pi < m$, is orthogonal to each node set $S_{q,\pi}$, $0 \leq \pi < m$, where $q \neq k$, $0 \leq q < G$. Thus, each node set of a specific formation is orthogonal to each node set of each other formation. Consequently, interconnecting nodes of each node set of at least two formations $(2 \leq G \leq (m+1))$ through a respective switch yields a network providing multiple paths from each node to each other node of the plurality of M nodes.

Each switch connects to a respective number of nodes not exceeding a predefined number m. A partially populated switching system may have a number N of nodes at least equal to $2 \times m$ and at most equal to $m^2$.

FIG. 27 illustrates a first arrangement 2700 of formations 2720 of nodes of the first plurality of nodes of FIG. 26 having 25 nodes (N=25) for a switching system based on switches of dimension 5 (m=5). Each formation 2720 comprises a number of disjoint sets 2740 of nodes constituting the entire plurality of nodes. The nodes of each set 2740 of nodes are interconnected through a respective switch 200.

In accordance with an embodiment, a node set $S_{k,\pi}$, of index $\pi$ in formation $\Omega_k$, contains nodes 820 of indices:

$(j+i \times m \times k + m \times \pi)_{modulo\ M}, 0 \leq j < m, 0 \leq k < m, M=m^2,$ Five formations of node sets, individually identified as 2720(0), 2720(1), 2720(2), 2720(3), and 2720(4), are thus produced. Each formation contains five sets of nodes. A set of nodes of any formation is orthogonal to each set of nodes of each other formation. To create a network of order G, $2 \leq G \leq 6$, each set of nodes of any G formations of the five formations may connect to a respective switch having five inlets and five outlets.

There are five switches of order 0 connecting to disjoint zero-order sets of nodes of indices {0, 1, 2, 3,4}, (5, 6, 7, 8, 9), (10, 11, 12, 13, 14), (15, 16, 17, 18, 19), and {20, 21, 22, 23, 24}. There are five switches of order 1 connecting to order-1 sets of nodes of indices {0, 6, 12, 18, 24}, {4, 5, 11, 17, 23}, {3, 9, 10, 16, 22}, {2, 8, 14, 15, 21}, and {1, 7, 13, 19, 20}. Each of the five order-1 sets of nodes is orthogonal to each of the 0-order sets of nodes. Likewise, there are five switches of order 2 connecting to disjoint order-2 sets of nodes, with each order-2 set of nodes being orthogonal to each order-0 set of nodes and each order-1 set of nodes. There are five disjoint order-3 sets of nodes, five disjoint order-4 sets of nodes, and five disjoint order-5 sets of nodes, with each order-j set of nodes being orthogonal to each order (j−1) set of nodes, $1 < j < G$.

In addition to the m formations $\Omega_0$ to $\Omega_{(m-1)}$, an additional formation $\Omega_m$ may be generated. Formation $\Omega_m$ includes m sets of nodes $S_{m,\pi}$, $0 \leq \pi < m$, where a set of index $\pi$ contains nodes 820 of indices: $(j \times m + \pi)$, $0 \leq j < m$. The sets of nodes thus formed are illustrated in FIG. 27.

Alternatively, in accordance with another embodiment, a node set $S_{k,\pi}$, of index $\pi$ in formation $\Omega_k$, contains nodes 820 of indices:

$(j \times m + |k \times j + \pi|_m), 0 \leq j < m,$ for $0 \leq k < m, 0 \leq \pi < m.$ In addition to the m formations $\Omega_0$ to $\Omega_{(m-1)}$, an additional formation $\Omega_m$ may be generated. Formation $\Omega_m$ includes m sets of nodes $S_{m,\pi}$, $0 \leq \pi < m$, where a set of index $\pi$ contains nodes 820 of indices: $(j+m \times \pi)$, $0 \leq j < m$. The sets of nodes thus formed are illustrated in FIG. 28.

FIG. 28 illustrates a second arrangement 2800 of formations of nodes of the first plurality of nodes of FIG. 26 having 25 nodes (N=25) for a switching system based on switches of dimension 5 (m=5). Each formation 2820 comprises a number of disjoint sets 2840 of nodes constituting the entire plurality of nodes. The nodes of each set 2840 of nodes are interconnected through a respective switch 200.

Up to (m+1) formations may be generated. The formations used to configure the switching system may be selected from the (m+1) formations. Selecting m as a prime number, a node of index η connects to a switch of group k of index π determined as:

$$\pi = (\eta - k \times \lfloor \eta/m \rfloor)_{modulo\ m}, 0 \leq k < m, \text{ and}$$

$$\pi = \lfloor \eta/m \rfloor \text{ for } k = m$$

Each switch connects to a respective number of nodes not exceeding a predefined number m and the plurality of nodes comprises a number N of nodes at least equal to 2×m and at most equal to $m^2$. The N nodes are preferably indexed as 0 to (N−1), and the switches of each switch group are preferably indexed sequentially in steps of 1 starting from 0.

The network may be configured so that a selected switch group comprises a first number, μ, μ>1, of switches of the plurality of switches while each other switch group comprises a second number, m, m≥μ, of switches of the plurality of switches. Each switch of the selected switch group connects to m switches while each switch of each other switch group connects to μ nodes of the plurality of nodes.

As defined above, nodes sharing a same switch are said to be mutually adjacent nodes. For example, in the configuration of FIG. 27, the five nodes of indices {0, 1, 2, 3, 4} are mutually adjacent nodes. Likewise, the five nodes {1, 7, 13, 19, 20} are mutually adjacent nodes; the five nodes {1, 9, 12, 15, 23} are mutually adjacent nodes, and so on. In a network of order 3 based on the first three formations of FIG. 27, the nodes 820 of indices {0, 2, 3, 4, 7, 13, 19, 20, 9, 12, 15, 23} are adjacent to node 820(1) and, conversely, node 820(1) is adjacent to each of nodes 2620 of indices {0, 2, 3, 4, 7, 13, 19, 20, 9, 12, 15, 23}. In a fully populated network of order G, 2≤G≤(m+1), each node has G×(m−1) adjacent nodes of the total number of $m^2$ nodes. Thus, in a network of order 5 (G=5), i.e., based on G node formations, with each formation having 251 node sets (m=251), each node has 1250 adjacent nodes (5×250) of a total number of nodes of 63001 other nodes. With G=(m+1), each node has ($m^2$−1) adjacent nodes, i.e., each node is adjacent to each other node.

FIG. 29 illustrates the sets of nodes of formations $\Omega_2$ and $\Omega_3$ of FIG. 27 where the nodes of each set of nodes are indicated relevant to the matrix of nodes of FIG. 26. It is seen that the sets of nodes of each formation are disjoint while any set of nodes in formation $\Omega_2$ has one common node in each set of nodes of formation $\Omega_3$.

FIG. 30 illustrates numbering of a second plurality of nodes, containing 49 nodes following the pattern of FIG. 8. The nodes are arranged in a logical matrix having seven columns and seven rows (m=7). The nodes are indexed as 0 to 48.

FIG. 31 illustrates three formations of the nodes of FIG. 30. The three formations are created in a pattern similar to the coordinate-based pattern of FIG. 5. FIG. 31 illustrates formations $\Omega_0$, $\Omega_1$, and $\Omega_2$, of nodes corresponding to coordinates of the second plurality of nodes of FIG. 30. Based on the node numbering scheme of FIG. 30, and considering formations $\Omega_0$, $\Omega_1$, and $\Omega_2$ of FIG. 31 to be primary, secondary, and tertiary formations, respectively, a network having N nodes, (2×m)≤N≤$m^2$, would have a number n of primary switches determined as n=⌈N/m⌉, a number m of secondary switches, and a number m of tertiary switches. Each primary switch interconnects m nodes while each secondary or tertiary switch interconnects n nodes. A primary switch of index π connects to m nodes 820 of indices (j+m×π), 0≤j<m, 0≤π<n. A secondary switch of index π connects to n nodes of indices (j×m+π), 0≤j<n, 0≤π<m. A tertiary switch of index π connects to n nodes of indices (j×m+(j+π)$_{modulo\ m}$), 0≤j<n, 0≤π<m. FIG. 31 illustrates a fully populated network where n=m=7, each formation contains seven sets of nodes, with each set of nodes containing seven nodes.

The N nodes of the network, (2×m)≤N≤$m^2$, are individually indexed as 0 to (N−1). The switches 200 connecting sets of nodes of sequential numbers are arbitrarily termed "primary switches". Accordingly, the plurality of switches comprises n primary switches, n=⌈N/m⌉, m secondary switches, and m tertiary switches. The primary switches are individually and uniquely indexed as 0 to (n−1), the secondary switches are individually and uniquely indexed as 0 to (m−1), and the tertiary switches are individually and uniquely indexed as 0 to (m−1).

With the node numbering of FIG. 26 or FIG. 30, where m is an arbitrary positive integer exceeding 2, a node of index ν, 0≤ν<N connects to:

a primary switch of index $I_1 = \lfloor \nu/m \rfloor$;
a secondary switch of index $I_2 = (\nu - m \times I_1)$; and
a tertiary switch of index $I_3 = |I_2 - I_1|_m$.

With the above connectivity pattern, a primary switch of index π, 0≤π<n, 1<n≤m, connects to nodes of indices (j+m×π), 0≤j<m, a secondary switch of index π, 0≤π<m, connects to nodes of indices (j×m+π), 0≤j<n, and a tertiary switch of index it π 0≤π<m, connects to nodes of indices (j×m+|j+π|$_m$), 0≤j<n.

FIG. 32 and FIG. 33 illustrate an arrangement of formations of nodes of the second plurality of nodes of FIG. 30, for a network configuration based on switches of dimension 7 (m=7), with each formation comprising a number of disjoint sets of nodes constituting the entire plurality of nodes, where the nodes of each set of nodes are interconnected through a respective switch. Each formation 3220 comprises a number of disjoint sets 3240 of nodes constituting the entire plurality of nodes. The nodes of each set 3240 of nodes are interconnected through a respective switch 200.

As described above with reference to FIG. 27, a node set $S_{k,\pi}$, of index π in a formation of index k (formation $\Omega_k$), contains nodes 820 of indices:

$$(j + j \times m \times k + m \times \pi)_{modulo\ M}, 0 \leq j < m, 0 \leq k < m, M = m^2.$$

Seven formations of node sets, individually identified as 3220(0), to 3220(6), are thus produced. Each formation contains seven node sets 3240. A node set of any formation is orthogonal to each node set of each other formation.

In addition to the m formations $\Omega_0$ to $\Omega_{(m-1)}$, an additional formation $\Omega_m$ may be generated as described above with reference to FIG. 27. Formation $\Omega_m$ includes m sets of nodes $S_{m,\pi}$, 0≤π<m, where a set of index π contains nodes 820 of indices: (j×m+π), 0≤j<m.

Alternatively, a node set $S_{k,\pi}$, of index π in formation $\Omega_k$, contains nodes 820 of indices:

$$(j \times m + |k \times j + \pi|_m), 0 \leq j < m, \text{for } 0 \leq k < m, 0 \leq \pi < m.$$

In addition to the m formations $\Omega_0$ to $\Omega_{(m-1)}$, an additional formation $\Omega_m$ may be generated. Formation $\Omega_m$ includes m sets of nodes $S_{m,\pi}$, 0≤π<m, where a set of index π contains nodes 820 of indices: (j+m×π), 0≤j<m.

Each set of nodes of any formation in the arrangement of FIG. 27 is orthogonal to each set of nodes of each other formation. Likewise, each set of nodes of a formation in the arrangement of FIG. 31 is orthogonal to each set of node of each of the other two formations and each set of nodes of any formation in the arrangement of FIGS. 32 and 33 is orthogonal to each set of nodes of each of the other six formations. Thus, each node of the nodes of FIG. 26 belongs to one set of nodes in each formation in the arrangement of FIG. 27. In the arrangement of FIG. 31, each node of the nodes of FIG. 30 belongs to one set of nodes in each of the three formations. In the arrangement of FIGS. 32 and 33, each node of the nodes of FIG. 30 belongs to one set of nodes in each of the eight formations.

The nodes of each set of nodes of the formations of FIG. 27, the formations of FIG. 31, or the formation of FIGS. 32 and 33 are interconnected through a respective switch 200.

Fully-Populated Switching System

In a fully populated switching system, each switch has a same switch dimension, m, m>2, a switch dimension being a number of dual ports of a switch. The number m of dual ports excludes ports which may be used for control purposes. The number of formations may vary from 2 to (m+1), the number of nodes in a fully populated network is $m^2$ regardless of the number of formations. As mentioned earlier, the number of formations defines a switching-system order (network order). Increasing the switching-system order by 1 requires adding m new switches 200 and increasing the dimensions of the nodes 820.

Each formation has a respective number of node sets and each node set connects to a respective switch 200. The switches 200 connecting node sets of a formation are herein referenced as a switch group. Each node 820 connects to one switch 200 in each switch group so that each switch of the switches of the switching system connects to a respective number of nodes, and a set of nodes connecting to any switch 200 of any switch group is orthogonal to a set of nodes connecting to any switch of any other switch group.

In a switching system where each switch connects to a same number, m, of nodes, m being a prime number and each switch group contains m switches, a switch of switch group k and index π, 0≤π<m, connects to nodes of indices:

$(j+j\times m\times k+m\times \pi)_{modulo\ M}, 0 \le j < m$, for $0 \le k < m$, where $M=m^2$; and $(j\times m+\pi), 0 \le j < m$, for $k=m$;

The number of switch groups is at least 2 and at most (m+1), and the m switches of each switch group are individually indexed as 0 to (m−1), and nodes 820 of the switching system are individually index as 0 to (M−1).

With G=3, a switch 200 of order 0 and index π connects to nodes of indices (j+m×π), a switch of order 1 and index π connects to nodes of indices $(j+j\times m+m\times \pi)_{modulo\ M}$, and a switch of order 2 and index π connects to nodes of indices $(j+2\times j\times m+m\times \pi)_{modulo\ M}$, where 0≤π<m, 0≤j<m, $M=m^2$.

The above expressions determine node sets connecting to respective switches of a target fully-populated switching system supporting $m^2$ nodes. A switching system may be partially populated having a number of nodes less than $m^2$. The node sets connecting to respective switches of a partially-populated switching system having N nodes, N<$m^2$, may be derived from the node sets of the target fully-populated switching system by excluding nodes of indices greater than or equal to N.

As described, the switches 200 may be arranged into a plurality of switch groups and each node of a plurality of nodes may connect to one switch in each switch group so that a set of nodes connecting to any switch of any switch group is orthogonal to a set of nodes connecting to any switch of any other switch group, and sets of nodes connecting to different switches of a same switch group are disjoint.

Thus, each switch connects to a respective set of nodes, all sets of nodes connecting to switches of different switch groups are mutually orthogonal; and all sets of nodes connecting to switches of a same switch group are mutually disjoint.

With each switch connecting to a respective set of m nodes, m>2, and the plurality of nodes comprising $m^2$ nodes, the order G of the switching system would be limited to 2≤G≤(m+1).

The dimension of a switch 200, expressed as the integer number m, may be selected to be a sufficiently large number to realize a network of a specified coverage. Using fast-switching optical switches may limit the dimension of a switch to a moderate value of 128 or so, thus limiting the number of nodes 820 to 16384 or so. Using electronic switches permits using switches of larger dimensions. In particular, a rotating-access electronic latent space switch may grow to much larger dimensions, of 8192 or so.

If the predefined upper bound, m, of a switch dimension is selected as a prime number, the orthogonality condition for a switching system of order 3 (G=3) is realized with a node of index ν, 0≤ν<N connecting to:

a switch of switch group $k_1$ of index $I_1=|\lfloor v/m \rfloor - \lambda \times k_1|_m$;

a switch of switch group $k_2$ of index $I_2=|\lfloor v/m \rfloor - \lambda \times k_2|_m$; and a switch of switch group $k_3$ of index $I_3=|\lfloor v/m \rfloor - \lambda \times k_3|_m$; where $\lambda = v - m \times \lfloor v/m \rfloor$, $k_1$, $k_2$, and $k_3$ being different integers selected arbitrarily within the range 0 to (m−1).

A switching system of order G, 2≤G≤(m+1) may be based on any combination of G formations selected from (m+1) formations. FIG. 27 illustrates six formations, $\Omega_0$, $\Omega_1$, $\Omega_2$, $\Omega_3$, $\Omega_4$, and $\Omega_5$, generated for the plurality of nodes of FIG. 26. A switch 200(k,π) interconnects nodes 820 of a node set $S_{k,\pi}$ of formation k and index π, 0≤k≤m, 0≤π<m.

FIG. 34 illustrates a route set for a selected distant node pair, 820(9) and 820(17), of the plurality of nodes of FIG. 26 for a switching system of order 3 based on formations $\Omega_0$, $\Omega_1$, $\Omega_2$ of FIG. 27. A route set for a distant node pair in a switching system of order G includes G×(G−1) compound routes. With G=3, the route set for the directed node pair 820(9) to 820(17) includes six compound routes labeled Route-1 to Route-6 as indicated in FIG. 34.

Route-1 includes a simple path 3410 from node 920(9) to node 820(5), traversing switch 200(0,1), concatenated with a simple path 3420 from node 820(5) to the destination node 820(17) traversing switch 200(1,1).

Route-2 includes a simple path 3410 from node 920(9) to intermediate node 820(6), traversing switch 200(0,1), concatenated with a simple path 3420 from node 820(6) to the destination node 820(17) traversing switch 200(2,4).

Route-3 includes a simple path 3410 from node 920(9) to intermediate node 820(16), traversing switch 200(1,2), concatenated with a simple path 3420 from node 820(16) to the destination node 820(17) traversing switch 200(1,3).

Route-4 includes a simple path 3410 from node 920(9) to intermediate node 820(3), traversing switch 200(1,2), concatenated with a simple path 3420 from node 820(3) to the destination node 820(17) traversing switch 200(2,4).

Route-5 includes a simple path 3410 from node 920(9) to intermediate node 820(15), traversing switch 200(2,3), concatenated with a simple path 3420 from node 820(15) to the destination node 820(17) traversing switch 200(0,3).

Route-6 includes a simple path 3410 from node 920(9) to intermediate node 820(23), traversing switch 200(2,3), concatenated with a simple path 3420 from node 820(23) to the destination node 820(17) traversing switch 200(1,1).

FIG. 35 illustrates a route set for the same distant node pair of FIG. 34 for a switching system of order 3 based on formations $\Omega_1$, $\Omega_3$, $\Omega_5$ of FIG. 27. The route set for the directed node pair 820(9) to 820(17) includes six compound routes labeled Route-i to Route-vi as indicated in FIG. 35. Each compound path includes a first simple path 3510 followed by a second simple path 3520.

FIG. 36 illustrates a route set for adjacent nodes 820(4) and 820(23), for a switching system of order 3 based on the selected three formations $\Omega_0$, $\Omega_1$, $\Omega_2$ of FIG. 34. The two nodes are adjacent within node set $S_{1,1}$, both connecting to switch 200(1,1). A route set for an adjacent node pair in a switching system of order G includes one simple route and $(G-1)\times(G-2)$ compound routes. With G=3, the route set for the directed node pair 820(4) to 820(23) includes one simple route labeled Route-A traversing switch 200(1,1) and two compound routes labeled Route-B to Route-C as indicated in FIG. 36. Optional compound paths traversing the same switch to which nodes 820(4) and 820(23) connect are also indicated in FIG. 36 (dotted lines).

Route-B includes a simple path 3610 from node 820(4) to node 820(1), traversing switch 200(0,0), concatenated with a simple path 3620 from node 820(1) to the destination node 820(23) traversing switch 200(2,3). Route-C includes a simple path 3610 from node 820(4) to node 820(21), traversing switch 200(2,2), concatenated with a simple path 3620 from node 820(21) to the destination node 820(23) traversing switch 200(0,4).

Switching-System Growth

Switching system expansion to increase coverage (number of nodes) and overall capacity may be realized in a variety of ways.

FIG. 37 illustrates capacity growth of a fully populated switching system based on increasing the order of the switching system. The number of nodes remains unchanged (equal to $m^2$) but more switches are added and the number of ports of each node is increased.

A switching system may be partially populated with the option of incremental growth without disturbing current operation of the switching system. Initially, a selected formation 3220 of a number of formations, G, $2 \leq G \leq (m+1)$, comprises a first number, $\mu$, $\mu < m$, of disjoint sets of nodes, each set of which containing m nodes. A first switch group comprising $\mu$ switches is provided. Each switch has a dimension m and interconnects nodes of a respective node set 3240.

Each other formation 3220 of the G formations would comprise m disjoint sets of nodes 3240 with each set of nodes containing $\mu$ nodes. Thus, each formation contains the same number $\mu \times m$ of nodes, which is the initial total number of nodes supported. A switch group comprising m switches 200 each of an initial dimension of $\mu$ is provided for each of the other formations with each switch interconnecting nodes of a respective node set.

The number N of nodes may grow from $(2 \times m)$ to the maximum number $m^2$. To realize the requisite orthogonality, a node of index $\eta$, $0 \leq \eta < N$, is included in a set of nodes of formation k and index $\pi$ determined as:

$$\pi = |\lfloor \eta/m \rfloor - k \times \eta|_m, 0 \leq k < G; 2 \leq G \leq m, \text{ and}$$

$$\pi = \eta_{modulo\ m}, \text{for } k=m;$$

The sets of nodes of each formation are indexed sequentially in steps of 1 starting from 0, to a maximum of (m−1).

Thus, one of the switch groups comprises a first number, $\mu$, $\mu > 1$, of switches 200, each connecting to m nodes 200 while each other switch group comprises a second number, m, $m \geq \mu$, of switches 200, each connecting to $\mu$ nodes 820.

Each switch of the plurality of switches connects to a respective number of nodes not exceeding a predefined upper bound, m, $m > 2$. The predefined upper bound defines the ultimate coverage of the network, i.e., the maximum number of nodes ($m^2$) that can be supported. For example with m=1024, the maximum number of nodes would be 1048576. The plurality of nodes comprises N nodes, $(2 \times m) \leq N \leq m^2$, indexed as 0 to (N−1).

FIG. 38 illustrates connectivity of a partially populated switching system of order 3 (G=3) based on three formations where a first formation has $\mu$ node sets, $\mu < m$, each node set containing m nodes, a second formation has m node sets each containing $\mu$ nodes, and third formation containing m node sets each containing $\mu$ nodes. With $\mu$=4 and m=7, formation 3882(0) contains $\mu$ node sets 3840(0,0), 3840(0, 1), 3840(0,2), and 3840(0,3), each having seven nodes. Formation 3820(1) contains seven node sets 3840(1,0) to 3840(1,6), each having four nodes. Formation 3820(2) contains seven node sets 3840(2,0) to 3840(2,6), each having four nodes. A first switch group 200 has $\mu$ switches 200 each connecting to a respective node set of m nodes 820, a second switch group has m switches each connecting to a respective node set of $\mu$ nodes, and a third switch group has m switches, each connecting to a respective node set of $\mu$ nodes (m=7, $\mu$=4). The total number of nodes is m×$\mu$ nodes (28 nodes).

FIG. 39 illustrates coverage growth of the partially populated switching system of FIG. 38 where the network order is unchanged (G=3). A new node set 3940(0,4) containing new nodes 820 of indices {28, 29, 30, 31, 32, 33, and 34} is added to the node population. One node of the new node set is added to node sets of the second and third formation; each node set 3940(1, 0) to 3940(1,6), and each node set 3940(2,0) to 3940(2,6) contains an additional node. A switch connecting to the new node set 3940(0,4) containing m new nodes (m=7) is added to the first switch group, thus $\mu$ increases from 4 to 5, the number of nodes ($\mu \times m$) increases from 28 to 35 and the core capacity of the switching system is increased by a ratio of 5/4. Each node 820 still connects to G switches, one from each of the G switch groups. Thus, each switch of the second and third switch groups connects to five nodes instead of four.

FIG. 40 illustrates capacity growth of the network of FIG. 38 where the order of the switching system is increased to 4 (G=4). Increasing the network order from 3 to 4 necessitates adding m switches each connecting to a respective node set 4040 of a new formation 4020(3) as illustrated in FIG. 40. The number of nodes is unchanged (28 nodes) but each node connects to 4 switches of 4 different switch groups (instead of 3 switches). The network core capacity is then increased by a ratio of 4/3.

FIG. 41 illustrates combined capacity growth and coverage growth of the network of FIG. 38 where the network order is increased to 4 (G=4). Increasing the network order from 3 to 4 necessitates adding m switches each connecting to a respective node set 4140 of a new formation 4120(3) as illustrated in FIG. 41. A switch connecting to a new node set 4140(0,4) containing m new nodes (m=7) 120 of indices {28, 29, 30, 31, 32, 33, and 34} is added to the first switch group, thus $\mu$ increases from 4 to 5, and the number of nodes ($\mu \times m$) increases from 28 to 35. A new group of m switches, each connecting to 5 nodes is added to the configuration of FIG. 38, and each switch connecting a node set in any of formations 4120(1), 4120(2), 4120(3) contains five nodes 820.

The operating dimension of each switch of the second and third switch groups is increased from 4 to 5. Increasing the network order from 3 to 4 and increasing the operating dimension of each switch to support 5 nodes instead of 4 nodes, as illustrated in FIG. 41, increases the number of nodes from 28 to 35 and increases the core capacity by a ratio of 5/3; determined as $((\mu+1)\times(G+1))/(\mu\times G)$; $\mu=4$, $G=3$.

FIG. 42, FIG. 43, FIG. 44, FIG. 45, illustrate connectivity of nodes to switches according to the growth scheme of FIG. 41. With the numbering and arrangement of nodes of FIG. 30, the nodes connecting to each of the four switches of switch group 0 (switch group of index 0) of FIG. 37 are identified in arrangement 4200 of formation 4120(0) by joining solid lines in FIG. 42. The new nodes 120 of indices {28, 29, 30, 31, 32, 33, 34} connecting to the added switch of the first group are identified by dotted lines in FIG. 42.

Figure 43:
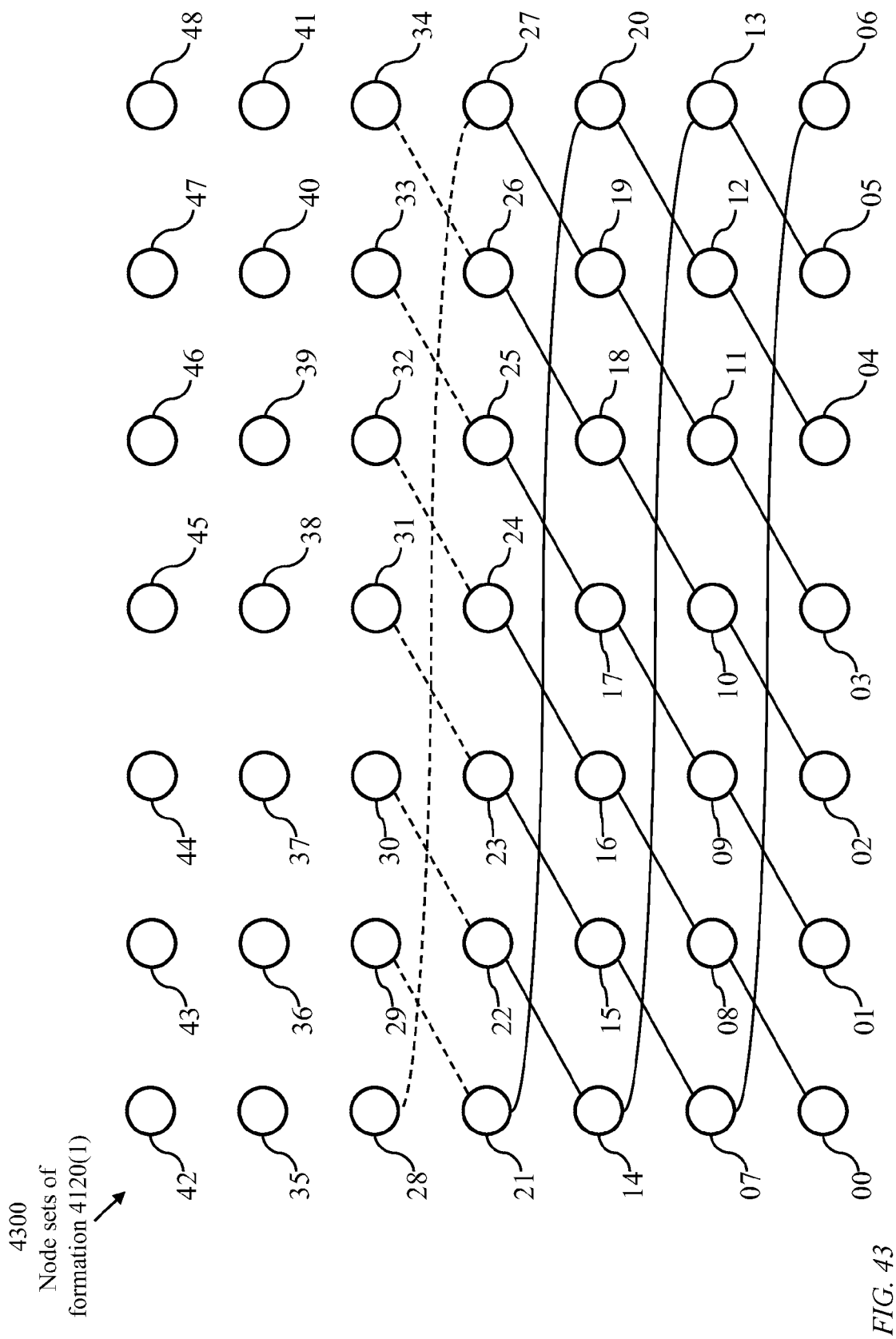
Figure 44:
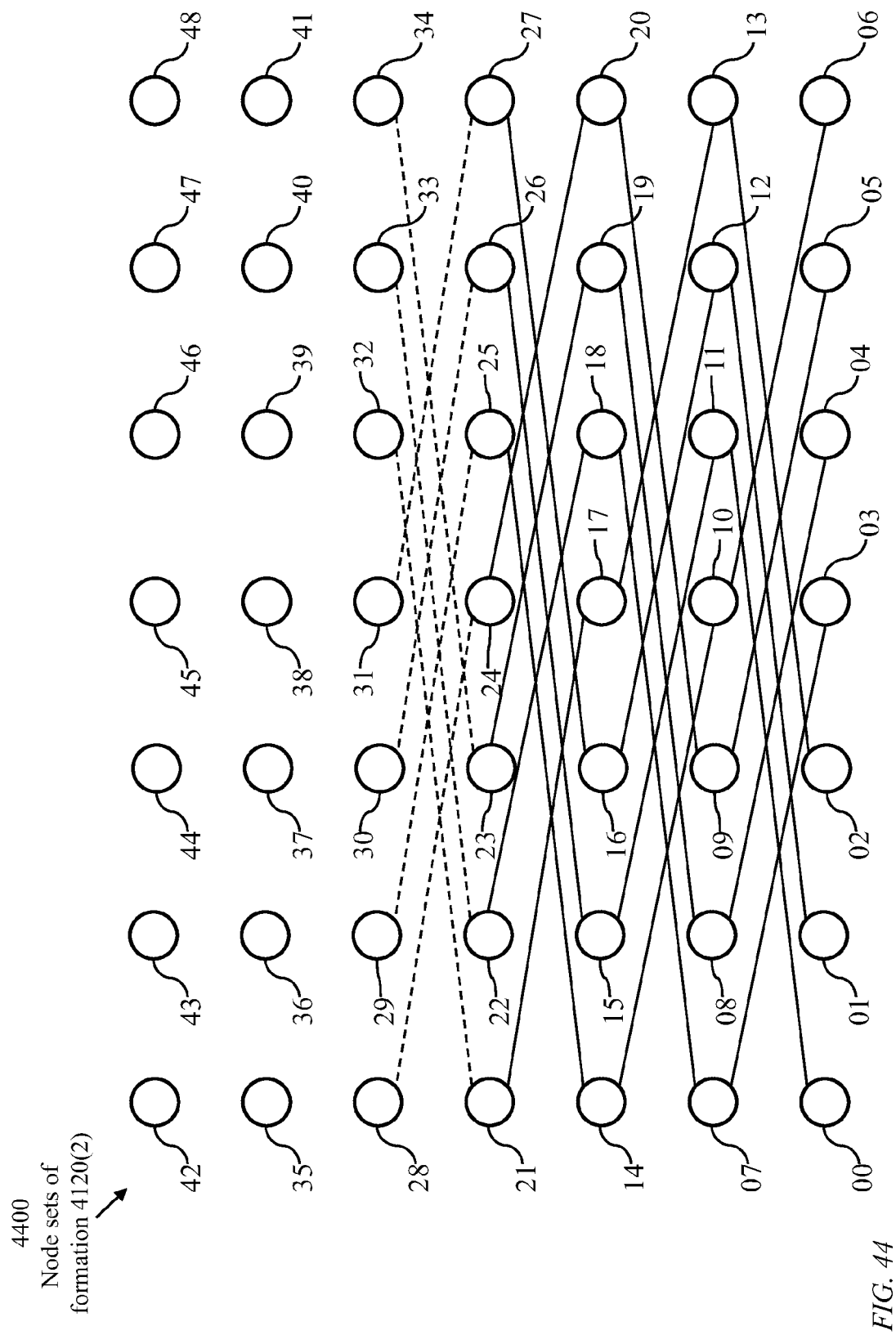
Figure 45:
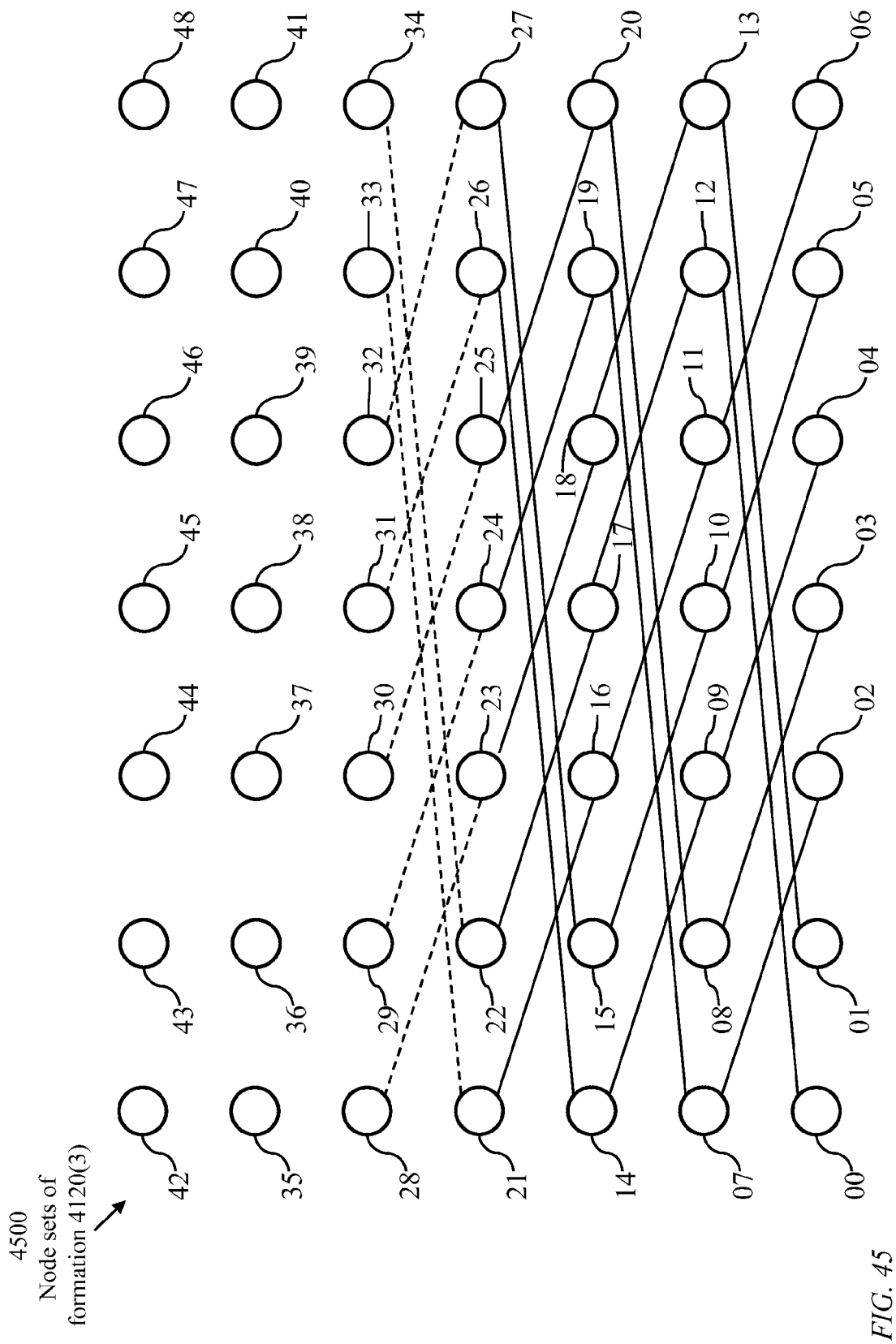

The nodes connecting to each of the seven switches of switch group 1 of FIG. 37 are identified in arrangement 4300 of formation 4120(1) by joining solid lines in FIG. 43. The addition of the new nodes to the node sets connecting to switches of switch group 1 is indicated by dotted lines. Likewise, the addition of the new nodes to the node sets connecting to switches of switch group 2 is indicated in arrangement 4400 of formation 4120(2) by dotted lines in FIG. 44 and the addition of the new nodes to the node sets connecting to switches of switch group 3 is indicated in arrangement 4500 of formation 4120(3) by dotted lines in FIG. 45. This exemplary connection pattern of nodes to switches ensures that addition of new nodes to an existing partially populated switching system preserves the condition that a set of nodes connecting to any switch in any switch group is orthogonal to a set of nodes connecting to any switch of a different switch group.

Routes within a Set of Adjacent Nodes

Each node has a dual link to each of G switches of different switch groups. An originating node and a destination node of a set of m nodes interconnected through a switch may communicate through a simple path traversing the switch in addition to (m−2) compound paths. Each compound path comprises a first simple path from the originating node to any of (m−2) intermediate nodes of the set of m nodes and a second simple path from the intermediate node to the destination node through the switch.

A node 820 of index p, $0 \leq p < m^2$, maintains an array W(0), W(1), . . . , W($m^2$−1) for identifying other nodes reached through a simple path each. The value of W(q), $0 \leq q < m^2$, is either a switch order or a null. The order of a switch has a value of 0, 1, . . . , or (G−1). A switch order identifies a switch connecting both node p and another node q. A null value indicates that node p can only reach node q through compound paths.

Switch-Controlled Routing

A switch controller of a switch 200 may construct a routing table identifying paths from the switch to each node of the entire switching system. The switch controller may compute the routing table based on either a connectivity pattern used in the entire switching system or nodal formations as illustrated in FIGS. 32 and 33. In the former case, each switch controller receives encoded algorithms for constructing the nodal formations. In the latter case, each switch controller receives tabulations of the formation computed externally. In either case, each switch controller receives software modules for generating a routing table together with parameters specific to the switch associated with the switch controller.

Each switch 200 has a dual channel to each of the adjacent nodes of the switch. Thus, a switch controller 250 has a direct path to each of its adjacent node. To generate a routing table, a switch controller of a particular switch simply accesses the formation tables to identify nodes in each formation which are adjacent to each node directly connecting to the particular switch. A routing table may then be formed in a variety of ways devised to enable fast processing.

FIG. 46 illustrates an exemplary routing table 4600 maintained at a switch controller of switch 200(2, 4) interconnecting nodes of node set 3240(2, 4) of the fully populated network of order 4 based on four formations selected to be the four formations 3220(0), 3220(1), 3220(2), and 3220(3) of FIG. 37, selected from the eight formations of FIGS. 32 and 33. The routing table identifies nodes connecting to switch 200(2, 4) which may serve as intermediate nodes 820 for each node in the entire switching system. Table 4600 is split into portions for ease of illustration. The table identifies, for each formation 2320(0), 3220(1), and 3220(3), intermediate nodes 4620 corresponding to each (destination) node and the order 4610 of a sink switch 200 connecting an intermediate node to the destination node. Node set 3240(2, 4) belongs to formation 3220(2). Because all node sets of a same formation are mutually disjoint, none of the other node sets of formation 3220(2) has a node common with any of the nodes of node set 3240(2,4). A compound path traversing a switch associated with any formation is completed through a switch associated with a different formation. Thus, the row in Table 4600 corresponding to formation 3220(2) has null entries.

Table 4600 is constructed directly from the selected formations of FIG. 37. Array 4640 indicates indices of each node 820 of a switching system considered a destination node of a compound route traversing switch 200(2, 4) interconnecting the nodes 820 of node set 3240(2, 4). Node set 3240(2, 4) belongs to formation 3220(2) and contains nodes 820 of indices 05, 09, 20, 24, 28, 39, and 43. Considering formation 3220(0), it is seen that node 820(05) is adjacent to nodes {00, 01, 02, 03, 04, 06}. The node index "05" is thus entered in entries of Table 4600 corresponding to formation 3220(0) and nodes {00, 01, 02, 03, 04, 06}. Node 820(09) is adjacent to nodes {07, 08, 10, 11, 12, 13} in formation 3220(0). The node index "09" is thus entered in entries of Table 4600 corresponding to formation 3220(0) and nodes {07, 08, 10, 11, 12, 13}. Likewise, node indices 20, 24, 28, 39, and 43 are entered in entries in Table 4600 corresponding to indices of nodes of formation 3220(0) adjacent to nodes 820 of indices 20, 24, 28, 39, and 43. The process is repeated for formations 3220(1) and 3220(3). Thus, for each destination node, there are (G−1) intermediate nodes each having a simple path traversing a respective switch to a respective destination node. For example, Table 4600 identifies nodes 820 of indices 24, 09, and 20 as intermediate nodes 4620 for destination node 820(25). The intermediate nodes 4620 belong to rows 0, 1, and 3 respectively, corresponding to the order of each sink switch of a compound route traversing the source switch connecting to node set 3240. Thus, to complete a compound path to node 820(25), switch 200(2, 4) directs node 820(24) to seek a connection through a switch of order 0, directs node 820(09) to seek a connection through a switch of order 1, or directs node 820(20) to seek a connection through a switch of order 3. Each node connects to G adjacent switches of different order and a node need only be aware of the order (and not necessarily other topological details) of each of its G adjacent switches.

When a switch controller of switch 200(2,4) receives a request to establish a connection to a distant destination node, the switch controller consults routing table 4600 to determine intermediate nodes associated with the destination node. The switch controller may select an intermediate node at random, cyclically, or according to tracked vacancies of channels connecting the switch to the intermediate nodes.

A switch controller of a switch connecting to m nodes, m>2, may also establish (m−2) compound paths to each of its adjacent nodes where a compound path traverses the switch once to an intermediate adjacent node then traverses the same switch again to a destination adjacent node. It is noted, however, that a compound path established through the same switch may not be needed given the feasibility of a single path.

Consider a fully populated switching system where each switch is of dimension m and each set of nodes in each formation contains m nodes. The order G of the switching system is at least 2 and at most (m+1). Each node belongs to G sets of nodes, one set of nodes in each of G formations. Each node in a formation has (m−1) adjacent nodes within the formation. Each set of nodes in any formation has one node in common with each set of nodes of each other formation.

Each node is adjacent to (m−1) nodes in each of the G formations to a total of G×(m−1) adjacent nodes. Each node has (G−1)×(G−2) compound paths, each traversing two switches of different order, to each of the G×(m−1) adjacent nodes. In addition, the paths from each node to each of its G×(m−1) adjacent nodes include a simple path traversing a single switch and (m−2) compound paths, each traversing the single switch twice.

Each node has G×(G−1) compound paths to each distant node, each compound path traversing two switches of different switch order, i.e., two switches of different switch groups.

FIG. 47 illustrates a routing table 4700 maintained at a switch 200(2,4) of the partially populated network of FIG. 40. The table identifies intermediate nodes 4720 corresponding to each (destination) node and the order 4710 of a sink switch 200 connecting an intermediate node to the destination node.

Table 4700 is constructed directly from the selected formations of FIG. 40. Node set 4040(2,4) belongs to formation 4020(2) and contains nodes 820 of indices 05, 09, 20, and 24. Considering formation 4020(0), it is seen that node 820(05) is adjacent to nodes {00, 01, 02, 03, 04, 06}. The node index "05" is thus entered in entries of Table 4700 corresponding to formation 4020(0) and nodes {00, 01, 02, 03, 04, 06}. Node 820(09) is adjacent to nodes {07, 08, 10, 11, 12, 13} in formation 4020(0). The node index "09" is thus entered in entries of Table 4700 corresponding to formation 4020(0) and nodes {07, 08, 10, 11, 12, 13}. Likewise, node indices 20 and 24 are entered in entries in Table 4700 corresponding to indices of nodes of formation 4020(0) adjacent to nodes 820 of indices 20 and 43. The process is repeated for formations 4020(1) and 4020(3). Considering formation 4020(1), it is seen that node 820(05) is adjacent to nodes {13, 14, 22}. The node index "05" is thus entered in entries of Table 4700 corresponding to formation 4020(1) and nodes {13, 14, 22}. Node 820(09) is adjacent to nodes {01, 17, 25} in formation 4020(1). The node index "09" is thus entered in entries of Table 4700 corresponding to formation 4020(1) and nodes {01, 17, 25}.

For each destination node, there is at least one intermediate node having a simple path traversing a respective switch to a respective destination node. For example, Table 4700 identifies nodes 820 of indices 24, 09, and 20 as intermediate nodes for destination node 820(25). The intermediate nodes belong to rows 0, 1, and 3 respectively. The table identifies nodes 820 of indices 20 and 9 as intermediate nodes for destination node 820(17). The intermediate nodes belong to rows 0 and 1 respectively.

Thus, to complete a compound path to node 820(17), switch 200(2,4) directs node 820(20) to seek a connection through a switch of order 0 or directs node 820(09) to seek a connection through a switch of order 1.

Source-Controlled Routing

Each node belongs to a node set in each of the G formations. A source routing table maintained at a node identifies: (i) index of a destination node; (ii) order of a source switch (connecting the originating node to the originating node); (iii) index of intermediate node; and (iv) order of a sink switch (connecting the intermediate node to the destination node).

Each node set of any formation intersects each node set of each other formation in exactly one node. To construct a source routing table from a first node to a second node, the node controller of the first node identifies a common node (an intersecting node) of each node set to which the first node belongs and each node set to which the second node belongs in each formation. A common node in a node set of formation j, 0≤j<G, containing the first node, and a node set of formation k, 0≤k<G, containing the second node is an intermediate node connecting to both a source switch of order j and a sink switch of order k. Naturally, j≠k because node sets of a same formation are disjoint. Thus, where the second node is distant from the first node, a source routing table having G×(G−1) entries defining compound paths can be constructed. The second node can only be adjacent to the first node in only one formation. If the first node and the second node are adjacent nodes, the source routing table would define a simple path and $(G-1)_{\times(G-2)}$ compound paths from the first node to the second node.

A process for determining intersection of node sets containing an originating node and node sets containing a destination node is illustrated in FIG. 48. The process uses two arrays 4822 and 4824 initialized with null entries (a null entry may be an out-of-range number, such as a negative integer). The first array 4822 may be indexed with indices of nodes 820 of each node set containing the originating node to enter an indicator of the formation to which the node set belongs. The second array 4824 may be indexed with indices of nodes 820 of each node set containing the destination node to enter an indicator of the formation to which the node set belongs. Array 820, used for illustration only, identifies the indices of arrays 4822 and 4824.

Thus, within each formation, a node set containing the originating node is identified and an index of the formation is entered at indices of the first array 4822 corresponding to indices of the nodes 820 of the node set. Likewise, within each formation, a node set containing the destination node is identified and an index of the formation is entered at indices of the second array corresponding to indices of the nodes of the node set. An index of the two arrays corresponding to two different formation indices is an index of an intermediate node 820 of a compound route from the originating node to the destination node. The formation index of the first array is also the switch order of the source switch and the formation index of the second array is also the switch order of the sink switch. The process determines for each compound path an order of the source switch, an order of the sink switch, and an index of an intermediate node connecting to both the source switch and the sink switch.

FIG. 48 illustrates the process of determining a source routing table defining compound routes for a distant node 820(11) to node 820(29) in a fully populated network based on the nodal formations of FIG. 37. The originating node 820(11) belongs to node sets 3240 of indices {(0,1), (1,4), (2,0), (3,3)}. The destination node 820(29) belongs to node sets of indices {(0,4), (1,3), (2,2), (3,1)}.

Node set 3240(0,1) of formation 3220(0) contains nodes 820 of indices {07, 08, 09, 10, 11, 12, 13}. Thus, the formation index, 0, is entered in array 4822 at indices 07, 08, 09, 10, 11, 12, and 13. The entry at index 11 is irrelevant since an originating node is not used as an intermediate node. The entry is marked "Source" for illustration only. Node set 3240(1,4) of formation 3220(1) contains nodes 820 of indices {03, 11, 19, 27, 28, 36, 44}. Thus, the formation index, 1, is entered in array 4882 at indices 03, 11, 19, 27, 28, 36, 44. The entry at index 11 is irrelevant as mentioned above. The process of marking array 4822 continues similarly for node set 3240(2,0) of formation 3220(2) and node set 3240(3,3) of formation 3220(3).

Node set 3240(0,4) of formation 3220(0) contains nodes 820 of indices {28, 29, 30, 31, 32, 33, 34}. Thus, the formation index, 0, is entered in array 4824 at indices 28, 29, 30, 31, 32, 33, and 34. The entry at index 29 is irrelevant since a destination node is not used as an intermediate node. The entry is marked "destination" for illustration only. Node set 3240(1,3) of formation 3220(1) contains nodes 820 of indices {04, 12, 20, 21, 29, 37, 45}. Thus, the formation index, 1, is entered in array 4882 at indices 04, 12, 20, 21, 29, 37, 45. The entry at index 29 is irrelevant as mentioned above. The process of marking array 4822 continues similarly for node set 3240(2,2) of formation 3220(2) and node set 3240(3,1) of formation 3220(3).

The intermediate nodes of compound routes from originating node 820(11) to destination node 820(29) are determined as indices of arrays 4822 and 4824 excluding each index at which at least one entry in array 4822 or array 4824 is a null entry. With such exclusion, arrays 4822 and 4824 include only formation indices of a source switch 200 and a sink switch 200. A source switch is a switch adjacent to the originating node and a sink switch is a switch adjacent to the destination node. Thus, the process of FIG. 48 determines for each compound path an order of the source switch, an order of the sink switch, and an index of an intermediate node connecting to both the source switch and the sink switch.

Node set 3240(0,1) of formation 3220(0) and node set 3240(1,3) of formation 3220(1) intersect in node 820(12). Thus, a first compound path from originating node 820(11) to destination node 820(29) is defined by a source switch 200 of order 0, an intermediate node 820(12), and a sink switch 200 of order 1. Likewise, Node set 3240(0,1) and node set 3240(2,2) intersect in node 820(10). Thus, a second compound path from originating node 820(11) to destination node 820(29) is defined by a source switch 200 of order 0, an intermediate node 820(10), and a sink switch 200 of order 2. Node set 3240(3,3) of formation 2320(3) includes originating node 820(11) and node set 3240(2,2) of formation 3220(2) includes destination node 820(29). The two sets intersect in node 820(06). Thus, another compound path from originating node 820(11) to destination node 820(29) is defined by a source switch 200 of order 3, an intermediate node 820(06), and a sink switch 200 of order 2.

FIG. 49 illustrates routing tables (route sets) 4900 including source routing tables 4920, 4930, and 4940, thus determined, for fully populated switching systems of orders 2, 3, and 4, respectively of a switching system based on the formations of FIG. 37. The source routing tables indicate an order 4912 of the source switch, an order 4914 of the sink switch, and an index 4916 of an intermediate node for each compound route. Route sets from originating node 820(11) to destination node 820(29) which constitute a distant node pair for networks of order 2, 3, and 4 are illustrated. The switching system of order 2 is based on formations 0 and 1, the switching system of order 3 is based on formations 0, 1, and 2, and the switching system of order 4 is based on formations 0, 1, 2, and 3. Notably, a switching system of order G, $2 \leq G \leq (m+1)$ may be based on any combination of G formations selected from the (m+1) formations.

As illustrated in FIG. 49, a network of order 2 (G=2) provides only two paths from originating node 820(11) to distant destination node 820(29). Originating node 820(11) connects to switch 200(0,1) and switch 200(1,4). Destination node 820(29) belongs to switch 200(0,4) and switch 200(1,3). The first compound path traverses switch 200(0,1) to intermediate node 820(12) then traverses switch 200(1,3) to destination node 820(29). The second compound path traverses switch 200(1,4) to intermediate node 820(28) then traverses switch 200(0,4) to the destination node 820(29).

A network of order 3 (G=3) provides six paths from originating node 820(11) to distant destination node 820(29). Originating node 820(11) connects to switches 200(0,1), 200(1,4), and 200(2,0). Destination node 820(29) connects to switches 200(0,4), 200(1,3), and 200(2,2). As illustrated in FIG. 49, the six compound paths:

A switch of order 0 (140(0,1)) to node 820(12) then a switch of order 1 (140(1,3)) to connect node 820(12) to node 820(29);

A switch of order 0 (140(0,1)) to node 820(102) then a switch of order 2 (140(2,2)) to connect node 820(10) to node 820(29);

A switch of order 1 (140(1,4)) to node 820(28) then a switch of order 0 (140(0,4)) to connect node 820(28) to node 820(29);

A switch of order 1 (140(1,4)) to node 820(44) then a switch of order 2 (140(2,2)) to connect node 820(14) to node 820(29);

A switch of order 2 (140(2,0)) to node 820(30) then a switch of order 0 (140(0,4)) to connect node 820(30) to node 820(29);

A switch of order 2 (140(2,0)) to node 820(45) then a switch of order 1 (140(1,3)) to connect node 820(45) to node 820(29).

A network of order 4 (G=4) provides 12 paths from originating node 820(11) to distant destination node 820(29). Originating node 820(11) connects to switches 200(0,1), 200(1,4), 200(2,0), and 200(3,3). Destination node 820(29) connects to switches 200(0,4), 200(1,3), 200(2,2), and 200(3,1). As illustrated in FIG. 49, the 12 compound paths traverse:

a switch of order 0 to intermediate nodes 820(12), 820(10), and 820(7) then switches of order 1, 2, and 3, respectively to the destination node;

a switch of order 1 to intermediate nodes 820(28), 820(44), and 820(19) then switches of order 0, 2, and 3, respectively to the destination node;

a switch of order 2 to intermediate nodes 820(30), 820(45), and 820(41) then switches of order 0, 1, and 3, respectively to the destination node;

a switch of order 3 to intermediate nodes 820(33), 820(21), and 820(06) then switches of order 0, 1, and 2, respectively to the destination node.

The source routing tables of FIG. 49 correspond to distant nodes 820(11) and 820(29). FIG. 50 illustrates routing tables (route sets) including source routing tables 5020, 5030, and 5040 for adjacent nodes 820(11) and 820(43) based on the four formations of FIG. 37. Nodes 820(11) and 820(43) belong to node set 3240(3,3). The source routing tables indicate an order 5012 of the source switch, an order 5014 of the sink switch, and an index 5016 of an intermediate node for each compound route. An entry 5018 having a value equal to an index of the destination node indicates that the destination node is adjacent to the originating node in a particular switch. As illustrated in FIG. 50, the entry in routing table 5014 corresponding to a source switch of order 3 and a sink switch of order 3 is the index of the destination node 820(34). Thus, source switch is also the sink switch, and nodes 820(11) and 820(43) connect to the same switch in a switch group of order 3 corresponding to formation 3220(3) of FIG. 37 (or FIG. 32).

The originating node 820(11) belongs to node sets 3240 of indices {(0,1), (1,4), (2,0), (3,3)}. The destination node 820(43) belongs to node sets 3240 of indices {(0,6), (1,5), (2,4), (3,3)}. The originating and destination nodes are adjacent in node set 3240(3,3). Thus, the source routing table 5040 for the switching system of order 4 defines the same compound paths of a switching system 5030 of order 3 based on the same formations of FIG. 37. Source routing table 5040 indicates that destination node 820(43) connects to the same switch connecting to the originating node 820(11).

Originating node 820(11) and destination node 820(43) constitute a distant node pair in each of formations 3220(0), 3220(1), 3220(2), but are an adjacent node pair within formation 3220(3). The route sets for networks of order 2, 3, and 4 are based on the formations of FIG. 32 and FIG. 33 where the switching system of order 2 is based on formations 0 and 1, the switching system of order 3 is based on formations 0, 1, and 2, and the switching system of order 4 is based on formations 0, 1, 2, and 3.

As illustrated in FIG. 50, the network of order 2 (G=2) provides G×(G−1) paths (two paths) from originating node 820(11) to distant destination node 820(43), the network of order 3 (G=3) provides G×(G−1) paths (6 paths). For the network of order 4 (G=4), switch 200(3,3) provides a simple path for the node pair 820(11) and 820(43). Switch 200(3,3) interconnects nodes of a node set 3240(3,3) of formation 3220(3). Thus, formation 3220(3) is excluded in determining compound paths. Thus, route set includes a simple path, and (G−1)×(G−2) compound paths (6 paths). The six compound paths are those determined for the network of order 3.

FIG. 51 illustrates a process of determining a source routing table defining compound routes for a distant node 820(11) to node 820(29) in a partially populated switching system based on the nodal formations of FIG. 41. The process is similar to the process of FIG. 48 with arrays 5142 and 5144 initialized with null entries. The originating node 820(11) belongs to node sets 4140 of indices {(0,1), (1,4), (2,0), (3,3)}. The destination node 820(29) belongs to node sets of indices {(0,4), (1,3), (2,2), (3,1)}.

Node set 4140(0,1) of formation 4120(0) contains nodes 820 of indices {07, 08, 09, 10, 11, 12, 13}. Thus, the formation index, 0, is entered in array 5142 at indices 07, 08, 09, 10, 11, 12, and 13. Node set 4140(1,4) of formation 4120(1) contains nodes 820 of indices {03, 11, 19, 27, 28, 36, 44}. Thus, the formation index, 1, is entered in array 5142 at indices 03, 11, 19, 27, 28, 36, 44. The process of marking array 5142 continues similarly for node set 4140(2,0) of formation 4120(2) and node set 4140(3,3) of formation 4120(3).

Node set 4140(0,4) of formation 4120(0) contains nodes 820 of indices {28, 29, 30, 31, 32, 33, 34}. Thus, the formation index, 0, is entered in array 5144 at indices 28, 29, 30, 31, 32, 33, and 34. Node set 4140(1,3) of formation 4120(1) contains nodes 820 of indices {04, 12, 20, 21, 29}. Thus, the formation index, 1, is entered in array 4882 at indices 04, 12, 20, 21, and 29. The process of marking array 5144 continues similarly for node set 4140(2,2) of formation 4120(2) and node set 4140(3,1) of formation 4120(3).

The intermediate nodes of compound routes from originating node 820(11) to destination node 820(29) are determined as indices of arrays 5142 and 5144 excluding each node index at which at least one entry in array 5142 or array 5144 is a null entry. Thus, the process of FIG. 51 determines for each compound path an order of the source switch, an order of the sink switch, and an index of an intermediate node connecting to both the source switch and the sink switch.

It is noted that arrays 5142 and 5144 may be determined from arrays 4842 and 4844 by including only common node indices of the formations of FIG. 37 and FIG. 41. Each formation 4120 contains $m^2$ nodes and each formation 4120 contains n×m nodes, n being the number of node sets of the first formation which is also the number of nodes of each node set of other formations.

FIG. 52 illustrates source-controlled routing based on source routing table 4920. Originating node 820(11) belongs to node sets 3240(0,1) and 3240(1,4), hence connects to switches 200(0,1) and 200(1,4). Destination node 820(29) belongs to node sets 3240(0,4) and 2340(1,3). Node 820(12) is common in node sets 3240(0,1) and 3240(1,3). Node 820(28) is common in node sets 3240(1,4) and 3240(0,4). With source-controlled routing, the node controller of originating node 820(11) may select at least one of two compound paths. The originating-node controller 125 may instruct a switch controller 250 of its adjacent switch 200 of order 0, which is switch 200(0,1), to complete a compound connection through intermediate node 820(12) and an adjacent switch 200 of node 820(12) of order 1, which is switch 200(1,3). The originating-node controller may also instruct a switch controller 250 of its adjacent switch 200 of order 1, which is switch 200(1,4), to complete a compound path through intermediate node 820(28) and an adjacent switch of node 820(28) of order 0, which is switch 200(0,4).

FIG. 53 illustrates source-controlled routing based on source routing table 4930. The originating-node controller, i.e. the node controller of originating node 820(11), may select at least one of six compound paths. The originating-node controller may instruct its adjacent switch of order 0, which is switch 200(0,1), to complete a compound path through intermediate node 820(12) and its adjacent switch of order 1, which is switch 200(1,3) or to complete a compound path through intermediate node 820(10) and its adjacent switch of order 2, which switch 200(2,2).

The originating-node controller may instruct its adjacent switch of order 1, which is switch 200(1,4), to complete a compound path through intermediate node 820(28) and its adjacent switch of order 0, which is switch 200(0,4) or to complete a compound path through intermediate node 820 (44) and its adjacent switch of order 2, which switch 200(2,2).

The originating-node controller may instruct its adjacent switch of order 2, which is switch 200(2,0), to complete a compound path through intermediate node 820(30) and its adjacent switch of order 0, which is switch 200(0,4) or to complete a compound path through intermediate node 820 (45) and its adjacent switch of order 1, which switch 200(1,3).

FIG. 54 illustrates source-controlled routing based on source routing table 4940. The originating-node controller, i.e. the node controller of originating node 820(11) may select at least one of 12 compound paths. The originating-node controller may instruct of its adjacent switches of order 0, 1, 2, and 3, which are switches 200(0,1), 200(1,4), 200(2,0), and 200(1,3), respectively, to complete compound paths through specified intermediate nodes and a specified switch-order for each of the specified intermediate nodes as indicated in source routing table 4940.

Control Paths

The switches of the network of FIG. 3 may have different structures. For example, some switches may be instantaneous space switches while the other switches may be latent space switches. A path through an electronic switch, whether configured as an instantaneous space switch or a latent space switch, may occupy an integer number of time slots of a cyclical time frame organized into a number T time slots, T being an integer exceeding 1. The number T is preferably selected as an integer multiple of m to simplify scheduling.

Each switch 200 has a dedicated time-limited control path from a node controller 825 of each node 820 to which the switch connects to the switch controller 250 and a dedicated time-limited control path from the switch controller 250 to a node controller 825 of each node connecting to the switch as described below with reference to FIG. 55 and FIG. 56.

As described above, each switch 200 has a respective switch controller 250. The switch controller 250 may be coupled to input ports and output ports of the switch to receive upstream control data from a set of nodes 820 connecting to the switch 200 and transmit downstream control data to the set of nodes. Alternatively, the switch controller 250 may be connected to at least one input port and at least one output port of the switch. The switch controller may then receive upstream control data from the set of nodes 820 through the switching mechanism (switch fabric) of the switch 200 and transmit downstream control data to the set of nodes through the switching mechanism. The switch may be configured as an instantaneous space switch in which data is transferred from an input port to an output port "instantaneously" (with negligible delay). The switch may also be configured as a latent space switch in which data is transferred from an input port to an output port after a systematic delay which has a constant value specific to each pair of input port and output port. A latent space switch has the advantage of scalability to large dimensions.

The input ports of a switch may be bufferless or equipped with buffers. If the input ports are bufferless, the transmission of data from the set of nodes to the switch need be timed so that data arrive at the input ports in alignment to enable collision-free switching. If the input ports are equipped with buffer, time coordination takes place at the input ports.

If the switch is an instantaneous space switch, with the switch controller connected to an input port and an output port, as illustrated in FIG. 11, upstream control data switched from the input ports 1141 to the switch controller 1150 need be staggered over non-coincident time intervals. Likewise, downstream control data switched from the switch controller 1150 to the output ports 1142 need be staggered over non-coincident time intervals. The time domain may be organized into repetitive time frames each containing a predefined number of time slots. The predefined number of time slots at least equals the number of input ports. Payload data is switched during data time slots 5540. FIG. 55 illustrates non-coincident upstream control time slots 5520(0) to 5520(10) spread over a time frame of 22 time slots and allocated to input ports 1120(0) to 1120(10) of an instantaneous space switch 1100 having 11 input ports 1120 and 11 output ports 1120 (m=11). The figure also illustrates adjacent upstream control time slots 5530(0) to 5530(10) spread over a time frame of 11 time slots and allocated to input ports 1120(0) to 1120(10), respectively. The allocation of downstream control time slots follows a similar pattern so that downstream control time slots are spread over a time frame.

If the switch is a latent space switch, with the switch controller connected to an input port and an output port, as illustrated in FIG. 12 or FIG. 13, the timing of transmitting control data from the input ports 1222 or 1322 to the switch controller 1250 or 1350, respectively, is affected by the systematic switch delay which is a function of the position of each input port. Likewise, the timing of transmission of downstream control data from the switch controller 1250 or 1350 to the output ports 1234 or 1334, respectively, is affected by the systematic switching delay which is a function of the position of each of the output ports. Considering the configuration of FIG. 13, where the input rotator 1320 is a descending rotator and the output rotator 1330 is an ascending rotator, the systematic switching delay from an input port 1341(j), 0≤j<m, to the switch controller 1350 is (j)$_{modulo\ m}$. Thus, upstream control data sent from input ports 1322(0) to 1322(m−1) simultaneously, during a same time slot, arrive sequentially at the switch controller 1350 during m consecutive time slots. Likewise, the systematic switching delay from the switch controller 1350 to an output port 1334(k), 0≤k<(m−1), is (k)$_{modulo\ m}$. Thus, downstream control data sent from the switch controller 1350 sequentially during m successive time slots arrive at the output ports 1334(0) to 1334(m−1) simultaneously during a same time slot. FIG. 56 illustrates an allocated control time slot for input ports 1322(0) to 1322(m−1) and output ports 1334(0) to 1334(m−1). The allocated time slot is arbitrarily selected to be the first time slot of a time frame of m time slots. However, any time slot within a time frame may be selected for sending control data simultaneously from all input ports 1322 to the switch controller 1350. The time frame is selected to cover one rotation cycle of the input rotator 1320 (or the output rotator 1330). In general, the time frame may contain any number of time slots which is at least equal to the number of rotation steps of a rotation cycle. Preferably, the number of time slots per frame is an integer multiple of the number of rotation steps per rotation cycle. At least one control time slot 5620 per time frame is dedicated for transferring control data from the input ports 1322 to switch controller 1350 and distributing control data from the switch controller 1350 to the output ports 1334. Array 5610 illustrates control data received at switch controller 1350 from the input ports 1322 and control data transmitted from the switch controller 1350 to the output ports 1334. Payload data of a data flow is transferred during data time slots 5640.

FIG. 57 illustrates a routing method for a switching system based on the nodal formation of FIGS. 32 and 33.

Flow chart 5700 depicts the main steps of allocating at least one path from an originating node to a destination node. A node requesting path allocation is referenced as an "originating node". The node controller of the originating node is referenced as a "source-node controller". A path may be a simple path traversing a single switch 200 or a compound path traversing a first switch to an intermediate node 820 and a second switch connecting the intermediate node to the destination node. The first switch is referenced as the "source switch" and the second switch is referenced as the "sink switch".

In step 5710, an originating node receives a request from a data source, which may be any external network element, for transmitting data to a specified destination node. The source controller formulates a connection request specifying the destination node and a requisite flow rate. The requisite flow rate may be specified by the data source or determined by the source-node controller according to monitored performance of a connection along an allocated path.

Preferably, each node 820 maintains a list of its adjacent nodes, i.e. a list of all nodes connecting to each of the adjacent switches of the node. The list may be structured in various ways to enable fast processing and may associate each adjacent node with an order of an adjacent switch. The list may be used by a source-node controller (of an originating node) for determining whether a specified destination node is an adjacent node connecting directly to one of the adjacent switches of the originating node. A path to an adjacent node is preferably a simple path traversing only one switch, though compound paths can also be allocated between any two adjacent nodes. In step 5720, the source-node controller uses the list to determine whether the destination node is an adjacent node. If the destination node is not an adjacent node, the source-node controller starts a process of allocating a compound path (step 5780). Otherwise, if the destination node is adjacent to the originating node, the source-node controller directs the formulated connection request to the switch controller 250 of the adjacent switch connecting to the destination node. In step 5740, the switch controller 250 of the adjacent switch attempts to allocate a simple path from the originating node to the destination node. The switch controller may also establish a compound connection through another node connecting to the same switch. The compound connection includes two simple connections; one from the originating node to any other node through the switch, and the other from the other node to the destination node through the same switch. Such compound paths traversing a same switch twice are feasible but not preferable. If a simple path is successfully allocated through the switch, the switch controller establishes the connection (steps 5750 and 5760) and may inform both the originating node and destination node through corresponding dedicated time-limited control paths. Otherwise, if a simple path is not available, the source-controller starts a process of allocating a compound path (steps 5750 and 5780) through other adjacent switches of the originating node. The source controller may allocate a compound path through any adjacent switch excluding the adjacent switch which has failed to establish a simple connection.

FIG. 58 details a process of selecting a compound path (step 5780). The source-node controller may select any of its G adjacent switches of the originating node as the source switch (step 5820). If step 5780 is reached from step 5750 (FIG. 57), the source controller may exclude an already tried adjacent switch and connect to any of the remaining (G−1) adjacent switches. In step 5830, the switch controller of the source switch consults its switch routing table, as illustrated in FIG. 46 or FIG. 47, to identify intermediate nodes each having a simple path to the destination node. As described earlier, the switch routing table indicates for each intermediate node the order of an adjacent switch connecting to a respective destination node, i.e., the order of a sink switch corresponding to each intermediate node. It is noted that a node 820 need only be aware of the order of its adjacent switches and not necessarily the topological position of the adjacent switches within the switching system. In a switching system of order G, the number of adjacent switches of any node is G whether the switching system is fully populated or partially populated. However, the number of intermediate nodes depends on the number of nodes populating the switching system. If the switching system is fully populated, there would be exactly (G−1) intermediate nodes, connecting to each adjacent switch of an originating node, each having a simple path to a distant destination node. In a partially populated switching system, there would be different numbers of intermediate nodes each having a simple path to a distant destination node. The feasible number of compound paths from any node to any distant node is G×(G−1) for a fully populated switching system of order G and at least 2×(G−1) for a partially populated switching system. The exemplary switch routing table of FIG. 46 identifies (G−1), that is 3, intermediate nodes for paths from a switch 200(2,4) to each distant node of a fully populated switching system of order G=4. The exemplary switch routing table of FIG. 47 identifies intermediate nodes which vary in number between 3 and 1 for paths from a switch 200(2,4) to each of distant nodes of a partially populated switching system of order 4.

The switch controller of the selected adjacent switch selects one of the intermediate nodes and communicates with the node controller of the selected intermediate node to provide an identifier of the destination node and, optionally, the order of the sink switch. The order of the sink switch may be determined from a switch routing table of the structure illustrated in FIG. 46 or FIG. 47. The selected intermediate node may also determine the order of the sink switch using its own list of adjacent nodes as described above. If the channel to the selected intermediate nodes is fully occupied, the switch controller may select another intermediate node (steps 5835 and 5855). If all channels to all intermediate nodes are fully occupied, the switch controller transfers control to the source controller (step 5865) which may select another adjacent switch. If all adjacent switches have been tried, the source controller may queue the request for execution after permissible waiting period. If an intermediate node is reached, the corresponding sink switch executes a process to connect the intermediate node to the destination node in order to complete allocation of a compound path (steps 5835 and 5840). If the allocation is successful, the sink switch may notify the originating node through the control paths. Otherwise, the connection request is sent through the control paths to the source switch to select another intermediate node, and hence another sink switch (steps 5855 and 5830). If all intermediate nodes of the source switch have been tried, an identifier of the connection request is sent back to the originating node which may select another adjacent switch, i.e., another source switch.

The nodes 820 and switches 200 may be geographically distributed to form a switching system serving as a wide-coverage telecommunications network. The nodes 820 and the switches 200 may also be collocated to form a routing-switching center in a telecommunications network. In a switching system based on mutually-orthogonal node formations, the dimension of a node depends on the order of the switching system. With m=1000, for example, the switching system may have one million nodes thus forming a wide coverage network which provides multiple paths from each node to each other node, each path traversing at most two switches 200. One or more nodes 820 may be dedicated to distribute administrative information and/or processor-readable instructions to the other nodes 820 and to the switches 200 of the switching system. The administrative information may be in the form of routing tables, software modules, or both. Exemplary switch routing tables installed in switch controllers 250 applicable to a switching system based on mutually orthogonal node formations are illustrated in FIG. 46 and FIG. 47. Exemplary source routing tables installed in node controllers 825 applicable to a switching system based on mutually orthogonal node formations are illustrated in FIG. 49, FIG. 50, and FIG. 51. The switch routing tables may be distributed to the switch controllers 250 from administrative nodes or computed at the switch controllers based on broadcasted formations tables. Likewise, the source routing tables may be distributed to the node controllers 825 from administrative nodes or computed at the node controllers based on broadcasted formations tables.

As described above, the nodes 820 of a switching system employing switches 200, each of which having a dimension not exceeding a predetermined value m, may be arranged into a number G of mutually orthogonal formations where $2 \leq G \leq (m+1)$. For m=5, FIG. 27 illustrates six mutually orthogonal formations 2720 based on a first method and FIG. 28 illustrates six mutually orthogonal formations based on a second method. For m=7, FIG. 32 and FIG. 33 illustrate eight mutually orthogonal formations based on the first method. In an envisaged switching system accommodating a large number of nodes 820, the value of m may vary, for example, from 61 to more than 1000. The order of a switching system depends on a preferred node dimension. For example with nodes 820, other than administrative nodes, each of dimension 16 (having 16 dual ports), 5 dual ports may connect to external data sources and sinks and 11 dual ports may connect to adjacent switches. As such, G=11 and only 11 mutually orthogonal formations need be generated.

Contiguous Switching System

As defined above, a fully populated switching system provides maximum coverage, supporting $m^2$ nodes, where m, m>2, is a preset upper bound of the number of nodes per node set connecting to one switch 200. A partially populated switching system supports a number of nodes less than $m^2$. The number of node formations of a partially populated or a fully populated switching system is at least two but may be less than the maximum realizable number of formations.

A contiguous switching system is a fully populated switching system or a partially populated switching system having the maximum number (m+1) of formations, where m is the maximum number of dual ports per switch. The number m of dual ports excludes ports which may be used for control purposes. In a contiguous switching system, whether partially populated or fully populated, each node is a neighbor of each other node in one node set. There is a short path traversing only one switch and a number ($\mu \times m-2$) compound path from each node to each other node, where $\mu$ is the number of node sets in the principal formation.

The number of node formations, which defines the order of the switching system, is determined by the dimensions of the nodes. The nodes are preferably of equal dimensions. With a preset upper bound m, m>2, on the number of nodes per node set, the maximum number of formations is (m+1). In the arrangement of FIG. 27, the maximum number of nodes per formation set to equal 5 and the number of formations is limited to 6.

FIG. 59 illustrates an arrangement of switches of a fully-populated contiguous switching system. Each switch interconnects nodes of a respective set of nodes of the formations of FIG. 27. The switches are logically arranged into 6 switch groups 5920(0), 5920(1), 5920(2), 5920(3), 5920(4), and 5920(5) having a one-to-one correspondence to the 6 formations 2720(0) to 2720(5).

Switch group 5920(0) includes switches 200 of indices (0, A), (0, B), (0, C), (0, D), and (0, E) corresponding to node sets S(0, 0), S(0, 1), S(0, 2), S(0, 3), and S(0, 4), respectively, of formation 2720(0). Switch group 5920(1) includes switches 200 of indices (1, A), (1, B), (1, C), (1, D), and (1, E) corresponding to node sets S(1, 0), S(1, 1), S(1, 2), S(1, 3), and S(1, 4), respectively, of formation 2720(1). Likewise, switch group 5920(k) includes switches 200 of indices (k, A), (k, B), (k, C), (k, D), and (k, E), respectively, of formation 2720(k), $2 \leq k \leq 6$.

FIG. 60 illustrates a switching system where the upper bound, m, of the number of nodes per node set is 5, providing a maximum coverage of 25 nodes. The switching system is partially populated with 15 nodes of the maximum coverage of 25 nodes being present nodes (currently installed nodes). FIG. 60 illustrates an arrangement 6010 of currently installed nodes (present nodes) and an arrangement 6020 of potential future nodes.

FIG. 61 illustrates all (m+1) formations of the present and future nodes determined according to the expressions provided in Table-IV below. The first formation 2720(0) includes a formation 6108 of present nodes and a formation 6118 of future nodes. Each node set of the first formation 2720(0) contains m nodes. Formation 6108 includes $\mu$ node sets ($\mu \leq m$) of present nodes, with $\mu=3$. Formation 6118 includes (m-$\mu$) node sets of future nodes.

Each of formations 2720($\gamma$), $0 \leq \gamma < G$, (G=m+1=6), includes a formation 6110 of present nodes and a formation 6120 of future nodes. Each formation 2720($\gamma$), $0 \leq \gamma < G$, comprises m node sets with each node set containing $\mu$ present nodes and (m-$\mu$) future nodes.

TABLE IV

| Node connectivity - Maximum number of nodes of $\mu \times m$, $2 < \mu \leq m$ | | | |
|---|---|---|---|
| Node identifier | Formation k | Switch index $\pi$ within formation k | Boundaries |
| $\eta$, $0 \leq \eta < (\mu \times m)$ | 0 to (m − 1) | $\pi = |\lfloor \eta/m \rfloor - k \times \eta|_m$ | $0 \leq k < G$; $2 \leq G \leq m$, |
| | m | $\pi = \eta | \text{modulo } m$ | k = m |

FIG. 62 illustrates node formations of the present nodes separately.

FIG. 63 illustrates an arrangement 6300 of switches of a partially populated contiguous switching system. The switches are arranged in switch groups corresponding to the node formations of FIG. 61.

A first switch group 6320(0) includes a set of present switches configured to a predetermined dimension limit while each of the other switch groups 6320(1), 6320(2), 6320(3), 6320(4), and 6320(5) comprises a set of switches of a current dimension less than the dimension limit. The first switch group 6320(0) includes n (n=3) switches 200 of indices (0, A), (0, B), and (0, C), each interconnecting a respective set of m present nodes. Each switch of any of the other switch groups 6320(1), 6320(2), 6320(3), 6320(4), and 6320(5) is of dimension μ×μ, each interconnecting a respective node set containing μ nodes.

A future switch 200(0, D) may be installed to interconnect future nodes 820 of indices 15 to 19. An additional dual port is then activated in each switch of the other switch groups 6320(1), 6320(2), 6320(3), 6320(4), and 6320(5), increasing the dimension of each to (μ+1)×(n+1), each interconnecting nodes of a respective node set containing (n+1) nodes. The connectivity of each of the future nodes 820 of indices 15 to 19 is as indicated in FIG. 61. For example, future node 17 would be connected to switches coupled to node sets S(1, 1), S(2, 4), S(3, 2), S(4, 0), and S(5, 2).

Another future switch 200(0, E) may be installed to interconnect additional future nodes 820 of indices 20 to 24. An additional dual port is then activated in each switch of the other switch groups 6320(1), 6320(2), 6320(3), 6320(4), and 6320(5), increasing the dimension of each to (μ+2)×(μ+2), each interconnecting nodes of a respective node set containing (μ+2) nodes. The connectivity of each of the future nodes 820 of indices 20 to 24 is as indicated in FIG. 61. For example, future node 22 would be connected to switches coupled to node sets S(1, 2), S(2, 0), S(3, 3), S(4, 1), and S(5, 2).

FIG. 64 illustrates connectivity of node sets of formation 2720(0) of FIG. 62 to switches of switch group 6320(0). Formation 2720(0) includes node set S(0, 0) containing nodes 820 of indices 0 to 4, node set (0, 1) containing nodes 820 of indices 5 to 9, and node set S(0, 2) containing nodes 820 of indices 10 to 14. Switch group 6320(0) includes switches 200 of indices (0, A), (0, B), and (0, C). Each of nodes 820 connecting to switch 200(0, A) is labeled "A", each of nodes 820 connecting to switch 200(0, B) is labeled "B", and each of nodes 820 connecting to switch 200(0, C) is labeled "C".

Figure 65:
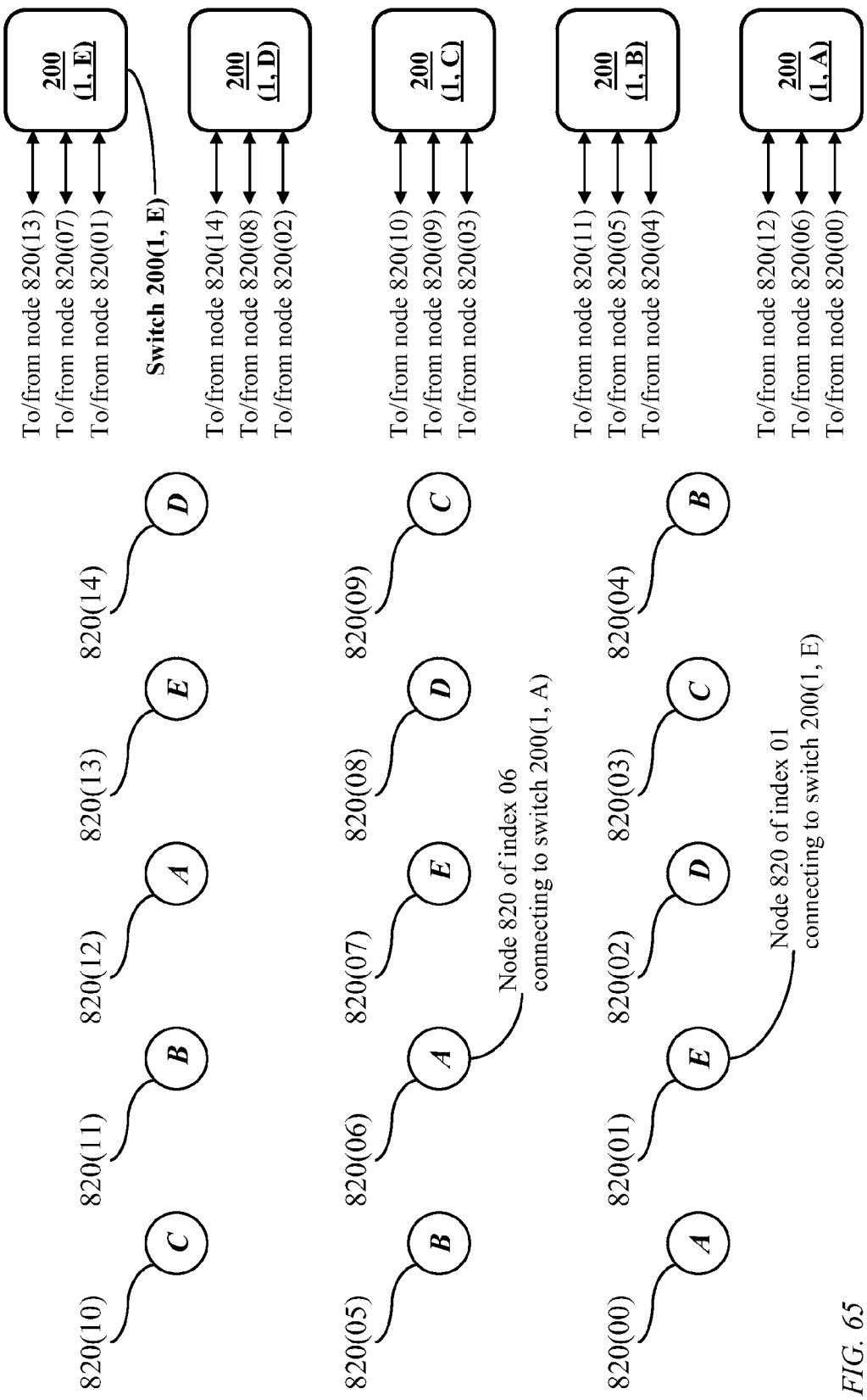

FIG. 65 illustrates connectivity of node sets of formation 2720(1) of FIG. 62 to switches of switch group 6320(1). Formation 2720(1) includes:

node set S(1, 0) containing nodes 820 of indices 0, 6, and 12;

node set S(1, 1) containing nodes 820 of indices 4, 5, and 11;

node set S(1, 2) containing nodes 820 of indices 3, 9, and 10;

node set S(1, 3) containing nodes 820 of indices 2, 8, and 14; and node set S(1, 4) containing nodes 820 of indices 1, 7, and 13.

Switch group 6320(0) includes switches 200 of indices (1, A), (1, B), (1, C), (1, D), and (1, E). Each of nodes 820 connecting to switch 200(1, A) is labeled "A", each of nodes 820 connecting to switch 200(1, B) is labeled "B", each of nodes 820 connecting to switch 200(1, C) is labeled "C", each of nodes 820 connecting to switch 200(1, D) is labeled "D", and each of nodes 820 connecting to switch 200(1, E) is labeled "E".

Figure 66:
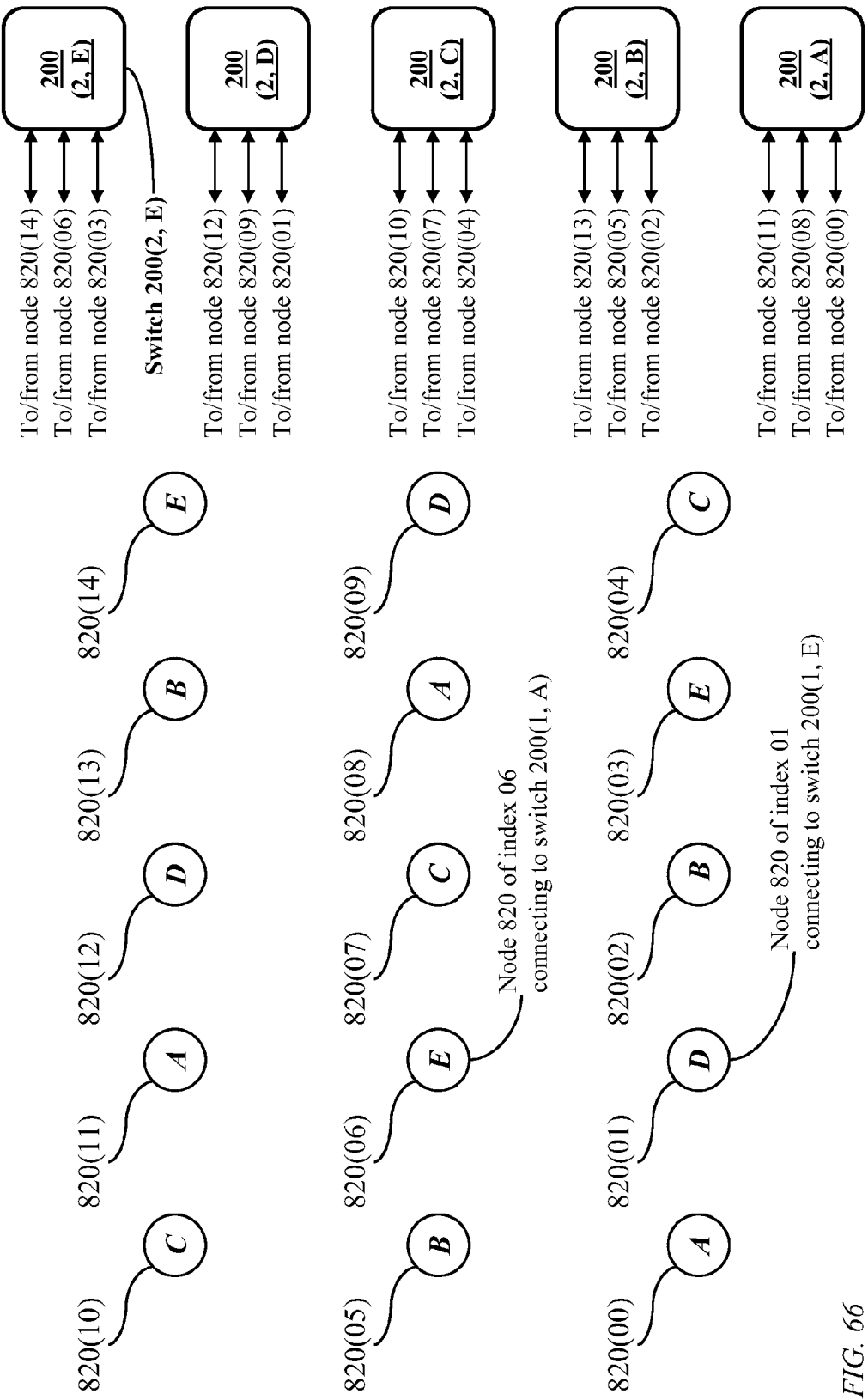
Figure 67:
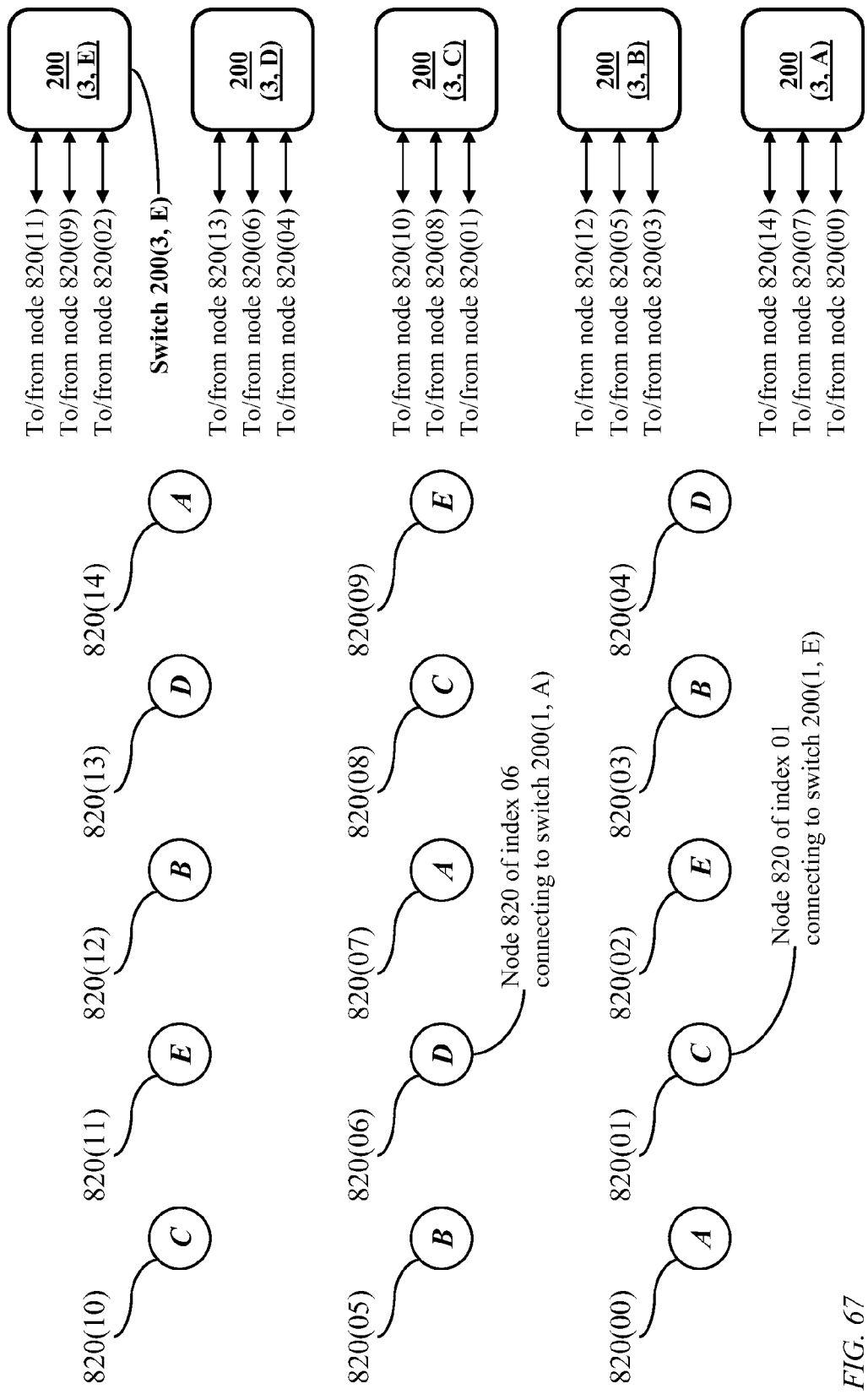
Figure 68:
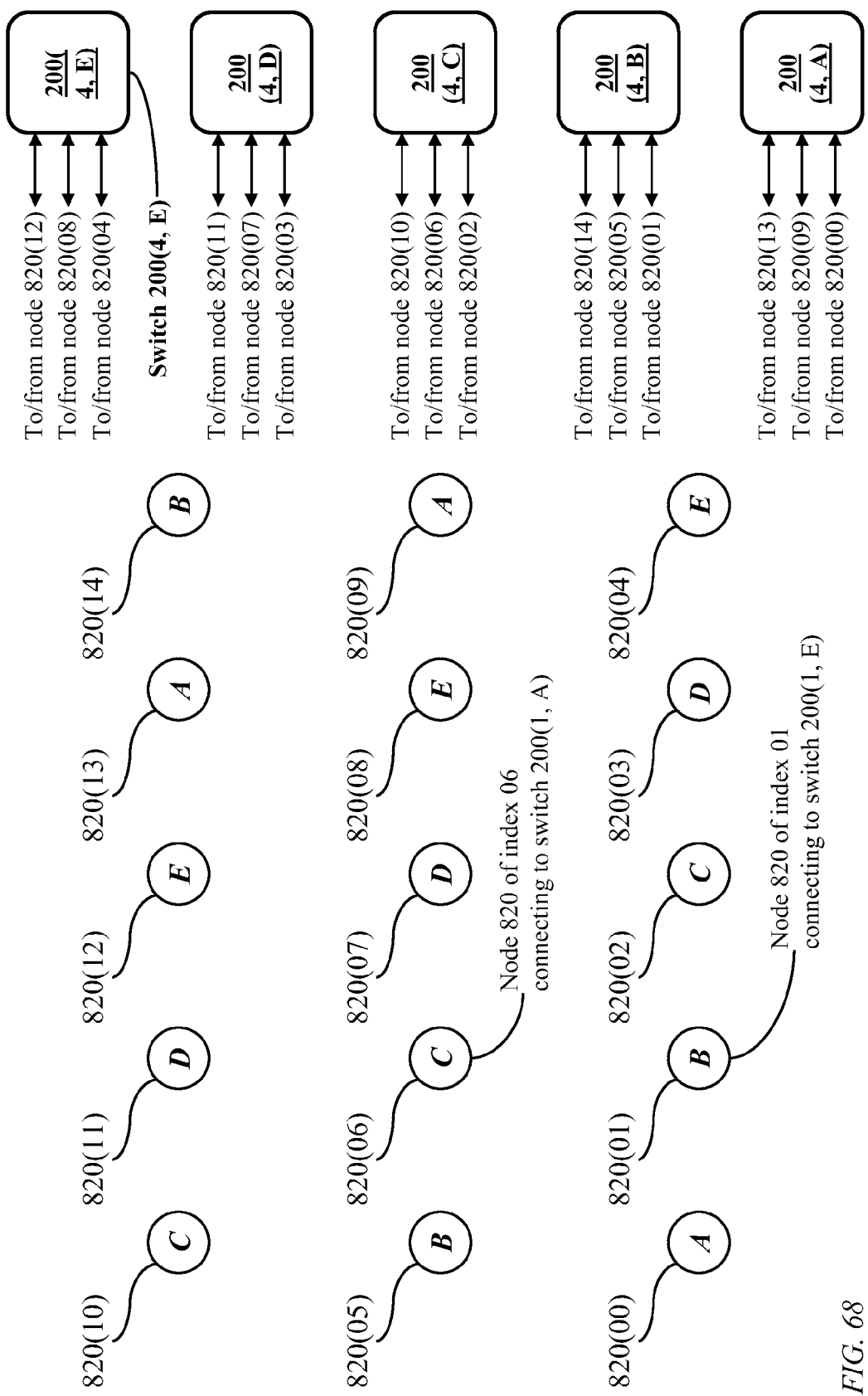
Figure 69:
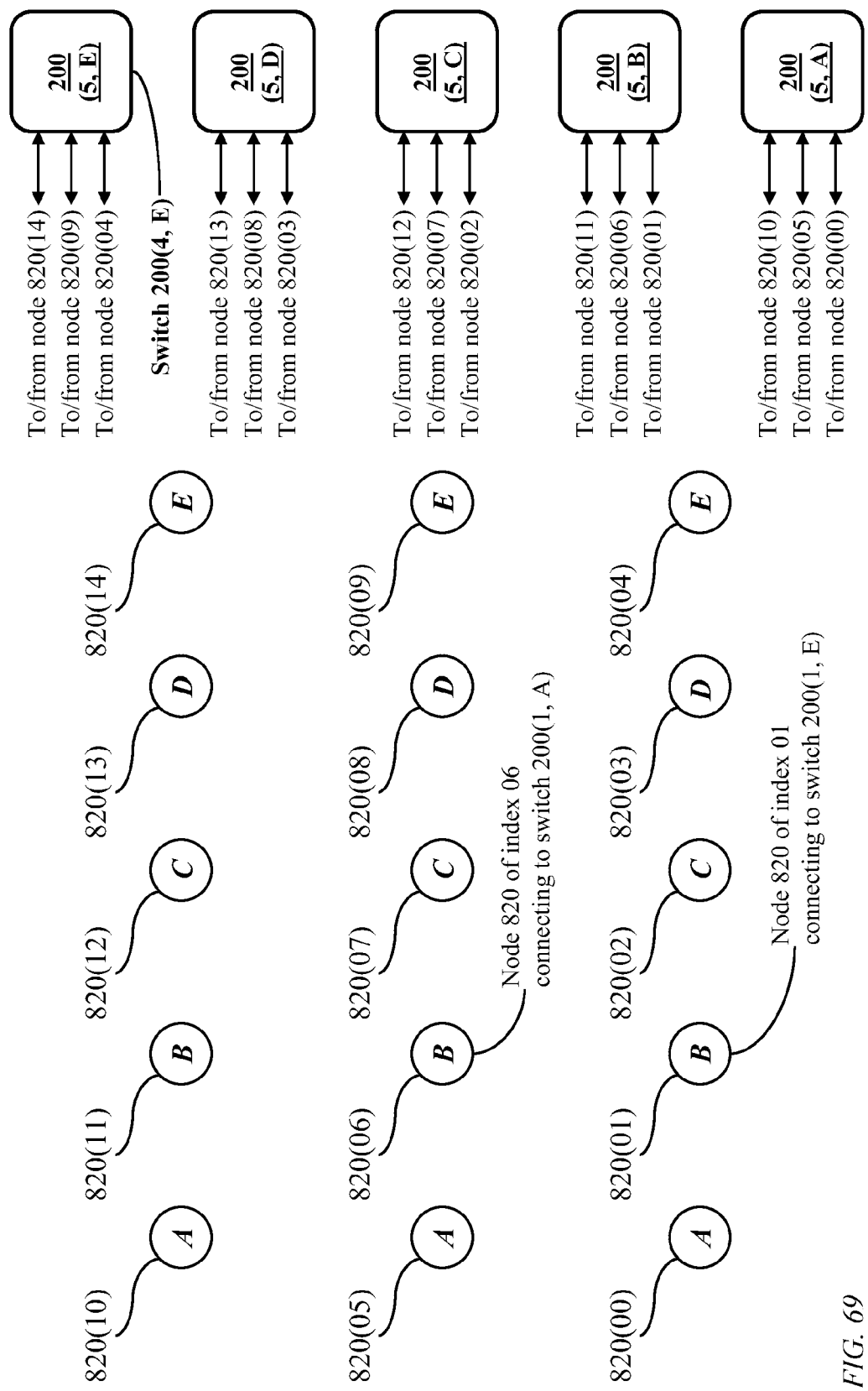

Likewise, FIG. 66 illustrates connectivity of node sets of formation 2720(2) of FIG. 62 to switches of switch group 6320(2), FIG. 67 illustrates connectivity of node sets of formation 2720(3) of FIG. 62 to switches of switch group 6320(3), FIG. 68 illustrates connectivity of node sets of formation 2720(4) of FIG. 62 to switches of switch group 6320(4), and FIG. 69 illustrates connectivity of node sets of formation 2720(5) of FIG. 62 to switches of switch group 6320(5).

Routing in a Contiguous Switching System

In a contiguous switching system, each node is a neighbor of each other node; there is a path from each node to each other node traversing only one switch. With one node formation comprising μ disjoint node sets, each node set having m nodes while each of the other m formations comprises m disjoint node sets of μ nodes each, there are (μ×m−2) compound paths, each compound path traversing a first switch, an intermediate node, and a second switch.

As described above, a switching system comprises nodes arranged in G formations interconnected through switches arranged in G switch groups, 2≤G≤(m+1). Each node has an upstream channel to, and a downstream channel from, a switch in each of the G switch groups. Preferably, an upstream channel connecting a node to a switch is assigned the same index of the formation to which the switch connects. Thus, an upstream channel from any node to a switch in switch group γ, 0≤γ<(G−1) is assigned an index γ.

Each switch connects exclusively to a respective node set. In order to facilitate routing among the nodes, a switch belonging to a switch group of index γ communicates the value γ of the index to each node of the node set. Each node maintains a routing array of (μ×m) entries, each entry corresponding to one of the μ×m nodes of the switching system. An entry of a routing table contains an index of an upstream channel from the node leading to a switch that connects to a respective destination node. For an originating node 820(ζ), 0≤ζ<(μ×m), an entry corresponding to a destination node 820(η), 0≤η(μ×m), stores an index of an upstream channel from node 820(ζ) leading to a switch which connects directly to destination node 820(η). The originating node need not be aware of the identity (the coordinates) of the switch. The entry corresponding to a node of index η=ζ stores a "don't care" value.

To populate a routing array from a specific node, each entry of the routing array is initialized to have a null value. The specific node receives from each adjacent switch a list of nodes of the node set connecting to the each adjacent switch. A node controller of the specific node then populates the routing array so that an entry of index η, 0≤η<(μ×m), stores an index of a channel connecting the specific node to a switch. For example, node 820 of index 8 receives: from switch 200(0, 1) the list of node indices {5, 6, 7, 8, 9}; from switch (1, 3) the list of node indices {2, 8, 14}; from switch (2,0) the list of node indices {0, 8, 11}; from switch (2, 0) the list of node indices {1, 8, 10}; from switch 200(4, 5) the list of node indices {4, 8, 12}; and from switch 200(5, 3) the list of node indices {3, 8, 13}; as represented in Table-V below.

TABLE V

Node-sets' data sent to node 820(8):

| | Node set | | | | | |
|---|---|---|---|---|---|---|
| | {5, 6, 7, 8, 9} | {2, 8, 14} | {0, 8, 11} | {1, 8, 10} | {4, 8, 12} | {3, 8, 13} |
| Switch-group index | 0 | 1 | 2 | 3 | 4 | 5 |

The switches corresponding to the node sets have indices of (0, 1), (1, 3), (2, 0), (3, 2), (4, 4), and (5, 3) as indicated in FIG. 62. The node controller of node 820(8) writes switch-group index "0" at entries 5, 6, 7, and 9 of the routing array, and writes switch-group index "1" at entries 2 and 14, and so on to produce Table-VI below.

TABLE VI

Routing table of node 820(8):

| | Node Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Channel | 2 | 3 | 1 | 5 | 4 | 0 | 0 | 0 | x | 0 | 3 | 2 | 4 | 5 | 1 |

Thus, a node controller of node 820(8): sends a connection request along a channel of index "2" to seek a short path traversing a single switch to destination node 820(0); sends a connection request along a channel of index "3" to seek a short path to node 820(1), and so on.

A node 820 receives routing data from adjacent switches at different ports of the node. Thus, a controller of the node may process the data sequentially. The routing data is updated in response to topological changes.

Alternatively, instead of each node synthesizing its own routing table, a configuration controller for the entire switching system may collect connectivity data from the nodes and/or from the switches and generate a routing table for each node to be distributed to the nodes.

FIG. 70 illustrates a connectivity table 7000 of a partially populated contiguous with m=5 and μ=3 comprising (m×μ) nodes. Given an index 7010 of a node, and an index 7020 of a switch group, the table indicates an index 7030 of a switch in the switch group to which the node connects. A node of index η, 0≤η<(m×μ) connects to a switch in each of G=(m+1) switch groups. The index π of a switch in formation k, 0≤k<G, is determined according to the expressions of Table-IV.

FIG. 71 illustrates a table 7100 of nodal routing arrays including a routing array for each of the (m×μ) nodes determined according to the connectivity pattern of FIG. 70. Given an index 7110 of an originating node and an index 7120 of a destination node, the routing array of the originating node indicates an index 7130 of a switch group having a switch directly connecting the originating node to destination node.

In a contiguous switching system, there is a path from each node to each other node traversing only one switch. With one node formation comprising μ disjoint node sets, each node set having m nodes while each of the other m formations comprises m disjoint node sets of μ nodes each, there are (μ×m−2) compound paths, each traversing a first switch, an intermediate node, and a second switch.

A node may serve as an originating node (receiving data from an external source), an intermediate node (transferring data from an upstream switch to a downstream switch, or a destination node receiving data from a switch to be transmitted to an external sink. Each node comprises a respective switching mechanism and a respective node controller comprising a processor and storage media.

A switch may serve as an upstream switch transferring data from an originating node to an intermediate node, a downstream switch transferring data from an intermediate node to a destination node, or an upstream/downstream switch transferring data from an originating node to a destination node in a preferred switching mode. Each switch comprises a respective switching mechanism and a respective switch controller. A switch controller comprises at least one processor and storage media.

FIG. 72 illustrates all paths 7200 from node 820(9) to node 820(12) for a switching-system configuration of m=5, μ=3, and G=6. Node 820(9) has a short path traversing switch 200(2, 3) to node 820(12). As illustrated in FIG. 71, a channel of index "2" from node 820(9) leads to the connecting switch 200(2, 3).

Node 820(9) has (m+1) upstream channels of indices 0, 1, 2, 3, 4, and 5 to adjacent witches 200(0, 1), 200(1, 2), 200(2, 3), 200(3, 4), 200(4, 0), and 200(5, 4) respectively. The channel of index "2" (the preferred channel) connects to switch 200(2, 3) which connects directly to destination node 820(12). Switch 200(2, 3) also connects to node 820(1). Thus, if the short path to node 820(12) does not have sufficient vacancy, a compound path traversing switch 200(2, 3) to node 820(1) then traversing switch 200(2, 3) again to node 820(9) may be considered.

The channel of index "0" connects to upstream switch 200(0, 1) which connects to nodes 820 of indices 5, 6, 7, and 8. The routing tables (FIG. 71) of nodes 820 of indices 5, 6, 7, and 8 indicate that respective channels of indices 3, 1, 5, and 4, respectively, lead to downstream switches which connect directly to the destination node 820(12). Thus four compound paths may be established through switch 200(0, 1).

The channel of index 1 connects to upstream switch 200(1, 21) which connects to nodes 820 of indices 3 and 10. The routing tables (FIG. 71) of nodes 820 of indices 3 and 10 indicate that respective channels of indices 3 and 0, respectively, lead to downstream switches which connect directly to the destination node 820(12). Thus two compound paths may be established through switch 200(1, 2). Likewise, two compound paths may be established through each of switches 200 of indices (3, 4), (4, 0), and (5, 4).

A shared-memory node, as illustrated in FIG. 9 or FIG. 10, is generally suitable for use in a switching system of a relatively small switching-system order G; where G is less than 32 for example. A contiguous switching system employs nodes of medium dimensions. A switching system employs switches each configured to support a maximum of m dual ports (excluding ports which may be used for control purposes). With m=127, for example, each node of the contiguous switching system would have G inner dual ports, G=m+1=128, in addition to a number Q of outer dual ports interfacing with external data sources and sinks (generally, external network elements). The node may be based on an instantaneous switching mechanism or a latent switching mechanism. A latent switching mechanism of the type illustrated in FIG. 13 may be adapted for use in a node.

FIG. 73 illustrates a node 7300 having Q outer input ports 7310 for receiving data from external data sources through channels 7311, G inner input ports 7320 for receiving data from adjacent switches of the node through channels 7321, Q outer output ports 7340 for transmitting data to external data sinks through channels 7341, and G inner output ports 7350 for transmitting data to the adjacent switches through channels 7351. A switching mechanism 7330 may be configured to selectively transfer data from any input port (7310 or 7320) to any output port (7340 or 7350) either "instantaneously" (experiencing negligible switching delay) or after a deterministic systematic delay. A node controller

7380 may be accessed through the switching mechanism 7330, as illustrated, or through other means such as cyclic access to the input ports (7310/7320) and output ports (7340/7350).

FIGS. 74 to 77 illustrate a method of establishing a path from an originating node to a destination node in a contiguous switching system. A node controller of an originating node receives a request for a connection to a destination node and determines availability of a path through a preferred adjacent switch which directly connects the originating node to the destination node. If a path through the switch has sufficient vacancy, a connection is established. Otherwise, the node controller seeks a compound path through any of the adjacent switches of the originating node.

FIG. 74 illustrates processes 7400 performed at a node controller for establishing a path from a first node to a second node of the switching system. The first node receives a request identifying a destination node and a requisite capacity (process 7410). The node controller of the first node attempts to establish a short path to the destination and may resort to a compound path if the short path does not have a sufficient vacancy to accommodate the connection. The node controller of the first node uses its routing array (FIG. 71) to identify the preferred upstream channel leading to a switch connecting directly to the second node.

Starting with the preferred upstream channel, the node controller of the first node uses a channel-vacancy array (not illustrated) to determine a current vacancy of the upstream channel (process 7420). If the upstream channel does not have sufficient vacancy (process 7430), the node controller implements process 7480. If the upstream channel has sufficient vacancy as determined in process 7430, the node controller send the connection request along the upstream channel (process 7440) and waits for a response from the switch to which the upstream channel connects. Upon receiving a response (process 7450), process 7460 determines whether to reserve allocated resources or seek another path. Process 7470 reserves resources for the connection if the response is in the affirmative indicating availability of a path from the switch to the destination node. Otherwise, the node controller implements process 7480. Process 7480 determines whether all adjacent switches of the first node have been considered. If at least one adjacent switch has not been considered, process 7420 is revisited. Otherwise, the node controller of the first node may queue the request (process 7490) for some predetermined waiting time.

FIG. 75 illustrates processes 7500 performed at a switch controller of an upstream switch. The upstream switch receives (process 7510) a connection request from an originating node and selects (process 7520) a candidate channel having sufficient vacancy to an adjacent node. A switch controller of the each switch stores an array of indices of nodes directly connected to the switch. Thus, the switch controller of the upstream switch determines whether the second node (i.e., the destination node) is directly connected to the upstream switch. If so, the controller of the upstream switch selects a channel to the second node as a first candidate channel. The switch controller sends (process 7530) the connection request along the candidate channel and waits for a response. Upon receiving a response (process 7540), if the response is favorable (process 7550), the switch controller executes process 7570. Otherwise, the switch controller of the upstream switch determines (process 7560) whether all adjacent nodes have been considered for the connection. If at least one adjacent node has not been considered, the switch controller revisits process 7520; otherwise the switch controller executes process 7570. Process 7570 causes a processor of the switch controller to communicate the result to the first node (the originating node).

FIG. 76 illustrates processes 7600 performed at a node controller of an intermediate node. The intermediate node receives (process 7610) a connection request from an upstream switch. A node controller of the intermediate node determines (process 7620) whether the intermediate node is the target second node (destination node). If the intermediate node is the destination node, the node controller executes process 7630 which causes the node processor to determine acceptance or otherwise of the connection request and communicate (process 7680) a result to the requesting upstream switch.

If process 7620 determines that the intermediate node is not the destination node, process 7640 uses the routing table of the intermediate node to identify a channel from the intermediate node to a downstream switch connecting directly to the destination node. If the identified channel has sufficient vacancy as determined in process 7650, the node controller causes the node processor to send (process 7660) the connection request along the identified channel to the downstream switch. The intermediate node waits for a response from the downstream switch. The response indicates acceptance, or otherwise, of the connection request. Upon receiving the response, process 7670 causes the node processor to communicate (process 7680) a result to the requesting upstream switch. If process 7650 determines that the identified channel to the downstream switch does not have sufficient vacancy, the node controller of the intermediate node communicates the result, i.e., the unavailability of a path, to the upstream switch.

FIG. 77 illustrates processes 7700 performed at a switch controller of a downstream switch connecting directly to the destination node. The downstream switch receives (process 7710) a connection request from an intermediate node and identifies (process 7720) a channel from the downstream switch to the destination node. If the channel does not have sufficient vacancy (process 7730), the requesting intermediate node is notified (process 7760). Otherwise, the connection request is sent (process 7740) along the channel to the destination node. A response received (process 7750) from the destination node is communicated to the requesting intermediate node.

FIG. 78 illustrates all compound paths from a first node (an originating node) 820(9) to a second node (a destination node) 820(12) for a switching system configuration of m=5, μ=3, and G=6. The total number of compound paths is μ×m−2=13. As illustrated in FIG. 70, the originating node 820(9) connects to switches of indices (0, 1), (1, 2), (2, 3), (3, 4), (4, 0), and (5, 4). The destination node 820(12) connects to switches 200 of indices (0, 2), (1, 0), (2, 3), (3, 1), (4, 4), and (5, 2). In a contiguous switching system each node has a path to each other node traversing only one switch.

Switch 200(0, 1) connects to nodes 820 of indices 5, 6, 7, 8, and 9. Each of nodes 820 of indices 5, 6, 7, and 8 has a path traversing one switch to destination node 820(12). The routing array of node 820(5) indicates (FIG. 71) that a channel of index 3 leads to an upstream switch (of switch group 3) connecting directly to destination node 820(12). The routing arrays (FIG. 71) of nodes 820 of indices 6, 7, and 8 indicate that channels of indices 1, 5, and 4, respectively, lead to upstream switches (in switch groups of indices 1, 5, and 4) connecting to destination node 820(12).

Switch 200(1, 2) connects to nodes 820 of indices 3, 9, and 10, each having a path traversing one switch to destination node 820(12). The routing arrays of nodes 820 of indices 3 and 10 indicate that channels of indices 3 and 0, respectively, lead to upstream switches (in switch groups of indices 3 and 0) connecting to destination node 820(12).

Switch 200(2, 3) connects to nodes 820 of indices 1 and 12, each having a path traversing one switch to destination node 820(12). Switch 200(2, 3) interconnects the originating and destination nodes. In addition to a short path through switch 200(2, 3), the switch may be traversed twice to provide a compound path. The routing array of node 820(1) indicates that a channel of index 2 from the node leads to upstream switch 200(2,3) connecting to destination node 820(12).

Switch 200(3, 4) connects to nodes 820 of indices 2, 9, and 11, each having a path traversing one switch to destination node 820(12). The routing arrays of nodes 820 of indices 2 and 11 indicate that channels of indices 5 and 0 lead to upstream switches (in switch groups of indices 5 and 0, respectively) connecting to destination node 820(12).

Switch 200(4, 0) connects to nodes 820 of indices 0, 9, and 13, each having a path traversing one switch to destination node 820(12). The routing arrays (FIG. 71) of nodes 820 of indices 0 and 13 indicate that channels of indices 1 and 0 lead to upstream switches (in switch groups of indices 1 and 0, respectively) connecting to destination node 820 (12).

Switch 200(5, 4) connects to nodes 820 of indices 4, 9, and 14, each having a path traversing one switch to destination node 820(12). The routing arrays of nodes 820 of indices 4 and 14 indicate that channels of indices 4 and 0 lead to upstream switches (in switch groups of indices 4 and 0, respectively) connecting to destination node 820(12).

The compound paths from each node to each other node may likewise be determined. FIG. 78 also illustrates compound routes from node 820(9) to node 820(6) for a switching system configuration of m=5, $\mu$=3, and G=6. The total number of compound paths is $\mu \times m-2=13$.

FIG. 79 illustrates all compound paths from an originating node 820(9) to a destination node 820(12) for a switching system configuration of m=5, $\mu$=5, and G=6. The total number of compound paths is $\mu \times m-2=23$. As illustrated in FIG. 70, node 820(9) connects to switches of indices (0, 1), (1, 2), (2, 3), (3, 4), (4, 0), and (5, 4). Node 820(12) connects to switches (0, 2), (1, 0), (2, 3), (3, 1), (4, 4), and (5, 2). In a contiguous switching system, each directed node pair may be interconnected through a path traversing only one switch.

Switch (0, 1) connects to nodes 820 of indices 5, 6, 7, 8, and 9. Each of nodes 820 of indices 5, 6, 7, and 8 has a path traversing one switch to destination node 820(12). The routing array of node 820(5) indicates that a channel of index 3 leads to an upstream switch (of switch group 3) connecting directly to destination node 820(12). The routing arrays of nodes 820 of indices 6, 7, and 8 indicate that channels of indices 1, 5, and 4, respectively lead to upstream switches (in switch groups of indices 1, 5, and 4) connecting to destination node 820(12).

Switch (1, 2) connects to nodes 820 of indices 3, 9, 10, 16, and 22, each having a path traversing one switch to destination node 820(12). The routing arrays of nodes 820 of indices 3, 10, 16, and 22 indicate that channels of indices 3, 0, 4, and 5, respectively lead to upstream switches (in switch groups of indices 3, 0, 4, and 5) connecting to destination node 820(12).

Switch (2, 3) connects to nodes 820 of indices 1, 9, 12, 15, and 23, each having a path traversing one switch to destination node 820(12). Switch 200(2, 3) interconnects the originating and terminating. In addition to the short path, switch 200(2, 3) may be traversed twice to provide a compound path. The routing arrays of each of nodes 820 of indices 1, 15, and 23 indicate that respective channels of index 2 lead to an upstream switch (switch 200(2,3)) connecting to destination node 820(12).

Switch (3, 4) connects to nodes 820 of indices 2, 9, 11, 18, and 20, each having a path traversing one switch to destination node 820(12). The routing arrays of nodes 820 of indices 2, 11, 18, and 20 indicate that channels of indices 5, 0, 1, and 4 lead to upstream switches (in switch groups of indices 5, 0, 1, and 4, respectively) connecting to destination node 820(12).

Switch (4, 0) connects to nodes 820 of indices 0, 9, 13, 17, and 21, each having a path traversing one switch to destination node 820(12). The routing arrays of nodes 820 of indices 0, 13, 17, and 21 indicate that channels of indices 1, 0, 5, and 3 lead to upstream switches (in switch groups of indices 1, 0, 5, and 3, respectively) connecting to destination node 820(12).

Switch (5, 4) connects to nodes 820 of indices 4, 9, 14, 19, and 24, each having a path traversing one switch to destination node 820(12). The routing arrays of nodes 820 of indices 4, 14, 19, and 24 indicate that channels of indices 4, 0, 3, and 1 lead to upstream switches (in switch groups of indices 4, 0, 3, and 1, respectively) connecting to destination node 820(12).

The compound paths from each node to each other node may likewise be determined. FIG. 80 illustrates compound routes from node 820(9) to node 820(6) for a switching system configuration of m=5, $\mu$=5, and G=6. The total number of compound paths is $\mu \times m-2=23$.

Switching-System Coverage and Access Capacity

As defined above, a "switching-system order", denoted G, is the number of switch groups of a switching system, which is the maximum number of switches to which a node connects. The minimum switching-system order is two and the maximum switching-system order is (m+1), where m is the upper bound of the number of dual ports per switch excluding any ports connected to controllers; thus, $2 \leq G \leq (m+1)$; a dual port comprises an input port and an output port. A "contiguous switching system" has a switching-system order G=(m+1). Consequently, each node is adjacent to each other node in one of the node formations, hence the label "contiguous".

In a contiguous switching system, whether partially populated or fully populated, a selected formation has a number, $\mu$, of node sets, $2 \leq \mu \leq m$, each node set of which containing m nodes, while each other formation has m node sets each of which containing $\mu$ nodes. The nodes of a node set are interconnected through a respective switch. The total number of nodes, which defines the "coverage" of the switching system, is $\mu \times m$. Each node is adjacent to (m−1) nodes in the selected formation, and is adjacent to ($\mu$−1) nodes in each of the other m formations. Thus, each node is adjacent to (m−1)+m×($\mu$−1) nodes, which is ($\mu \times m$−1), i.e., each node is adjacent to each other node of the entire switching system. There is one topologically-short path, traversing a single switch, and ($\mu \times m$−2) compound paths, each traversing two switches and an intermediate node, from each node to each other node.

In a non-contiguous switching system, whether partially populated or fully populated, the number G of formations is in the range $2 \leq G \leq m$. Each node is adjacent to some other nodes and distant from the remaining nodes. In a fully populated non-contiguous switching system there are G×(G−1) compound paths from any node to any of its distant nodes. In a partially populated non-contiguous switching system, there are at least 2×(G−1) compound paths from any node to any of its distant nodes.

Each node has inner dual ports connecting to switches and outer dual ports connecting to external data sources and data sinks. In a switching system of order G, each node has G inner dual ports, one to a switch in each switch group, and a number, Q, of outer dual ports. To account for the portion of data that may be routed through compound paths, the number, Q, of outer dual ports per node is preferably selected to be smaller than G. The access capacity per node is Q×ρ, where ρ is the input flow rate or output flow rate per outer dual port of a node (10 or 20 Gigabits/second, for example).

The selection of a contiguous or non-contiguous configuration depends largely on the intended function of the switching system. A contiguous switching system is preferred in applications requiring small switching delays while a non-contiguous switching system may be preferred for use as a network of very wide coverage. In a geographically distributed switching system, the propagation delay from one node to another may be orders of magnitude higher than typical switching delays.

A contiguous switching system enables part of the total incoming data from external sources to be routed through topologically short paths, each traversing one switch hence experiencing lower delays in comparison with delays experienced by data routed through compound paths. A contiguous switching system is therefore suitable for use as a data center. With m=127 and μ=8, for example, a partially-populated contiguous switching system may start with a coverage of μ×m nodes (1016 nodes) each node having 128 (G=m+1=128) inner dual ports and 64 outer dual ports (Q=64). With p=10 Gigabits/second, for example, the access capacity per node would be 640 gigabits/second and the access capacity of the entire switching system would be approximately 650 Terabits/second. The coverage may gradually grow to $m^2$ nodes (16129 nodes), hence an access capacity exceeding 10 Petabits/second.

In addition to the reduced switching delay, a contiguous switching system has the advantage of using less switching resources in comparison with a non-contiguous switching system. Thus, the ratio of the number Q of outer dual ports and the number G of inner dual ports can be increased.

A non-contiguous switching system enables deployment of nodes of relatively small dimensions. With m=997 and μ=20, for example, a partially-populated non-contiguous switching system may start with a coverage of μ×m nodes (19940 nodes) each node having 8 (G=8) inner dual ports and 4 outer dual ports (Q=4). With ρ=10 Gigabits/second, for example, the access capacity per node would be 40 gigabits/second and the access capacity of the entire switching system would be 797.6 Terabits/second. The coverage may gradually grow to $m^2$ nodes (994009 nodes), with a total access capacity exceeding 39 Petabits/second.

An advantage of using a node of a relatively small dimension is that multiple nodes may be integrated to share a common switching mechanism and presented to external data sources and data sinks as a single node. For example, with a standardized node dimension of 12 dual ports (4 outer dual ports and 8 inner dual ports), a node of a dimension of 48 dual ports (16 outer dual ports and 48 inner dual ports) may be presented to switches of the switching system as four standard nodes and presented to external data sources and sinks as a single node.

The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A contiguous switching system comprising:
a plurality of unjoined switches, arranged into a plurality of switch groups comprising:
  a leading switch group comprising a first number of switches exceeding two; and
  a second number, at least equal to said first number, of succeeding switch groups, each succeeding switch group comprising a number of switches equal to said second number;
and
a plurality of nodes, each node connecting to a dual port of one switch of said leading switch group and a dual port of one switch of said each succeeding switch group so that:
  each of the switches of said leading switch group connects to a number of nodes equal to said second number;
  each of the switches of said each succeeding switch group connects to a number of nodes equal to said first number;
and
  a first set of nodes connecting to any switch of said plurality of unjoined switches and a second set of nodes connecting to any other switch of said plurality of unjoined switches have at most one node in common;
said plurality of unjoined switches establishing for each node pair a respective path traversing only one switch;
thereby the switching system supports a total number of nodes determined as the first number times the second number.

2. The contiguous switching system of claim 1 wherein each node of at least three nodes of said plurality of nodes connects to an external network element through at least one dual channel.

3. The contiguous switching system of claim 1 wherein each switch of said plurality of unjoined switches comprises a respective switch controller configured to:
maintain identifiers of nodes connected to said each switch; and
maintain descriptors of at least one route from said each switch to each distant node of said each switch, a distant node being a node connecting to any other switch of said plurality of switches.

4. A method of switching data among a plurality of nodes comprising:
arranging a plurality of unjoined switches into:
  a leading switch group comprising a first number of switches exceeding two;
and
  a second number, at least equal to said first number, of succeeding switch groups each succeeding switch group comprising a number of switches equal to said second number;
employing a processor to determine a connectivity pattern so that:
  each of the switches of said leading switch group connects to a number of nodes equal to said second number;

each of the switches of said each succeeding switch group connects to a number of nodes equal to said first number;
and
a first set of nodes connecting to any switch of said plurality of unjoined switches and a second set of nodes connecting to any other switch of said plurality of unjoined switches have at most one node in common;
connecting each node of said plurality of nodes to a dual port of one switch in said leading switch group and a dual port of one switch of said each succeeding switch group according to said connectivity pattern;
and
establishing for each node pair a respective path traversing only one switch;
thereby synthesizing a contiguous switching system supporting a total number of nodes determined as the first number times the second number.

5. The method of claim 4 further comprising configuring a switch controller of a first switch of said plurality of unjoined switches to route data from an originating node connecting to said first switch to a destination node connecting to a second switch of said plurality of unjoined switches through an intermediate node connecting to said first switch and said second switch.

6. The method of claim 5 further comprising configuring a node controller of said originating node to cyclically select said first switch from a set of switches to which said originating node connects.

7. The method of claim 5 further comprising configuring a node controller of said originating node to select said first switch from a set of switches to which said originating node connects according to vacancy of channels connecting said originating node to said set of switches.

8. The method of claim 4 further comprising selecting said first number and said second number so that the product of said first number and said second number at least equals a preselected number of nodes.

9. A contiguous switching system comprising:
a plurality of unjoined switches; and
a plurality of nodes arranged into:
a plurality of leading sets of nodes comprising a first number exceeding two of leading sets of nodes, each leading set of nodes comprising a second number of nodes, at least equal to said first number, coupled to dual ports of a respective switch; and
a number, equal to said second number, of succeeding formations, each succeeding formation comprising a number of succeeding sets of nodes equal to said second number, each succeeding set of nodes comprising a number of nodes, equal to said first number, coupled to dual ports of a respective switch;
wherein a first set of nodes connecting to any switch of said plurality of unjoined switches and a second set of nodes connecting to any other switch of said plurality of unjoined switches have at most one node in common;
said plurality of unjoined switches establishing for each node pair a respective path traversing only one switch;
thereby the switching system supports a total number of nodes determined as the first number times the second number.

10. The contiguous switching system of claim 9 wherein each switch of said plurality of unjoined switches comprises a respective switch controller having a respective processor, said each switch having a dedicated time-limited control path from a node controller of each node to which said each switch connects to said respective switch controller and a dedicated time-limited control path from said respective switch controller to said node controller.

11. The contiguous switching system of claim 9 wherein each node of said plurality of nodes comprises a plurality of dual ports divided into:
a number of inner ports, each inner port connecting to a switch of said plurality of switches; and
a number of outer ports connecting to external network elements;
and wherein said respective node controller is configured to track output vacancy of each dual port of said each node.

12. The contiguous switching system of claim 9 wherein each switch of said plurality of unjoined switches comprises a respective switch controller configured to:
maintain a record of vacancy of output ports of said each switch; and
maintain a routing table identifying routes from said each switch to each node of said plurality of nodes.

13. The contiguous switching system of claim 12 wherein said respective switch controller is configured to schedule transfer of data from a first node to a second node, both said first node and said second node connecting to said each switch, through at least one of:
a simple path from said first node traversing said respective switch to said second node; and
a compound path traversing said each switch to any intermediate node connecting to said each switch then traversing said each switch again to said second node.

14. The contiguous switching system of claim 12 wherein said respective switch controller is configured to schedule transfer of data over a compound path from a first node connecting to said each switch to a distant second node connecting to any other switch of said plurality of switches, said compound path traversing said each switch to a node connecting to both said each switch and said any other switch.

* * * * *